US012699833B2

(12) United States Patent
Irissou et al.

(10) Patent No.: US 12,699,833 B2
(45) Date of Patent: Aug. 4, 2026

(54) SYSTEMS AND METHODS FOR OBFUSCATING A CIRCUIT DESIGN

(71) Applicant: efabless corporation, San Jose, CA (US)

(72) Inventors: Bertrand Irissou, San Jose, CA (US); John M. Hughes, Hartford, CT (US); Lucio Lanza, Palo Alto, CA (US); Mohamed K. Kassem, Carlsbad, CA (US); Michael S. Wishart, Hillsborough, CA (US); Rajeev Srivastava, Austin, TX (US); Risto Bell, San Jose, CA (US); Robert Timothy Edwards, Poolesville, MD (US); Sherif Eid, Sunnyvale, CA (US); Greg P. Shaurette, Tahoe City, CA (US)

(73) Assignee: Umbralogic Technologies LLC, San Carlos, CA (US)

( * ) Notice: Subject to any disclaimer, the term of this patent is extended or adjusted under 35 U.S.C. 154(b) by 993 days.

(21) Appl. No.: 17/745,814

(22) Filed: May 16, 2022

(65) Prior Publication Data

US 2022/0277126 A1     Sep. 1, 2022

Related U.S. Application Data

(63) Continuation of application No. 17/493,576, filed on Oct. 4, 2021, now Pat. No. 11,775,722, which is a
(Continued)

(51) Int. Cl.
*G06F 30/398*          (2020.01)
*G06F 30/30*          (2020.01)
(Continued)

(52) U.S. Cl.
CPC ........... *G06F 30/398* (2020.01); *G06F 30/30* (2020.01); *G06F 30/33* (2020.01);
(Continued)

(58) Field of Classification Search
CPC ...... G06F 30/39; G06F 30/392; G06F 30/367; G06F 30/398; G06F 30/33;
(Continued)

(56) References Cited

U.S. PATENT DOCUMENTS 10,423,748 B2 * 9/2019 Irissou .................... G06F 30/30
10,437,953 B2 * 10/2019 Irissou .................... G06F 30/33
(Continued)

*Primary Examiner* — Phallaka Kik
(74) *Attorney, Agent, or Firm* — Eric Kelly

(57) ABSTRACT

Systems and methods for obfuscating a circuit design are described. One of the methods includes receiving the circuit design from a user computing device. The circuit design includes a plurality of circuit components. The method further includes obfuscating each of the circuit components by transforming layout features associated with the circuit design into a generic layout feature representation. The generic layout feature representation excludes scaled representations of the layout features. The method also includes generating a visual representation of the obfuscated designs. Each of the obfuscated designs has an input port and an output port. The method further includes enabling placement of the obfuscated designs and routing between the input ports and the output ports of the obfuscated designs. The method includes generating an obfuscated integrated circuit design having a master input port, a master output port, the obfuscated designs, and the routing between the obfuscated designs.

19 Claims, 78 Drawing Sheets

Related U.S. Application Data continuation of application No. 16/879,045, filed on May 20, 2020, now Pat. No. 11,301,609, which is a continuation of application No. 16/564,536, filed on Sep. 9, 2019, now Pat. No. 10,671,700, which is a continuation of application No. 15/633,412, filed on Jun. 26, 2017, now Pat. No. 10,423,748.

(60) Provisional application No. 62/359,858, filed on Jul. 8, 2016.

(51) Int. Cl.

| | | |
|---|---|---|
| *G06F 30/33* | (2020.01) | |
| *G06F 30/3308* | (2020.01) | |
| *G06F 30/3323* | (2020.01) | |
| *G06F 30/367* | (2020.01) | |
| *G06F 30/39* | (2020.01) | |
| *G06F 30/392* | (2020.01) | |
| *H10W 42/40* | (2026.01) | |
| *G06F 119/18* | (2020.01) | |

(52) U.S. Cl.

CPC ...... *G06F 30/3308* (2020.01); *G06F 30/3323* (2020.01); *G06F 30/367* (2020.01); *G06F 30/39* (2020.01); *G06F 30/392* (2020.01); *H10W 42/40* (2026.01); *G06F 2119/18* (2020.01)

(58) Field of Classification Search

CPC .... G06F 30/3323; G06F 30/30; G06F 30/327; G06F 30/3308; G06F 2119/18; H10W 42/40

USPC ........ 716/119, 111, 136, 104, 106, 118, 126, 716/138; 703/15

See application file for complete search history.

(56) References Cited

U.S. PATENT DOCUMENTS

| | | | | |
|---|---|---|---|---|
| 10,452,802 | B2 * | 10/2019 | Irissou | ................. G06F 30/392 |
| 10,671,700 | B2 * | 6/2020 | Irissou | ............... G06F 30/3323 |
| 11,182,526 | B2 * | 11/2021 | Irissou | .................. G06F 30/39 |
| 11,301,609 | B2 * | 4/2022 | Irissou | .............. G06F 30/3308 |
| 11,748,541 | B2 * | 9/2023 | Irissou | .................. G06F 30/33 |
| | | | | 716/111 |
| 2007/0174030 | A1 * | 7/2007 | Yun | ....................... G06F 30/367 |
| | | | | 703/11 |
| 2008/0222581 | A1 * | 9/2008 | Banerjee | ............. G06Q 50/184 |
| | | | | 716/136 |
| 2015/0317426 | A1 * | 11/2015 | Song | ................... G06F 30/398 |
| | | | | 716/131 |
| 2022/0277126 | A1 * | 9/2022 | Irissou | ............... G06F 30/3323 |

\* cited by examiner

Customer Design Process
1. CUSTOMERS create a spec and post on a website hosted by DES
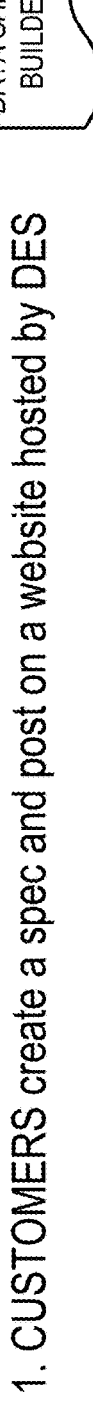
DATA SHEET BUILDER
Searchable Storage
Web address
2. COMMUNITY searches for projects; accepts the request
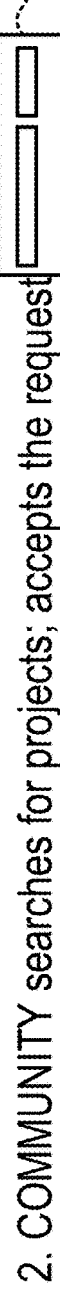
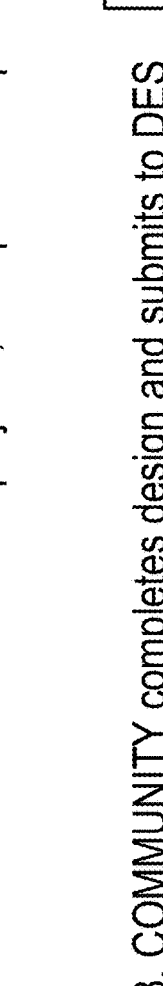
MULTIPLE SOLUTIONS
3. COMMUNITY completes design and submits to DES
Web address
4. DES automatically verifies designs
5. CUSTOMERS accept design   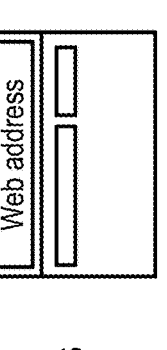 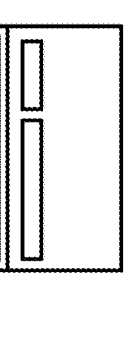 COMMUNITY gets paid
FIG. 1C-1

No NDA

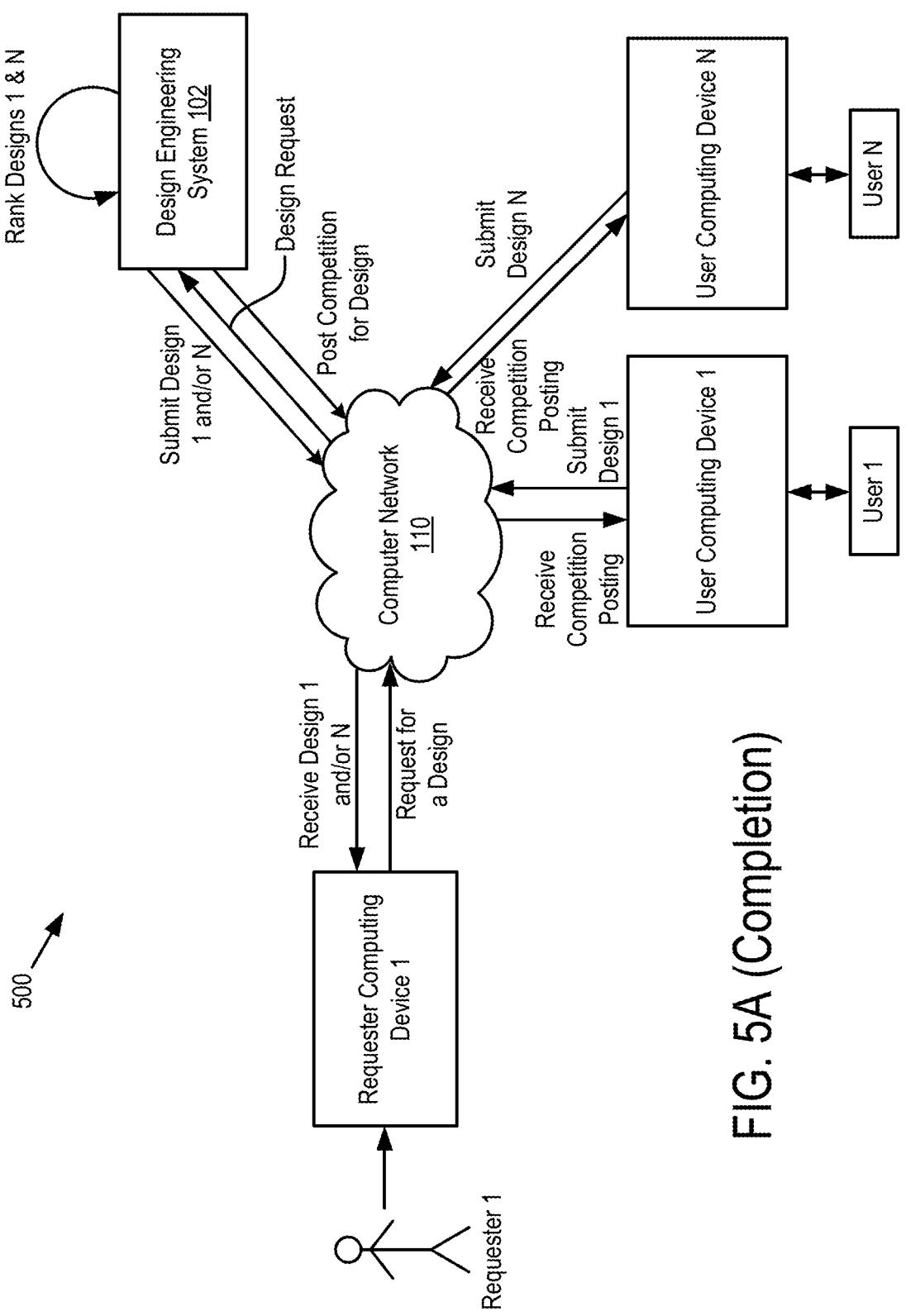
FIG. 5A (Completion)

700

Crowdsourced Development Process

1st Design
2nd Design
3rd Design
4th Design

600

Traditional Engineering Process

1st Design
2nd Design
3rd Design
4th Design

Electrical Specifications: Unless otherwise noted, $V_{IN} = V_{OUT(MAX)} + V_{DROPOUT(MAX)}$ (Note 1), $V_R = 1.8V$ for Adjustable Output, $I_{OUT} = 1$ mA, $C_{IN} = C_{OUT} = 4.7$ µF (Ceramic), $T_A = +25°C$. Boldface type applied for junction temperatures, $T_J$ (Note 7) of -40°C to +125°C

| Parameters | Sym | Min | Typ | Max | Units | Conditions |
|---|---|---|---|---|---|---|
| Input Operating Voltage | $V_{IN}$ | 2.3 | | 6.0 | V | Note 1 |
| Input Quiescent Current | $I_Q$ | — | 120 | 220 | µA | $I_L = 0$ mA, $V_{IN} =$ Note 1, $V_{OUT} = 0.8V$ to $5.0V$ |
| Input Quiescent Current for SHDN Mode | $\overline{SHDN}$ | — | 0.1 | 3 | µA | $\overline{SHDN} = GND$ |
| Maximum Output Current | $I_{OUT}$ | 1.5 | — | — | A | $VIN = 2.3V$ to $6.0V$, $VR = 0.8V$ to $5.0V$, Note 1 |
| Line Regulation | $\Delta V_{OUT}/(V_{OUT}x\Delta V_{IN})$ | — | 0.05 | 0.16 | %/V | (Note 1) $\leq V_{IN} \leq 6V$ |
| Load Regulation | $\Delta V_{OUT}/\Delta V_{OUT}$ | -1.0 | ±0.5 | 1.0 | % | $I_{OUT} = 1$ mA to $1.5A$, $V_{IN} =$ Note 1, (Note 4) |
| Output Short Circuit Current | $I_{OUT\_SC}$ | — | 2.2 | — | A | $V_{IN} =$ Note 1, $R_{LOAD} < 0.1\Omega$ Peak Current |
| Adjust Pin Characteristics (Adjustable Output Only) | | | | | | |
| Adjust Pin Reference Voltage | $V_{ADJ}$ | 0.402 | 0.410 | 0.418 | V | $V_{IN} = 2.3V$ to $V_{IN} = 6.0V$, $I_{OUT} = 1$ mA |
| Adjust Pin Leakage Current | $I_{ADJ}$ | -10 | ±0.01 | +10 | nA | $V_{IN} = 6.0V$, $V_{ADJ} = 0V$ to $6V$ |
| Adjust Temperature Coefficient | $TCV_{OUT}$ | — | 40 | — | ppm/°C | Note 3 |
| Fixed-Output Characteristics (Fixed Output Only) | | | | | | |
| Voltage Regulation | $V_{OUT}$ | $V_R$-2.5% | $V_R\pm$ 0.5% | $V_R$+2.5% | V | Note 2 |

1: The minimum $V_{IN}$ must meet two conditions: $V_{IN} \geq 2.3V$ and $V_{IN} \geq V_{OUT(MAX)} + V_{DROPOUT(MAX)}$.

2: $V_R$ is the nominal regulator output voltage for the fixed cases. $V_R = 1.2V$, $1.8V$, etc. $V_R$ is the desired set point output voltage for the adjustable cases. $V_R = V_{ADJ} * ((R_1/R_2)+1)$.

3: $TCV_{OUT} = (V_{OUT-HIGH} - V_{OUT-LOW}) *10^6 / (V_R * \Delta Temperature)$. $V_{OUT-HIGH}$ is the highest voltage measured over the temperature range. $V_{OUT-LOW}$ is the lowest voltage measured over the temperature range.

4: Load regulation is measured at a constant junction temperature using low duty-cycle pulse testing. Load regulation is tested over a load range from 1 mA to the maximum specified output current.

5: Dropout voltage is defined as the input-to-output voltage differential at which the output voltage drops 2% below its nominal value that was measured with an input voltage of $V_{OUT} = V_R + V_{DROPOUT(MAX)}$.

A/D CONVERTERS — FLASH, PIPELINE, OVER-SAMPLING

D/A CONVERTER

REGULATORS — LDO — GP, LOW NOISE

A/D CONVERTERS

D/A CONVERTER

REGULATORS

Include Acceptance Criteria Testbench

FIG. 10

1200
CUSTOMER/Requester 1
Startups, Product
Companies & SMB
DESIGN REQUEST
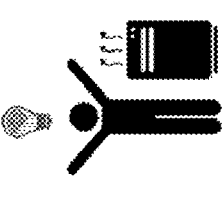
"is this what you
are looking for?"
COMMUNITY
Designers, Developers,
Testers/Customers & Marketers
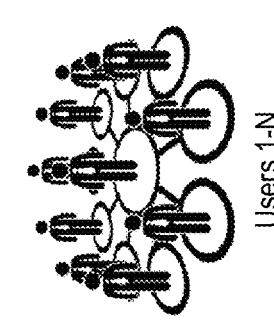
Users 1-N
FIG. 12

VERIFICATION AND VALIDATION PROCESS

① Foundry requests for more IP for a process, or customer requests IP.

② DES creates datasheet (the "template").

Data Sheet Generator

Datasheet viewed on web

This is created on a website having a web address

From 18A-2

To 1602 of

③ Methods are specified for the design characterization:

Methods may be generic—auto-generated, no additional work needed.

Methods may be design-specific—schematics requested. Generally, each design will have a unique set of pins, and so will use a unique schematic drawing for each critical characterization measurement (electrical parameter).

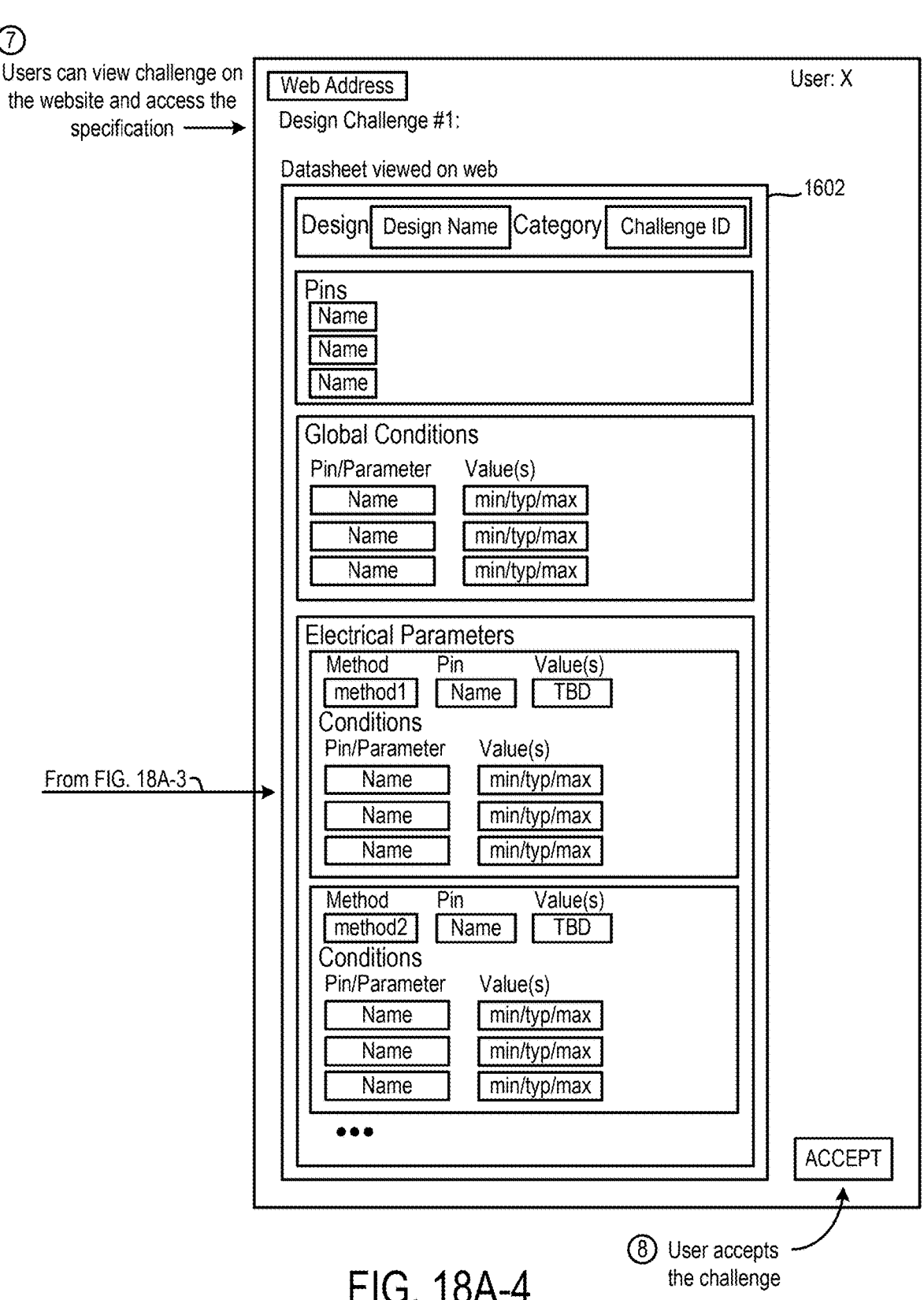

⑦ Users can view challenge on the website and access the specification ⟶

Web Address

Design Challenge #1:

Datasheet viewed on web

1602

| Design | Design Name | Category | Challenge ID |

Pins
Name
Name
Name

Global Conditions

| Pin/Parameter | Value(s) |
| Name | min/typ/max |
| Name | min/typ/max |
| Name | min/typ/max |

Electrical Parameters

| Method | Pin | Value(s) |
| method1 | Name | TBD |

Conditions

| Pin/Parameter | Value(s) |
| Name | min/typ/max |
| Name | min/typ/max |
| Name | min/typ/max |

From FIG. 18A-3 ⟶

| Method | Pin | Value(s) |
| method2 | Name | TBD |

Conditions

| Pin/Parameter | Value(s) |
| Name | min/typ/max |
| Name | min/typ/max |
| Name | min/typ/max |

• • •

ACCEPT

User: X

⑧ User accepts the challenge

FIG. 18A-4

⑩ User creates IP circuit design on the Workspace App.

Designer Workspace

User: X

1830

1806

1602

DUT

Out

Vdd

Vdd

Vss

In

C
1.0pF

R
1.0kΩ

Vdd

DUT

Vss out in

V
5V

V spice: .option temp ${TEMPERATURE}
spice: .tran ${STOPTIME} ${STEPTIME}

Datasheet as JSON file.

Design | Design Name | Category | Challenge ID

Pins

Name

Name

Name

Global Conditions

Pin/Parameter | Value(s)

Name | min/typ/max

Name | min/typ/max

Name | min/typ/max

Electrical Parameters

Method | Pin | Value(s)

method1 | Name | TBD

Conditions

Pin/Parameter | Value(s)

Name | min/typ/max

Name | min/typ/max

Name | min/typ/max

To Designer
Workspace of
FIG. 18B-2

FIG. 18B-1

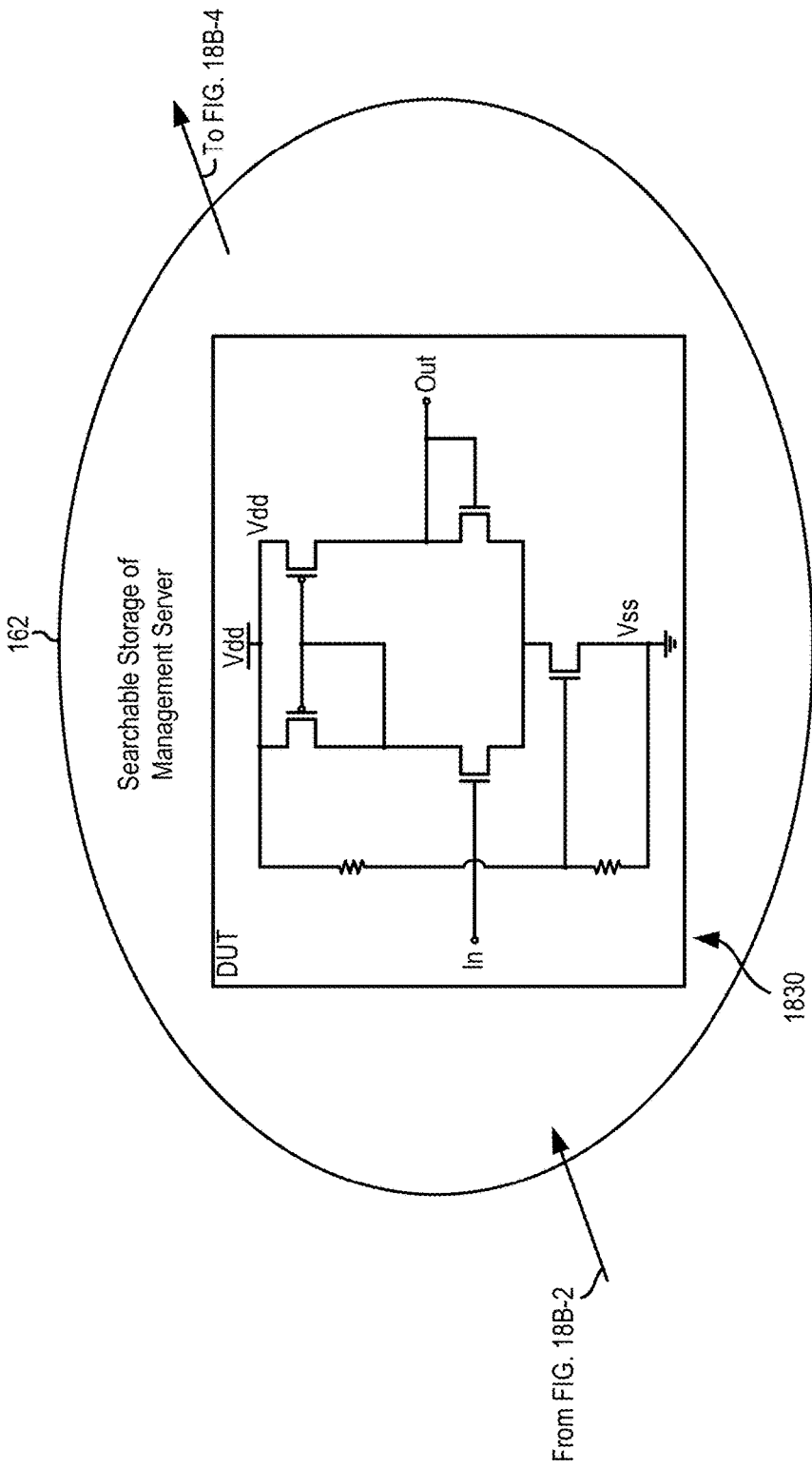

Searchable Storage of
Management Server

From FIG. 18B-2

1830

⑫ Once satisfied with the design, user uploads completed design to the
searchable storage. Local files used for simulation are not part of the transfer.

Schematic gets tarballed and sent to the searchable storage; a JSON file with
user ID information and a reference to the file goes in the searchable storage.

FIG. 18B-3

⑬ Other users may or may not see the design on the website depending on whether the designer has marked the design as public or private.

(14) User views design and template on Searchable Storage and makes the final call to do the official characterization.

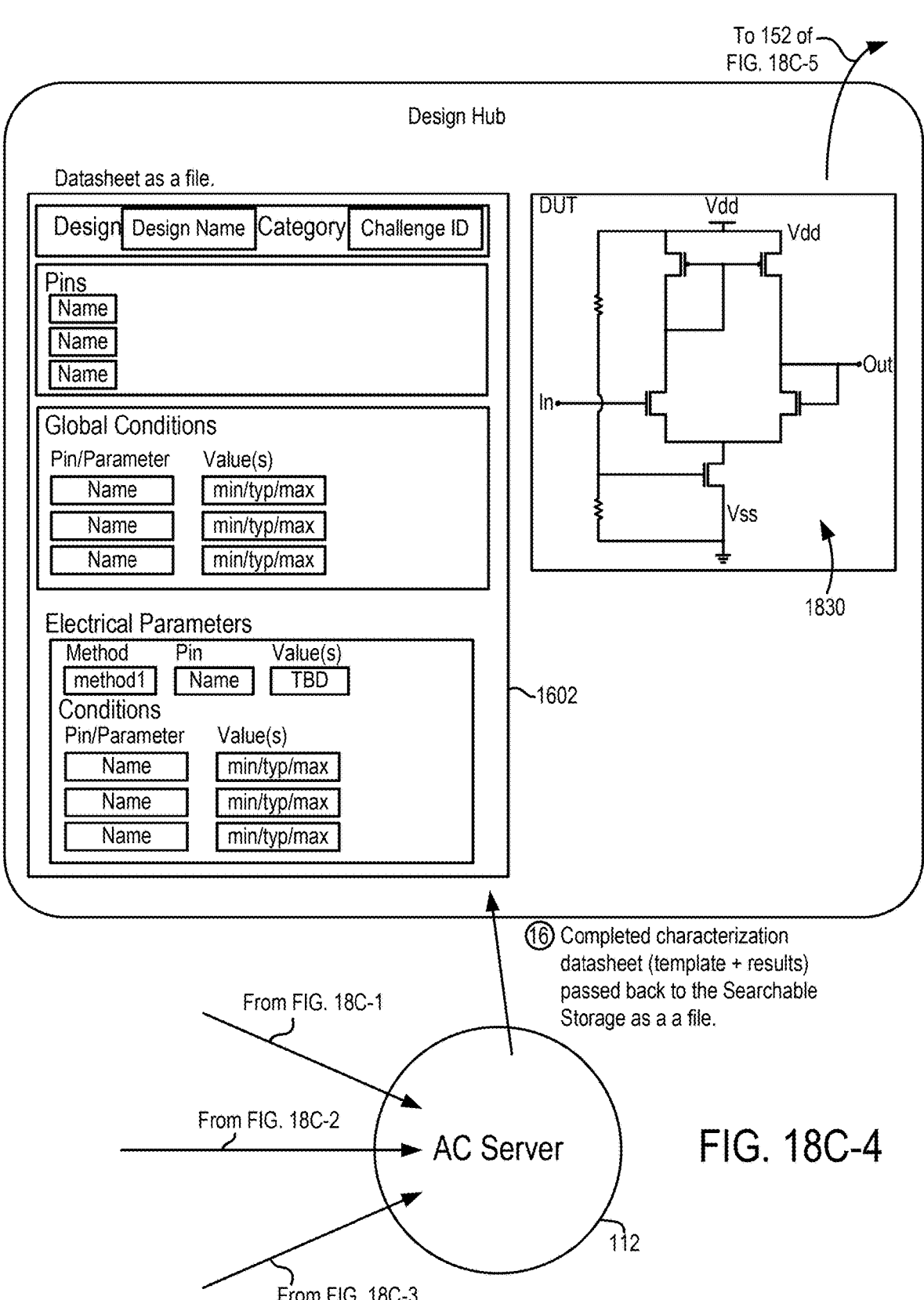

To 152 of FIG. 18C-5

Design Hub

Datasheet as a file.

Design | Design Name | Category | Challenge ID

Pins
- Name
- Name
- Name

Global Conditions

| Pin/Parameter | Value(s) |
|---|---|
| Name | min/typ/max |
| Name | min/typ/max |
| Name | min/typ/max |

Electrical Parameters

| Method | Pin | Value(s) |
|---|---|---|
| method1 | Name | TBD |

Conditions

| Pin/Parameter | Value(s) |
|---|---|
| Name | min/typ/max |
| Name | min/typ/max |
| Name | min/typ/max |

~1602

DUT

Vdd

Vdd

Out

In

Vss

1830

⑯ Completed characterization datasheet (template + results) passed back to the Searchable Storage as a a file.

From FIG. 18C-1

From FIG. 18C-2

AC Server

From FIG. 18C-3

Management Server

From FIG. 18C-4

⑰ Design wins challenge and is promoted to the Management Server, where bidding may occur.

1832

Out

Vdd

Vdd

Vss

DUT

1830

In

Datasheet as JSON file.

Design | Design Name | Category | Challenge ID

Pins

Name
Name
Name

Global Conditions

Pin/Parameter    Value(s)

Name    min/typ/max
Name    min/typ/max
Name    min/typ/max

Electrical Parameters

Method   Pin    Value(s)
method1 | Name | TBD

Conditions

Pin/Parameter    Value(s)

Name    min/typ/max
Name    min/typ/max
Name    min/typ/max

From FIG. 18C-5

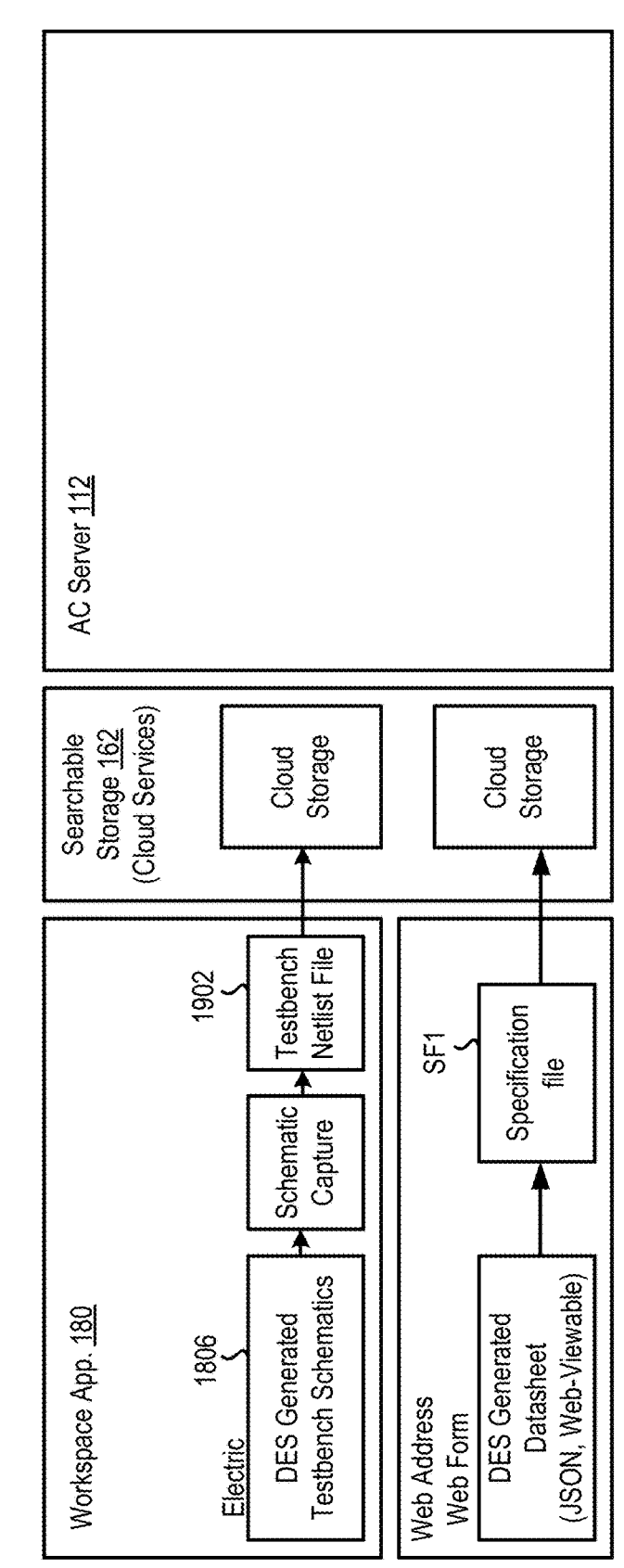

1900

AC Server 112

Searchable Storage 162 (Cloud Services)

Cloud Storage

Cloud Storage

Workspace App. 180

Electric

1806

DES Generated Testbench Schematics

Schematic Capture

1902

Testbench Netlist File

Web Address Web Form

DES Generated Datasheet (JSON, Web-Viewable)

SF1

Specification file

Step 1. DES generates testbench schematics and datasheet forms defining a challenge.
These are placed in cloud storage.
Datasheet forms are viewable by users at web address.
Testbench netlists can be retrieved by the AC server for use in simulations.

FIG. 19A (Characterization/Validation Flow for Design Challenges)

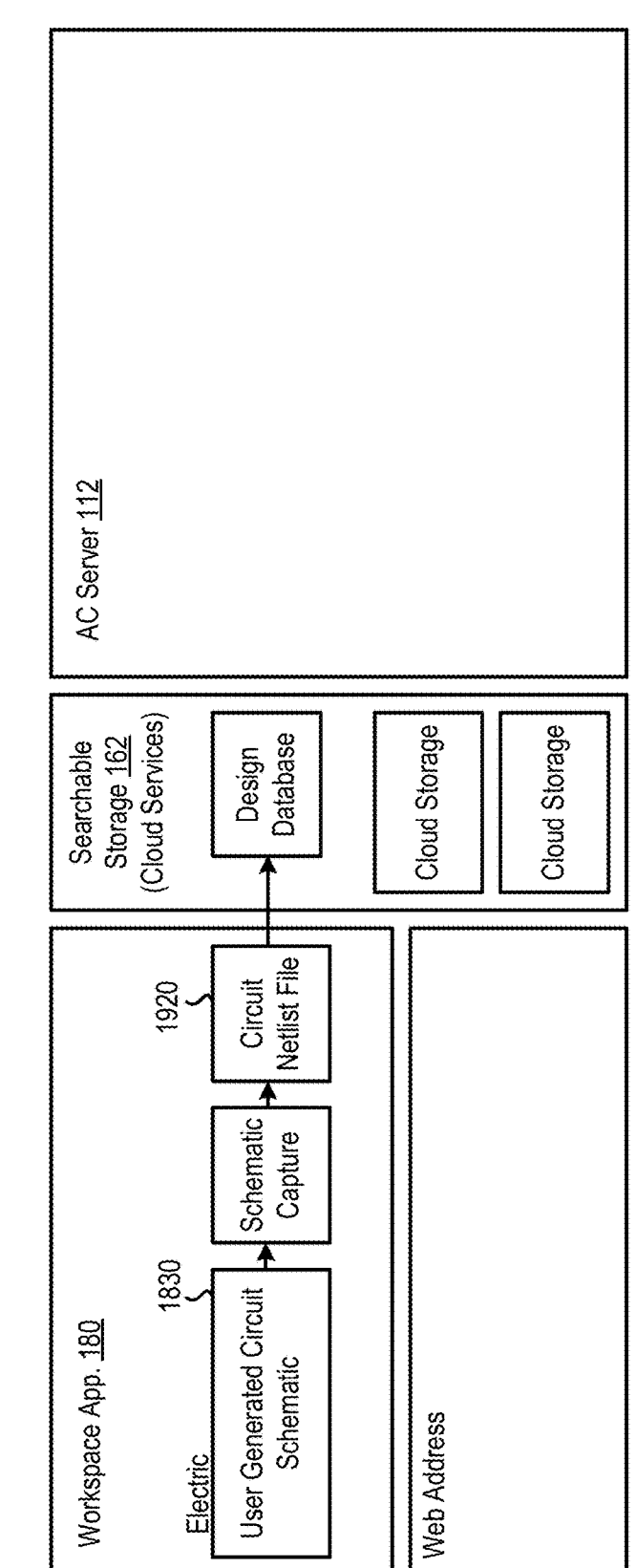

FIG. 19B

(Characterization/Validation Flow for Design Challenges)

Step 2.  User accepts challenge.
User designs circuit in the workspace app design environment, creating schematics with the workspace app.
Designs are saved in cloud storage.
Designer makes use of local simulation tools (e.g., ng-spice, Xspice).
Using the web interface to the Design Hub, user submits design for automatic characterization.

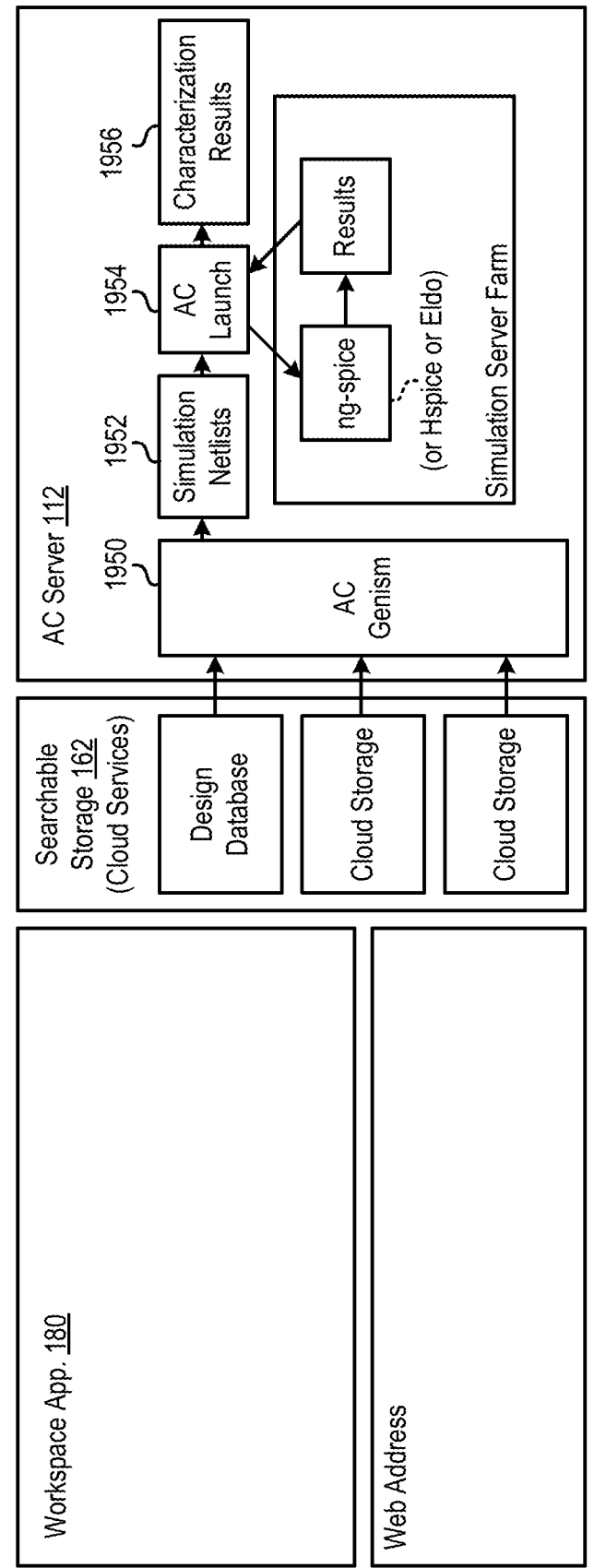

FIG. 19C (Characterization/Validation Flow for Design Challenges)

Step 3.  Design netlist is sent to the AC server along with the template for the challenge and netlists for simulation.
The AC gensim tool generates all the simulation files for the characterization.
The AC launch tool calls the simulator, either locally on the server or distributed among servers in a simulation farm.
The simulation results are collected, analyzed, and the circuit given a score for performance.

(Characterization/Validation Flow for Design Challenges)

Step 4. Characterization results are sent back to the design hub, where they can be viewed as a completed design datasheet. Top designs from the challenge get placed in the searchable storage for access via a web address to be bid upon.

⋮

Electrical Parameters (cont.)

| Displayed Name | Pin | Method | Minimum | Typical | Maximum | Units |
|---|---|---|---|---|---|---|
| VBGP | VBGP | DCVOLTAGE_VBGP | 1.239 | 1.285 | 1.332 | V |

Description:          Penalty per unit:

|  |  |  | 1E6 | 100 | 1E6 |
|---|---|---|---|---|---|

Output reference voltage

Conditions:

| Displayed Name | Pin/Param | Condition | Minimum | Typical | Maximum | Units |
|---|---|---|---|---|---|---|
| $C_L$ | VBGP | CAPACITANCE |  | 10 |  | pF |
|  | VDDA | RISETIME |  | 100 |  | ns |
| VDD | VDDA | VOLTAGE | 2.7 |  | 3.3 | V |
|  |  | Step: | 0.3 | linear | Step Type | |
| TEMP |  | TEMPERATURE | 20 |  | 100 | °C |
|  |  | Step: | 10 | linear | Step Type | |

| Displayed Name | Pin | Method | Minimum | Typical | Maximum | Units |
|---|---|---|---|---|---|---|
| $T_{START}$ | VBGP | RISETIME_VBGP |  | 20 | 60 | µs |

Description:          Penalty per unit:

|  |  |  | 10 | 10 |
|---|---|---|---|---|

Start-up time

Conditions:

| Displayed Name | Pin/Param | Condition | Minimum | Typical | Maximum | Units |
|---|---|---|---|---|---|---|
| $C_L$ | VBGP | CAPACITANCE |  | 10 |  | pF |
| VDDRISE | VDDA | RISETIME | 10 | 100 |  | ns |
|  |  | Step: | 2 | log | Step Type | |

Electrical Parameters (cont.)

| Displayed Name | Pin | Method | Minimum | Typical | Maximum | Units |
|---|---|---|---|---|---|---|
| V$_{NOISE}$ | VBGP | VNOISE_VBGP | | | 20 | µV-rms |

Description:                    Penalty per unit:              | | | 100 |

| Noise at the output terminal |

Conditions:

| Displayed Name | Pin/Param | Condition | Minimum | Typical | Maximum | Units |
|---|---|---|---|---|---|---|
| FMIN | | FMIN | | 0. | | Hz |
| FMAX | | FMAX | | 10 | | kHz |

Physical Parameters

| Displayed Name | Pin/Param | Method | Minimum | Typical | Maximum | Units |
|---|---|---|---|---|---|---|
| Area | | AREA | | | 50000 | µm-sq |
| | | Penalty per unit: | | | 100 | |
| Width | | WIDTH | | | 100 | µm |
| | | Penalty per unit: | | | 0 | |
| Height | | HEIGHT | | | 50 | µm |
| | | Penalty per unit: | | | 0 | |

More notes:

16. "Units" should be a 2-stage selection allowing first the base unit, then the SI modifier, if applicable. Use UTF-8 to show real units such as ° and µ. Some values are unitless, so that should be an option. 3$^{rd}$ stage may be needed for suffixes like "-rms" or "-sq", but they could be part of the base unit since there are very few combinations (V-rms, m-sq).

17. Usually the condition chosen will uniquely determine the base unit type. However, nothing can be pre-determined from a "Method".

FIG. 20D

10. Drop-down selection with ability to add a user-defined entry.

8. Add these  9. Drop-down selection

Global Conditions

| Displayed Name | Pin/Param | Condition | Minimum | Typical | Maximum | Units | Pass/Fail |
|---|---|---|---|---|---|---|---|
| $V_{DD}$ | VDDA | VOLTAGE | | 3 | | V | P |
| | VSSA | VOLTAGE | | 0 | | V | P |
| | EN | VOLTAGE | | 3 | | V | P |
| $R_{LOAD}$ | VBGP | RESISTANCE | | 100 | | MΩ | P |
| $C_L$ | VBGP | CAPACITANCE | | 10 | | pF | P |
| TEMP | | TEMPERATURE | -40 | 30 | 125 | °C | P |
| | | SIGMA | | 3 | | | P |
| | | CORNER | mc | tm | wz | | P |
| $V_{DDRISE}$ | VDDA | RISETIME | | 100 | | ns | P |
| FMIN | | FMIN | | 0.1 | | Hz | P |
| FMAX | | FMAX | | 10 | | kHz | P |

2004

11. Note: "CORNER" may need to be handled separately, as there may be up to nine process corners, and they are the only string values. May need to get list of corners for the process and node, and then select which ones will be used for characterization

Electrical Parameters

12. Drop-down list  13. Selection of methods and testbench schematics

| Displayed Name | Pin | Method | Minimum | Typical | Maximum | Units | Pass/Fail |
|---|---|---|---|---|---|---|---|
| PSRR | VBGP | PSRR_VBGP | | -20 | -15 | dB | P |

Description:

Penalty per unit: | | 100 | 1E6 | | P

Power supply rejection

14. Add these

Conditions:

| Displayed Name | Pin/Param | Condition | Minimum | Typical | Maximum | Units | Step | Step Type | P/F |
|---|---|---|---|---|---|---|---|---|---|
| $C_L$ | VBGP | CAPACITANCE | | 10 | | pF | | | P |
| | VDDA | RISETIME | | 100 | | ns | | | P |
| $V_{DD}$ | VDDA | VOLTAGE | 2.7 | | 3.3 | V | 0.3 | linear | P |
| 15. Add these to each line → Step: | | | 0.3 | linear | Step Type → | | | | P |
| TEMP | | TEMPERATURE | 20 | | 100 | °C | | | P |
| Step: | | | 10 | linear | Step Type | | | | P |

Electrical Parameters (cont.)

| Displayed Name | Pin | Method | Minimum | Typical | Maximum | Units | | Pass/Fail |
|---|---|---|---|---|---|---|---|---|
| VBGP | VBGP | DCVOLTAGE_VBGP | 1.239 | 1.285 | 1.332 | V | | P |
| Description: | | Penalty per unit: | 1E6 | 100 | 1E6 | | | P |

Description:
| Output reference voltage |
|---|

Conditions:

| Displayed Name | Pin/Param | Condition | Minimum | Typical | Maximum | Units | | Pass/Fail |
|---|---|---|---|---|---|---|---|---|
| C_L | VBGP | CAPACITANCE | | 10 | | pF | | P |
| | VDDA | RISETIME | | 100 | | ns | | P |
| VDD | VDDA | VOLTAGE | 2.7 | | 3.3 | V | | P |
| | | Step: | 0.3 | linear | Step Type | | | P |
| TEMP | | TEMPERATURE | 20 | | 100 | °C | | P |
| | | Step: | 10 | linear | Step Type | | | P |

| Displayed Name | Pin | Method | Minimum | Typical | Maximum | Units | | Pass/Fail |
|---|---|---|---|---|---|---|---|---|
| T_START | VBGP | RISETIME_VBGP | | 20 | 60 | μs | | P |
| Description: | | Penalty per unit: | | 10 | 10 | | | P |

Description:
| Start-up time |
|---|

Conditions:

| Displayed Name | Pin/Param | Condition | Minimum | Typical | Maximum | Units | | Pass/Fail |
|---|---|---|---|---|---|---|---|---|
| C_L | VBGP | CAPACITANCE | | 10 | | pF | | P |
| VDDRISE | VDDA | RISETIME | 10 | 100 | | ns | | P |
| | | Step: | 2 | log | Step Type | | | P |

Electrical Parameters (cont.)

| Displayed Name | Pin | Method | Minimum | Typical | Maximum | Units | Pass/Fail |
|---|---|---|---|---|---|---|---|
| V_NOISE | VBGP | VNOISE_VBGP | | | 20 | μV-rms | P |

Description:          Penalty per unit:          100

Noise at the output terminal

Conditions:

| Displayed Name | Pin/Param | Condition | Minimum | Typical | Maximum | Units | Pass/Fail |
|---|---|---|---|---|---|---|---|
| FMIN | | FMIN | | 0. | | Hz | P |
| FMAX | | FMAX | | 10 | | kHz | P |

Physical Parameters

| Displayed Name | Pin/Param | Method | Minimum | Typical | Maximum | Units | Pass/Fail |
|---|---|---|---|---|---|---|---|
| Area | | AREA | | | 50000 | μm-sq | P |
| | | Penalty per unit: | | | 100 | | P |
| Width | | WIDTH | | | 100 | μm | P |
| | | Penalty per unit: | | | 0 | | P |
| Height | | HEIGHT | | | 50 | μm | P |
| | | Penalty per unit: | | | 0 | | P |

More notes:

16. "Units" should be a 2-stage selection allowing first the base unit, then the SI modifier, if applicable. Use UTF-8 to show real units such as ° and μ. Some values are unitless, so that should be an option. 3rd stage may be needed for suffixes like "-rms" or "-sq", but they could be part of the base unit since there are very few combinations (V-rms, m-sq).

17. Usually the condition chosen will uniquely determine the base unit type. However, nothing can be pre-determined from a "Method".

FIG. 20H

Pinout can be automatically generated by knowing the list of pins, types, and directions. Power pins go on top, ground pins go on bottom. Signal inputs go on the left, and signal outputs go on the right. IP name goes in the center. Size everything to fit.

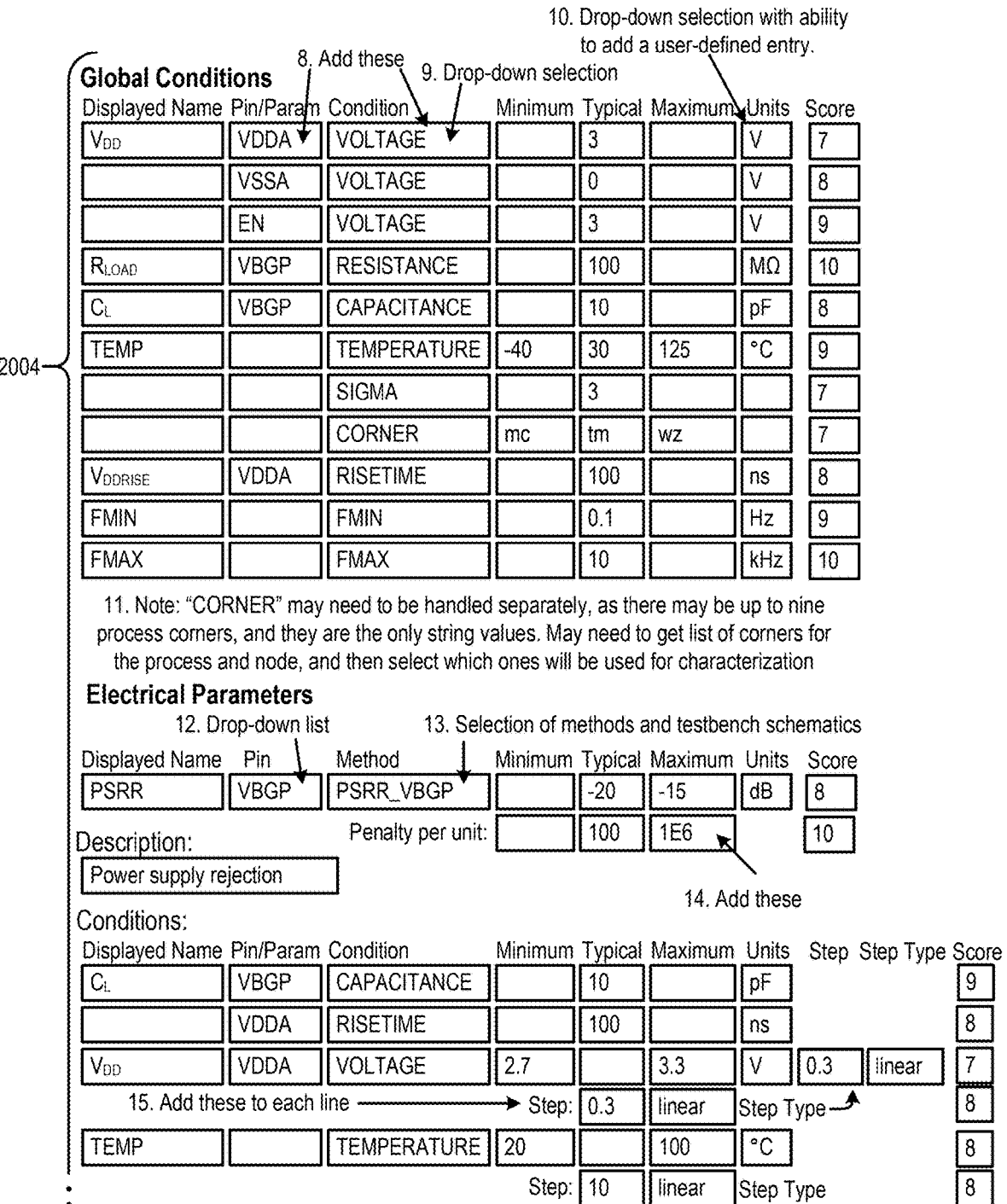

Global Conditions

10. Drop-down selection with ability to add a user-defined entry.

8. Add these
9. Drop-down selection

| Displayed Name | Pin/Param | Condition | Minimum | Typical | Maximum | Units | Score |
|---|---|---|---|---|---|---|---|
| $V_{DD}$ | VDDA | VOLTAGE | | 3 | | V | 7 |
| | VSSA | VOLTAGE | | 0 | | V | 8 |
| | EN | VOLTAGE | | 3 | | V | 9 |
| $R_{LOAD}$ | VBGP | RESISTANCE | | 100 | | MΩ | 10 |
| $C_L$ | VBGP | CAPACITANCE | | 10 | | pF | 8 |
| TEMP | | TEMPERATURE | -40 | 30 | 125 | °C | 9 |
| | | SIGMA | | 3 | | | 7 |
| | | CORNER | mc | tm | wz | | 7 |
| $V_{DDRISE}$ | VDDA | RISETIME | | 100 | | ns | 8 |
| FMIN | | FMIN | | 0.1 | | Hz | 9 |
| FMAX | | FMAX | | 10 | | kHz | 10 |

11. Note: "CORNER" may need to be handled separately, as there may be up to nine process corners, and they are the only string values. May need to get list of corners for the process and node, and then select which ones will be used for characterization

Electrical Parameters

12. Drop-down list      13. Selection of methods and testbench schematics

| Displayed Name | Pin | Method | Minimum | Typical | Maximum | Units | Score |
|---|---|---|---|---|---|---|---|
| PSRR | VBGP | PSRR_VBGP | | -20 | -15 | dB | 8 |

Description:
Power supply rejection

Penalty per unit:

| | | | | 100 | 1E6 | | 10 |

14. Add these

Conditions:

| Displayed Name | Pin/Param | Condition | Minimum | Typical | Maximum | Units | Step | Step Type | Score |
|---|---|---|---|---|---|---|---|---|---|
| $C_L$ | VBGP | CAPACITANCE | | 10 | | pF | | | 9 |
| | VDDA | RISETIME | | 100 | | ns | | | 8 |
| $V_{DD}$ | VDDA | VOLTAGE | 2.7 | | 3.3 | V | 0.3 | linear | 7 |
| 15. Add these to each line → Step: | | | 0.3 | linear | | Step Type | | | 8 |
| TEMP | | TEMPERATURE | 20 | | 100 | °C | | | 8 |
| Step: | | | 10 | linear | | Step Type | | | 8 |

Electrical Parameters (cont.)

| Displayed Name | Pin | Method | Minimum | Typical | Maximum | Units | | Score |
|---|---|---|---|---|---|---|---|---|
| VBGP | VBGP | DCVOLTAGE_VBGP | 1.239 | 1.285 | 1.332 | V | | 8 |
| | | Penalty per unit: | 1E6 | 100 | 1E6 | | | 10 |

Description:

| Output reference voltage |
|---|

Conditions:

| Displayed Name | Pin/Param | Condition | Minimum | Typical | Maximum | Units | | Score |
|---|---|---|---|---|---|---|---|---|
| $C_L$ | VBGP | CAPACITANCE | | 10 | | pF | | 7 |
| | VDDA | RISETIME | | 100 | | ns | | 9 |
| VDD | VDDA | VOLTAGE | 2.7 | | 3.3 | V | | 7 |
| | | | Step: | 0.3 | linear | Step Type | | 8 |
| TEMP | | TEMPERATURE | 20 | | 100 | °C | | 9 |
| | | | Step: | 10 | linear | Step Type | | 10 |

| Displayed Name | Pin | Method | Minimum | Typical | Maximum | Units | | Score |
|---|---|---|---|---|---|---|---|---|
| $T_{START}$ | VBGP | RISETIME_VBGP | | 20 | 60 | µs | | 7 |
| | | Penalty per unit: | | 10 | 10 | | | 10 |

Description:

| Start-up time |
|---|

Conditions:

| Displayed Name | Pin/Param | Condition | Minimum | Typical | Maximum | Units | | Score |
|---|---|---|---|---|---|---|---|---|
| $C_L$ | VBGP | CAPACITANCE | | 10 | | pF | | 8 |
| VDDRISE | VDDA | RISETIME | 10 | 100 | | ns | | 6 |
| | | | Step: | 2 | log | Step Type | | 5 |

Electrical Parameters (cont.)

| Displayed Name | Pin | Method | Minimum | Typical | Maximum | Units | Score |
|---|---|---|---|---|---|---|---|
| $V_{NOISE}$ | VBGP | VNOISE_VBGP | | | 20 | μV-rms | 8 |

Description:

Noise at the output terminal    Penalty per unit: | | | 100 | | 10

Conditions:

| Displayed Name | Pin/Param | Condition | Minimum | Typical | Maximum | Units | Score |
|---|---|---|---|---|---|---|---|
| FMIN | | FMIN | | 0. | | Hz | 9 |
| FMAX | | FMAX | | 10 | | kHz | 10 |

Physical Parameters

| Displayed Name | Pin/Param | Method | Minimum | Typical | Maximum | Units | Score |
|---|---|---|---|---|---|---|---|
| Area | | AREA | | | 50000 | μm-sq | 8 |
| | | Penalty per unit: | | | 100 | | 10 |
| Width | | WIDTH | | | 100 | μm | 7 |
| | | Penalty per unit: | | | 0 | | 10 |
| Height | | HEIGHT | | | 50 | μm | 8 |
| | | Penalty per unit: | | | 0 | | 10 |

More notes:

16. "Units" should be a 2-stage selection allowing first the base unit, then the SI modifier, if applicable. Use UTF-8 to show real units such as ° and μ. Some values are unitless, so that should be an option. 3rd stage may be needed for suffixes like "-rms" or "-sq", but they could be part of the base unit since there are very few combinations (V-rms, m-sq).

17. Usually the condition chosen will uniquely determine the base unit type. However, nothing can be pre-determined from a "Method".

FIG. 20L (Customer Needs)

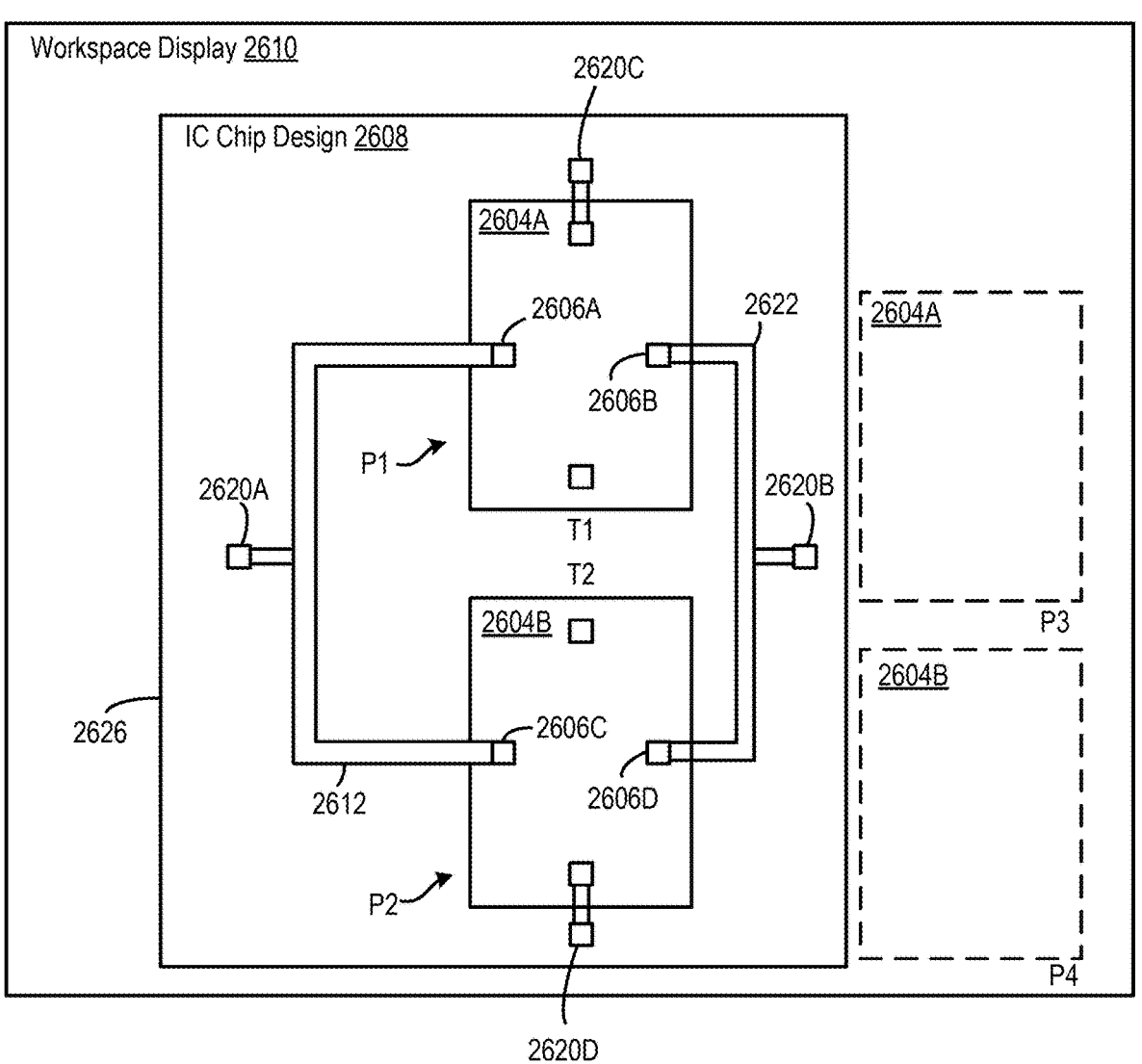
FIG. 26B (Designer places & routes)

Designer is allowed to choose width and length of each transistor, no. of transistors, placement of transistors, and routing between transistors.

- Types on same plane cannot overlap
- GDS layers can be generated from planes but are not visible to a user or requester

Obfuscator Tool Rules

| | User Drawn | Width | Spacing |
|---|---|---|---|
| Well Type (e.g., nwell, pwell, dnwell) | X | X | ✓ |
| Diffusion type 1 (e.g., Bulk p + substrate diffusion) | ✓ | ✓ | ✓ |
| Diffusion type 2 (e.g., nwell n-substrate diffusion) | X | X | ✓ |
| All other diffusion types | X | X | X |
| All poly | X | X | X |
| All metals | ✓ | ✓ | ✓ |
| All vias | ✓ | ✓ | ✓ |
| Active Device (e.g., MOSFET, resistor, capacitor) | X | X | X |

FIG. 32

SYSTEMS AND METHODS FOR OBFUSCATING A CIRCUIT DESIGN

CLAIM OF PRIORITY

The present patent application is a continuation of and claims priority, under 35 U.S.C. § 120, to U.S. nonprovisional application Ser. No. 17/493,576, filed on Oct. 4, 2021, and titled "Systems and Methods for Obfuscating a Circuit Design" which is a continuation of and claims priority, under 35 U.S.C. § 120, to U.S. nonprovisional application Ser. No. 16/879,045, filed on May 20, 2020, titled "Systems and Methods for Obfuscating a Circuit Design", and now issued as U.S. Pat. No. 11,301,609, which is a continuation of and claims priority, under 35 U.S.C. § 120, to U.S. nonprovisional application Ser. No. 16/564,536, filed on Sep. 9, 2019, titled "Systems and Methods for Obfuscating a Circuit Design", and now issued as U.S. Pat. No. 10,671,700, which is a continuation of and claims priority, under 35 U.S.C. § 120, to U.S. nonprovisional application Ser. No. 15/633,412, filed on Jun. 26, 2017, titled "Systems and Methods for Obfuscating a Circuit Design", and now issued as U.S. Pat. No. 10,423,748, which claims priority, under 35 U.S.C. § 119(e), to a U.S. provisional patent application having application No. 62/359,858, filed on Jul. 8, 2016, and titled "Systems and Methods for Engineering Integrated Circuit Design and Development", all of which are incorporated by reference herein in their entirety.

FIELD

The present embodiments relate to systems and methods for engineering circuit design and development, and cloud systems that enable designers to access design tools used for a design of integrated circuits, methods for verifying designs, methods for posting designs to an online design engineering system, systems and methods for obfuscating a circuit design, and methods for generating integrated circuits manufacturing models to interface with fabrication entities. Some embodiments enable designers to generate prototype integrated circuits and validate specifications for the integrated circuits, and the prototype integrated circuits and the specifications are then made available for use in application specific integrated circuits (ASICs), systems on a chip (SOC), and/or for use in other electronic systems, circuits, products or devices.

BACKGROUND

Integrated circuits (ICs) include electronic components built into an electrical connection network on a semiconductor substrate. IC design is usually divided into categories of digital and analog IC design. Digital IC design is used to produce digital electrical circuit components such as microprocessors, field programmable gate arrays (FPGAs), and memory devices. Digital design sometimes focuses on logical correctness, maximizing circuit density, and placing circuits so that clock and timing signals are routed efficiently. Analog IC design represents physical conditions, such as pressure or temperature, or other continuous functions in electronic circuitry, and has many specializations including power IC design, sensor interface IC design and radio frequency (RF) IC design. In some instances, ICs can be designed to include both analog and digital components. A design relies on engineering specifications that are tuned to achieve a specific function, device or application.

However, it is difficult to generate a design of an IC and to fabricate a prototype of the IC. It is in this context that embodiments described in the present disclosure arise.

SUMMARY

Integrated circuit design is typically conducted by design engineers that have knowledge of electrical circuits and circuit functionality. However, to design integrated circuits, designers may not have access to specialized software tools and to fabrication facilities. Once a design for an integrated circuit (IC) is complete and validated by computer modeling using various software tools, the designer should validate the design by fabricating a prototype of the IC on a semiconductor wafer. The software tools generate manufacturing-aware electronic models that should be sent to the fabrication facilities. As noted, the designers do not have access to the fabrication facilities, which fabricates many layers of the IC on a semiconductor wafer. Fabrication of a semiconductor wafer, as is generally known, is performed using specialized tools to perform operations such as, ion implant operations, photolithograph operations, etching operations, deposition operations, cleaning operations, and many more operations. Additionally, designers do not have access to circuit libraries that are designed and/or used by the fabrication facilities. The circuit libraries include specifications for layouts, connections and other rules so that the fabrication facilities can fabricate the IC created by the designer, such as by using cell layouts from a circuit library. Once the IC design is fabricated, the IC design is tested to validate its functionality.

As can be appreciated, designers do not have access to the process of designing and validating ICs, do not have access to sophisticated software tools, do not have access to libraries of fabrication facilities, and do not have access to financial capital to complete the IC design that can be used in a system or device. Designers that have access to these resources are employed by companies that invest heavily in maintaining the latest design tools and have either internal fabrication facilities or have established relationships with one or more fabrication facilities. Although individual designers are able to come up with unique and useful IC designs, they are not generally able to generate IC designs and/or generate prototypes for validating their IC designs outside of a company.

Embodiments of the disclosure provide apparatus, methods and computer programs for developing IC designs, verifying functionality of IC designs before fabrication, generating a prototype of the IC resulting from the design, testing the IC in the form of a prototype, and validating the functionality against a specification. In one embodiment, the process of designing the IC, verifying the design of the IC, testing the prototype of the IC, and generating validated specifications utilizes an online design engineering system. The online design engineering system is implemented as a cloud-based infrastructure that provides designers with access to design software tools, access to design libraries of fabrication facilities, and an infrastructure that facilitates verification and generation of prototypes of the IC from one or more fabrication facilities. In one embodiment, the cloud infrastructure of the online design engineering system enables designs to be shared with a community of designers or requesters, such as customers, that request a new design or a type of design similar to one already designed by an engineering designer. In other embodiments, the online design engineering system enables the customers or other designers to post a request to the online design engineering system for a specific design, such as one having specific functional requirements.

Requesters that are interested in creating such a design will produce a specification, which defines how the circuit design will function. In some cases, more than one requester will submit a specification. In one embodiment, the online design engineering system screens the specifications to determine completeness and/or other metrics. Once a specification is selected, a designer proceeds to create a circuit design, such as to create circuitry connections and to interconnect cells. This phase of the design includes producing a schematic, which then proceeds to physical layout description. The software tools provided by online design engineering system, in addition to enabling production of the schematic, and layout and design verification, enable an interface with the fabrication facilities for producing a prototype. In one embodiment, the online design engineering system provides designers with access to circuit libraries of a fabrication facility. The circuit libraries, by way of example, include cells that are used in a layout design and that include custom layout features. The custom layout features in the cells are regarded as confidential by the fabrication facility.

However, since the online design engineering system is providing access to many individual designers, the online design engineering system provides access via an obfuscation layer. The obfuscation layer is configured to "black box" layout geometries and/or design rules of the cells, but still provides access to the cells, which include defined inputs and outputs. In one embodiment, the obfuscation layer is managed by the online design engineering system, so that many designers are able to gain access to functional blocks of the cells associated with circuit libraries, but the confidential information of the fabrication facilities is not shared.

In a like manner, designers use the cells and other interconnections and other integration circuits, such as glue logic, to create their proprietary circuit designs. Ways in which the designers interconnect the cells, make specific connections, and/or routing is considered confidential to the designers. In one embodiment, a designer level obfuscation layer is provided, so that circuit designs shared with the community and/or used by entities wishing to implement the proprietary circuit design in their IC are not provided with such details.

In an embodiment, a designer provides a circuit design with a specification that he or she believes meets a functional requirement for an IC, such as an IC that is requested by an entity or another member, such as a requester, of the online design engineering system. In some cases, multiple designers produce their own circuit designs and associated specifications. In an embodiment, the online design engineering system screens the designs for completeness, compliance to specifications, and manufacturability.

In one embodiment, a circuit design is connected to an integration circuit design, such as a glue logic design, that is provided by the online design engineering system to generate an integrated circuit chip design. Moreover, another circuit design is connected to the integration circuit design, such as the glue logic design, to generate another integrated circuit design. A designer of the circuit designs is able to use the online design engineering system to generate manufacturing-aware electronic models that are sent to the fabrication facilities to generate prototypes. Both the integrated circuit designs are fabricated on a shuttle, such as a wafer, to generate prototypes of integrated circuit chips. The prototypes are coupled to a printed circuit board that is provided by the online design engineering system, and the printed circuit board is coupled to a computer having software for testing the prototypes. The software is provided by the online design engineering system. The designer is able to use the online design engineering system to test the prototypes.

In an embodiment, the online design engineering system, which facilitates a crowd-sourcing platform, is provided for semiconductor intellectual property blocks (IP) and ICs. The online design engineering system is provided to address market access, and development cost and collaboration barriers that inhibit innovation in hardware product development.

Using the online design engineering system, the community members create IP and ICs and sell the IP and ICs to potential requesters, such as, system developers and device developers, around the world. Using the online design engineering system, the requesters request the community to design a chip or collaborate on interesting projects. In an embodiment, the online design engineering system allows the members, such as designers, of the community to design at no upfront cost. The online design engineering system manages an interface to foundry process technology so that the community members cost-effectively convert ideas into prototypes without significant administrative overhead. The online design engineering system provides a weighted revenue sharing process based on community members' contributions.

Several features of the online design engineering system include:

Providing a cloud based system for access by the members. For example, the customers access the online design engineering system via their corresponding web accounts, e.g., user accounts, etc., and post projects for which they desire to have IC design guidance or execution. Moreover, the designers post circuit designs of IP or integrated circuit chip designs of ICs into the online design engineering system for the customers to license. The customers and the designers, in an embodiment, set their own terms of payment, e.g., amount of payment, upfront payment, royalty amount, royalty percentage, etc.

Providing a design environment. For example, a registered community member accesses the design tools for free, such as without cost, to the registered community member. In an embodiment, electronic design automation (EDA) tools are provided via the online design engineering system to the designers. Also, in one embodiment, additional capabilities to integrate the design tools into a logical flow are provided by the online design engineering system.

Providing a foundry interface. The online design engineering system provides the designers access to foundry process technology and cell libraries. The online design engineering system provides the ability to generate manufacturing-aware electronic models that are sent to the fabrication facilities to generate prototypes. This eliminates a major barrier for the designers to generate designs of IPs or ICs, and fabricate prototypes from the designs.

Providing ratings, badges and reviews. For example, the online design engineering system facilitates review and rating of designs of IPs or ICs or of the prototypes of the designs. In an embodiment, the badges are awarded for particular areas of capability.

Providing a community-oriented design process. For example, the online design engineering system facilitates an IC or IP development process regardless of a specific application, such as, definition, schematic capture, simulation, layout, place and route, and characterization. As such, the development process is divided into various discrete steps and automated with different participants at each stage. In an embodiment, competitions are held to address each stage along the development process. The online design engineering system leverages the community of designers who compete by submitting potential solutions to each step in the development process.

Providing multiple winners. For example, to obtain multiple entries, multiple winners, such as the designers, are selected at each of various stages of the development process with payments of various amounts to each of the winners. In an embodiment, all entries, such as designs, win or lose, are placed in the online design engineering system for subsequent demand.

Providing datasheet driven community design. For example, the development process begins with creation of an on-line data sheet that is specific to a class of product or application. The data sheet is a central form of communication throughout a design generation, design verification, prototype validation, and sign-off process. The data sheet is transformed from being a descriptive document produced after a design is completed and used for sales purposes into a design control document.

Providing an iterative community design. For example, the development process is an inherently iterative process that reduces time and costs associated with: (i) unintended or unforeseen results within a given stage in the development process, such as yield or performance results from core/cell integration and design/process interaction within chip development; (ii) unforeseen interactions and tradeoffs between or among the stages, such as, relative benefits or issues between software and hardware components within a system; and (iii) unforeseen problems in moving a product from design to manufacture. The online design engineering system is architected to leverage the community to expedite achievement of the unintended or unforeseen results, the unforeseen interactions and tradeoffs, and the unforeseen problems with lower costs than that associated with a conventional process of fabricating an integrated circuit.

Provides a multi-threaded community design. For example, hardware and IC research and development is experimental and often uses trial and error to get to an optimal outcome, particularly for IoT and other emerging hardware. The design engineering facilitates generation of alternative paths that are invoked at various times in a research and development process in ways that are not foreseen at the beginning of the development process. The online design engineering system overcomes resource limitations in internal development teams and time-consuming nature of qualifying third party outsourced developers, reduces chances of cost overruns, reduces occurrences of time to market problems, and reduces chances of providing sub-optimal solutions. In an embodiment, the online design engineering system is architected to allow for dynamic multi-threading to introduce multiple potential solutions to a research and development process with little if any additional cost or time to market.

Providing community verification and validation. For example, the online design engineering system provides pre-silicon verification of designs, and post silicon validation of the IP or IC. To illustrate, the online design engineering system provides breadth and accuracy of the verification and validation by providing simulation tools for running simulations on the designs. Moreover, the designers of the community and a design engineering entity expand both the breadth and accuracy of verification by replicating results, independently. To further illustrate, simulation tools are applied by a designer to generate results of a simulation and the same or different simulation tools are applied by another designer or the design engineering entity to generate results of another simulation. The results of both simulations act as a check against each other or a verification on top of another. In one embodiment, different simulation tools are used by the design engineering entity or an independent community member, such as a user, than that used by the designer. For example, the simulation tools applied by the design engineering entity or the independent community member not only include simulation tools used by the designer but also include additional simulation tools. As an example of the validation, the design engineering entity offers the community with an integrated circuit test chip and related software for community validation of a circuit design. Results of the verification and the validation are made transparent to the community to verify and validate the results.

Providing market perceived quality. For example, a perceived quality of results of the verification or validation is improved when the design engineering entity re-verifies results of the verification or validation and when any community member re-verifies results of a simulation, e.g., performed by another designer, etc., or validates parameters of a chip. In an embodiment, a use counter tool of the online design engineering system counts usage, such as, a number of times a design is implemented within an integrated circuit, a number of times the design is commented on positively by designers, and/or a number of times a simulation is run on the design for which the design passes a simulation, of a design and generates reviews and ratings for the usage and reports the reviews and ratings in the online design engineering system, further improving market confidence and perception. For example, perception increases exponentially with a reported number of uses and re-simulations.

Providing try before buy technology. A cost benefit of the online design engineering system is improved by the try before buy technology, provided by a crowd-sourcing platform of the online design engineering system. The designers use the design tools and one or more IP libraries for no upfront payment or a minor upfront payment to the online design engineering system, and deploy in prototypes of one or more designs for an additional affordable fee. This allows for multiple development paths and therefore higher probability of success of the customers and the designers, at a very lower cost through prototype, than that possible by conventional approaches.

Providing foundry technology obfuscation. In an embodiment, the designers access foundry processes, e.g., IP libraries of foundry entities, etc., used to generate a circuit design. The foundry entities typically work on a peer-to-peer basis through an NDA with the designers to protect their underlying technology. This is particularly sensitive in analog design where the designers interact at an intimate level with an underlying process technology. The online design engineering system inserts an obfuscation functionality in a design flow to obfuscate critical underlying foundry process technology, e.g., Graphics Database System (GDS) layers obtained from a library of GDS layers, etc. In one embodiment, the online design engineering system provides an approach to simulation and other design steps where process data is maintained in a protected location and accessed by tools without visibility to the designer. For example, while running a simulation, the online design engineering system does not allow access to data that is output at an intermediate node in a layout design or to GDS layers of the layout design. The GDS layers is proprietary to the design engineering entity. This feature of the online design engineering system eliminates the need for a foundry non-disclosure agreement (NDA).

Providing designer technology obfuscation: A feature of crowd-sourced marketing and sale of a design is that the customers work with the design at an intimate level but that critical technology and design features of the design are not exposed. This is done without specific NDA between the requester and the designer. The approach here is analogous to the foundry technology obfuscation above, except that obfuscated information is the design. For example, a schematic of the circuit design generated by a designer cannot be accessed by another designer or a requester without permission from the designer.

Providing a collaborative interactive specification. For example, the customer posts a desired specification within a data sheet for an integration circuit and the community interacts with the data sheet to define a deliverable specification. This approach leverages a capability and size of the community to achieve an optimal outcome for the customer, regardless of knowledge of the customer regarding IC or IP design.

In one embodiment, a method for providing an online design engineering system to fabricate a prototype of a circuit is described. The method includes providing, by a management server, access to a design engineering system (DES) access application for accessing a data sheet. The method includes receiving, by the management server, a specification of a design of the circuit via the data sheet. The method includes providing, by the management server, access to the data sheet to a plurality of user computing devices operated by users of the community. The method further includes providing access to a circuit design tool via a plurality of user accounts of the users for facilitating generation of a plurality of circuit designs. The method includes receiving, by the management server, the circuit designs of the circuit via the plurality of user accounts. The method further includes an operation of analyzing, by an automatic certification server, the circuit designs to determine whether the circuit designs pass an automatic circuit design test. The method includes selecting, by the management server, two of the user accounts of two of the users for which two of the circuit designs pass the automatic circuit design test. The method includes an operation of providing, by the management server, access to a layout design tool to the two user accounts for generating two layout designs of the circuit. The method includes receiving, by the management server, the two layout designs via the two user accounts of the community. The method also includes an operation of analyzing, by the automatic certification server, the two layout designs to determine whether the two layout designs pass an automatic layout design test. The method includes selecting, by the management server, one of the two user accounts for which one of the two layout designs of the circuit passes the automatic layout design test. The method includes generating, by the management server, a file, such as a Graphics Database System II (GDSII) file, including the layout design of the circuit upon selecting the user account for which the layout design passes the automatic layout design test. The method includes sending, by the management server, the file to an integrated circuit fabrication facility to fabricate a prototype of the circuit based on the layout design.

In an embodiment, the method further includes obfuscating portions of the circuit designs before providing access to the circuit designs to additional users of the community via corresponding additional user accounts. The method includes obfuscating portions of the layout designs before providing access to the layout designs to the additional users via the corresponding additional user accounts.

In an embodiment, a method for obfuscating a circuit design is described. The method includes receiving the circuit design from a user computing device via a computer network and a user account. The circuit design includes a plurality of circuit components and connections between the circuit components. The method further includes obfuscating each of the circuit components by transforming layout features associated with the circuit design into a generic layout feature representation. The generic layout feature representation excludes scaled representations of the layout features. The operation of obfuscating is performed so that each circuit component is represented as an obfuscated design that has electrical characteristics of the circuit component and excludes access to the layout features of the circuit component. The method also includes generating a visual representation of the obfuscated designs. Each of the obfuscated designs has an input port and an output port. The method further includes enabling placement of the obfuscated designs and routing between the input ports and the output ports of the obfuscated designs. The method includes generating an obfuscated integrated circuit design having a master input port, a master output port, the obfuscated designs, and the routing between the obfuscated designs. The obfuscated integrated circuit design is accessible to simulate the circuit design without exposing the circuit design such that the simulation of the circuit design is performed while the circuit components are obfuscated.

In one embodiment, a system for obfuscating a circuit design is described. The system includes a circuit design tool that receives the circuit design from a user computing device via a computer network and a user account. The circuit design includes a plurality of circuit components and connections between the circuit components. The system further includes an obfuscator tool coupled to the circuit design tool. The obfuscator tool obfuscates each of the circuit components by transforming layout features present in the circuit design into a generic layout feature representation. The generic layout feature representation excludes scaled representations of the layout features. The obfuscator tool performs the obfuscation to represent each circuit component as an obfuscated design that has electrical characteristics of the circuit component and excludes access to the layout features of the circuit component. The obfuscator tool generates a visual representation of the obfuscated designs. Each of the obfuscated designs has an input port and an output port. The system includes a layout design tool coupled to the circuit design tool and the obfuscator tool. The layout design tool enables placement of the obfuscated designs and routing between the input ports and the output ports of the obfuscated designs. The obfuscator tool generates an obfuscated integrated circuit design having a master input port, a master output port, the obfuscated designs, and the routing between the obfuscated designs. The obfuscated integrated circuit design is accessible to simulate the circuit design without exposing the circuit design such that the simulation of the circuit design is performed while the circuit components are obfuscated.

In an embodiment, a system for obfuscating a circuit design is described. The system includes a circuit design tool that receives the circuit design from a user computing device via a computer network and a user account. The circuit design includes a plurality of circuit components and connections between the circuit components. One of the circuit components is of a different type than one of remaining of the circuit components. Each circuit component has an input and an output. The system further includes an obfuscator tool coupled to the circuit design tool. The obfuscator tool obfuscates the types of the circuit components to generate an obfuscated design for each component. The system also includes a layout design tool coupled to the obfuscator tool. The layout design tool receives, from the user computing device via the user account and the computer network, a request for accessing the layout design tool. The obfuscator tool sends the obfuscated design of each of the circuit components to the user computing device via the user account and the computer network when the request to access the layout design tool is received.

Some advantages provided by the online design engineering system include:

Enabling hardware, such as semiconductor chip, innovation by lowering cost of fabricating a prototype. For example, in a traditional semiconductor company, a cost of fabricating a prototype is a fixed cost, e.g., people cost, salaries of employees, etc. In the online design engineering system, people costs are their opportunity cost, which are low. For example, there are no salaries of the designers. Rather, each designer is compensated in one of two ways, such as an award at the completion of the design effort, or a percentage of the generated revenue when their design is purchased through the online design engineering. The online design engineering system allows various designers to showcase their skills in generating circuit designs to promote innovation at no or minimal cost to the designers.

Lowering development cost of an integrated circuit chip.

Creativity of the community is far greater than creativity of any one organization or person. The creativity of the community is increased exponentially by connectivity, via user accounts, etc., assigned to the members of the community.

Massive collaboration via the online design engineering system between the users and the requesters.

Solving a problem of talent access limitation. Hardware development has been a process of rapid evolution of a known and finite set of platforms, such as personal computer (PC), phone, and router, with known or predictable market sizes and needs. Focus of such hardware development has been on high volume standard IC products. However, Internet of Things (IoT) development is different. IoT products are massively customized, with unknowable potential. Semiconductor design of IoT products employs the online design engineering system that supports mass customization with significant trial and error. Traditional semiconductor models are not conducive to this because of the limited access to captive design talent. A crowdsourcing development model provided by the online design engineering system solves the problem of talent access limitation.

It should be appreciated that the present embodiments can be implemented in numerous ways, e.g., a process, an apparatus, a system, a piece of hardware, or a method on a computer-readable medium. Several embodiments are described below. Other aspects will become apparent from the following detailed description, taken in conjunction with the accompanying drawings.

BRIEF DESCRIPTION OF THE DRAWINGS

The embodiments are understood by reference to the following description taken in conjunction with the accompanying drawings.

FIG. 1B-2 is a diagram of an embodiment of a system to illustrate creations of designs of different electrical circuits based on a variety of specifications.

FIG. 1C-1 is a diagram to illustrate processes for verification of a design and acceptance of the design by a requester.

FIG. 1C-2 is a flowchart of an embodiment of a method for generating a design and providing a requester access to the design.

FIG. 2 is a diagram of an embodiment of the online design engineering system for illustrating communication with multiple user computing devices and requester computing devices via a computer network.

FIG. 4B-1 is a diagram of an embodiment of a schematic of a design and a layout of the design to illustrate obfuscation of the schematic and the layout.

FIG. 4B-2 is a diagram of an embodiment of the online design engineering system to illustrate shuttling of different integrated circuit chips on a wafer and testing of a prototype.

FIG. 5A is a diagram of an embodiment of the online design engineering system to illustrate a competition for generating a design.

FIG. 10 is a diagram of an embodiment of a specification of a component of the electrical circuit.

FIG. 12 is a diagram of an embodiment of a system to illustrate an interplay between a customer and a community to fabricate a prototype of an integrated circuit chip.

FIG. 18A-1 is a diagram to illustrate an embodiment of a design engineering method to illustrate a data sheet.

FIG. 18A-2 is a diagram to illustrate an embodiment of another portion of the design engineering method of FIG. 18A-1.

FIG. 18A-3 is a diagram to illustrate an embodiment of yet another portion of the design engineering method of FIG. 18A-1.

FIG. 18A-4 is a diagram to illustrate an embodiment of still another portion of the design engineering method of FIG. 18A-1.

FIG. 18A-5 is a diagram to illustrate an embodiment of another portion of the design engineering method of FIG. 18A-1.

FIG. 18B-1 is a diagram to illustrate an embodiment of a continuation of the design engineering method of FIG. 18A-5.

FIG. 18B-2 is a diagram to illustrate an embodiment of another portion of the design engineering method of FIG. 18B-1.

FIG. 18B-3 is a diagram to illustrate an embodiment of yet another portion of the design engineering method of FIG. 18B-1.

FIG. 18B-4 is a diagram to illustrate an embodiment of still another portion of the design engineering method of FIG. 18B-1.

FIG. 18C-1 is a diagram to illustrate an embodiment of a continuation of the design engineering method of FIG. 18B-4.

FIG. 18C-2 is a diagram to illustrate an embodiment of another portion of the design engineering method of FIG. 18C-1.

FIG. 18C-3 is a diagram to illustrate an embodiment of yet another portion of the design engineering method of FIG. 18C-1.

FIG. 18C-4 is a diagram to illustrate an embodiment of still another portion of the design engineering method of FIG. 18C-1.

FIG. 18C-5 is a diagram to illustrate an embodiment of yet another portion of the design engineering method of FIG. 18C-1.

FIG. 18C-6 is a diagram to illustrate an embodiment of still another portion of the design engineering method of FIG. 18C-1.

FIG. 19A is a diagram of a system to illustrate functionality of a workspace application and storage of various files, such as a testbench netlist file and a specification file, within a searchable storage.

FIG. 19B is a diagram of an embodiment of the system of FIG. 19A to illustrate a storage of a circuit netlist file associated with a schematic in the searchable storage.

FIG. 19C is a diagram of an embodiment of the system of FIG. 19A to illustrate a simulation test performed on a design of a schematic.

FIG. 20C is a continuation of the data sheet of FIG. 20B.

FIG. 20D is a continuation of the data sheet of FIG. 20C.

FIG. 20F is a continuation of the data sheet of FIG. 20E.

FIG. 20G is a continuation of the data sheet of FIG. 20F.

FIG. 20H is a continuation of the data sheet of FIG. 20G.

FIG. 20I is a diagram of an embodiment of a portion of a data sheet.

FIG. 20J is a continuation of the data sheet of FIG. 20I.

FIG. 20K is a continuation of the data sheet of FIG. 20J.

FIG. 20L is a continuation of the data sheet of FIG. 20K.

FIG. 26B is a diagram of an embodiment of a workspace display to illustrate a manual placement of obfuscated designs and to illustrate manual generation of routes between the obfuscated designs.

FIG. 32 is a diagram of an embodiment of a listing of obfuscator rules that are applied by the obfuscator tool to obfuscate one or more layout features of a layout design.

DETAILED DESCRIPTION

Figure 1A:
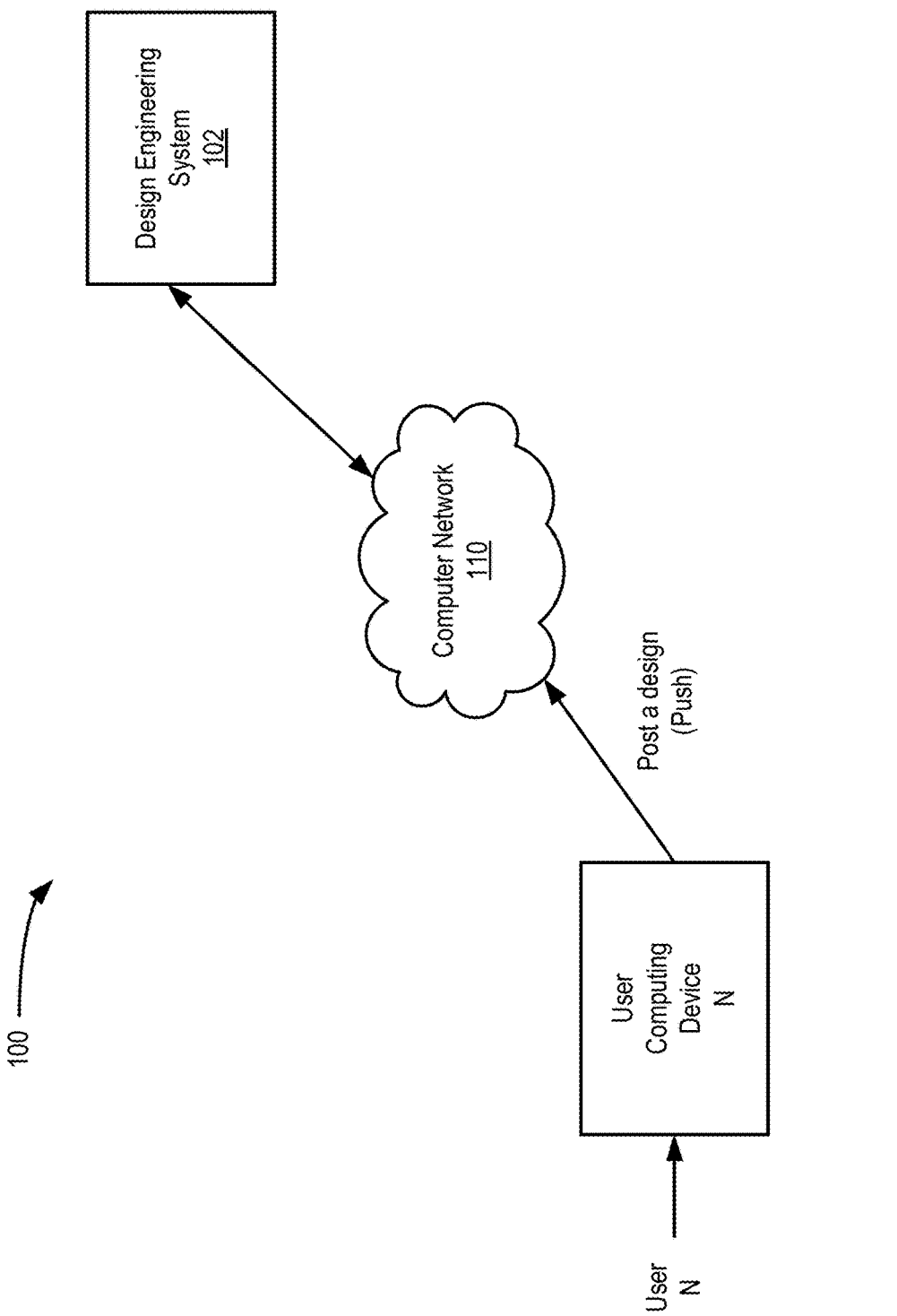
FIG. 1A is a diagram of an embodiment of an online design engineering system for illustrating a push operation.

The following embodiments describe systems and methods for engineering circuit design and development. It will be apparent that the present embodiments may be practiced without some or all of these specific details. In other instances, well known process operations have not been described in detail in order not to unnecessarily obscure the present embodiments.

The online design engineering system connects circuit and system designers with other circuit and system designers, customers or end-users and fabrication entities. The online design engineering system allows various circuit designers to share various designs for zero or market-equivalent licensing fees or royalties. The designers, upon receiving a request via the online design engineering system or without receiving the request to generate one or more designs, submit the designs to the online design engineering system. In generating schematics of the designs, the designers apply design tools that are provided by the online design engineering system. Moreover, in generating physical layouts of the designs, the designers access intellectual property (IP) libraries that are coupled to the online design engineering system. The designs are verified using one or more simulation software provided by the online design engineering system. In one embodiment, a design engineering entity performs an independent verification of the designs by using the one or more simulation software and/or a different simulation software.

In an embodiment, one or more design level obfuscation layers are applied by the online design engineering system to a schematic of a circuit design to hide connections between components of the circuit design, and/or the components of the circuit design, and/or the entire circuit design. The design level obfuscation layers are applied to protect intellectual property of a designer from being publicly available via the online design engineering system.

In one embodiment, one or more obfuscation layers are applied to a physical layout of a circuit design to hide connections between cells of the physical layout and/or to hide IP layers of the physical layout. The obfuscation layers are applied by the online design engineering system to protect intellectual property of a fabrication entity, such as a foundry, that provides an IP library from which the cells are accessed by a designer and to protect intellectual property of the designer. In an embodiment, the fabrication entity is controlled by, such as under management of or governed by, the design engineering entity. For example, all employees of the fabrication entity are employees of the design engineering entity. In one embodiment, the fabrication entity is independent of control of the design engineering entity. For example, the fabrication entity is a separate organization from the design engineering entity and none of the employees of the fabrication entity and the design engineering entity are the same.

In an embodiment, an integrated circuit chip design is provided by the online design engineering system. The integrated circuit chip design includes a glue logic design or another integration circuit design that is compatible with one or more designs that are generated by a designer. The one or more designs are coupled to the glue logic design or the other integration circuit design by the designer to create derivatives of the integrated circuit chip design and the derivatives are fabricated on a shuttle to generate prototypes of integrated circuit chips. The derivatives are verified using a validation software, such as a prototype tester and test report generator tool. Also, in an embodiment, the prototypes are tested using a printed circuit board and a computer. The computer is used to execute a test software of prototype tester and test report generator tool. In an embodiment, the online design engineering system validates the prototypes independently of validation performed by the designer. The independent verification increases confidence of users in the integrated circuit chip design and its derivatives.

FIG. 1A is a diagram of an embodiment of a system 100 for illustrating a push operation. The system 100 includes a computing device N, a computer network 110, and an online design engineering system 102 (DES), where N is an integer greater than zero.

Examples of a computing device, as used herein, includes a smart phone, a tablet, a computer, a desktop computer, a laptop computer, a smart television, etc. Examples of the computer network 110 include a local area network (LAN), such as an Intranet, and a wide area network (WAN), such as the Internet, or a combination of the LAN and WAN. To illustrate, a communication protocol, such as Transmission Control Protocol (TCP) over Internet Protocol (IP) or a Universal Datagram Protocol (UDP) over IP, is applied by computing devices, described herein, to communicate via the computer network 110. To further illustrate, packets, such as TCP/IP or UDP/IP packets are generated by a sending computing device and the packets are depacketized to extract data within the packets by a receiving computing device.

Examples of the online design engineering system 102 include one or more servers, or a combination of the one or more servers and one or more searchable storage devices coupled to the one or more servers. In an embodiment, the online design engineering system 102 is implemented using cloud computing, e.g., hardware virtualization, service-oriented architecture, etc. For example, the online design engineering system 102 is a shared pool of computing resources, e.g., networks, servers, storage devices, computer software applications and services, etc. To illustrate, the online design engineering system 102 includes a data center or a part of the data center that is used to process information received from a computing device and send the processed information back to the computing device. The data center is a part of a cloud computing system and includes one or more servers that executes one or more tools, described below, to allow access to functionality of online design engineering processes, described herein, to computing devices. As such, a server is sometimes referred to herein as a cloud computing node that is accessible to a computing device via the computer network 110 for executing one or more tools. In one embodiment, a combination of a server and a searchable storage that is coupled to and accessed by the server is sometimes referred to herein as a cloud computing node.

In an embodiment, a node is a virtual machine, which is an emulation of a computer system. In the virtual machine, a hypervisor is a computer software or hardware or a combination thereof that shares and manages hardware resources, such as processors and memory devices, to execute functions described herein as performed by the online design engineering system 102. As an example, a virtual machine includes an operating system, one or more application computer programs that run on top of the operating system, and one or more hardware resources, such as central processing units (CPUs), graphical processing units (GPUs), video encoders, audio encoders, network communication devices, memory devices, internal communication devices, network communication devices, etc., that are accessed by the one or more application computer programs via the operating system and the hypervisor for performing the functions described herein as being performed by the online design engineering system 102.

In an embodiment, the online design engineering system 102 is controlled by one or more design engineering entities. For example, the design engineering entity leases a space within a data center to provide services, e.g., functions, etc., described herein as being performed by the online design engineering system 102. The services are provided via the computer network 110 to one or more computing devices that are connected to the computer network 110.

In one embodiment, the online design engineering system 102 includes one or more servers that perform the services described herein as being performed by the online design engineering system 102. In an embodiment, the online design engineering system 102 includes one or more processors of one or more servers that perform the services described herein as being performed by the online design engineering system 102. As used herein, a processor refers to an application specific integrated circuit (ASIC), or a programmable logic device (PLD), or a microprocessor, or a controller, or a CPU.

A user N, e.g., a designer, etc., uses the computing device N to access a user account N to generate a circuit design of an electrical circuit of a system on chip (SoC). For example, a user accesses a website that is controlled by the design engineering entity, and provides user login information, such as an e-mail address or password or a combination thereof, via the website to access a user account that is assigned to the user by the online design engineering system 102. The website is accessed to access multiple webpages of the website. Each webpage is used to display a corresponding account and to provide access to various tools, described herein. An authenticator tool of the online design engineering system 102 determines whether the user login information is authentic, such as matches data that is stored in a login database of the online design engineering system 102. Upon determining that the user login information is authentic, the user N is allowed by the authenticator tool access to the user account N. On the other hand, upon determining that the user login information is not authentic, the user N is not allowed access by the authenticator tool to the user account N. Upon accessing the user account N, the user N creates the circuit design by accessing a circuit design tool, such as Ngspice™, or Cider™, or Xspice™, which is executed by the online design engineering system 102. The design tool is not executed on the computing device N, which is operated by the user N.

The circuit design created by the user N is sent from a network interface controller, such as a network interface card (NIC), of the computing device N via the computer network 110 to the online design engineering system 102 independent of whether a request for the circuit design is received by the online design engineering system 102. For example, there is no request made by a requester via a requester computing device and a requester account of the online design engineering system 102 to a user account of the online design engineering system 102 for the circuit design and the circuit design is pushed, such as sent without receiving the request, from the computing device N to the online design engineering system 102 via the computer network 110. As another example, at a time the user N indicates via the user account N to upload the circuit design to the online design engineering system 102, the network interface controller applies a communication protocol, e.g., TCP/IP or UDP/IP, etc., to the circuit design to generate one or more packets and sends the one or more packets via the computer network 110 to the online design engineering system 102 for storage of the circuit design in a design database.

The online design engineering system 102 receives the circuit design via the computer network 110 from the computing device N and processes the circuit design to place the circuit design in a searchable storage of the online design engineering system 102. For example, the online design engineering system 102 applies the communication protocol to depacketize the one or more packets that include the circuit design to obtain the circuit design from the one or more packets, and stores the circuit design in the searchable storage. Any depacketization, described herein, as being performed by the online design engineering system 102 is performed by an NIC of the online design engineering system 102. It should be noted that the circuit design is posted to the searchable storage for access by other computing devices after obfuscating, e.g., hiding, encrypting, etc., the circuit design so that the circuit design is not visible via user accounts, which are described below. The circuit design is not visible when accessed via the user accounts that do not have a permission from the user N to view the circuit design. In an embodiment, the design engineering entity that creates and controls the online design engineering system 102 is an operator, such as a manager, of the online design engineering system 102. For example, the circuit design when received by the online design engineering system 102 is posted on a webpage for access by other computing devices, e.g., computing devices 1 through N–1, etc. The webpage is controlled by the operator.

In an embodiment, none of the users 1 through N are employees of a fabrication entity, as described herein, or a requester, or the design engineering entity. For example, none of the users 1 through N is employed for wages or salary by an entity, such as a fabrication entity, or a requester, or the design engineering entity, to work full time or part time for the entity.

Figures 1, 1B:
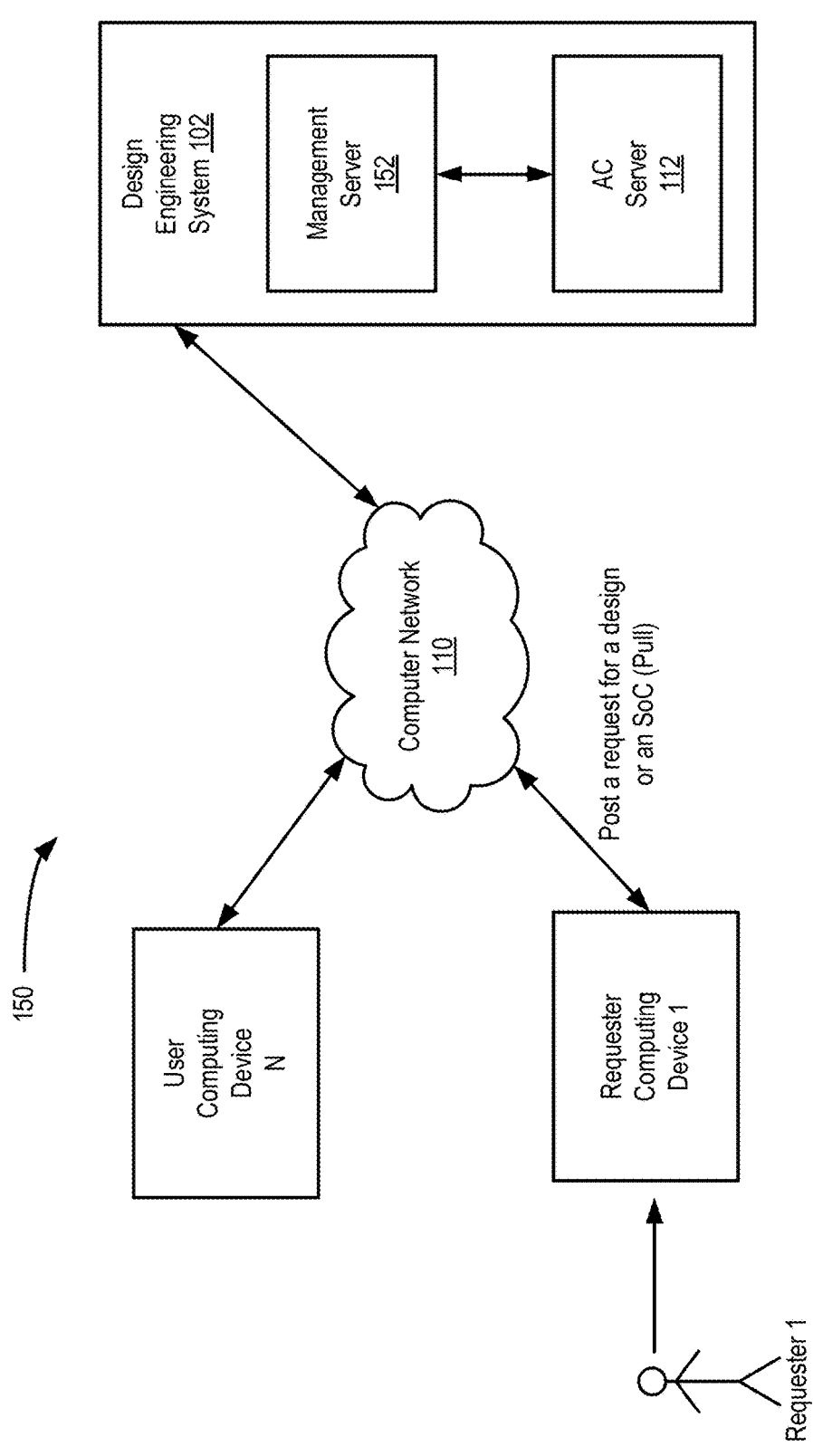
FIG. 1B-1 is a diagram of an embodiment of an online design engineering system to illustrate a pull operation.

FIG. 1B-1 is a diagram of an embodiment of a system 150 to illustrate a pull operation. The system 150 includes the computing device N, a requester computing device 1, the computer network 110, and the online design engineering system 102. The online design engineering system 102 includes a management server 152 and an automation certification (AC) server 112, both of which are further described below. Examples of a requester computing device include a computing device that is controlled by a requester, such as one or more entities that develop an integrated circuit that includes one or more circuit designs. To illustrate, the requester is an entity that develops processors for performing graphical operations to generate graphics in computer games or other computer software applications. As another illustration, the requester is an entity that makes IoT devices. As yet another illustration, the requester is an entity that makes integrated circuits for applying wireless communication protocols, such as Wi-Fi and Bluetooth. Other examples of the requester include an employee of the requester entity, or a user.

A requester accesses the website that is controlled by the design engineering entity, described below, and provides requester login information, such as an e-mail address or password or a combination thereof, to access a requester account assigned to the requester by the online design engineering system 102. The authenticator tool of the online design engineering system 102 determines whether the requester login information is authentic, such as matches data that is stored in a login database of the online design engineering system 102. Upon determining that the requester login information is authentic, the requester is allowed to access the requester account. On the other hand, upon determining that the requester login information is not authentic, the requester cannot access the requester account.

A requester 1 uses the requester computing device 1 to post via a requester account 1 a request for a design of the SoC to the online design engineering system 102 via the computer network 110. For example, the requester computing device 1 receives an input via an input device of the requester computing device 1 from the requester 1 via the requester account 1 to publish the request for the design of the SoC onto a webpage of the online design engineering system 102. Examples of an input device include a mouse, or a keyboard, or a keypad or a touchscreen display having one or more graphical display buttons. The requester 1 that publishes the request is, in an embodiment, an employee of a requester entity that controls the requester computing device 1 and/or a contractor hired by the requester entity. The requester computing device 1 initiates the pull operation by providing the request for the design to the online design engineering system 102 via the computer network 110. As another example, a network interface controller of the requester computing device 1 applies the communication protocol to the request for the design to generate one or more packets and sends the one or more packets via to the online design engineering system 102 via the computer network 110. As used herein, an SoC is an integrated circuit that integrates components of a computer or other electronic systems, such as Internet of things (IoTs). For example, an SoC is an integrated circuit that includes digital, or analog, or mixed signal functions. To illustrate, an SOC integrates a microcontroller and a graphics processing unit. As another illustration, an SOC integrates an oscillator with a phase-locked loop or integrates a voltage regulator with a power management circuit.

Upon receiving the one or more packets, the online design engineering system 102 applies the communication protocol to depacketize the one or more packets, and posts the request for the design onto a webpage that is controlled by the design engineering entity that controls the online design engineering system 102. In response to the request, the online design engineering system 102 determines whether a design of the electrical circuit that is created by the user N meets parameters indicated within the request. Examples of the parameters are provided below. Upon determining that the design of the electrical circuit meets the parameters, the online design engineering system 102 provides the design created by the user N via the computer network 110 to the requester computing device 1.

Figures 1, 1B, 2:
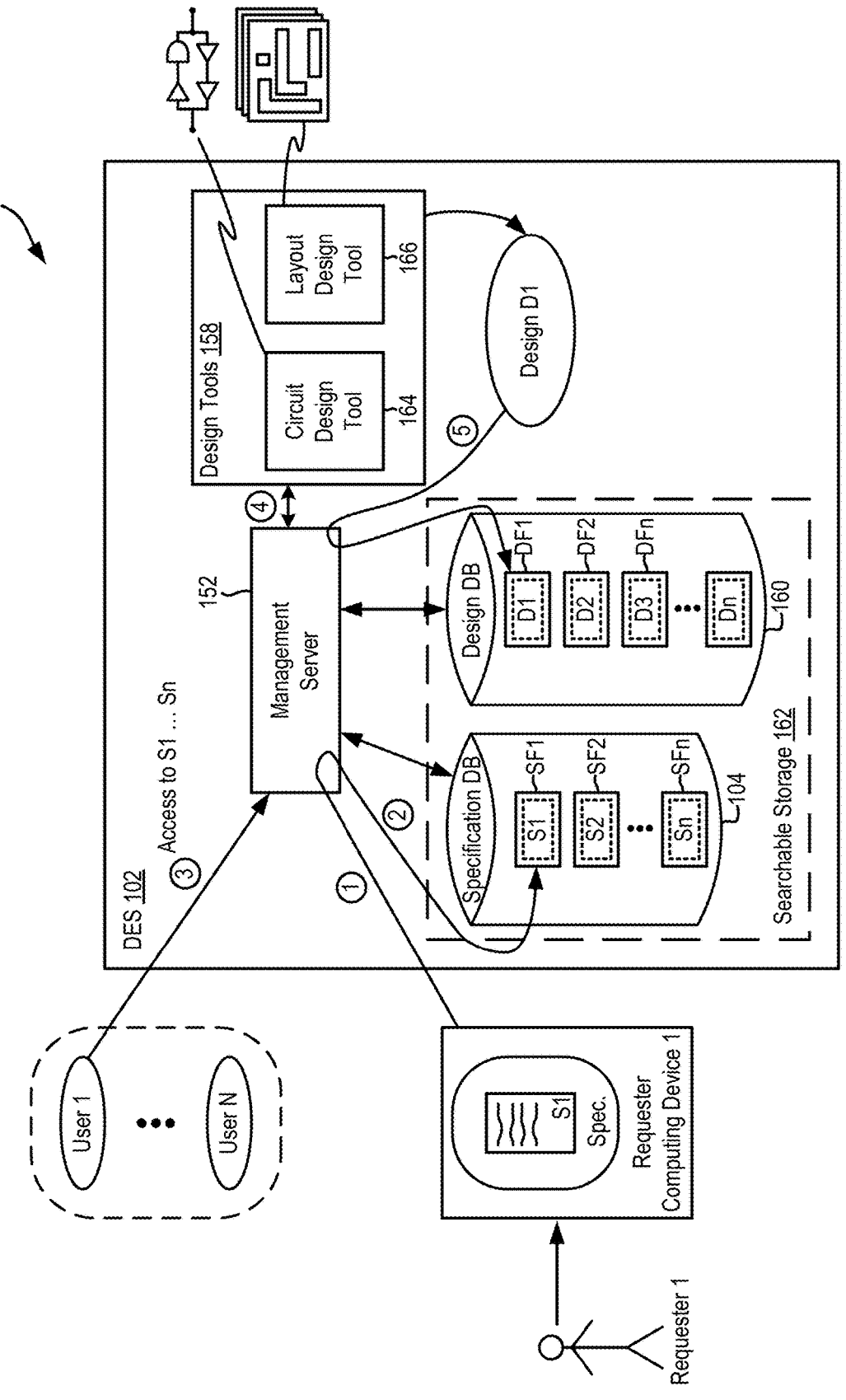

FIG. 1B-2 is a diagram of an embodiment of a system 111 to illustrate creations of designs D1 through Dn of different electrical circuits based on a variety of specifications S1 through Sn, where n is an integer greater than zero. The system 111 includes the online design engineering system 102 and the requester computing device 1. The requester computing device 1 is coupled to the online design engineering system 102 via the computer network 110 of FIG. 1A.

The requester 1 accesses the website to further access the requester account 1 via the requester computing device 1. The requester 1 further provides an indication via the input device of the requester computing device 1 to provide a specification S1 including the parameters for a design of an SoC. For example, a data sheet builder tool of the online design engineering system 102 receives the specification S1 via the computer network 110 from the requester computing device 1. To illustrate, the data sheet builder tool applies the communication protocol to depacketize, such as parse, packets having the specification S1 to extract the specification S1 from the packets. The packets are generated and sent from a network interface controller of the requester computing device 1. Upon receiving the indication, the management server 152 accesses, such as reads, a data sheet from a template database, and sends the data sheet via the computer network 110 to the requester computing device 1. As an example, the data sheet is a template, such as a web form, that includes a plurality of fields for entry of parameters of a design. The template database is coupled to the management server 152 and is a part of the online design engineering system 102. The data sheet is displayed on a display device of the requester computing device 1. Examples of a display device include a touch screen display, a liquid crystal display, a plasma display, and a light emitting diode display. The requester 1 uses the input device of the requester computing device 1 to fill in the data sheet with the specification S1. The management server 152 receives the specification S1 via the computer network 110 and stores the specification S1 within a specification file SF1 in a specification database 104. For example, the data sheet builder tool receives the specification S1 within a data sheet via the computer network 110 from the requester computing device 1, creates the specification file SF1 within the specification database 104, and writes the specification S1 to the specification file SF1. The specification database 104 is stored within a searchable storage 162 that is coupled to the management server 152. Similarly, the specification database 104 stores multiple specification files SF2 through SFn. The specification file SF2 stores a specification S2 and similarly the specification file SFn stores a specification Sn. The specification S2 is received from the same requester 1 or from another requester via the computer network 110. An example of a searchable storage includes one or more memory devices, such as a read-only memory (ROM) or a random access memory (RAM) or a combination thereof. To illustrate, the searchable storage is a flash memory or a redundant array of independent disks (RAID). Data stored within the memory devices is read by a read controller of the online design engineering system 102 and data is written via a write controller of the online design engineering system 102 to the memory devices.

The management server 152, such as the data sheet builder tool, informs the user 1 via the user account 1 and other users 2-N via corresponding user accounts 2-N of receipt of the specification S1. For example, each user account 2-N is posted with information indicating that the specification S1 is received and an identity, such as a name or the requester login information, of the requester 1. The users 1-N select the post via input devices of corresponding computing devices 1-N operated by the users 1-N. Upon receiving the selection of the post from the user 1 via the user account 1, the management server 152, such as the data sheet builder tool, accesses the specification S1 from the specification database 104 and provides the specification S1 via the user account 1 to the user 1. To illustrate, the data sheet builder tool reads the specification S1 of a data sheet from the specification file SF1, applies the communication protocol to packetize the data sheet having the specification S1 to generate packets, and sends the packets via the computer network 110 and the user account 1 to the user computing device 1 for display on the display device of the user computing device 1. Similarly, upon receiving the selection of the post from the user 2 via the user account 2, the management server 152, such as the data sheet builder tool, provides the specification S1 via the user account 2 to the user 2.

The user 1 uses the user computing device 1 to log into the user account 1 to further access a circuit design tool 164 of design tools 158. The circuit design tool 164 is accessed remotely by a computing device to facilitate generation of a design D1 based on the specification S1. For example, the management server 152 executes the circuit design tool 164 to create a user interface, such as an image, on the computing device 1 that is operated by the user 1. The user interface is displayed when the circuit design tool 162 is executed by the management server 152. The user interface of the circuit design tool 162 includes circuit design generation graphics, such as graphics representing logic gates, graphics representing transistors, graphics representing connections between the logic gates, and graphics representing logic between the transistors, to generate the design D1. For example, upon receiving a selection of one or more access buttons via the user account 1 and the computer network 110, the management server 152 executes the circuit design tool 164 to generate a display of the circuit design tool 164 on the user computing device 1 via the computer network 110. The selection of the one or more access buttons is made by the user 1 via the input device of the user computing device 1. The user 1 generates a schematic of a circuit design by using the input device of the user computing device 1 to access the circuit design tool 162. The management server 152 does not allow a download of the circuit design tool 164 via the computer network 110 to the computing device 1 operated by the user 1. For example, when the circuit design tool 164 is accessed via the user account 1, there is no display of a download button on the user computing device 1 for downloading the circuit design tool 164. As such, the circuit design tool 164 is executed on the cloud computing node.

The design D1, such as a circuit schematic, is stored by the management server 152 within a design file DF1. For example, the circuit design tool 164 creates the design file DF1 within the searchable storage 162 and stores, such as writes, the design D1 to memory addresses, within the searchable storage 162, designated to store the design file DF1. It should be noted that in one embodiment the design D1 is generated independent of whether a request for generation of the design D1 is received from the requester computing device 1 via the requester account 1 and the computer network 110. A design file is generated by the management server 152, such as by the circuit design tool 164 or a layout design tool 166 of the design tools 158. The design file DF1 is stored within a design database 160, which is stored within the searchable storage 162. For example, the user 1 operates the user computing device 1 to select an option to save the design D1. Upon receiving an indication of the selection of the option to save via the user account 1 and the computer network 110, the management server 152 stores the design D1 within the design file DF1 and stores the design file DF1 in the design database 160. Similarly, other designs D2-Dn are stored within corresponding design files DF2-DFn, which are stored in the design database 160. The designs DF2-DFn are created by the user 1 upon execution of the circuit design tool 164 or by another one of the users 2-N upon execution of the circuit design tool 164.

Moreover, the user 1 uses the user computing device 1 to log into the user account 1 to further access the layout design tool 166. The layout design tool 166 is accessed to generate a layout design based on the specification S1. For example, the management server 152 executes the layout design tool 164 to create a user interface on the computing device 1 that is operated by the user 1. An example of a layout design tool is a computer program that is executed to generate multiple planes, such as IP layers, in which each plane includes tiles, such as rectangles. A tile is a cell that represents a portion of the electrical circuit, such as n-type well or a p-type well or a via or an interconnect between two components of the electrical circuit. As an illustration, Magic™ is an example of the layout design tool 166. The user interface is displayed when the layout design tool 166 is executed by the management server 152. For example, upon receiving a selection of one or more access buttons via the user account 1 and the computer network 110, the management server 152 executes the layout design tool 166 to generate a display of the layout design tool 166 on the user computing device 1 via the computer network 110. The layout design tool 166 is executed for generation of the layout design. The selection of the one or more access buttons is made by the user 1 via the input device of the user computing device 1. The user 1 generates the layout design by using the input device of the user computing device 1 to access the layout design tool 166. The management server 152 does not allow a download of the layout design tool 166 via the computer network 110 to the computing device 1 operated by the user 1. For example, when the layout design tool 166 is accessed via the user account 1, there is no display of a download button on the user computing device 1 for downloading the layout design tool 166. As such, the layout design tool 166 is executed on the cloud computing node.

The layout design is stored by the management server 152 within a layout design file. The layout design file is stored within the design database 160. For example, upon receiving via the computer network 110 a selection of a save button that is displayed upon execution of the layout design tool 166, the layout design tool 166 creates a layout design file within the searchable storage 162 and stores, such as writes, the layout design to memory addresses, within the searchable storage 162, designated to store the layout design file. It should be noted that in one embodiment the layout design is generated independent of whether a request for generation of the layout design is received from the requester computing device 1 via the requester account 1 and the computer network 110. The save button is displayed on the display device of the user computing device 1. Similarly, other layout designs are stored within corresponding layout design files, which are stored in the design database 160. The other layout designs are created by the user 1 upon execution of the layout design tool 166 or by another one of the users 2-N upon execution of the layout design tool 166. In one embodiment, the layout design tool 166 that is provided access via the user accounts 1 through N is stored within a layout design tool database that is controlled by and managed by the fabrication entity.

The design file DF1 is provided via the computer network 110 and the requester account 1 to the requester computing device 1 for a review of characteristics of the design D1. Examples of the characteristics of a circuit design include components, such as transistors or logic gates, of the circuit design, connections between the components, and operation of the components of the circuit design. Similarly, the layout design file is provided by the computer network 110 and the requester account 1 for a review of characteristics of the layout design. Examples of the characteristics of a layout design include placement of tiles and connections between the tiles, an order in which the planes are stacked, and a relative orientation in which the planes are stacked against each other.

In one embodiment, the design file DF1 includes the layout design instead of a circuit design. In an embodiment, the circuit design tool 164 is referred to herein as a schematic design tool.

Figures 1, 1C, 2:
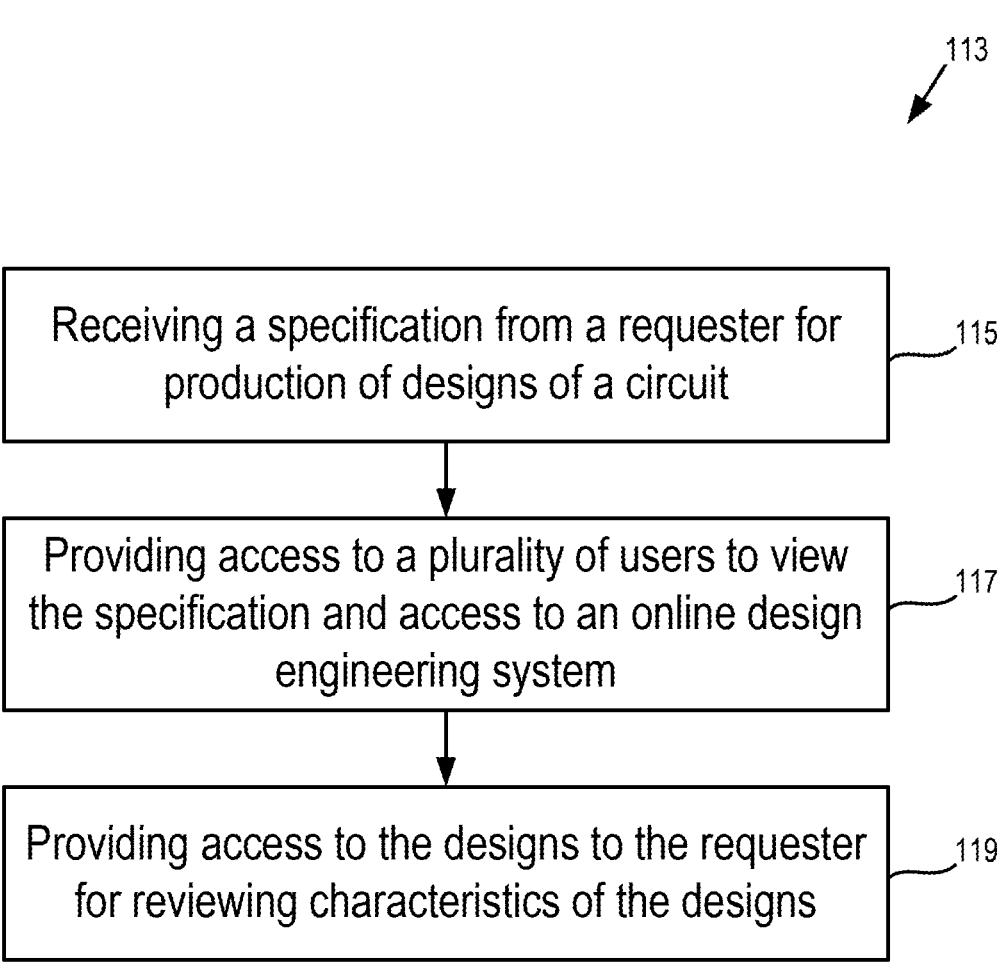

FIG. 1C-1 is a diagram to illustrate processes for verification of a design and acceptance of the design by a requester, which is sometimes referred to herein as a customer. In a process operation 1, the customer accesses the requester account 1 to create a specification and fills in the specification into a data sheet. The data sheet is created by the data sheet builder tool, such as a computer program executed by the management server 152 of FIG. 1B-2. The management server 152 posts the datasheet having the specification onto a webpage that is hosted by the online design engineering system 102. In a process operation 2, one or more of the users 1-N of a community access corresponding user accounts 1-N to search for a project. For example, the user 1 provides a search request to the online design engineering system for a project to design an SoC, such as an analog-to-digital converter or a digital to analog converter or an oscillator. As another example, upon accessing the corresponding user accounts 1-N, one or more of the users 1-N access the webpage to view the specification. In a process operation 3, one or more of the users 1-N generate one or more designs, such as a circuit design or a layout design, based on the specification and submit the designs to the online design engineering system 102. For example, the user 1 generates the circuit design D1 to satisfy the parameters of the specification S1 and the user 2 generates the circuit design D2 to me the parameters of the specification S1. In such a manner, multiple solutions for achieving the parameters of the specification S1 are provided by the users 1 and 2.

In a process operation 4, the online design engineering system 102 verifies the designs that are received from one or more of the users 1-N via corresponding user accounts 1-N. For example, upon receiving the one or more designs via the corresponding user accounts 1-N, an online verification tool, such as a circuit design verification tool or a layout design verification tool, is executed by the management server 152 to test the one or more designs. There is no need for reception by the management server 152 from the one or more users 1-N via corresponding user accounts 1-N of an indication for verifying the one or more designs. However, in one embodiment, the indication for verifying the one or more designs is received to execute the online verification tool.

In a process operation 5, one or more designs that are created by the one or more users 1-N via corresponding user accounts 1-N and verified by the online design engineering system 102 are accepted by the customer via the requester account 1. Upon receiving an indication of the acceptance from the customer via the requester account 1, the management server 152 determines to reward, such as monetarily reward or provide a job position or provide a contractual opportunity, one or more of the users 1-N that created the one or more designs.

FIG. 1C-2 is a flowchart of an embodiment of an online design engineering method 113 for generating a design and providing the requester 1 access to the design. In an operation 115 of the method 113, the management server 152 receives a specification from the requester 1 via the requester account 1 for production of the design of the electrical circuit. The management server 152 receives the specification via the network interface controller of the requester computing device 1, the computer network 110, and a network interface controller of the online design engineering system 102.

In an operation 117 of the method 113, the management server 152 provides access to the users 1-N via the corresponding user accounts 1-N for viewing the specification that is received in the operation 115. For example, after the users 1-N log into the corresponding user accounts 1-N via corresponding computing devices 1-N, the user accounts 1-N provide a view on a display device of the corresponding computing devices 1-N of a data sheet that includes the specification. One or more of the users 1-N access the design tools 158 via the corresponding user accounts 1-N to generate one or more designs, such as a circuit design or a layout design, of the electrical circuit based on the parameters of the specification received in the operation 115.

Moreover, in an operation 119 of the method 113, the management server 152 provides access to the one or more designs of the electrical circuit via the requester account 1 to the requester 1. The requester 1 views the one or more designs of the electrical circuit to review the characteristics of the one or more designs to further determine whether to accept or reject the one or more designs.

Figure 1D:
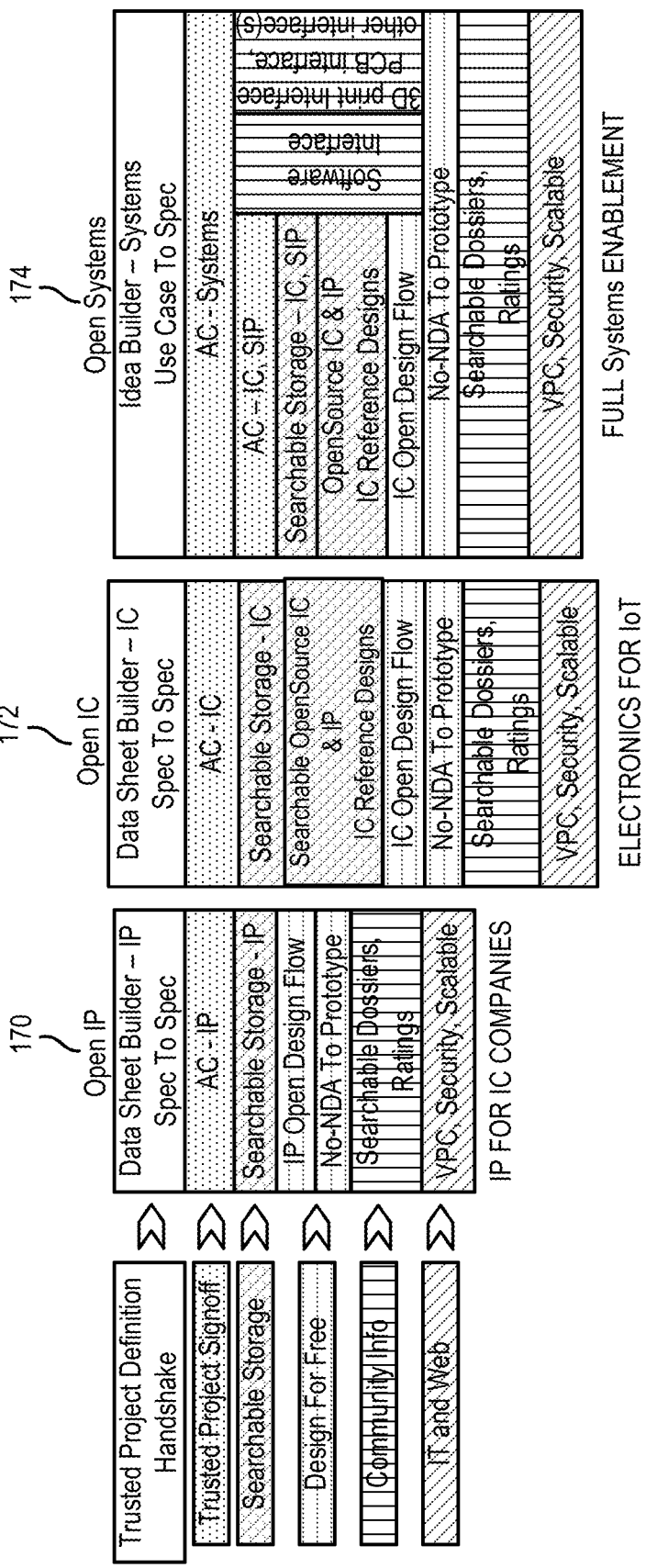
FIG. 1D is a diagram to illustrate fabrication of prototypes of an intellectual property (IP) circuit, an integrated circuit (IC) or an Internet of things (IoT) circuit.

FIG. 1D is a diagram to illustrate fabrication of prototypes of an IP circuit 170, an integrated circuit (IC) 172 or an IoT circuit 174. In an embodiment, multiple IP circuits are coupled to each other to create an integrated circuit and multiple integrated circuits are coupled to each other to create an IoT circuit. An example of an IP circuit is a register or a flip-flop or a logic gate. An example of an integrated circuit is an analog-to-digital converter, a digital to analog converter, an encoder, a read controller, or a write controller, or a processor, or a memory device. An example of an IoT is a network circuit that couples various Internet-connected things, such as cars or buildings or temperature sensors or actuators, with each other via the Internet to enable the Internet-connected things to exchange data via the Internet with each other.

A design of an SoC is created by the user 1 by accessing the design tools 158 of FIG. 1B-2 based on a specification. Moreover, the automatic certification server 112 of FIG. 1B-1 performs a test on the design to determine whether the design meets the parameters of the specification. Furthermore, the design of the SoC is stored in the searchable storage 162 of FIG. 1B-2. The design stored in the searchable storage 162 is searchable by the requester 1 via the requester account 1 or via one or more of the users 1-N via the corresponding user accounts 1-N. For example, a design is identified by its name, such as a series of alphanumeric characters, that is assigned by the user who created the design or by a requester during submission of a data sheet for generating the design. Illustrations of the name of the design includes an analog-to-digital converter or an AND gate or an OR gate or an N-type transistor or an encoder or a decoder. Another user or a requester searches for the design based on the name of the design. To illustrate, the management server 152 generates a design search field, which is displayed on the computing device 1 operated by the user 1 or on the requester computing 1. The user 1 uses the user computing device 1 or the requester 1 uses the requester computing device 1 to enter the name of the design, such as a name of the electrical circuit, within the design search field. The management server 152 searches the design database 104 of FIG. 1B-2 to determine whether there is a match between the name of the design received from the user computing device 1 or the requester computing device 1 and a name of the design stored in the design database 104. Upon determining that there is a match, the management server 152 accesses, such as reads, the design, such as the design D1, from the design database 104 and provides the design D1 via the computer network 110 to the user computing device 1 operated by the user 1 via the user account 1 or to the requester computing device 1 via the requester account 1 for review by the requester 1.

Moreover, there is no need for a nondisclosure agreement from the fabrication facility from a time the specification is received from the requester 1 to a time of generating a prototype of the electrical circuit based on the design. For example, portions of the design are obfuscated by the management server 152, such as by an obfuscator tool, described below, before the design is accessed by one or more of the users 2-N who did not create the design. To illustrate, when a layout design is accessed by the user computing device N from a fabrication computing device via the computer network 110, the obfuscator tool obfuscates one or more Graphics Database System (GDS) layers of the layout design before the layout design is stored in the searchable storage 162.

Furthermore, the management server 152 generates a rating of the design based on a number of times the design is used by one or more of the users 2-N via corresponding user accounts 2-N. For example, the management server 152 keeps track of a number of times for which the design is displayed via the user accounts 2-N on the computing devices 2-N. The rating of the design increases with an increase in the number of times for which the design is displayed. Similarly, the rating of the design decreases with a decrease in the number of times for which the design is displayed. As another example, the management server 152 calculates a number of times for which the design is bid on via the user accounts 2-N on the computing devices 2-N. The rating of the design increases with an increase in the number of times for which the design is bid on. Similarly, the rating of the design decreases with a decrease in the number of times for which the design is bid on. The management server 152 generates a bid field, which is displayed on the user computing device N via the computer network 110 and the user account N. The user N users the input device of the user computing device N to provide a bid, such as a dollar amount, within the bid field. The bid is sent from the user computing device N via the user account N and the computer network 110 to the management server 152. As yet another example, the management server 152 computes a number of times for which the design is displayed via the user accounts 2-N is selected via corresponding input devices of the computing devices 2-N. The rating of the design increases with an increase in the number of times for which the design is selected. Similarly, the rating of the design decreases with a decrease in the number of times for which the design is selected.

As another example, the management server 152 generates a rating of a design and the rating is based on a number of times a comment, such as a positive comment or a negative comment, regarding the design is received from one or more of the users 2-N via corresponding user accounts 2-N. To illustrate, a field in which a post, such as a comment, is to be placed is provided by the management server 152 via the computer network 110 to display on the computing device 2 operated by the user 2. The user 2 uses the input device of the computing device 2 to select the field and post the comment within the field. The comment is a positive comment, such as one that praises functionality of the design or advantages of the design, or a negative comment, such as one that indicates disadvantages of the design or degrades the design. Upon determining that a number of positive comments regarding the design posted via the user accounts 2-N exceeds a number of negative comments regarding the design posted via the user accounts 2-N, the management server 152 increases the rating of the design. For example, as the number of positive comments regarding the design increases compared to the number of negative comments, the management server 152 increases the rating of the design. As another example, as a number of positive comments regarding the design decreases compared to the number of negative comments, the management server 152 decreases the rating of the design.

In an embodiment, a combination of two or more of the number of times for which the design is displayed via the user accounts 2-N, the number of times for which the design is bid on, the number of times for which the design is displayed via the user accounts 2-N is selected, the number of times for which a comment is made on the design are used by the management server 152 to determine a rating of the design, a number of tests that the design has passed, and a number of times for which the design is integrated in one or more integrated circuit chips. For example, a weighted combination of the rating generated based on the number of times for which the design is bid on and the rating generated based on the number of times for which a comment is made on the design is used by the management server 152 to generate a rating of the design. As another example, a weighted combination of the rating generated based on the number of times for which the design has passed simulation tests and the rating generated based on the number of positive comments are made on the design is used by the management server 152 to generate a rating of the design.

The rating of the design is searchable via a rating search field that is generated by the management server 152 and is displayed via the user accounts 1-N on the corresponding computing devices 1-N. For example, when the user 2 enters a name of the design within the rating search field displayed on a display device of the user computing device 2 and selects via the input device of the user computing device 2 a submit option, such as a submit button, displayed on the display device, the management server 152 receives the name of the design via the computer network 110 from the computing device 2. The selection of the submit option is an example of submission of a search request for a rating assigned to the design. The management server 152 identifies, from the name of the design, a rating of the design that is stored within a rating database of the searchable storage 162 of FIG. 1B-2, and provides the rating via the computer network 110 and the user account 2 to the computing device 2.

In one embodiment, a specification is searchable via a specification search field that is generated by the management server 152 and is displayed via the user accounts 1-N on the corresponding computing devices 1-N. For example, the user 2 enters a name of the design within the specification search field displayed on a display device of the user computing device 2, and selects a submit option, such as a submit button, displayed on the display device. Upon selection of the submit option, the management server 152 receives the name of the design via the computer network 110 from the computing device 2. The management server 152 further identifies, from the name of the design, a specification within the specification database 104 for generating the design of the electrical circuit, and provides the specification via the computer network 110 and the user account 2 to the computing device 2.

Figure 1E:
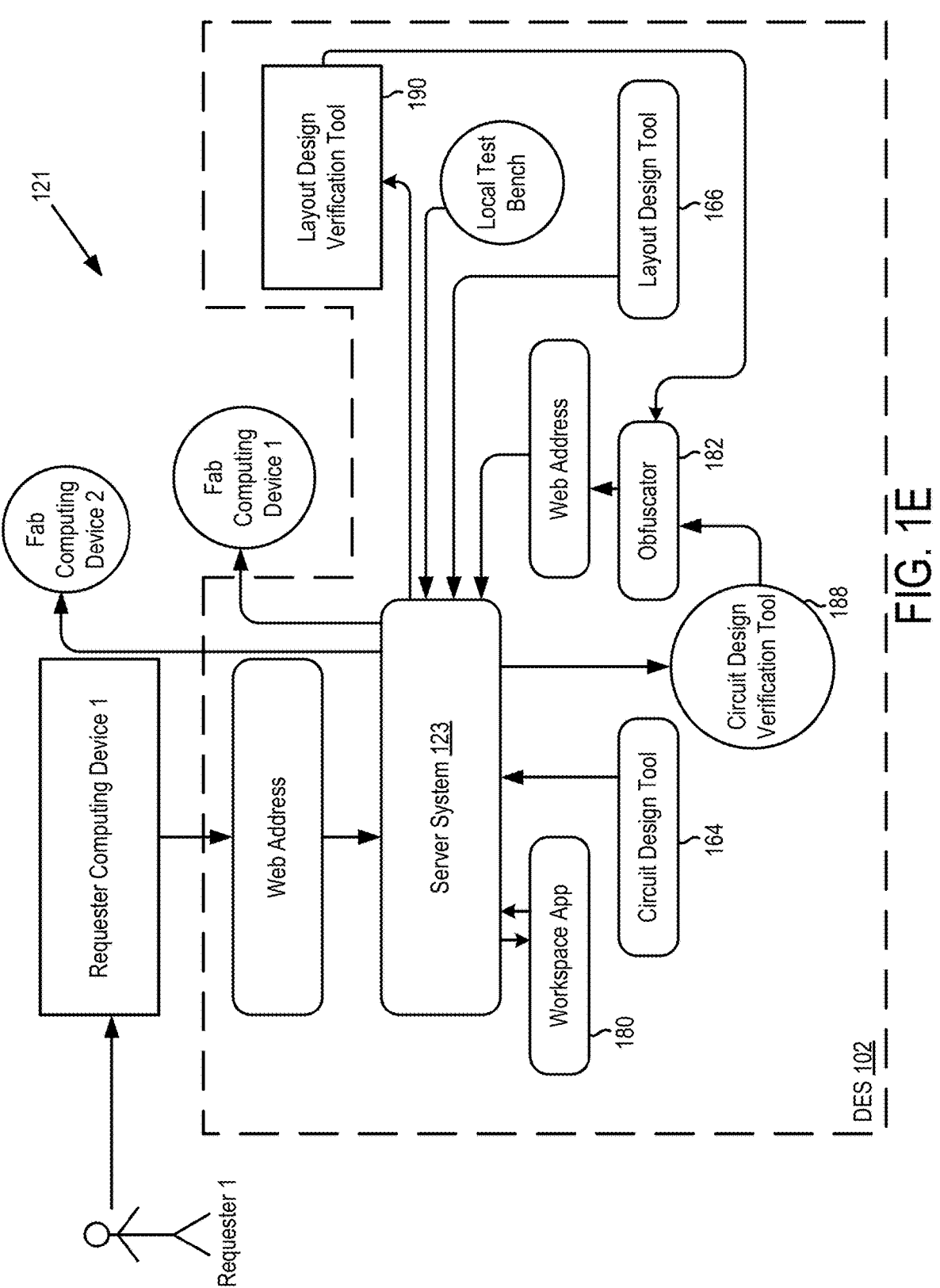
FIG. 1E is a diagram of an embodiment of the online design engineering system for illustrating generation and verification of a design.

FIG. 1E is a diagram of an embodiment of a system 121. The system 121 includes the requester computing device 1, the online design engineering system 102 and fabrication computing devices 1 and 2. In one embodiment, a fabrication computing device and a requester computing device are the same. In this embodiment, a requester is a fabrication entity.

The online design engineering system includes a server system 123, which includes the management server 152 and the automatic certification server 112 of FIG. 1B-1. The requester 1 uses the requester computing device 1 to access the website having a web address, such as www.abcd.com. Upon accessing the website, the requester 1 logs into the requester account 1 to access a data sheet from the template database of the searchable storage 162 for providing a specification within the data sheet.

The user 1 also accesses the website via the user computing device 1. Upon accessing the website, the user 1 logs into the user account 1. A notification indicating that the specification for a design is received by the management server 152 is posted within the user account 1. In one embodiment, the user 1 enters a name of a design within the specification search field to search for the specification that is received by the management server 152 and access the specification from the specification database 104. For example, the data sheet builder tool provides the user account 1 with access to the specification to the user computing device 1 via the computer network 110. To illustrate, the management server 152 executes the data sheet builder tool to generate a display of a data sheet having the specification via the computer network 110 on a display device of the user computing device 1. Similarly, as another example, the management server 152 executes the data sheet builder tool to generate a display of the data sheet having the specification via the computer network 110 on display devices of the user computing devices 2 through N to provide access to the specification to the user computing devices 2 through N.

Upon receiving the specification, the user 1 accesses a workspace application 180 to further access the circuit design tool 164 to generate a circuit design, such as a schematic, based on the parameters of the specification. For example, the workspace application 180 is executed by the management server 152 to provide access to the circuit design tool 164 on the user computer device 1 via the computer network 110. As another example, the workspace application 180 is executed by the management server 152 to generate a user interface on the display device of the user computing device 1. The user 1 operates the input device of the user computing device 1 to select a circuit design tool option, such as a circuit design tool icon or a circuit design tool button, representing the circuit design tool 164 displayed on the user interface. Upon receiving the selection of the circuit design tool option via the computer network 110, the management server 152 provides access to the circuit design tool 164 via the computer network 110 and the user account 1 to the user computing device 1. Moreover, a circuit design verification tool 188 is a computer program that is executed by the automatic certification server 112 to test the circuit design to determine whether the circuit design passes or fails the test. In one embodiment, at a time the specification is received from the requester computing device 1, a test bench is generated by the management server 152 for testing the circuit design. The same test bench is used by the automatic certification server 112 to test the circuit design.

An obfuscator tool 182 is a computer program that is executed by the management server 152 to obfuscate one or more portions of the circuit design at a time when the circuit design is accessed from the searchable storage 162 to provide the circuit design for display on the requester computing device 1 or on user computing devices 2-N via the website. For example, the user 2 accesses the website to log into the user account 2. Upon logging into the user account 2, the user 2 uses the user computing device 2 to request via the design search field the circuit design by providing a name of the circuit design within the design search field. The obfuscator tool 182 of the management server 152 accesses the circuit design from the searchable storage 162 and obfuscates one or more portions of the circuit design to generate an obfuscated circuit design and sends the obfuscated circuit design via the computer network 110 and the user account 2 to the computing device 2. In one embodiment, in addition to sending the obfuscated circuit design, the management server 152 sends a data sheet including a specification for generating the design via the computer network 110 and the user account 2 to the user computing device 2.

The user 1 further accesses the layout design tool 166 via the workspace application 180 to generate a layout design based on the circuit design. For example, the workspace application 180 is executed by the management server 152 to generate a user interface on the display device of the user computing device 1. The user 1 operates the input device of the user computing device 1 to select a layout design tool option, such as a layout design tool icon or a layout design tool button, representing the layout design tool 166 displayed on the user interface. Upon receiving the selection of the layout design tool option via the computer network 110, the management server 152 provides access to the layout design tool 166 via the computer network 110 and the user account 1 to the user computing device 1. Moreover, a layout design verification tool 190 is a computer program that is executed by the automatic certification server 112 to test the layout design to determine whether the layout design passes or fails the test. Upon determining that the circuit design passes the test and the layout design passes the test, the management server 152 sends the circuit design, the layout design, and the specification to the fabrication computing device 1 that is controlled by a fabrication facility for fabrication of a prototype of an SoC.

Figure 1F:
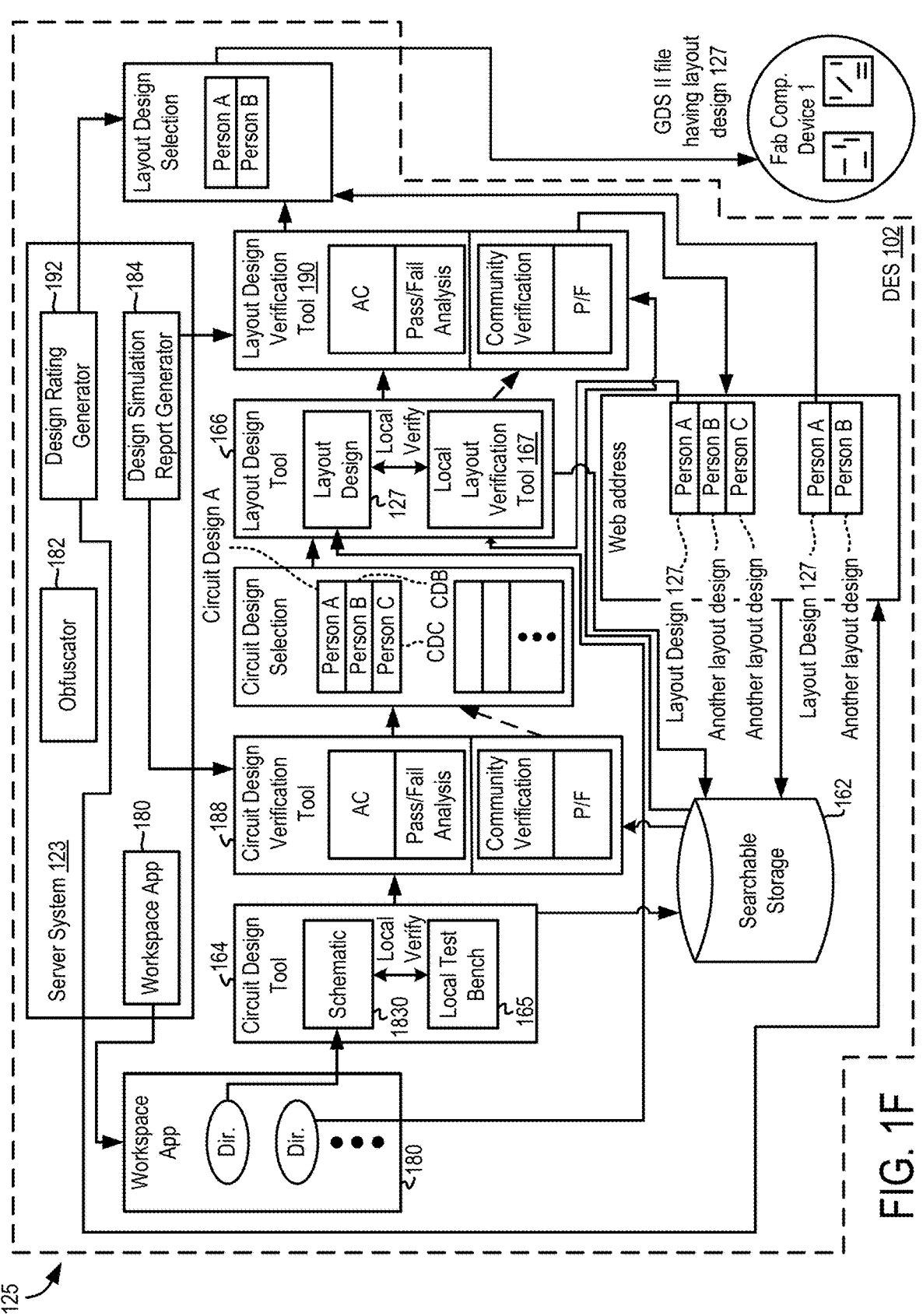
FIG. 1F is a diagram of an embodiment of the online design engineering system to illustrate a fabrication of a prototype of a design.
Figure 2:
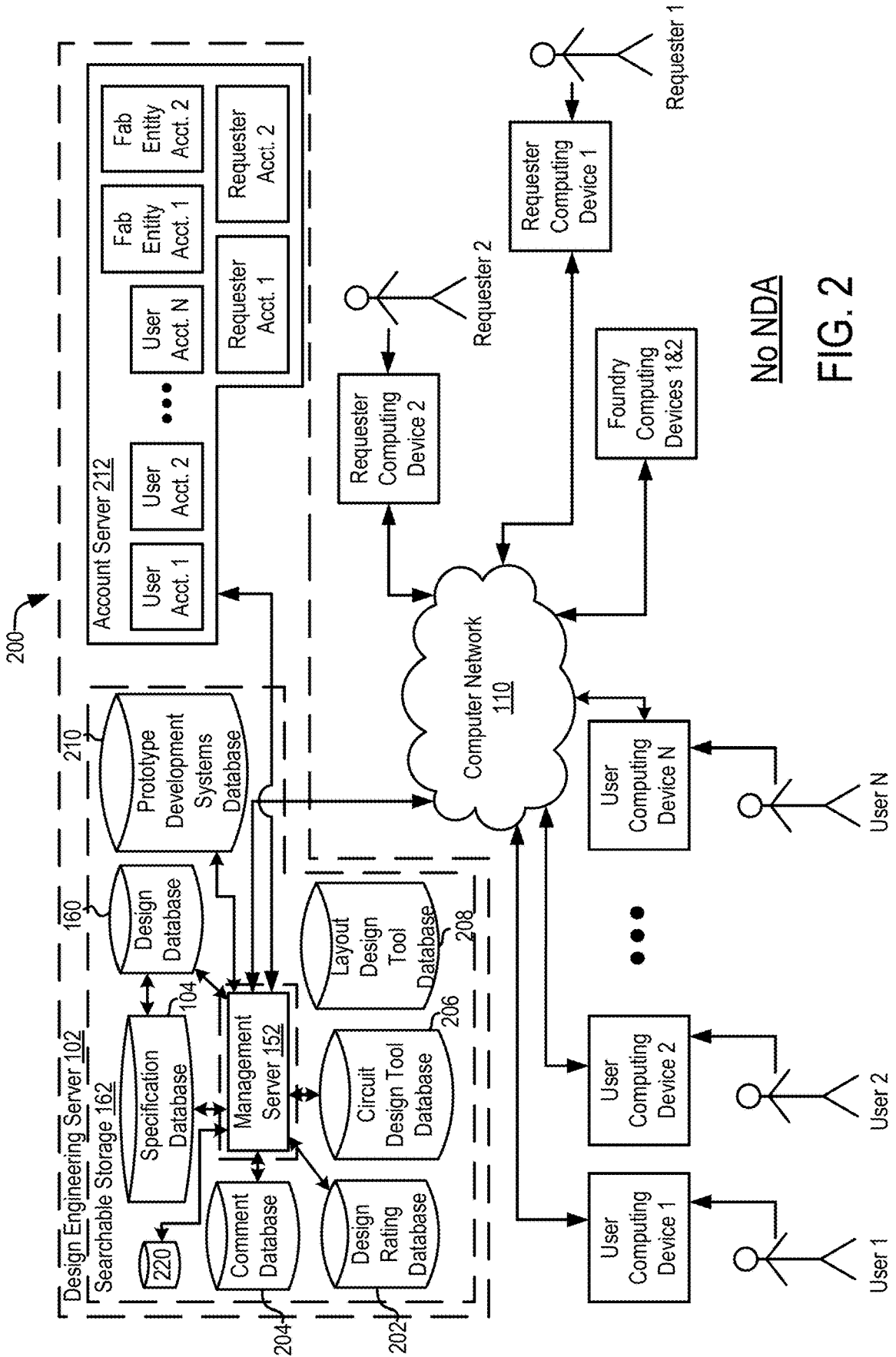

FIG. 1F is a diagram of an embodiment of a system 125 to illustrate a fabrication of a prototype of a design that is created and verified using the online design engineering system 102. The system 125 includes the server system 123, the searchable storage 162 and the fabrication computing device 1, which is coupled via the computer network 110 with the server system 123.

The server system 123 includes the obfuscator tool 182, the workspace application 180, a design simulation report generator tool 184, and a design rating generator tool 192. Each of the design simulation report generator tool 184 and the design rating generator tool 192 is a computer program that is executed by the server system 123.

Upon receiving a specification from the requester 1 via the requester account 1, the management server 152 posts a competition for generating a design of the electrical circuit based on a specification. The user 1 uses the user computing device 1 to access the workspace application 180 via the computer network 110 and the user account 1 to further access the circuit design tool 164. The circuit design tool 164 is accessed by the user 1 to generate a schematic 1830 of a circuit design according to the specification. An example of the schematic 1830 includes multiple components, such as transistors, logic gates, resistors, inductors, or capacitors, that are coupled to each other, such as in series or parallel, and connections between the components of the electrical circuit. The automatic certification server 112 of the server system 123 executes a local test bench tool 165 to generate a local test bench, such as one or more power sources that are coupled to input pins of the schematic 1830 and one or more loads that are coupled to the output pins of the schematic 1830. An example of a load includes a resistor or a capacitor or an inductor. In one embodiment, the local test bench is generated by the automatic certification server 112 or by the management server 152 at a time of reception, by the management server 152, of the specification based on which the schematic 1830 is generated. A local circuit design test is executed by the automatic certification server 112 when the user 1 selects, via the user account 1, one or more buttons displayed by the workspace application 180 on the display device of the user computing device 1 to apply the local test bench tool 165 on the schematic 1830. When the local circuit design test is executed, results of the local circuit design test are generated by the automatic certification server 112 to determine whether the schematic 1830 passes or fails the local circuit design test. In an embodiment, the local test bench tool 165 is stored within a memory device of the user computing device 1 and is executed by a processor of the user computing device 1 instead of being stored in the searchable storage 162 and executed by the automatic certification server 162.

The schematic 1830 and results of application of the local test bench tool 165 are stored in the searchable storage 162. Moreover, in an embodiment, the schematic 1830 is stored in a directory that is accessible via the workspace application 180 and the user account 1 to the user 1. The directory is stored on the computing device 1 that is operated by the user 1.

Furthermore, the automatic certification server 112 executes the circuit design verification tool 188 to perform a test on the schematic 1830 to determine whether the schematic 1830 passes or fails the test. Results of the test that are applied by executing the circuit design verification tool 188 are stored in the searchable storage 162. For example, a data sheet is updated by the automatic certification server 112 to include the results of the test of the schematic 1830 applied by executing the circuit design verification tool 188. Upon determining that the schematic 1830 passes the test executed by the circuit design verification tool 188, the schematic 1830 is indicated by the automatic certification server 112 to be certified by the design engineering entity. The certification by the design engineering entity is a result of an official characterization of the schematic 1830. An example of the official characterization is an execution of the circuit design verification tool 188 under control of the design engineering entity. The circuit design verification tool 188 is executed under control of the design engineering entity. For example, an employee of the design engineering entity uses the computing device 2 to execute the circuit design verification tool 188. The automatic certification server 112 does not allow a download of the circuit design verification tool 188 via the computer network 110 to the user computing device 1 operated by the user 1. As such, the circuit design verification tool 188 is executed on the cloud computing node.

In one embodiment, in addition to the execution of the local circuit design test and the circuit design verification tool 188, one or more of the user accounts 2-N are provided access by the management server 152 to the schematic 1830 for performing a community circuit design verification test. Before the one or more of the users 2-N access the schematic 1830, the obfuscator tool 182 obfuscates one or more portions of the schematic 1830. As such, there is no need for a nondisclosure agreement between one or more of the users 2-N and the user 1 that created the schematic 1830.

To perform the community circuit design verification test, one or more of the users 2-N access via the corresponding user accounts 2-N the circuit design verification tool 188 or the local test bench tool 165 or a local circuit verification tool that is stored in the corresponding computing device 2-N to test the schematic 1830. The local circuit verification tool is executed by a processor of corresponding computing device 2-N. Results of application of the community circuit design verification test by the users 2-N of the community are stored in the searchable storage 162.

Based on the results of the use of the local test bench tool 165 by the user 1 via the user account 1, the application of the circuit design verification tool 188 by the automatic certification server 112, and/or the local circuit verification tool used by one or more of the users 2-N, the user 1, such as person A, and/or other users, such as person B and person C, are determined by the management server 112 to be winners of the competition for generating a circuit design of the electrical circuit. For example, the management server 152 determines that the schematic 1830 created by the user 1, and other schematics created by the other users to meet the specification passes the local circuit design test applied using the local test bench tool 165, the test applied by executing the circuit design verification tool 188, and/or passes the test applied by executing the local circuit verification tool among multiple schematics received from the users 1-N based on the specification.

In an embodiment, results of the application of the local test bench tool 165 by the user 1 via the user account 1, the application of the circuit design verification tool 188 by the automatic certification server 112, and/or the application of the local circuit verification tool used by one or more of the users 2-N are stored within a data sheet. The data sheet with the results is sent from the management server 152 via the computer network 110 to the requester computing device 1 for access via the requester account 1.

In one embodiment, the circuit design verification tool 188 is the same as the local test bench tool 165 and/or the local circuit verification tool. For example, the user 1, the users 2-N, and the design engineering entity apply the same tool for verifying the schematic 1830.

The user 1 further uses the computing device 1 to access the workspace application 180 via the computer network 110 and the user account 1 to further access the layout design tool 166 from the online design engineering system 102. The layout design tool 166 is accessed by the user 1 via the user computing device 1 and the user account 1 to generate a layout design 127 that is based on the schematic 1830 and the specification. The automatic certification server 112 of the server system 123 executes a local layout verification tool 167, such as one for measuring physical dimensions of each cell within a plane, physical dimensions of each plane, an orientation of the planes with respect to each other, and an order of arrangement of the planes with respect to each other. The local layout verification tool 167 is executed by the automatic certification server 112 when the user 1 selects one or more buttons displayed by the workspace application 180 to apply the local layout verification tool 167 on the layout design 127. When the local layout verification tool 167 is executed, results of the execution are generated by the automatic certification server 112 to determine whether the layout design 127 passes or fails a local layout design test. In an embodiment, the local layout verification tool 167 is stored within a memory device of the user computing device 1 and is executed by a processor of the user computing device 1 instead of being stored in the searchable storage 162 and executed by the automatic certification server 162.

The layout design 127 and results of application of the local layout design test are stored in the searchable storage 162. Moreover, in an embodiment, the layout design 127 is stored in a directory that is accessible via the workspace application 180 and the user account 1 to the user 1. The directory, in which the layout design 180 is stored, is stored on the computing device 1 that is operated by the user 1.

Furthermore, the automatic certification server 112 executes the layout design verification tool 190 to perform a test on the layout design 127 to determine whether the layout design 127 passes or fails the test. Results of the test that are applied by executing the layout design verification tool 190 are stored in the searchable storage 162. For example, a data sheet is updated by the automatic certification server 112 to include the results of the test of the layout design 127. Upon determining that the layout design 127 passes the test executed by the layout design verification tool 190, the layout design 127 is indicated by the automatic certification server 112 to be certified by the design engineering entity. The certification by the design engineering entity is a result of an official characterization of the schematic 1830. An example of the official characterization is an execution of the layout design verification tool 190 under control of the design engineering entity. The layout design verification tool 190 is executed under control of the design engineering entity. For example, an employee of the design engineering entity uses the computing device 2 to execute the layout design verification tool 190. The automatic certification server 112 does not allow a download of the layout design verification tool 190 via the computer network 110 to the computing device 1 operated by the user 1. As such, the layout design verification tool 190 is executed on the cloud computing node.

In one embodiment, in addition to the execution of the local layout design test and the layout design verification tool 190, one or more of the user accounts 2-N are provided access by the management server 152 to the layout design 127 for performing a community layout design verification test. Before the one or more of the users 2-N access the layout design 127, the obfuscator tool 182 obfuscates, such as hides or covers, one or more portions of the layout design 127. As such, there is no need for a nondisclosure agreement between one or more of the users 2-N and the user 1 that created the layout design 127.

To perform the community layout design verification test, one or more of the users 2-N access the layout design verification tool 190 or the local layout verification tool 167 or a local layout verification tool that is stored in the corresponding computing device 2-N via the corresponding user accounts 2-N to test the layout design 127. The local layout verification tool 167 is executed by the processor of corresponding computing device 2-N. Results of application of the community layout design verification test by the users 2-N of the community are stored in the searchable storage 162.

Based on the results of the use of the local layout verification tool 167 by the user 1 via the user account 1, the application of the layout design verification tool 190 by the automatic certification server 112, and/or the local layout verification tool used by one or more of the users 2-N, person A and person B from person A, person B, and person C are determined by the management server 112 to be winners of the competition for generating a layout design of the electrical circuit. For example, the management server 152 determines that the layout design 127 created by person A and other layout designs created by person B to meet the specification passes the local layout design test, the test applied by executing the layout design verification tool 190, and/or passes the test applied by executing the local layout verification tool among multiple layout designs received from person A, person B, and person C and generated based on the specification.

In an embodiment, the results of the application of the local layout design test by the user 1 via the user account 1, the application of the layout design verification tool 190 by the automatic certification server 112, and/or the application of the local layout verification tool used by one or more of the users 2-N are stored within a data sheet. The data sheet with the results is sent from the management server 152 via the computer network 110 to the requester computing device 1 for access via the requester account 1.

The management server 152 accesses a Graphics Database System II (GDSII) file having the layout design 127 from the searchable storage 162, accesses a design file having the schematic 1830, and accesses a specification file having the specification for generating the layout design 127 from the searchable storage 162 and provides the GDSII file, the design file, and the specification file to the fabrication computing device 1 via the computer network 110. It should be noted that GDSII is a database file format for data exchange of a layout of the electrical circuit. GDSII is a binary file format representing planar geometric shapes, text labels and other information about the layout design 127 in a hierarchical form. The fabrication facility fabricates a prototype of the electrical circuit from the layout design 127 of the GDSII file.

In one embodiment, the local test bench tool 165, the circuit design verification tool 188, the layout design verification tool 190, and/or the local layout verification tool 167 are portions or parts of the design simulation report generator tool 184.

FIG. 2 is a diagram of an embodiment of a system 200 for illustrating the online design engineering system 102 in communication, via the computer network 110, with multiple user computing devices 1-N that are operated by the users 1-N and requester computing devices 1 and 2 that are operated by corresponding requesters 1 and 2. The system 200 includes the computing device N and additional computing devices 1, 2, through N−1. For example, each of the computing device 1 thru N−1 is operated by a different designer. To illustrate, the computing device 1 is operated by the user 1, the computing device 2 is operated by the user 2, and so on until the computing device N is operated by the user N. In an embodiment, each user 1 through N is a designer of a circuit design. For example, the user 1 designs a different circuit design than the user 2. The computing devices 1 through N are connected to the computer network 110. For example, each of the computing devices 1 through N includes a network interface controller for communicating packetized data to the computer network 110.

The system 200 further includes the online design engineering system 102, which includes various databases, e.g., a circuit design tool database 206 in which the circuit design tool 164 of FIG. 1B-2 is stored, a layout design tool database 208 in which the layout design tool 166 of FIG. 1B-2 is stored, a prototype development systems database 210, the design database 160, the specification database 104, a comment database 204, and a public-private indicator database 220. Each database is stored within one or more memory devices of the searchable storage 162. For example, the circuit design tool database 206 is stored in one or more memory devices and the specification database 104 is stored in one or more memory devices.

The circuit design tool database 206 stores rules and tools for generating a circuit design schematic. For example, the circuit design tool database 206 stores a computer program for generating a graphical representation, e.g., a schematic, etc., of a circuit design. As another example, the circuit design tool database 206 stores a computer program for generating a code that is executed to generate the schematic. Each component of a circuit design abides by one or more design rules. For example, an AND gate has an output and two inputs. As another example, an OR gate's output is high if any of its inputs are high, e.g., a bit 1, etc. The circuit design tool database 206 includes other rules for other components, e.g., transistors, diodes, multiplexers, flip-flops, capacitors, inductors, resistors, etc., of a circuit design.

The layout design tool database 208 stores rules regarding how to form and arrange various IP layers of a layout design of the SoC. For example, the layout design tool database 208 includes identities of components of each plane, a manner of connecting the components, and a manner of connecting the planes with each other. As another example, the layout design tool database 208 stores how various IP layers, such as a substrate layer, and a gate layer, of a layout design are to be arranged with respect to each other. As yet another example, the layout design tool database 208 stores a type of doping, such as n-type or p-type to be applied to a substrate, a number of vias between two adjacent or non-adjacent layers of a layout design, a number of traces between circuit components formed on an IP layer of the layout design, a number of pin outs of the layout design, and a number of pin ins of the layout design. In an embodiment, the layout design tool database 208 is generated by one or more fabrication entities and sent via the computer network 110 for storage within the online design engineering system 102. In one embodiment, the layout design tool database 208 is controlled by a fabrication entity and is accessible via the online design engineering system 102. The layout design tool database 208 is not stored within the online design engineering system 102 but within a cloud computing node that is under control of, such as leased by or owned by, a fabrication entity. When a user gains access to the online design engineering system 102, the user is allowed access by the management server 152 to the layout design tool database 208.

The prototype development systems database 210 stores a computer program for testing a prototype of the electrical circuit. For example, a prototype of an integrated circuit in which a layout design is implemented is connected to a computer, such as a user computer or a fabrication entity computer, via a cable, such as a serial transfer cable, a parallel transfer cable, or a universal serial bus (USB) cable. When the prototype is connected to the computer, a request for execution of a validation test on the prototype is sent from the computer via an account, such as the user account 1 or a fabrication entity account 1, and the computer network 110 to the prototype tester and test report generator tool of the online design engineering system 102. For example, the user 1 selects, via the input device of the user computing device 1, a button displayed within the user account 1 to generate and send the request for execution of the validation test. Upon receiving the request, the management server 152 provides the computer with access to the prototype tester and test report generator tool. The prototype tester and test report generator tool is executed by the automatic certification server 112 to provide an input value to the prototype for processing of the input value by the prototype. The prototype is implemented on a printed circuit board (PCB) during a test conducted by the prototype tester and test report generator tool. The PCB is coupled to the computer for testing the prototype. The prototype tester and test report generator tool receives results of the processing from the integrated circuit via the cable and the computer network 110, and determines whether the results match pre-determined values. Upon determining that the results match the pre-determined values, the prototype tester and test report generator tool determines that the prototype passes the validation test. On the other hand, upon determining that the results do not match the pre-determined values, the prototype tester and test report generator tool determines that the prototype fails the validation test. The results of the validation test, such as the prototype passed the validation test, the prototype failed the validation test, and output voltage values generated during the validation test, are integrated by the data sheet builder tool within a data sheet that includes a specification based on which the design for the prototype is generated. For example, the data sheet is integrated with pass or fail and values, such as voltage values or current values, that are output when the input value is provided to the prototype. The data sheet builder tool sends the data sheet including the results of the test of the prototype via the computer network 110 to the requester computing device 1 via the requester account 1. It should be noted that the prototype tester and test report generator tool is not downloaded to the computer. Rather, the prototype tester and test report generator tool is executed by the management server 152.

A fabrication entity uses a fabrication computing device to access a fabrication entity account to access the online design engineering system 102. For example, a fabrication entity accesses the website and provides fabrication entity login information, such as an e-mail address or password or a combination thereof, via the website to access a fabrication entity account that is assigned to the fabrication entity by the online design engineering system 102.

The design database 160 circuit designs of various electrical circuits that are created by the users 1 through N. For example, the management server 152 receives circuit design schematics from the computing devices 1 through N via the computer network 110 and stores the circuit design schematics within the design database 160. As another example, the management server 152 receives layout designs of various electrical circuits from the computing devices 1 through N via the computer network 110 and stores the layout designs within the design database 160.

The specification database 104 stores specifications of various electrical circuits. For example, the specification database 104 includes textual data and/or graphical data describing restrictions on various electrical parameters, such as amounts of input voltages, amounts of input currents, amounts of output currents, amounts of output voltages, frequencies of operation, or lack of use of a clock signal, and on various physical parameters, such as a number of pin ins, a number of pin outs, and use or lack of use of a clock signal pin, of various electrical circuits of one or more SoCs. As another example, the specification database 104 includes textual data and/or graphical data identifying a type, such as a name or an identifier, of the electrical circuit, such as a buffer, an inverter, a logic gate, a half-adder, a full adder, a processor, an analog-to-digital converter, or a digital-to-analog converter.

The comment database 204 stores comments or posts made by the users 1 through N via the corresponding user accounts 1 through N regarding various designs. For example, the user 1 logs into the user account 1 to access the user account 1 from an account server 212 via the computer network 110, and posts a comment to the user account 1. The user 1 uses the user computing device 1 to provide via the user account 1 authorization to the management server 152 to allow one or more of the other users 2 through N to access the comment via the corresponding user accounts 2 through N. The one or more of the other users 2 through N access their corresponding user accounts 2 through N to view the comment.

In an embodiment, a user or a requester or a fabrication entity provides login information, e.g., name, password, biometric information, etc., to the online design engineering system 102 to access his/her/its account. An example of a requester is a user that is an employee of the requester entity or is a contractor hired by the requester entity. Upon receiving the login information, an authenticator tool of the online design engineering system 102 compares the login information with pre-stored login information to determine whether the login information matches the pre-stored login information. The user or the requester or the fabrication entity is provided access to his/her/its account by the authenticator tool upon determining that the login information matches the pre-stored information. Otherwise, the user or the requester or the fabrication entity is not provided access to his/her account in case of a mismatch between the login information and the pre-stored information. A user or the requester or the fabrication entity logs into his/her/its account to access one or more databases of the online design engineering system 102 such as the circuit design tool database 206, the layout design tool database 208, the prototype development systems database 210, the design database 160, the specification database 104, and the comment database 204. Without being authenticated, the authenticator tool of the online design engineering system 102 does not provide access to any of the databases. The user accounts 1 through N assigned to the corresponding users 1 through N by the authenticator tool, fabrication entity accounts 1 and 2 assigned to fabrication entities 1 and 2 by the authenticator tool, and requester accounts 1 and 2 of the corresponding requesters 1 and 2 are stored within the account server 212, which is coupled to the management server 152.

The system 200 includes the requester computing devices 1 and 2 that are connected to the online design engineering system 102 via the computer network 110. Moreover, the system 200 includes the fabrication computing devices 1 and 2 that are connected via the computer network 110 to the online design engineering system 102. The one or more fabrication computing devices 1 and 2 are controlled by the corresponding fabrication entities 1 and 2. As an example, the fabrication entities 1 and 2 are corporations that fabricate a prototype of the electrical circuit.

Figure 3:
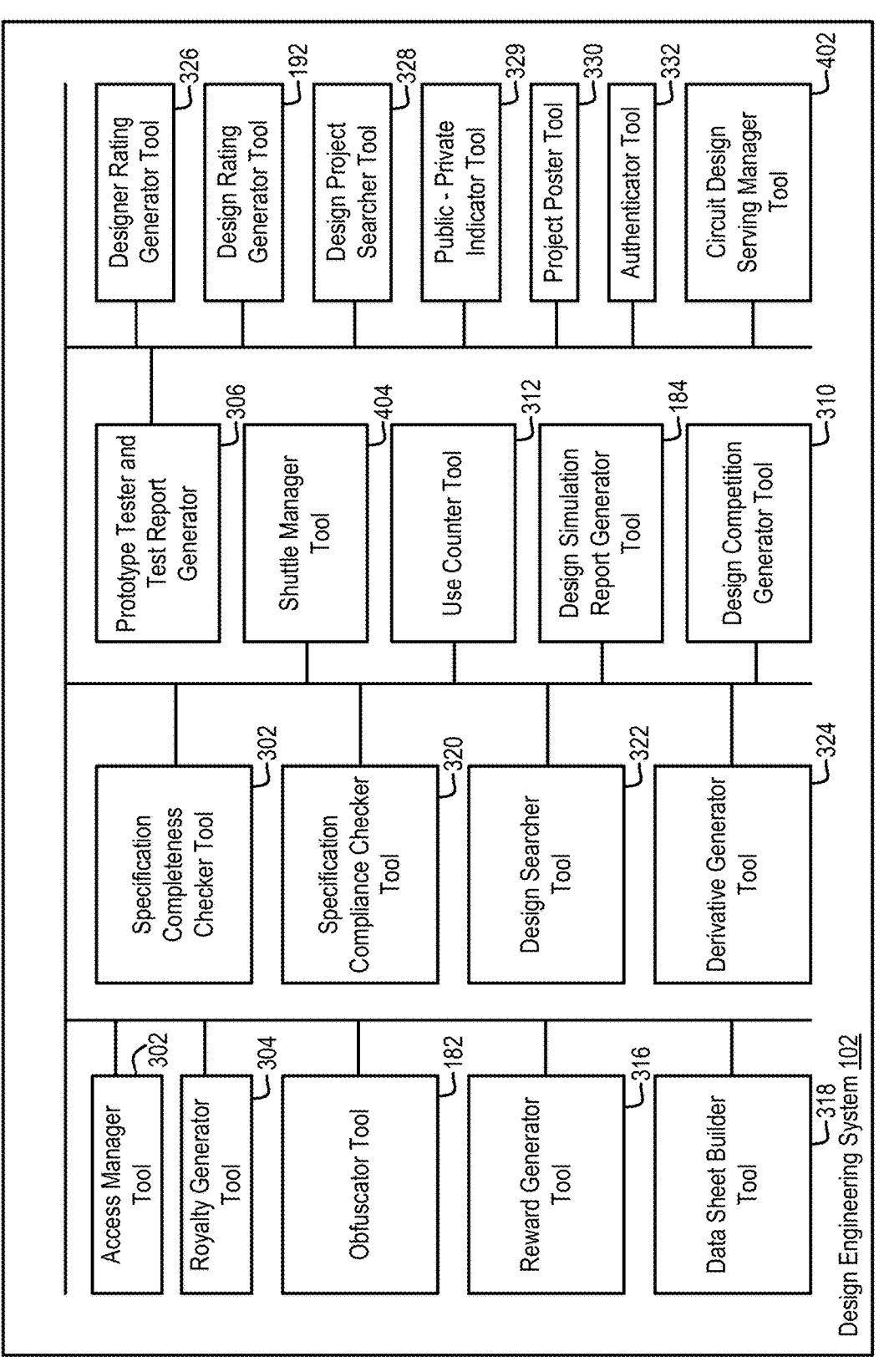
FIG. 3 is a diagram of an embodiment of various tools of the online design engineering system.

FIG. 3 is a diagram of an embodiment of various tools of the online design engineering system 102. It should be noted that in an embodiment, the online design engineering system 102 provides a specification driven design process, a web driven data sheet such as an online data sheet, a community driven interactive specification builder, a community-based verification of a circuit design, a pooling of knowledge of the community, a continual improvement through community input such as comments on a circuit design, a verification independent of a designer, an optional physical validation flow, test chip runs for validation of a circuit design, electrical characterization of test chips by the design engineering entity, feedback from the community, a rating of designer skills, a rating of a circuit design, a count of a number of uses of a circuit design, circuit design specific forms, a simulation of all specification parameters on the data sheet by using a simulation software, verification by the design engineering entity of all the specification parameters on the data sheet, coupling of a circuit design with a glue logic design or another integration circuit design provided by the design engineering entity, tools for generation of manufacturing-aware electronic models that are sent to the fabrication entities 1 and 2, manufacturing on a shuttle, testing of an integrated circuit chip design using a test printed circuit board and software provided by the design engineering entity, and/or reports or results provided by the community based on experience, etc. The reports and results provide potential for revenue sharing based on additional specification parameters that are checked.

The online design engineering system 102 includes an access manager tool 303, a royalty generator tool 304, the obfuscator tool 182, a reward generator tool 316, a data sheet builder tool 318, a specification completeness checker tool 302, a specification compliance checker tool 320, a design searcher tool 322, a derivative generator tool 324, a prototype tester and test report generator tool 306, a shuttle manager tool 404, a use counter tool 312, the design simulation report generator tool 184, a design competition generator tool 310, a designer rating generator tool 326, the design rating generator tool 192, a design project searcher tool 328, a public-private indicator tool 329, a project poster tool 330, the authenticator tool 332, and a design serving manager tool 402. In one embodiment, a tool, as used herein, is a hardware, such as an ASIC or a PLD, or a software, such as a computer program, executed by a processor, or a combination of the hardware and software. For example, a tool is a computer software program that is executed by one or more processors of a server. As another example, a tool is an ASIC or a PLD. As an example, the access manager tool 303, the royalty generator tool 304, the obfuscator tool 182, the reward generator tool 316, the data sheet builder tool 318, the specification completeness checker tool 302, the specification compliance checker tool 320, the design searcher tool 322, the derivative generator tool 324, the shuttle manager tool 404, the use counter tool 312, the design competition generator tool 310, the designer rating generator tool 326, the design rating generator tool 192, the design project searcher tool 328, the project poster tool 330, the authenticator tool 332, the design serving manager tool 402, and the public-private indicator tool 329 are parts of or executed by the management server 152. Moreover, as an example, the prototype tester and test report generator tool 306 and the design simulation report generator tool 184 are parts of or executed by the automatic certification server 112. In an embodiment, any tool of the online design engineering system 102 is coupled to any other tool of the online design engineering system 102 via a communication medium, such as a conductor for transferring data serially, multiple conductors for transferring data in a parallel manner, or a universal serial bus.

The access manager tool 303 determines whether to provide a computing device, such as, a user computing device or a requester computing device or a fabrication computing device, with access to other tools and the workspace application 180. Examples of the other tools include the royalty generator tool 304, the obfuscator tool 182, the reward generator tool 316, the data sheet builder tool 318, the specification completeness checker tool 302, the specification compliance checker tool 320, the design searcher tool 322, the derivative generator tool 324, the shuttle manager tool 404, the use counter tool 312, the design competition generator tool 310, the designer rating generator tool 326, the design rating generator tool 192, the design project searcher tool 328, the project poster tool 330, the design serving manager tool 402, the public-private indicator tool 329, the prototype tester and test report generator tool 306, and the design simulation report generator tool 184 of the online design engineering system 102. For example, the access manager tool 303 determines whether login information that is received from the computing device via the computer network 110 is authenticated by the authenticator tool 332. To illustrate, the access manager tool 303 sends a request to the authenticator tool 332 to determine whether the login information is valid. Upon receiving a reply from the authenticator tool 332 that the login information is valid, the access manager tool 303 provides access to the computing device to the other tools of the online design engineering system 102 and the workspace application 180. On the other hand, upon receiving a reply from the authenticator tool 332 that the login information is invalid, the access manager tool 303 denies access to the computing device to the other tools of the online design engineering system 102 and the workspace application 180. In one embodiment, the access manager tool 303 provides online access via the computer network 110 to the other tools and the workspace application 180 but does not allow a download of one or more of the other tools and the workspace application 180 to the computing device from the online design engineering system 102 via the computer network 110.

The royalty generator tool 304 generates royalties, such as, in terms of percentages or monetary amounts, for designs that are created by the users 1 through N and that passes one or more of the local circuit design test, the test executed by the circuit design verification tool 188, the community circuit design verification test, the local layout design test, the test executed by the layout design verification tool 190, and the community layout design verification test. For example, the royalty generator tool 304 generates a royalty amount or a royalty percentage when a designer posts a schematic of a circuit design to his/her user account and the schematic passes one or more of the local circuit design test, the test executed by the circuit design verification tool 188, the community circuit design verification test. As another example, the royalty generator tool 304 generates a royalty amount or a royalty percentage when a designer posts a layout design to his/her user account and the layout design passes one or more of local layout design test, the test executed by the layout design verification tool 190, and the community layout design verification test. As yet another example, the royalty generator tool 304 generates a royalty amount or a royalty percentage for a design based on a number of uses of the design. The royalty generator tool 304 accesses the number of uses from the use counter tool 312 for multiple designs. Upon determining that a number of uses of a first one of the designs is greater than a number of uses of a second one of the designs, the royal generator tool 304 generates a higher amount of royalty for accessing the first design than that for accessing the second design. In one embodiment, a royalty amount or a royalty percentage is provided from the royalty generator tool 304 to the requester 1 via the requester computing device 1 and the requester account 1 when a design for which the royalty percentage or the royalty amount is calculated is accessed by the requester computing device 1 via the requester account 1. For example, the requester 1 uses the requester computing device 1 to access the request account 1 to further request access to a design, such as via the design search field. Upon receiving the request for access, the royalty generator tool 190 provides access to the design with a royalty amount or a royalty percentage for accessing the design.

In an embodiment, the royalty generator tool 304 is connected to a credit and debit server system via the computer network 110. For example, when the requester 1 sends a request via the requester account 1 for a circuit design to the online design engineering system 102, and a designer provides the circuit design to the requester via the online design engineering system 102, the royalty generator tool 304 provides a royalty, such as a royalty amount or a royalty percentage, to the credit and debit server system, and the credit and debit server system debits the royalty from a deposit account of the requester and credits the amount to a deposit account of the designer. A deposit account is maintained by the credit and debit server system.

The obfuscator tool 182 hides at least a portion of a design so that a need for a non-disclosure agreement (NDA) between the requester and a designer is avoided. For example, the obfuscator tool 182 overlays a schematic or a layout design with an opaque portion, such as an opaque block, an opaque shape, that hides one or more portions of the schematic or one or more portions of the layout design to create a black box. To illustrate, pin ins and pin outs of the schematic are not covered by the opaque portion. To further illustrate, power pins, ground pins, data input pins, and data output pins are not covered or hidden to create the black box. In one embodiment, one or more pin ins and/or one or more pin outs of the schematic are covered or hidden by the opaque portion. As another example, the obfuscator tool 182 conceals various IP layers of a layout design and conceals various tiles of the IP layers to create a black box. In this example, pin ins and pin outs of the layout design are not covered by the opaque portion. In one embodiment, one or more pin ins and/or one or more pin outs of the layout design are covered by the opaque portion.

The obfuscator tool 182 is coupled to the authenticator tool 332 for displaying a design to a user or a requester with permission and obfuscating one or more portions of the design before display the design to the user or the requester without permission. For example, when an account, such as the user account 1 or the requester account 1, has permission from the authenticator tool 332 to display a design on a computing device, the obfuscator tool 182 does not overlay the design with the opaque portion to display the design on the computing device. In addition to providing access to the design to a computing device, such as a user computing device or a requester computing device, via the computer network 110, the management server 152 sends a data sheet including a specification for generating the design via the computer network 110 to the computing device. The design is provided access via an account, such as a user account or a requester account. The authenticator tool 332 determines that the account of another user or the requester has permission to view the design when a designer indicates via his/her account that the design is public. On the other hand, when the authenticator tool 332 determines that the account of another user, other than the designer, or the requester does not have permission to display the design on the computing device, the obfuscator tool 182 overlays the design with the opaque portion to generate an obfuscated design. In addition to providing access to the obfuscated design to the computing device, such as the user computing device or the requester computing device, via the computer network 110, the management server 152 sends a data sheet including a specification for generating the design via the computer network 110 to the computing device. The obfuscated design is provided access via the account, such as the user account or the requester account. The authenticator tool 332 determines that the account does not have permission to view the design when the user or the requester indicates via his/her account that the design is private.

In one embodiment, the obfuscator tool 182 accesses the public-private indicator database 220 of the searchable storage 162 to determine an association between an account, such as a requester account or a user account, and an indication of whether a design is public or private. The public-private indicator database 220 stores a list of associations, such as, a one-to-one mapping or a correspondence or a unique relationship or a link, between various accounts and indications of whether the accounts are allowed to access the design without obfuscation. For example, a first entry in the list indicates that the user 1 via the user account 1 has indicated that a design 1 of the electrical circuit be private to the user account 2. The user 1 creates the design 1 via the user account 1. Moreover, a second entry in the list indicates that the user 1 has indicated via the user account 1 that the design 1 be private to the requester account 2. Also, a third entry in the list indicates that the user 1 has indicated via the user account 1 that the design 2 be public to the user account 2. The obfuscator tool 182 accesses the first entry in response to an indication received from the user computing device 2 for accessing via the user account 2 and the computer network 110 the design 1 and obfuscates one or more portions of the design 1 to generate an obfuscated design. For example, when the design searcher tool 322 receives a request via the computer network 110 and the user account 1 from the user computing device 1 for accessing a design stored within the design database 160, the design searcher tool 322 sends a signal to the obfuscator tool 182 of the request. Upon receiving the signal indicating the reception of the request for accessing the design, the obfuscator tool 182 accesses an entry, such as the first entry, to determine whether the design is designated as private or public.

In the embodiment, the obfuscated design is sent, by the obfuscator tool 182, via the computer network 110 to the user computing device 2 operated by the user 2 for display on the user computing device 2 via the user account 2. For example, the obfuscator tool 182 packetizes the obfuscated design by applying the communication protocol to generate packets, and sends the packets via the computer network 110 and the user account 2 to the user computing device 2. In addition to sending the obfuscated design to the user computing device 2 via the computer network 110, the management server 152 sends a data sheet including a specification for generating the design 1 via the computer network 110 to the user computing device 2. The obfuscator tool 182 accesses the second entry when the requester 1 indicates via the requester account 1 to access the design 1 and obfuscates one or more portions of the design 1 to generate the obfuscated design, and sends the obfuscated design via the computer network 110 to the requester computing device 1 for display on the requester computing device 1. In addition to sending the design 1 to the user computing device 1 via the computer network 110, the management server 152 sends a data sheet including a specification for generating the design 1 via the computer network 110 to the requester computing device 1. The obfuscator tool 182 further accesses the third entry when the user 2 indicates via the user account 2 to access the design 2 and deobfuscates, such as removes an opaque portion, or does not obfuscate one or more portions of the design 2 and sends the design 2 via the computer network 110 to the computing device 2 operated by the user 2 for display. In addition to sending the design 2 to the user computing device 2 via the computer network 110, the management server 152 sends a data sheet including a specification for generating the design 2 via the computer network 110 to the user computing device 2.

The reward generator tool 316 generates a reward, such as a monetary amount or the royalty, to a winner, e.g., a designer, etc., of a design in a competition. In an embodiment, the reward generator tool 316 is connected to the credit and debit server system via the computer network 110. For example, when the requester 1 operates the requester computing device 1 to send a request via the requester account 1 for a circuit design to the online design engineering system 102, and the user 1 wins the competition among the users 1-N, the reward generator tool 316 provides the reward to the credit and debit server system, and the credit and debit server system debits an amount of the reward from a deposit account of the requester 1 and credits the amount to a deposit account of the user 1.

The competition is generated by the design competition generator tool 310 and is posted within the online design engineering system 102 for access by the computing devices 1 through N. For example, upon receiving the data sheet including the specification for the electrical circuit from the requester 1 by the requester account 1, the design competition generator tool 310 sends to the requester account 1 via the computer network 110 a request regarding whether the requester 1 wishes to generate a competition for a design of the electrical circuit. Upon receiving an indication via the requester computing device 1 and the requester account 1 for the generation of the competition, the competition generator tool 310 posts an indication of the competition along with the data sheet including the specification to the user accounts 1 through N. For example, the competition generator tool 310 provides, via the computer network 110 and the user accounts 1 through N, to the user computing devices 1 through N a data sheet for which a design is to be generated with the indication of the competition for generating the design. Moreover, the competition generator tool 310 provides, via the computer network 110 and the user accounts 1 through N, to the user computing devices 1 through N a competition entry option, such as a competition entry button. Upon viewing a display of the competition on display devices of the user computer devices 1 through N, one or more of the users 1 through N use respective user computing devices 1 and select via the corresponding user accounts 1 through N the competition entry option. Upon receiving the selections of the competition entry option via the corresponding user accounts 1 through N and the computer network 110, the competition generator tool 310 stores the selections in the searchable storage 152 and associates the selections with the user accounts 1 through N that are accessed to provide the selections.

The data sheet builder tool 318 generates a data sheet that includes fields for receiving a specification of the electrical circuit. For example, upon receiving an indicator from the requester account 1 for access to the data sheet, the data sheet builder tool 318 accesses the template database of the searchable storage 162 to provide the data sheet to the requestor account 1. For example, the data sheet builder tool 318 reads the data sheet from the template database and applies the communication protocol to generate packets from the data sheet, and sends the packets via the computer network 110 and the requester account 1 to the requester computing device 1. In an embodiment, the data sheet includes results of a simulation of a design, or results of a test of a prototype incorporating the design. In one embodiment, the data sheet is a web-driven data sheet, which is accessed via the website that is managed by the design engineering entity.

The specification completeness checker tool 302 determines whether a specification within a data sheet that is received from the requester 1 via the requester account 1 and the computer network 110 is complete. For example, for a type of a design, e.g., a design of a buffer, a design of an adder, a design of a multiplier, etc., the specification completeness checker tool 302 checks whether all parameters of the specification to generate the design are received in the data sheet. Upon determining that all the parameters are not received, the specification completeness checker tool 302 generates a notification. The specification completeness checker tool 302 sends the notification via the computer network 110 and the requester account 1 to the requester computing device 1 indicating the requester 1 that the specification is incomplete. The requester 1 uses the requester computing device 1 to provide the remaining parameters within the specification of the data sheet and sends the data sheet via the computer network 110 and the requester account 1 to the specification completeness checker tool 302.

The specification compliance checker tool 320 determines whether a specification received from the requester complies with specification compliance rules, which are stored in a specification compliance database of the searchable storage 162. Examples of the specification compliance rules include whether a parameter provided in the specification is within a predetermined range, whether a distance provided in the specification between two adjacent design components is within a preset limit, a number of pin ins of a design, a number of pin outs of the design, and whether a distance provided in the specification between two adjacent planes is within a predetermined limit. It should be noted that in some embodiments, pin ins and input pins are used interchangeably herein. Moreover, pin outs and output pins are used interchangeably herein.

The design searcher tool 322 searches for designs within the design database 160 of FIG. 2. For example, the requester computing device 1 sends via the requestor account 1 and the design search field or the user computing device 2 sends via the user account 2 and the design search field a request to search for a design to the online design searcher tool 322 via the computer network 110. The request includes the name of the design, such as, an encoder or an multiplexer or an amplifier or a voltage regulator. Based upon the request, the design searcher tool 322 searches for a design within the design database 160 whose name matches a name of the design within the request. When there is a match between the name of the design within the design database 160 and the design within the request, the design searcher tool 322, sends a request to the obfuscator tool 182. The obfuscator tool 182 access the public-private indicator database 220 to determine whether the requestor account 1 or the user account 2 has permission from the user 1 that generated the design to access the design. Upon determining that the requestor account 1 or the user account 2 does not have the permission, the obfuscator tool 182 obfuscates one or more portions of the design to generate an obfuscated design and sends the obfuscated design via the computer network 110 to the user computing device 2 or the requestor computing device 1 for display of the obfuscated design. On the other hand, upon determining that the requestor account 1 or the user account 2 has the permission, the obfuscator tool 182 deobfuscates or does not obfuscate the design and sends the design via the computer network 110 to the user computing device 2 or the requestor computing device 1 for display of the design via the user account 2 or the requester account 1.

The requester 1 via the requester account 1 sends a request for generating a derivative of the first integrated circuit chip design. Upon receiving the request, the derivative generator tool 324 generates a derivative of the first integrated circuit chip design. For example, the derivative generator tool 324 couples an integration circuit design, such as a glue logic design, with a first circuit design to create a first integrated circuit chip design and couples the integration circuit design with a second circuit design, which is a derivative of the first circuit design, to create a second integrated circuit chip design. The integration circuit design is stored in the searchable storage 162 and is accessed, such as read, by the derivative generator tool 324 from the searchable storage 162. In one embodiment, the derivative generator tool 324 recommends a derivative of a circuit design and sends the recommendation via the computer network 110 and the requester account 1 to the requester computing device 1.

In an embodiment, the derivative includes a change in one or more components of the first circuit design to generate the second circuit design with the changed components that perform the same functions as that performed by the one or more components. For example, multiple logic gates of the first circuit design are replaced by gates of a lower number in the second circuit design. For example, multiple transistors of the first circuit design are replaced by transistors of a lower number in the second circuit design. In one embodiment, the derivative allows for an increase in efficiency, features or a reduction in cost or space on an integrated circuit.

The prototype tester and test report generator tool 306 generates a test report that includes results of testing a prototype of the electrical circuit. In an embodiment, the prototype tester and test report generator tool 306 includes instructions as to how to connect the prototype to a computing device for testing the prototype.

The use counter tool 312 keeps a record of a number of uses of a design. For example, a number of times for which a design is used in a prototype of an integrated circuit chip and/or a number of times the circuit design is used by one or more of the users 1 through N is determined by the use counter tool 312. To illustrate, a number of integrated circuits in which a design is to be implemented are provided from a fabrication computing device operated by a fabrication entity. The fabrication entity uses the fabrication computing device to access a fabrication entity account 1, described below, to provide the number of integrated circuits via the computer network 110 to the use counter tool 312. As another example, the use counter tool 312 counts a number of tests that a design has passed. To illustrate, the use counter tool 312 requests the data sheet builder tool 318 to provide a total of a number of times for which a circuit design generated based on a specification passes a simulation test, a layout design generated based on the specification passes a simulation test, and a prototype generated based on the specification passes a test. The data sheet builder tool 318 generates the total and sends the total to the use counter tool 312. The number of uses is used by the online design engineering system 102 for one or more purposes, e.g., calculate a royalty, calculate a monetary amount to provide to a designer of a design, calculate a design rating of the design or a designer rating of the designer, etc.

The design simulation report generator tool 184 generates a design simulation report that includes results of a simulation of a schematic of a circuit design and/or results of a simulation of a layout design. For example, the design simulation report generator tool 184 generates a design simulation report that indicates a result of the local circuit design test performed by the user 1 via the user account 1, the application of the circuit design verification tool 188 by the automatic certification server 112, and/or the application of the local circuit verification tool used by one or more of the users 2-N of the community. As another example, the design simulation report generator tool 184 generates a design simulation report that indicates a result of the local layout design test performed by the user 1 via the user account 1, the application of the layout design verification tool 190 by the automatic certification server 112, and/or the application of the local layout verification tool used by one or more of the users 2-N of the community.

The design competition generator tool 310 receives a request for a circuit design competition from the requester 1 via the requestor account 1 and the computer network 110, and posts a competition for generating a circuit design based on the request. For example, the design competition generator tool 310 receives a specification for a circuit design from the requester, and posts the specification and terms, e.g., time limit of the competition in which the circuit design is to be submitted to the online design engineering system 102, reward for winning the competition, etc., of the competition. The designers that control the computing devices 1 through N receive the specification and the terms of the competition from the design competition generator tool 310 via the computer network 110 and compete by generating designs according to the specification. The generated designs are submitted by the designers via the computing devices 1 through N and the computer network 110 to the online design engineering system 102. The online design engineering system 102 evaluates the circuit designs based on the specification and terms of the competition to determine one or more winners of the competition. Results, such as, name of the one or more winners and one or more of the user accounts 1 through N, are posted by the online design engineering system 102 within the one or more of the user accounts 1 through N for access by one or more of the corresponding users 1 through N via the computer network 110. Moreover, the results of the competition are provided to the requester computing device 1 via the computer network 110 so that the requester entity 1 can provide an award, such as a reward, to the one or more winners via the computer network 110, the online design engineering system 102, and/or the credit and debit server system. For example, a number of points are awarded to the one or more winners via the online design engineering system 102, and/or cash amounts are awarded to the one or more winners via the credit and debit server system, etc.

The designer rating generator tool 326 generates a rating of the designer of the circuit design. For example, a designer who created a circuit design is rated on a scale of 1 to 10 based on a number of times the circuit design is used in one or more integrated circuits, and/or a number of times the circuit design is accessed via one or more of the user accounts 1 through N that have not been used to create the circuit design, and/or a number of times the circuit design is accessed by the requester computing device, and/or comments posted by one or more of the other users 1 through N regarding the designer to the comments database, etc.

The design rating generator tool 192 generates a rating of a design based on a number of uses of the design, and posts the rating to one or more servers that are controlled, e.g., leased by, owned by, etc., by the online design engineering system 102 for access by the computing devices 1 through N, the requester computing device, and/or the one or more servers controlled by the one or more fabrication entities. In an embodiment, a design is rated based on a number of times the design is used in one or more integrated circuits, and/or a number of comments made on the design, and/or a number of times for which the design passes one or more tests, and/or a number of times the design is accessed via one or more of the user accounts 1 through N that have not been used to create the circuit design, and/or a number of times the design is accessed by the requester computing device, etc. To illustrate, when a first design passes a higher number of tests compared to a second design, the first design is assigned a higher rating by the design rating generator tool 192 compared to the second design.

The design project searcher tool 328 searches for a design project that is posted by the requester computing device 1 onto the online design engineering system 102 via the computer network 110. For example, the user 2 uses the computing device 2 to provide a search query for a project for generating a circuit design. The search query includes a name, such as an analog-to-digital converter, a digital-to-analog converter, an adder, or a multiplexer, of an integrated circuit to be designed. As an example, the name of an integrated circuit identifies functionality of the integrated circuit. The search query is sent via the computer network 110 to the online design engineering system 102. The design project searcher tool 328 searches the specification database 160 that is connected to the online design engineering system 102 for the project, such as a specification, based on the name of the integrated circuit. The project is retrieved from a project database, such as the specification database 104, and provided via the computer network 110 to the computing device 2. For example, a data sheet including a specification for generating a circuit design is provided via the computer network 110 to the computing device 2. The project database is stored within the searchable storage 162. For example, the project database includes specifications for generating designs. In addition, in this example, the project database includes an indication for each specification whether one or more designs are generated based on the specification. When one or more designs are generated based on the specification and the designs pass simulation tests, described herein, and/or one or more integrated circuit chips are fabricated having the one or more designs and the one or more integrated circuit chips pass one or more validation tests, described herein, the project is marked by the management server 152 as completed within the project database. Otherwise, the project is marked by the management server 152 as being incomplete within the project database. Once a project is marked as complete. The user 2 can then start generating a design based on the specification within the data sheet.

It should be noted that in an embodiment, any output, e.g., royalty amounts, obfuscated circuit design, award for a design, a data sheet, results of whether a data sheet is complete, results of whether a specification is compliant, a schematic of the design, a layout of the design, a test report of testing a prototype generated based on the design, a simulation result of running a simulation on a design, a result of the competition, a rating of a designer, a rating of the design, a design project, etc., generated by any of the tools of the online design engineering system 102 are provided via the computer network 110 to the requester computing device or the one of the computing devices 1 through N that have a permission to receive the output.

In one embodiment, any of the tools, described herein, of the online design engineering system 102 is coupled to the searchable storage 162. For example, the design tools 158 are coupled to the searchable storage 162 via a communication medium, such as a serial transfer communication medium, a parallel transfer communication medium, or a universal serial bus communication medium, or a combination thereof. As another example, any of the tools, described herein, are coupled to the searchable storage 162 via the computer network 110.

Figure 4A:
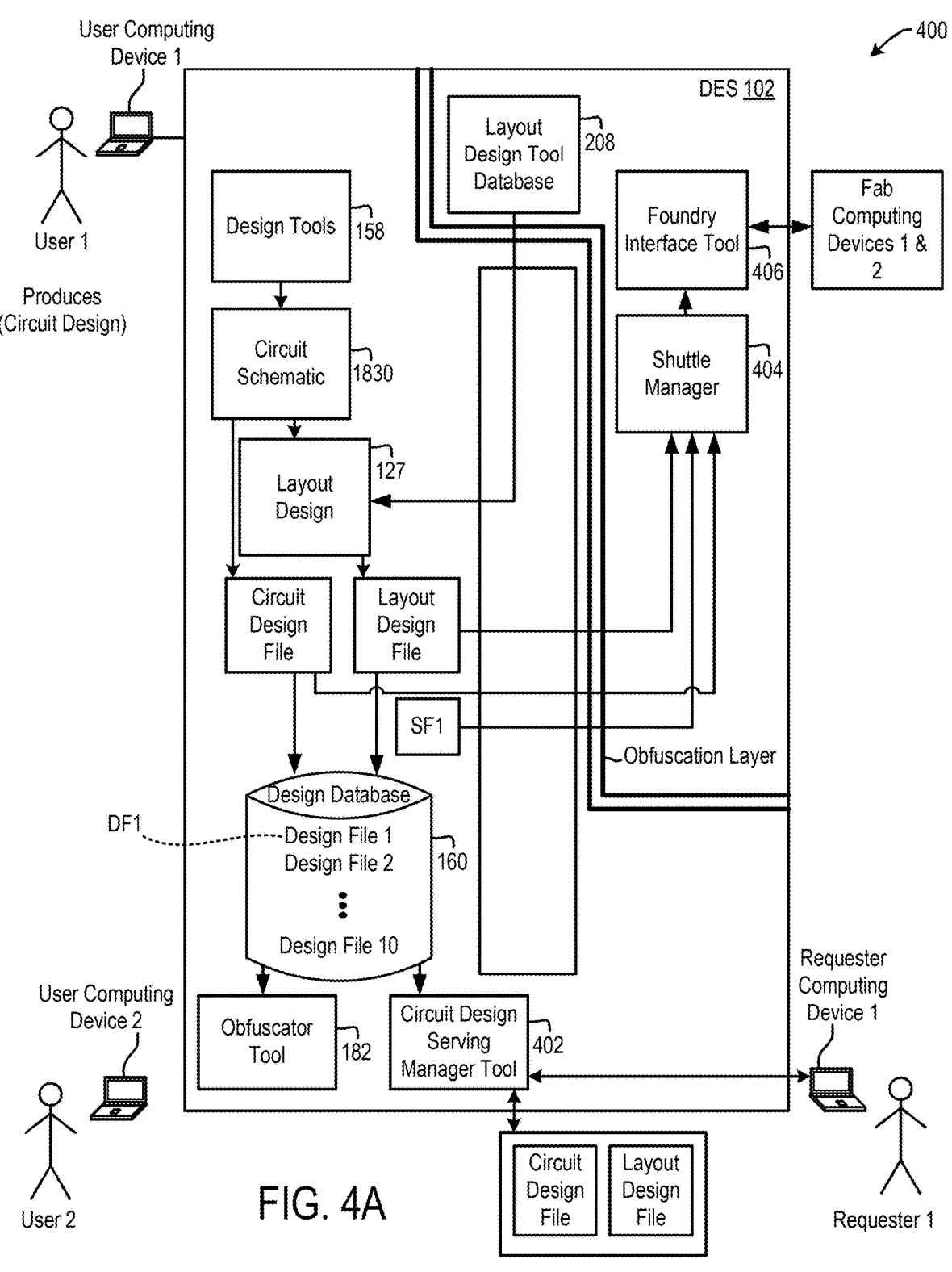
FIG. 4A is a diagram of an embodiment of the online design engineering system to illustrate obfuscation of a design and shuttling of multiple integrated circuit chips on a wafer.

FIG. 4A is a diagram of an embodiment of a system 400 to illustrate obfuscation of a design. The requester 1 requests the management server 152 via the requestor computing device 1 and the computer network 110 for a design based on the specification S1. For example, the requester 1 requests the management server 152 to provide a circuit design based on the specification S1. The management server 152 posts the request to the user accounts 1 through N. The user 1 accepts the request via the user account 1 for generating the circuit design, and generates the schematic 1830. The user 1 uses the computing device 1 to access the circuit design tool 164 from the circuit design tool database 206 (FIG. 2) to generate the schematic 1830 of the circuit design. The circuit design tool 164 is executed to generate graphics representing circuit design components, such as, transistors, logic gates, and connections between the transistors connections between the logic gates. Other examples of the circuit design tool 164 includes a computer software program that is accessed to draw the schematic 1830 of the circuit design. The schematic 1830 is drawn by the user 1 by providing one or more inputs via the input device of the computing device 1. The schematic 1830 is provided from the user computing device 1 to the management server 152 via the user account 1 and the computer network 110.

Upon generating the schematic 1830 of the circuit design, the user 1 accesses, via the computing device 1 and the computer network 110, from the layout design tool database 208, the layout design tool 166 that includes representations of IP blocks for generating the layout design 127 based on the schematic 1830 of the circuit design. For example, the online design engineering system 102 receives the schematic 1830 of the circuit design from the computing device 1 via the computer network 110 and an indication, e.g., a selection made by the user 1 via an input device connected to the computing device 1, etc., from the computing device 1 that a layout is to be generated from the schematic. Upon receiving the indication, the online design engineering system 102 allows the user 1 access via the computing device 1 to the layout design tool 166 from the layout design tool database 208 to generate the layout design 127 based on the schematic 1830.

In one embodiment, one or more fabrication entities, such as the fabrication entities 1 and 2, access, via the website, corresponding one or more fabrication entity accounts to receive access to a foundry interface tool 406. The one or more fabrication entities operate the corresponding one or more fabrication computing devices to upload the layout design tool database 208 to the searchable storage 162 via the foundry interface tool 406. Examples of the foundry interface tool 406 include a combination of hardware, such as processors, and computer programs that allow communication between a fabrication computing device and the online design engineering system 102 to send the layout design tool database 208 via the computer network 110 from the fabrication computing device to the management server 152 for storing the layout design tool database 208 in the searchable storage 162.

The schematic 1830 is stored in a circuit design file by the management server 152 and the layout design 127 is stored in a layout design file by the management server 152. The circuit design file and the layout design file are stored in the design database 160 by the management server 152. After the circuit design file and the layout design file are stored in the design database 160, the design serving manager tool 402 of the online design engineering system 102 accesses, such as reads, the circuit design file and the layout design file from the design database 160 and provides the circuit design file and the layout design file via the requestor account 1 of the requester 1 and the computer network 110 to the requester computing device 1. For example, the design serving manager tool 402 applies the communication protocol to packetize the circuit design file and the layout design file to generate packets, and sends the packets via the computer network 110 to the requester computing device 1.

In an embodiment, when one of the users 2-N requests the circuit design file and the layout design file and the user 1 has not provided permission via the user account 1 to access the circuit design and layout design files, the obfuscator tool 182 obfuscates one or more portions of the schematic 1830 of the circuit design to generate an obfuscated circuit design. For example, one or more components and/or one or more connections between two adjacent components of the schematic 1830 are covered by opaque blocks or opaque portions. Moreover, the obfuscator tool 182 obfuscates the layout design 127 to generate an obfuscated layout design.

In an embodiment, the layout design 127 is obfuscated in that an arrangement of IP layers, such as the tiles, of the layout design 127 and/or connections between the IP blocks and/or the IP layers are obfuscated from being displayed via one or more of the user accounts 2-N on display devices of the corresponding computing device 2-N. For example, one or more overlay layers are generated and placed by the obfuscator tool 182 on top of the IP layers and/or are placed on top of the arrangement of the IP layers and/or on top of the connections between the IP layers. The schematic 1830 and the layout design 127 are obfuscated before being presented to the users 2 through N. In an embodiment in which one or more of the other users 2 through N has permission from the online design engineering system 102 to view the schematic 1830 and the layout design 127, the schematic 1830 and the layout design 127 are not obfuscated or deobfuscated by the obfuscator tool 182 before presenting the schematic 1830 and the layout design 127 via one of the user accounts 2 through N on a display device of one of the user computing devices 2 through N.

In an embodiment, the circuit design file and the layout design file are accessed by the design serving manager tool 402 to provide to a shuttle manager tool 404 of the online design engineering system 102. The shuttle manager tool 404 determines whether a pre-determined number of designs, such as layout designs or circuit designs and corresponding layout designs, are received from one or more of the user accounts 1 through N via the computer network 110 for implementing the designs on the shuttle, e.g., a wafer, etc. The implementation is performed by the one or more fabrication entities. Upon determining that the pre-determined number of designs are received from one or more of the user accounts 1 through N, the shuttle manager tool 404 sends a request via the foundry interface tool 406 and the computer network 110 to the fabrication computing devices 1 and 2 of the one or more foundry entities for implementing the pre-determined number of designs on the shuttle to manufacture prototypes of SoCs based on the designs. For example, the shuttle manager tool 404 sends the request via the foundry interface tool 406, and the fabrication entity account 1 to the fabrication computing device 1 that is operated by a first foundry entity. As another example, the shuttle manager tool 404 sends the request via the foundry interface tool 406, and the fabrication entity account 2 to the fabrication computing device 2 that is operated by a second foundry entity.

In one embodiment, the shuttle manager tool 404 sends the request for the prototypes when an indication is received from requesters via corresponding requester accounts for fabrication of the prototype. For example, the shuttle manager tool 404 accesses a data sheet to determine whether the data sheet includes a request from the requester 1 via the requester account 1 for generation of a prototype based on parameters of a design described in the data sheet. As another example, the shuttle manager tool 404 accesses the requester account 1 to determine whether a prototype generation option, such as a prototype generation button, is selected by the requester 1 via the requester account 1. The requester 1 uses the requester computing device 1 to access the requester account 1 to further select the prototype generation option. A reception of selection of the prototype generation option indicates to the shuttle manager tool 404 that the requester 1 wishes to generate a prototype of an integrated circuit chip.

A fabrication entity 1 uses the fabrication computing device 1 to access the fabrication entity account 1 to receive the request for fabrication of prototypes of SoCs based on the designs. For example, the fabrication entity 1 uses the fabrication computing device 1 to access the website that is controlled by the design engineering entity, and provides login information, such as an e-mail address or password or a combination thereof, to access the fabrication entity account 1 assigned to the fabrication entity by the online design engineering system 102. The authenticator tool 332 of the online design engineering system 102 determines whether the login information received from the fabrication computing device 1 via the computer network 110 is authentic, such as matches data that is stored in the login database of the online design engineering system 102. Upon determining that the login information received from the fabrication computing device 1 is authentic, the fabrication entity 1 that is assigned the login information is allowed by the authenticator tool 332 to access the fabrication entity account 1. On the other hand, upon determining that the login information received from the fabrication computing device 1 is not authentic, the fabrication entity 1 is not allowed access by the authenticator tool 332 to access the fabrication entity account 1.

Figures 1, 4B:
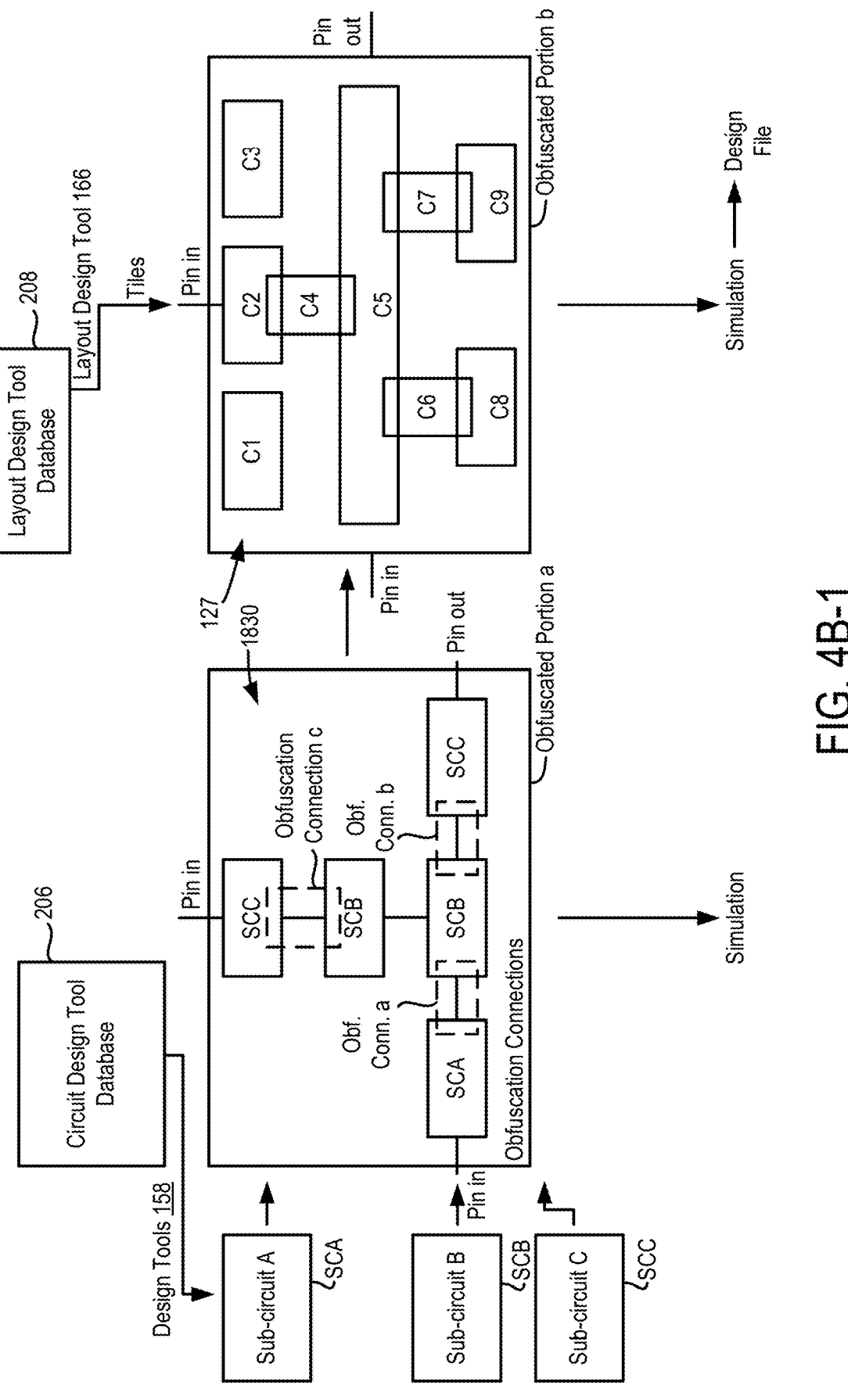
Figures 2, 4B:
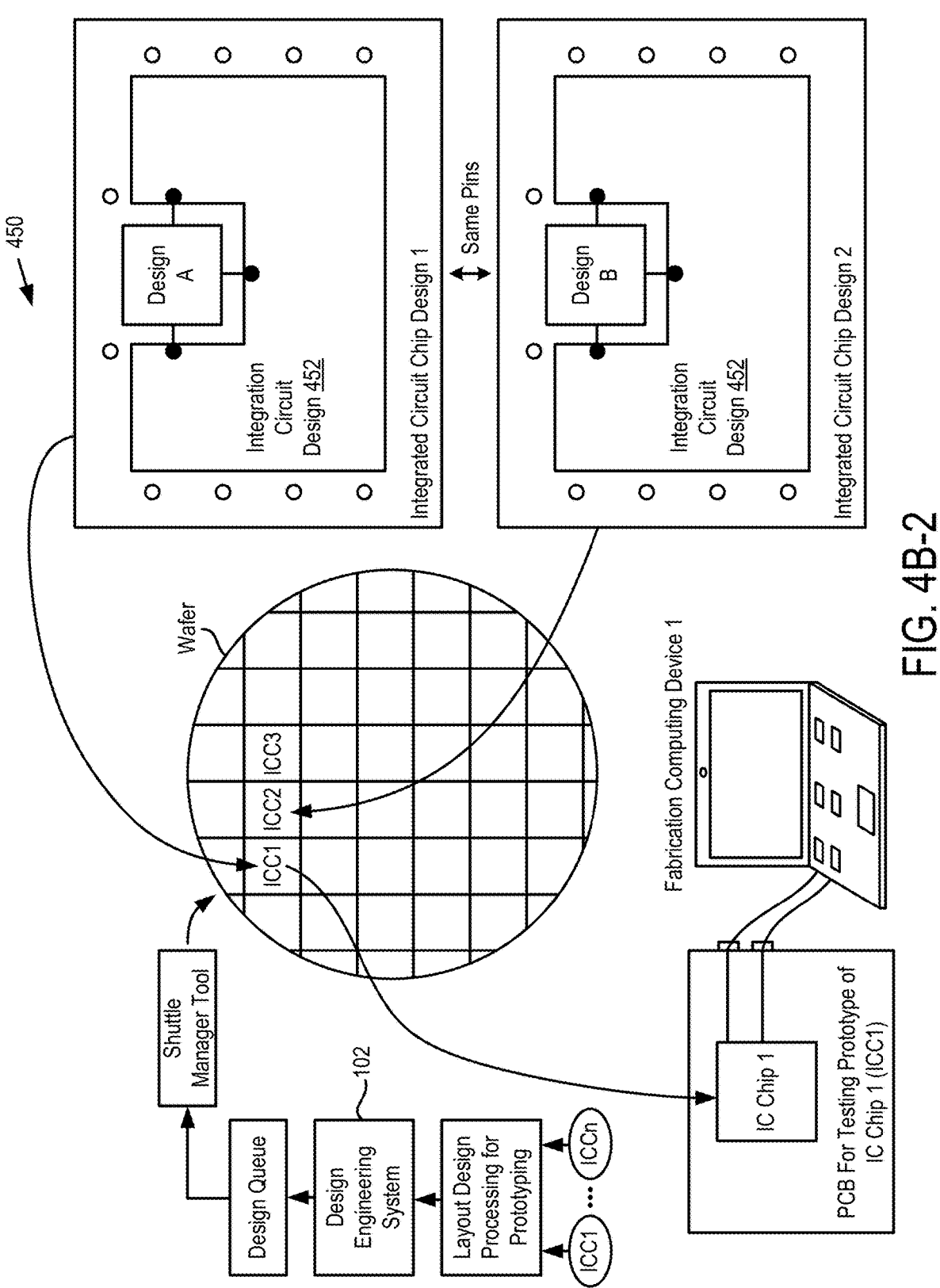

FIG. 4B-1 is a diagram to illustrate obfuscation of the schematic 1830 and of the layout design 127. The user 1 accesses circuit design tool 164 from the circuit design tool database 206 via the computing device 1, the user account 1, and the computer network 110 to generate a sub circuit design A (SCA), a sub circuit design B (SCB), and a sub circuit design C (SCC). A sub circuit design is one or more components of the electrical circuit. The sub circuit designs A, B, and C are connected to each other via a number of connections, e.g., wires, links, etc., to generate the schematic 1830 of a design A. For example, an output of the sub circuit design A is connected to an input of a first instance of the sub circuit design B and an output of the first instance of the sub circuit design B is connected to an input a first instance of the sub circuit design C. Moreover, an output of the a second instance of sub circuit design C is connected to an input of a second instance of the sub circuit design B and an output of the second instance of the sub circuit design B is connected to an input of the first instance of the sub circuit design B. An instance is a component. For example, two instances of the same sub circuit design are the same two components, such as two N-type transistors, two OR logic gates, or two AND logic gates.

In an embodiment, a connection between the output of the second instance of the sub circuit design C and the input of the second instance of the sub circuit design B is obfuscated by the obfuscator tool 182 by applying an obfuscation connection layer c, e.g., an opaque block, an opaque shape, etc. Moreover, a connection between the output of the sub circuit design A and the input of the first instance of the sub circuit design B is obfuscated by the obfuscator tool 182 by applying an obfuscation connection layer a. Also, a connection between the output of the first instance of the sub circuit design B and the input of the first instance of the sub circuit design C is obfuscated by the obfuscator tool 182 by applying an obfuscation connection layer b.

It should be noted that in one embodiment, a connection between the output of the second instance of the sub circuit design B and the input of the first instance of the sub circuit design B is not obfuscated by the obfuscator tool 182 by applying an obfuscation connection layer when the connection is known, according to design rules stored in the circuit design tool database 206, to people having ordinary skill in the art of circuit design. In one embodiment, a connection between the output of the second instance of the sub circuit design B and the input of the first instance of the sub circuit design B is obfuscated by the obfuscator tool 182 by applying an obfuscation connection layer.

In an embodiment, instead of or in addition to placing the obfuscation connection layers on the connections of the design A, an obfuscation layer, such as an opaque portion or an opaque block, that covers the entire design A except for one or more pin inputs and/or one or more pin outputs of the design A is generated and placed by the obfuscator tool 182 of the online design engineering system 102 on the design A. The placement of the obfuscation layer covers, such as hides or renders invisible or renders as a black box, the sub circuit designs A, B, and C and the connections between the sub circuit designs A, B, and C. When either a connection between two adjacent sub circuits or a subcircuit of the schematic 1830 or the schematic 1830 except for one or more pin inputs and/or one or more pin outputs of the design A is obfuscated, an obfuscated portion a is generated by the obfuscator tool 182.

The user 1 access via the user account 1 and the user computing device 1 the layout design tool 166 from the layout design tool database 208 of the online design engineering system 102 to generate the layout design 127, such as a physical layout, etc., of the design A based on the schematic 1830. For example, the physical layout of the design A includes cells C1, C2, C3, C4, C5, C6, C7, C8, and C9, which are arranged and connected, e.g., placed and routed, etc., in a manner illustrated in FIG. 4B-1. The arrangement and connection of the cells is covered by the obfuscator tool 182 of the online design engineering system 102 with an obfuscation layout, such as an opaque layer or an opaque portion or an opaque shape, except for one or more pin inputs and/or one or more pin outputs of the physical layout to hide the arrangement and connection from one or more of the user accounts 2 through N and/or the requestor account 1 of the requester 1 that does not have permission from the user 1 via the user account 1 for displaying the arrangement and connection of the cells. In an embodiment, each of the cells C1, C2, C3, C4, C5, C6, C7, C8, and C9 is covered by the obfuscator tool 182 with an obfuscation layer and/or a connection between any two adjacent ones of the cells is covered by the obfuscator tool 182 with an obfuscation layer instead of the obfuscation layer that covers the entire arrangement and connection of all the cells. When either a connection between two adjacent cells or a cell of the layout design 127 or the entire layout design 127 except for one or more pin inputs and/or one or more pin outputs of the design A is obfuscated, an obfuscated portion b is generated by the obfuscator tool 182.

In one embodiment, when a test, such as a simulation test or a verification test, is executed on an obfuscated connection or an obfuscated portion, any values that are output at the obfuscated connection or the obfuscated portion are also obfuscated by the obfuscator tool 182. Examples of the obfuscated portion includes an obfuscated intermediate node, such as a component or a cell, between a pin in and a pin out of a block. The obfuscated intermediate node is an output of a component, such as a gate or a transistor or a cell, of a design. The values output are obfuscated and stored within a data sheet. The verification test is executed by the local test bench tool 165, or by the circuit design verification tool 188, or by the community, or by the local layout verification tool 167, or by the layout design verification tool 190 of FIG. 1F. For example, when an account does not have access to all portions of a design but has access to an obfuscated design, the obfuscator tool 182 obfuscates one or more portions of the data sheet having the values before the data sheet is accessed via the account.

FIG. 4B-2 is a diagram of an embodiment of a system 450 to illustrate different integrated circuit chips on a wafer, such as a semiconductor substrate. The derivative generator tool 324 of the online design engineering system 102 provides an option via the computer network 110 and the user account 1 to the computing device 1 to integrate the design A within an integrated circuit chip design 1. Upon receiving a selection of the option via the input device connected to the computing device 1 from the user account 1, the derivative generator tool 324 connects the design A to an integration circuit design 452, which includes one or more pre-determined designs, of the integrated circuit chip design 1. For example, the integration circuit design 452 includes one or more cells that couple to one or more cells of the design A and further include pin inputs and pin outputs of the integrated circuit chip design 1. As another example, one or more cells on each plane of the integration circuit design 452 couple to one or more cells on a corresponding plane of the design A. For example, the integration circuit design 452 has planes 1 and 2 and the plane 1 is below the plane 2. Similarly, the design A has planes 1 and 2 and the plane 1 is below the plane 2. One or more cells of the plane 1 of the integration circuit design 452 couple to one or more cells of the plane 1 of the design A. Moreover, one or more cells of the plane 2 of the integration circuit design 452 couple to one or more cells of the plane 2 of the design A.

In an embodiment, the derivative generator tool 324 of the online design engineering system 102 generates a derivative, e.g., a design B, etc., of the design A. For example, there is a different type of gate substituted by online design engineering system 102 in the design B compared to that of the design A but the remaining structure of the design B is the same as that of the design A. As another example, there is a change in a predetermined number of connections between cells of the design A to generate the design B. The change is made by the online design engineering system 102. As yet another example, there is a substitution of one cell with another cell of the design A to generate the design B. The substitution is made by the online derivative generator tool 324. In an embodiment, the derivative is generated upon receiving a selection from the user 1 via the input device connected to the user computing device 1, the user account 1, and the computer network 110. In one embodiment, the design B is generated by the user 1 or another one of the users 2 through N by applying the layout design tool 166 to the design A.

Moreover, upon receiving a selection from the user 1 via the input device connected to the user computing device 1, the user account 1, and the computer network 110 indicating that the design B is to be connected to the integration circuit design 452, the derivative generator tool 324 connects the design B to the integration circuit design 452 to generate an integrated circuit chip design 2.

The integrated circuit chip designs 1 and 2 are provided by the management server 152 from the user account 1 to the shuttle manager tool 404 for reserving spots on the wafer for fabricating prototypes, e.g., an integrated circuit chip 1 (ICC1) and an integrated circuit chip 2 (ICC2), etc., of the integrated circuit chip designs 1 and 2. Similarly, in an embodiment, a prototype, which is an integrated circuit chip 3 (ICC3), is generated. The shuttle manager tool 404 receives a request from the user computing device 1 via the computer network 110 to be sent to the fabrication entity 1 for fabricating the prototypes. The request identifies, via names or alphanumeric characters, design files in which the integrated circuit chip designs 1 and 2 are stored. The shuttle manager tool 404 accesses the design files from the design database 160 based on the identities of the design files, and sends the design files with the request to the fabrication entities 1 and 2 via the fabrication entity accounts 1 and 2 to the corresponding fabrication computing devices 1 and 2. For example, the shuttle manager tool 404 receives the request from the user computing device 1 via the computer network 110 to be sent to the fabrication entity 1 for fabricating the prototypes. The shuttle manager tool 404 sends the request with the design files in which the integrated circuit chip designs 1 and 2 are stored via the fabrication entity account 1 to the fabrication computing device 1. Similarly, the shuttle manager tool 404 sends the request with the design files in which the integrated circuit chip designs 1 and 2 are stored to another foundry entity 2 via the fabrication entity account 2 to the fabrication computing device 2. The foundry entity 1 accepts the request for fabricating the prototypes ICC1, ICC2, and ICC3 on the wafer via the fabrication entity account 1 and sends the acceptance via the fabrication entity account 1 and the computer network 110 to the user account 1. In one embodiment, the request for generating a prototype based on the integrated circuit chip design 2 is received by the shuttle manager tool 404 from the user computing device 2 via the user account 2 and the computer network 110 instead of from the user computing device 1 via the user account 1 and the computer network 110.

The wafer is processed, e.g., etched, cleaned, deposited on, photomasked, sputtered, doped, etc., by the fabrication entity 1 by using a processing tool, e.g., a plasma chamber, etc., to fabricate and connect circuit components on the wafer to generate the integrated circuit chips ICC1, ICC2, and ICC3. The integrated circuit chips ICC1, ICC2, and ICC3 are removed by the foundry entity 1 from the wafer by cutting.

In an embodiment, the integrated circuit chip ICC1 is tested by the fabrication entity 1 by connecting the integrated circuit chip ICC1 to a printed circuit board and connecting the printed circuit board to the fabrication computing device 1 via one or more connections, e.g., serial connection, parallel connection, USB connection, one or more wires, a cable, etc. In one embodiment, the integrated circuit chip ICC1 is provided, such as mailed, to the user 1 and the user 1 uses the user computing device 1 to access the prototype tester and test report generator tool 306 (FIG. 3) to test the integrated circuit chip ICC1. For example, the prototype tester and test report generator tool 306 is a computer program executed by a processor of the management server 152 to provide one or more input values to the integrated circuit chip 1 and receive one or more output values from the integrated circuit chip 1. Based on the one or more output values and pre-determined criteria for passing a test, the prototype tester and test report generator tool 306 determines whether the integrated circuit chip 1 passes or fails the test. It should be noted that the prototype tester and test report generator tool 306 is not downloaded to the user computing device 1. For example, the management server 152 receives a request from the user account 1 for a download of the prototype tester and test report generator tool 306 and determines based on permissions associated with the user account 1 whether the user account 1 has permission to download the prototype tester and test report generator tool 306. Upon determining that the user account 1 does not have the permission for the download, the management server 152 does not allow the download from the online design engineering system 102 via the computer network 110 to the user computing device 1. Similarly, the integrated circuit chips ICC2 and ICC3 are tested.

In one embodiment, instead of the integration circuit design 452, any other integration circuit design that is pre-stored in the searchable storage 162 before the design A or design B is created is used to couple to the design A or the design B. The other integration circuit design is created by a user or by the design engineering entity or is obtained from another entity via the computer network 110.

FIG. 5A is a diagram of an embodiment of a system 500 to illustrate a competition for generating a design. The system 500 includes the requester computing device 1, the user computing device 1, the user computing device N, and the online design engineering system 102. The requester 1 uses the requester computing device 1 to send via the requester account 1 and the computer network 110 a request for a design to the online design engineering system 102. Upon receiving the request for the design, the design competition generator tool 310 (FIG. 3) of the online design engineering system 102 generates a competition for the design and posts the competition within the user accounts 1 through N via the computer network 110. For example, the competition is posted on the website that is controlled by, e.g., leased by, owned by, etc., the design engineering entity that controls the online design engineering system 102, and the posting of the competition on the website is accessible via the user accounts 1 through N.

The users 1 through N access the user accounts 1 through N to view the posting of the competition displayed on the corresponding user computing devices 1 through N. The users 1 through N enroll via corresponding user accounts 1 through N in the competition and generate designs by applying the circuit design tool 164 and/or the layout design tool 164. The user 1 uses the computing device 1 to send a design 1 via the user account 1 and the computer network 110 to the management server 152 of the online design engineering system 102. Moreover, the user N uses the computing device N to send a design N via the computer network 110 to the management server 152 of the online design engineering system 102. The design rating generator tool 192 (FIG. 3) of the online design engineering system 102 generates a rating, e.g., a ranking, etc., of the circuit designs 1 and N based on predetermined rules. For example, when the design 1 is used for a greater number of times compared to the design N, the design 1 is ranked higher than the design N. The rating is sent from the design rating generator tool 192 of the online design engineering system 102 via the computer network 110 and the requester account 1 to the requester computing device 1. In an embodiment, the rating of the designs 1 and N is posted within one or more of the user accounts 1 through N accessible via the website. The requester 1 via the requester computing device 1 determines, based on the rating, whether to select the circuit design 1 or N. For example, if the rating of the design 1 is greater than the rating of the design N, the requester 1 via the requester computing device 1 and the requester account 1 selects the design 1. An indication of the selection of the design 1 is sent from the requester computing device 1 via the requester account 1 and the computer network 110 to the reward generator tool 316.

Upon receiving the indication of the selection of the design 1 via the computer network 110 from the requester computing device 1, the reward generator tool 316 (FIG. 3) of the online design engineering system 102 generates a reward for the design 1 and sends the reward via the computer network 110 to the user account 1 of the user 1, who won the competition. For example, the online design engineering system 102 communicates with the credit and debit system to credit a predetermined monetary amount via the computer network 110 to a deposit account of the user 1. It should be noted that in an embodiment, deposit accounts of the users 1 through N are connected via the computer network 110 to the credit and debit system.

In one embodiment, an amount of the reward is received and stored within the searchable storage 162 by the reward generator tool 316. For example, the requester 1 operates the requester computing device 1 to provide a dollar amount of the reward via the computer network 110 to the reward generator tool 316 and the reward generator tool 316 stores the dollar amount within the searchable storage 162 for later providing the reward to the user account 1.

Figure 5B:
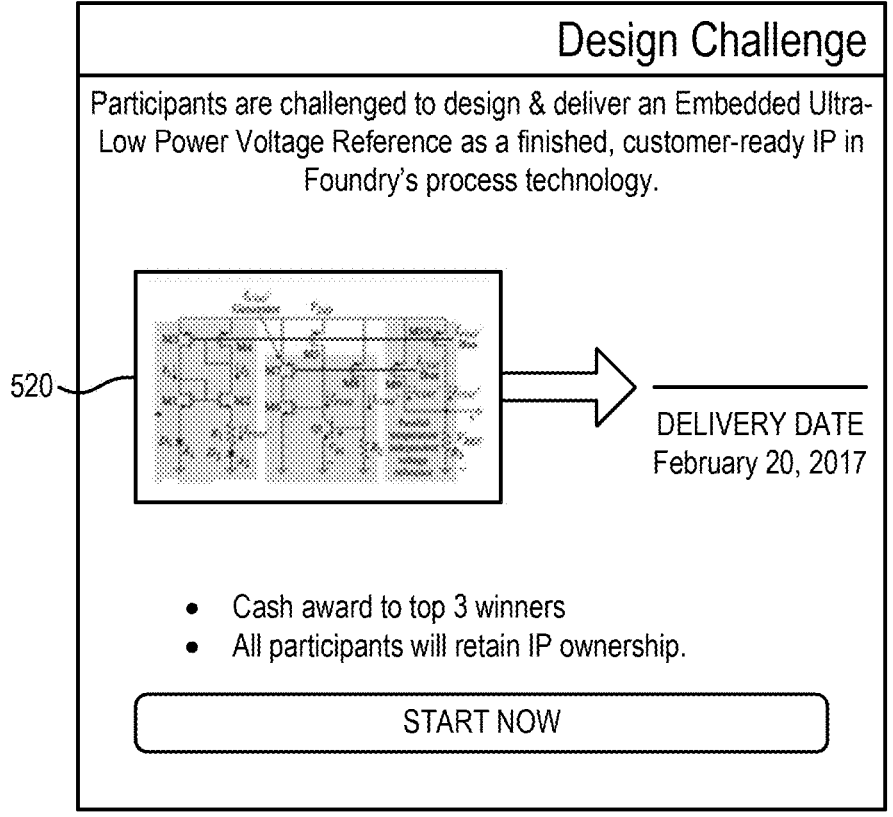
FIG. 5B is a diagram of an embodiment of a design challenge, which is posted within multiple user accounts when a requester via a requester account posts a request for a design.

FIG. 5B is a diagram of an embodiment of a design challenge, which is posted within the user accounts 1 through N when the requester 1 posts within the requester account 1 a request for a design. The requester 1 logs into the requester account 1 to indicate to the management server 152 the design challenge to fabricate a prototype of an embedded ultra-low power voltage reference. For example, the requester 1 operates the requester computing device 1 to submit via the requester account 1 and the computer network 110 the parameters of a specification within a data sheet for generating the design challenge. The design challenge is a challenge for generating a design based on the specification. Moreover, the requester 1 also indicates, within the data sheet, a due date for delivery of the prototype. The design competition generator tool 310 of the management server 152 receives the design challenge, embodied in the form of a data sheet, and posts the design challenge to the user accounts 1 through N. For example, the design competition generator tool 310 posts within the user accounts 1 through N the data sheet and a posting that a cash award will be provided to top three winners. Moreover, the design competition generator tool 310 posts within the user accounts 1 through N that all participants, such as the users 1 through N, who accept the design challenge will retain intellectual property ownership of designs that they create via the corresponding user accounts 1 through N. As an example, the data sheet builder tool 303 receives an acceptance of the design challenge by the computer network 110 and the user account 1 from the user computing device 1.

Figures 6, 7:
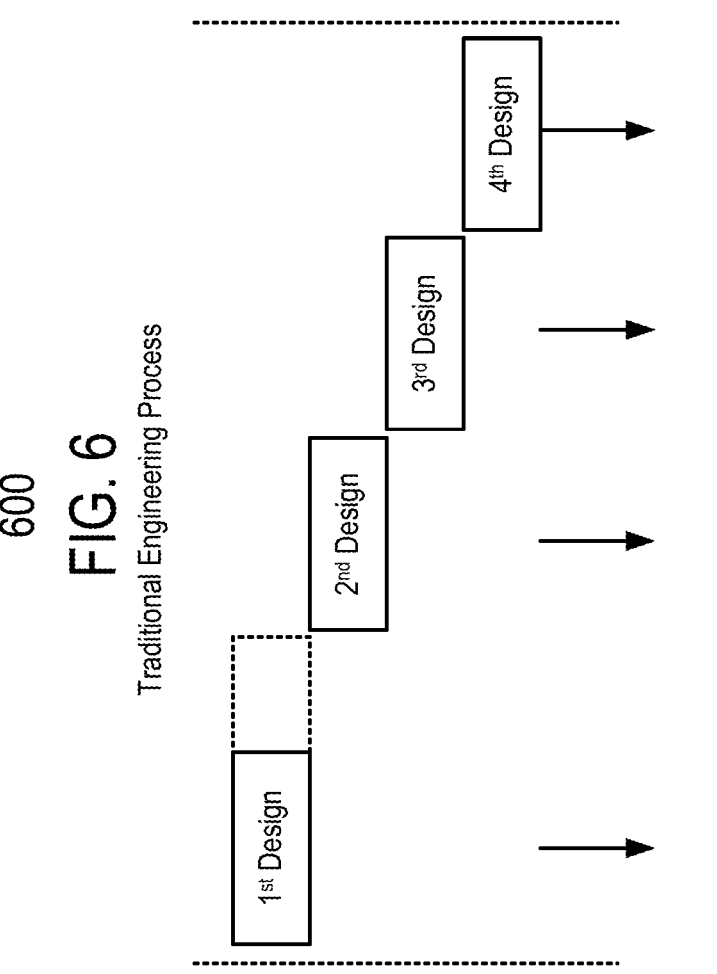
FIG. 6 is a diagram of an embodiment of a system to illustrate a serial process by which a design of an electrical circuit is generated.
FIG. 7 is a diagram of an embodiment of the online design engineering system to illustrate a parallel process in which multiple prototypes of multiple designs are generated.

FIG. 6 is a diagram of an embodiment of a system 600 to illustrate a serial process by which a design of the electrical circuit is generated. The requester 1 submits a request for generation of a first design, such as a design 1, of an integrated circuit to a foundry entity. A cost to the requester 1 for submitting the request to the foundry entity is Sz1. Moreover, a probability of success that the design of the integrated circuit will be completed adherent to the requester-provided specifications is β1%. Once the integrated circuit is delivered, a second design, such as a design 2, of another integrated circuit is requested by the requester 1. Similarly, request and completion of integrated circuits based on a third design and a fourth design, such as a design 3 and a design 4, are serial processes.

FIG. 7 is a diagram of an embodiment of a system 700 to illustrate a parallel process in which multiple designs of the electrical circuit are generated by the online design engineering system 102. For example, in the same or less amount of time taken to perform the serial process, the first through fourth designs for fabricating a prototype of the electrical circuit are generated. The requester 1 submits via the requester account 1 a request for generation of a design of an integrated circuit to the online design engineering system 102. The online design engineering system 102 posts the request to the user accounts 1 through N for generating the design and the request is accessible within the user accounts 1 through N via the website. The users 1 through N apply the circuit design tool 164 and the layout design tool 166 to generate the first through fourth designs of the integrated circuit. The first through fourth designs are generated in the parallel manner by the users 1 through 4 via corresponding user accounts 1 through 4 in which a lesser amount of time is spent compared to the serial process of FIG. 6. The design simulation report generator tool 184 (FIG. 3) of the online design engineering system 102 determines that the first and second designs are compliant to the specification of the design provided by the requester 1 via the requester account 1. The requester 1 chooses via the requester account 1 one or more of the first and second designs, which are compliant. The online design engineering system 102 sends a request to the credit and debit server system to credit a deposit account of the users 1 and 2 that generated the first and second designs with payments of $×1 and $×2 respectively. A cost to the requester 1 for submitting the request for the design to the online design engineering system 102 is $×2, which is lower than $×1. Moreover, a probability of success that the design of the integrated circuit will be completed and adherent to the requester-provided specification is β2%, which is greater than β1%.

Figure 8:
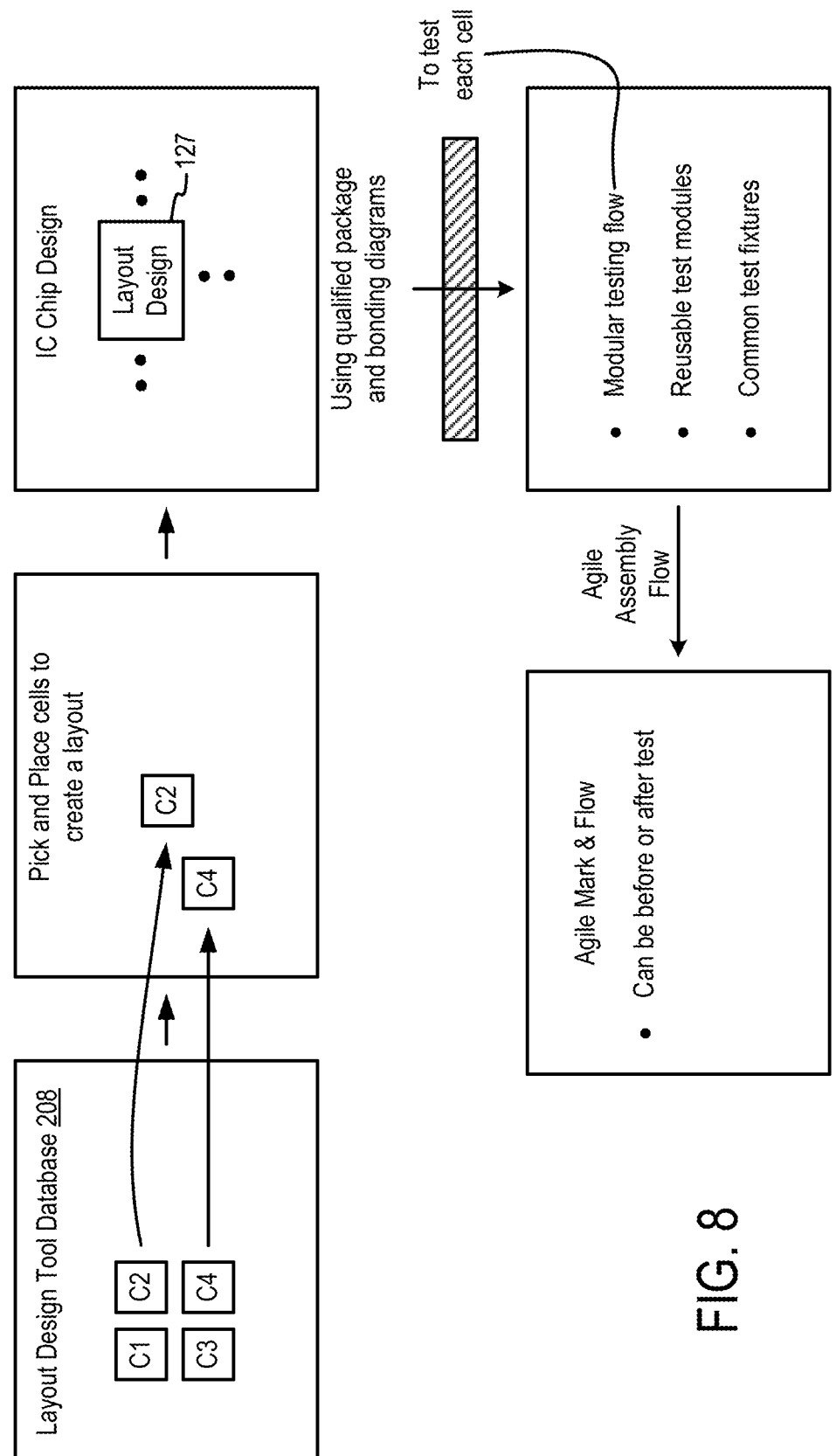
FIG. 8 is a diagram of an embodiment to illustrate fabrication and testing of a prototype of an integrated circuit.

FIG. 8 is a diagram of an embodiment to illustrate fabrication and testing of a prototype of an integrated circuit. The user 1 via the user computing device 1 and the user account 1 accesses the layout design tool database 208 for accessing cells C2 and C4 from multiple cells C1 through C4. The cells C2 and C4 are placed by the user 1 via the input device of the user computing device 1 to create the layout design 127. The layout design tool database 208 stores rules regarding bonding wires between different cells of the layout design 127. When the user 1 via the user computing device 1 and the user account 1 bonds wires between different cells of the layout design 127, the rules regarding bonding are applied by the layout design tool 166. Examples of the rules regarding bonding include an arrangement of bond pads on the layout design 127, a minimum ratio of length to width of the layout design 127, and a length of each wire. Moreover, the layout design tool database 208 stores rules regarding packaging of an integrated circuit having the layout design 127. Examples of rules regarding packaging include dimensions of a package of an integrated circuit, a material of the package, a number of pins extending from the package, and a distance between two adjacent pins of the package.

The layout design verification tool 190 of FIG. 1F executes a modular testing flow to test each cell of the layout design 127. Moreover, each of the circuit design verification tool 188, the layout design verification tool 190 of FIG. 1F, and the prototype tester and test report generator tool 306 of FIG. 3 include reusable test modules. The reusable test modules are reusable for the same component of a design. For example, when the design 1 includes an OR gate and the design 2 also includes an OR gate, the same test module of the circuit design verification tool 188 is executed to test both the OR gates. A module, as used herein, is a portion of a tool. In addition, common test fixtures, such as cables that connect a prototype of an integrated circuit to a computing device for testing the prototype and emulators for testing the prototype are provided by the design engineering entity to the users 1 through N for testing the prototype. For example, the user 1 requests via the user account 1 the common test fixtures for testing a prototype of an integrated circuit. Upon receiving the request, the management server 152 identifies from the user account 1, address information, such as a residence address or a work address, of the user 1. The management server 152 sends the common test fixtures via a mailing service to the residents of the work address of the user 1 for testing the prototype of the integrated circuit.

The online design engineering system 102, described herein, provides an easy design environment for chips, such as a prototype of an integrated circuit. Moreover, the online design engineering system 102 provides a method to quickly and economically validate circuit designs on silicon. For example, in two phases, designs with high predictability and correlation to silicon are provided, and labs, such as foundries, controlled by the online design engineering system 102 serve a physical validation process in which the prototype tester and test report generator tool 306 tests a prototype of an integrated circuit. Furthermore, a well verified library, e.g., the design database 160 (FIG. 2), etc., of components, such as regulators and data converters, is provided by the online design engineering system 102. For example, an integrated circuit chip design is stored in the design database 160, and accessed later by the one of the users 1 through N via one of the user accounts 1 through N assigned to the user, or by the requester 1 via the requester account 1, etc., from the design database 160. Any tiny glue or extra circuits, e.g., circuit designs or layout designs, are encapsulated in a new block and follow a certification and qualification process, such as one managed by the design simulation report generator tool 184.

Also, a scalable backend process, which includes predesigned and pre-qualified packages and bonding diagrams, an agile mark and assembly process, and a dealing with high variation of part numbers and functional differences is provided by the online design engineering system 102. Furthermore, a unified, standardized test method and flow, where each component or cell, such as a block, is tested using a simulation program, such as the circuit design verification tool 188 of FIG. 1F or the layout design verification tool 190 of FIG. 1F, is scalable so that every integrated circuit chip design that uses the same component uses the same simulation program without limitations for testing. In an embodiment, analog test and diagnostic standards of Institute of Electrical and Electronics Engineers (IEEE) are accessed by the online design engineering system 102 via the computer network 110 from an IEEE database that is managed by IEEE, and are applied by the circuit design verification tool 188, the layout design verification tool 190, and the prototype tester and test report generator tool 306 of FIG. 3 to test a design and a prototype of the design. For example, the IEEE standards are integrated and applied by the design simulation report generator tool 184 (FIG. 3) and/or by the prototype tester and test report generator tool 306 (FIG. 3), etc.

Figure 9A:
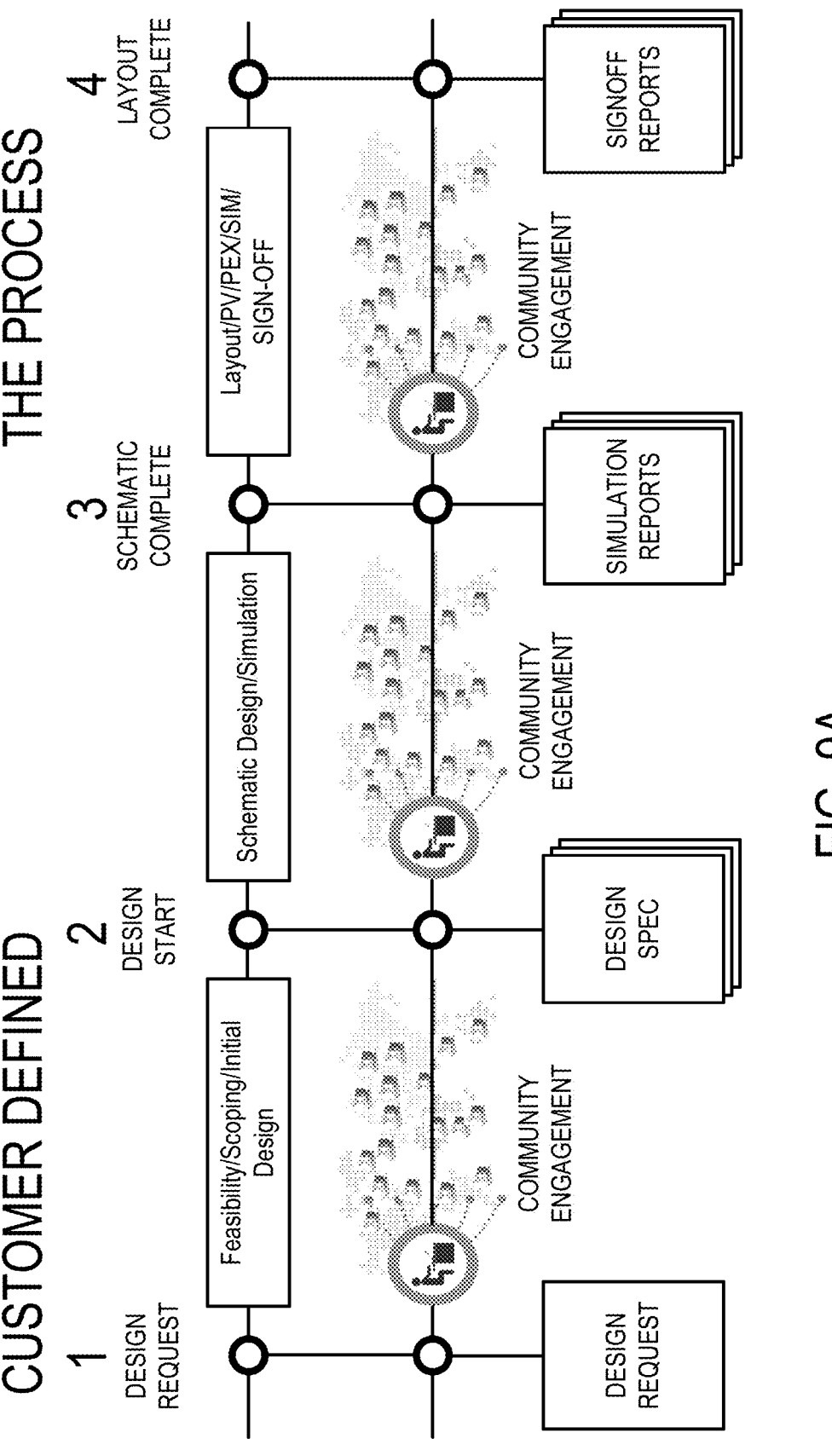
FIG. 9A is a diagram of an embodiment of an online design engineering process executed by the online design engineering system to generate a layout design.

FIG. 9A is a diagram of an embodiment of an online design engineering process 900 executed by the online design engineering system 102 to generate the layout design 127. The requester 1 via the requester computing device 1 accesses the website that is controlled by the design engineering entity to access the requester account 1. Upon accessing the requester account 1, the requester 1 uses the input device of the requester computing device 1 to submit a request for a design of the electrical circuit. For example, the requester 1 submits a specification including parameters for generating a design of the electrical circuit. The management server 152 receives the request via the computer network 110 and posts the request and the specification within the user accounts 1 through N for engaging the community.

The users 1 through N use the corresponding, such as respective, user computing devices 1 through N to access the website to further access the corresponding user accounts 1 through N to view the request for the design and the specification. Upon viewing the requester and the specification, the users 1 through N use the corresponding user computing devices 1 through N to access via the corresponding, such as respective, user accounts 1 through N the circuit design tool 164 from the circuit design tool database 206 to create N circuit designs based on the specification. Moreover, the users 1 through N use the corresponding user computing devices 1 through N to access via the corresponding user accounts 1 through N the local test bench tool 165 from the searchable storage 162 to test the N circuit designs to generate N simulation reports for the N circuit designs or to update a data sheet with results of the test. The data sheet builder tool 318 updates the data sheet with results of the test. In one embodiment, the users 1 through N use the corresponding user computing devices 1 through N to indicate via the corresponding user accounts 1 through N to the automatic certification server 112 to execute the circuit design verification tool 188. When the circuit design verification tool 188 is executed, the automatic certification server 112 generates the N simulation reports for the N circuit designs or the data sheet builder tool 318 updates a data sheet with results of the test.

Furthermore, the users 1 through N use the corresponding user computing devices 1 through N to access via the corresponding user accounts 1 through N the layout design tool 166 from the layout design tool database 208 to create N layout designs based on the N circuit designs. Moreover, the users 1 through N use the corresponding user computing devices 1 through N to access via the corresponding user accounts 1 through N the local layout verification tool 167 from the searchable storage 162 to test the N layout designs to generate N signoff reports for the N layout designs or to update a data sheet with results of the test. The data sheet builder tool 318 updates the data sheet with results of the test. In one embodiment, the users 1 through N use the corresponding user computing devices 1 through N to indicate via the corresponding user accounts 1 through N to the automatic certification server 112 to execute the layout design verification tool 190. When the layout design verification tool 190 is executed, the automatic certification server 112 generates the N signoff reports for the N layout designs or the data sheet builder tool 318 updates a data sheet with results of the test.

In one embodiment, instead of or in addition to generating a simulation report that includes a result of testing a circuit design, the result is integrated within a data sheet that includes the specification. Moreover, instead of or in addition to generating a signoff report that includes a result of testing a layout design, the result is integrated within the data sheet that includes the specification.

Figure 9B:
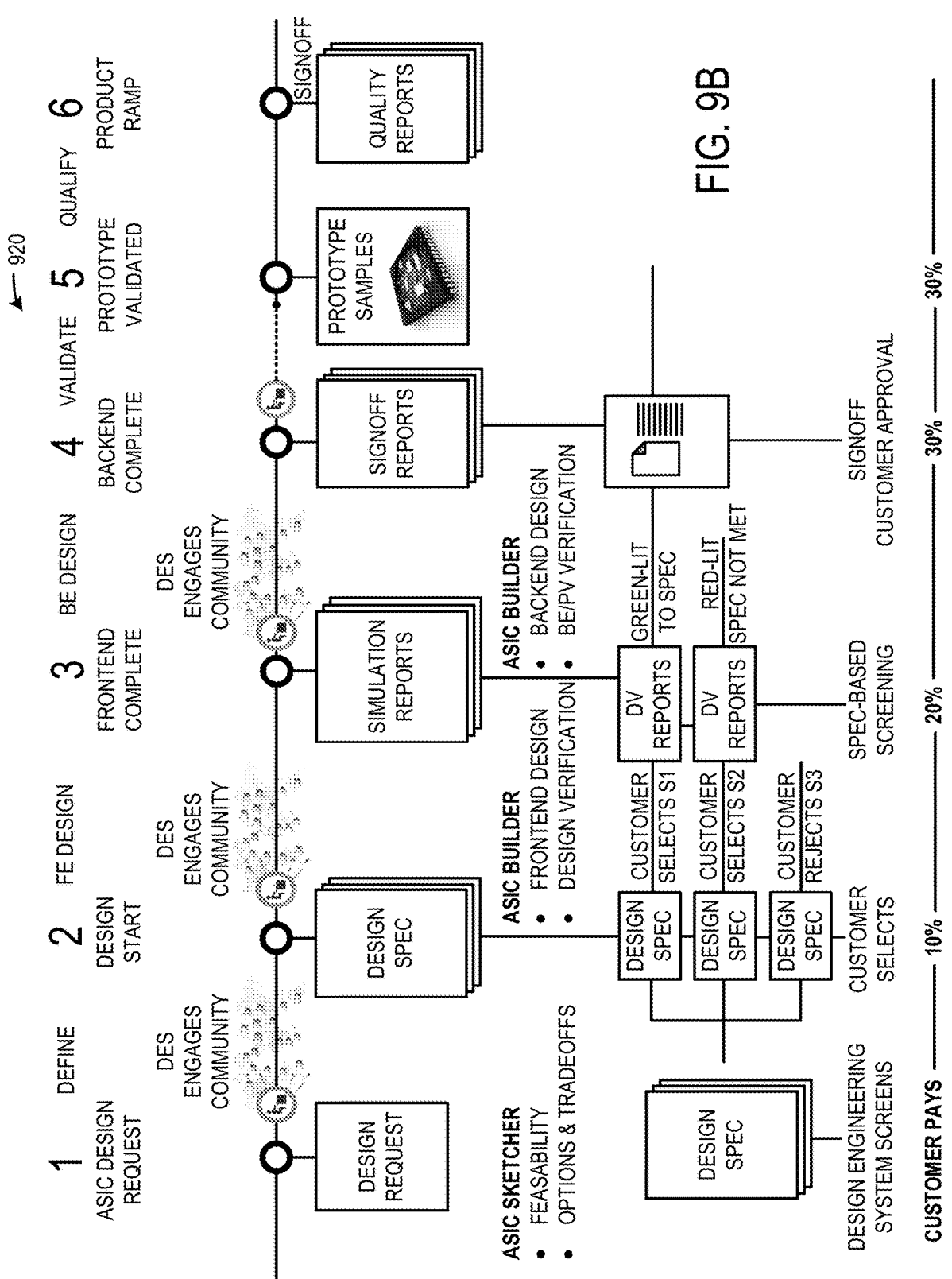
FIG. 9B is a block diagram of an embodiment of a design engineering process for illustrating use of the online design engineering system in fabricating an integrated circuit chip.

FIG. 9B is a block diagram of an embodiment of a design engineering process 920 for illustrating use of the online design engineering system 102 in fabricating an integrated circuit chip. As shown in FIG. 9B, at a stage 1 of the design engineering process 920, the requester 1 uses the requester computing device 1 and accesses the requester account 1 to generate multiple requests for multiple integrated circuit chip designs. The requester 1 uses the input device of the requester computing device 1 to provide parameters for generating multiple integrated circuit designs. The requests and the parameters are sent from the requester computing device 1 via the computer network 110 to the management server 152 of the online design engineering system 102. Upon receiving the request and the parameters, the management server 152 posts the requests and the parameters to the user accounts 1 through N to engage the community to generate specifications S1 through S3 based on the parameters. The users 1 through N access the respective user accounts 1 through N via the respective computing devices 1 through N to generate the specifications. For example, the users 1 through N add additional parameters to generate the specifications S1 through S3.

The specification completeness checker tool 302 of the online design engineering system 102 determines whether the specifications S1 through S3 are complete. For example, the specification completeness checker tool 302 determines whether all fields within data sheets having the specifications S1 through S3 have values of the parameters. Furthermore, upon receiving the request and the specifications, the specification compliance checker tool 320 of the online design engineering system 102 determines whether the specifications S1 through S3 comply with the specification compliance rules such as whether values of the parameters are within corresponding predetermined ranges.

The specifications S1 through S3 are provided from the specification compliance checker tool 320 to the requester computing device 1 via the computer network 110 and the requester account 1 for selection of one or more of the specifications S1 through S3. Upon receiving a selection from the requester computing device 1 via the requester account 1 of the specifications S1 and S2, at a stage 2 of the design engineering process 920, the management server 152 engages the community by providing access to the specifications S1 and S2 via the user accounts 1 through N to the user computing devices 1 through N. The requester 1 via the requester computing device 1 and the requester account 1 indicates to the management server 152 of rejection of the specification S3. The management server 152 indicates the rejection of the specification S3 to one of the user accounts 1 through N that is accessed by one of the users 1 through N to generate the specification S3.

The user 1 generates circuit designs, sometimes referred to herein as frontend designs, based on the specifications S1 and S2. Moreover, tests are run on the circuit designs to generate simulation reports. For example, the design simulation report generator tool 184 (FIG. 3) runs one or more simulations on circuit designs generated based on the specifications S1 and S2. The design simulation report generator tool 184 determines that the circuit design generated based on the specification S1 passes the one or more simulations and the circuit design generated based on the specification S2 fails the one or more simulations. This determination is a completion of a frontend process, in an embodiment, which occurs at a stage 3 of the design engineering process 920. The management server 152 indicates the failure of the one or more simulations to the user account 1 that is accessed by the user 1 through N to generate the circuit design based on the specification S2.

The simulation reports include whether the circuit designs pass or fail the tests. The simulation reports are sent from the design simulation report generator tool 184 of FIG. 3 via the computer network 110 and the requester account 1 to the requester computing device 1. The requester 1 views the simulation reports displayed on the display device of the requester computing device 1 via the requester account 1 to select one of the simulation reports for the circuit design generated based on the specification S1.

The selection of the simulation report for the circuit design generated based on the specification S1 is sent from the requester computing device 1 via the requester account 1 and the computer network 110 to the management server 152. The management server 152 indicates the selection to the user account 1 The user 1 views the selection posted to the user account 1 and generates a layout design, sometimes referred to herein as a backend design, for the circuit design generated based on the specification S1. Furthermore, tests are run on the layout design to generate a signoff report. For example, the design simulation report generator tool 184 (FIG. 3) runs one or more simulations on layout generated based on the specification S 1. The design simulation report generator tool 184 determines that the layout design generated based on the specification S1 passes the one or more simulations. This determination is a completion of a frontend process, which occurs at a stage 4 of the design engineering process 920. The signoff report indicates that the layout design passes one or more tests.

The signoff report is sent from the design simulation report generator tool 184 of FIG. 3 via the computer network 110 and the requester account 1 to the requester computing device 1. The requester 1 views the signoff report displayed on the display device of the requester computing device 1 via the requester account 1. Upon viewing the signoff report, the requester 1 uses the requester computing device 1 to indicate via the requester account 1 that a prototype is to be generated based on the signoff report for the layout design generated based on the specification S1.

Upon receiving the indication that the prototype is to be generated via the computer network 110 from the requester computing device 1, the shuttle manager tool 302 (FIG. 3) of the online design engineering system 102 provides a file including the layout design for the specification S1, a file including the circuit design for the specification S1, and a file including the specification S1 via the computer network 110 and the fabrication entity account 1 to the fabrication computing device 1. The fabrication entity 1 fabricates a prototype of the integrated circuit chip from the layout design for the specification S1, and sends the prototype via the mailing service to the design engineering entity. Upon receiving the prototype from the foundry, the prototype tester and test report generator tool 306 (FIG. 3) is executed under control of the design engineering entity to test the prototype to validate or invalidate the prototype. The validation or invalidation is done at a stage 5 of the design engineering process 920. Upon determining that the prototype is valid, the prototype is sent by the design engineering entity via the mailing service to the fabrication entity 1 for fabricating integrated circuit chips based on the prototype. This occurs at a stage 6 of the design engineering process 920.

In one embodiment, the derivative generator tool 324 (FIG. 3) of the online design engineering system 102 integrates the layout design with the integration circuit design 452 to generate an integrated circuit chip design. In an embodiment, the design simulation report generator tool 184 runs a simulation on the integrated circuit chip design to determine whether the integrated circuit design passes or fails a simulation. Upon determining that the integrated circuit chip design passes the simulation, in an embodiment, a backend process is completed at the stage 4 of the design engineering process 900. The shuttle manager tool 302 (FIG. 3) of the online design engineering system 102 provides a file including the integrated circuit chip design for the specification S1, a file including the layout design for the specification S1, a file including the circuit design for the specification S1, and a file including the specification S1 via the computer network 110 and the fabrication entity account 1 to the fabrication computing device 1. The fabrication entity 1 fabricates a prototype of an integrated circuit chip from the integrated circuit chip design, and sends the prototype via the mailing service to the design engineering entity. Upon receiving the prototype from the foundry, the prototype tester and test report generator tool 306 (FIG. 3) is executed by the design engineering entity to test the prototype to validate or invalidate the prototype. The validation or invalidation is done at the stage 5 of the design engineering process 920. Upon determining that the prototype is valid, the prototype is sent by the design engineering entity via the mailing service to the fabrication entity 1 for fabricating integrated circuit chips based on the prototype. This occurs at the stage 6 of the design engineering process 920.

It should be noted, that in an embodiment, at the end of the stage 2 of the design engineering process 920, a deposit account assigned to the requester 1 is debited by the credit and debit server system according to a predetermined percentage, e.g., 10%, etc., of a total cost, e.g., 100%, etc., of creating designs and fabricating integrated circuit chips from a prototype of one of the designs. The predetermined percentage is generated by the royalty generator tool 304. The deposit account is debited for crediting by the credit and debit server system the predetermined percentage to a deposit account of one or more of the users 1 through N that generated the specifications S1 through S3. Moreover, at the end of the stage 3 of the design engineering process 920, a deposit account of the requester 1 is debited by the credit and debit server system according to another predetermined percentage, e.g., 20%, etc., of the total cost. The other predetermined percentage is generated by the royalty generator tool 304. The deposit account is debited for crediting by the credit and debit server system the other predetermined percentage to a deposit account of the one or more of the users 1 through N that generated the circuit designs meeting the specification S1 and S2 and passing one or more simulation tests. Also, at the end of the stage 4 of the design engineering process 920, a deposit account of the requester 1 is debited by the credit and debit server system according to yet another predetermined percentage, e.g., 30%, etc., of the total cost. The yet another predetermined percentage is generated by the royalty generator tool 304. The deposit account is debited for crediting by the credit and debit server system the yet other predetermined percentage to a deposit account of the user 1 through N that generated the layout design meeting the specification S1 and passing one or more simulation tests. At the end of the stage 5 of the design engineering process 900, a deposit account of the requester 1 is debited by the credit and debit server system according to still another predetermined percentage, e.g., 30%, etc., of the total cost. The deposit account is debited for crediting by the credit and debit server system the still other predetermined percentage to a deposit account of the user 1 that generated the layout design meeting the specification S1 and for which a prototype generated based on the layout design is validated by one or more tests.

Figure 9C:
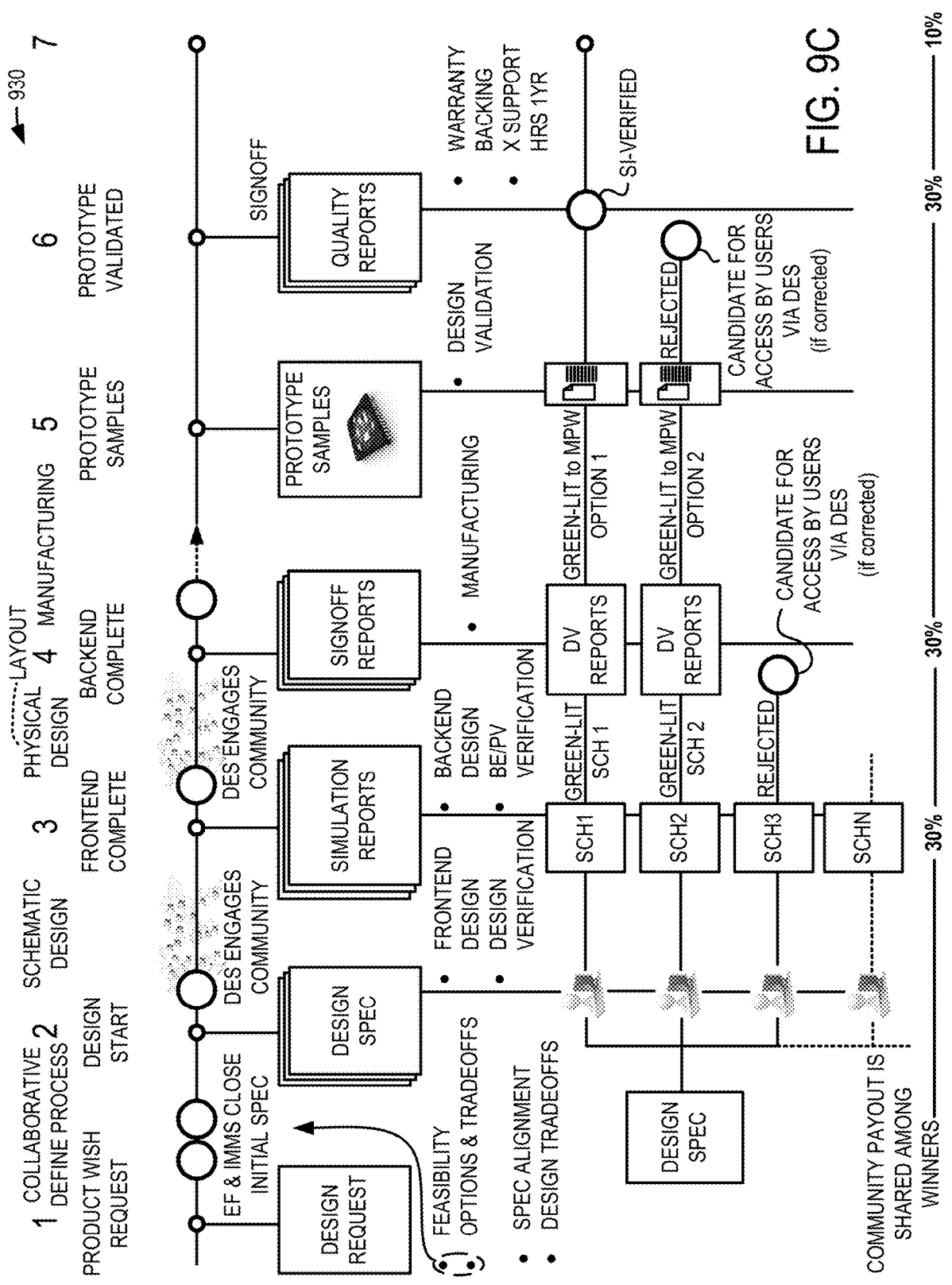
FIG. 9C is a block diagram of an embodiment of a design engineering process for illustrating use of the online design engineering system in fabricating an integrated circuit chip.

FIG. 9C is a block diagram of an embodiment of a design engineering process 930 for illustrating use of the online design engineering system 102 in fabricating an integrated circuit chip. As shown in FIG. 9C, at a stage 1 of the design engineering process 930, the requester 1 uses the requester computing device 1 and accesses the requester account 1 to generate multiple requests for multiple integrated circuit chip designs. The requester 1 uses the input device of the requester computing device 1 to provide parameters for generating multiple integrated circuit designs. The requests and the parameters are sent from the requester computing device 1 via the computer network 110 to the management server 152 of the online design engineering system 102.

Upon receiving the request and the parameters, the management server 152 posts the requests and the parameters to the user accounts 1 through N to engage the community to generate specifications S1 through S3 based on the parameters. The users 1 through N access the respective user accounts 1 through N via the respective computing devices 1 through N to generate the specifications. For example, the users 1 through N add additional parameters to generate the specifications S1 through S3.

The specification completeness checker tool 302 of the online design engineering system 102 determines whether the specifications S1 through S3 are complete. For example, the specification completeness checker tool 302 determines whether all fields within the specifications S1 through S3 have values of the parameters. Furthermore, upon receiving the request and the specifications, the specification compliance checker tool 320 of the online design engineering system 102 determines whether the specifications S1 through S3 comply with the specification compliance rules such as whether values of the parameters are within corresponding predetermined ranges.

The specifications S1 through S3 are provided from the specification compliance checker tool 320 to the requester computing device 1 via the computer network 110 and the requester account 1 for selection of one or more of the specifications S1 through S3. Upon receiving a selection from the requester computing device 1 via the requester account 1 of the specification S1, at a stage 2 of the design engineering process 930, the management server 152 engages the community by providing access to the specification S1 via the user accounts 1 through N to the user computing devices 1 through N. The requester 1 via the requester computing device 1 and the requester account 1 indicates to the management server 152 of rejection of the specifications S2 and S3. The management server 152 indicates the rejection of the specifications S2 and S3 to one or more of the user accounts 1 through N that created the specifications S2 and S3.

The user 1 generates via the user account 1 a circuit design schematic SCH1 based on the specification S1. Moreover, the user 2 generates via the user account 2 a circuit design schematic SCH2 based on the specification S1. Also, the user 3 generates via the user account 3 a circuit design schematic SCH3 based on the specification S1. Moreover, tests are run on the circuit design schematics SCH1 through SCH3 to generate simulation reports. For example, the design simulation report generator tool 184 (FIG. 3) runs one or more simulations on the circuit design schematics SCH1 through SCH3 generated based on the specification S1. The design simulation report generator tool 184 determines that the circuit design schematics SCH1 and SCH2 passes the one or more simulations and the circuit design schematic SCH3 fails the one or more simulations. This determination is a completion of a frontend process, which occurs at a stage 3 of the design engineering process 930. The management server 152 indicates the rejection of the circuit design schematic SCH3 to the user account 3 that is accessed by the user 3 to create the circuit design schematic SCH3.

The simulation reports include whether the circuit design schematics SCH1 through SCH3 pass or fail the tests. The simulation reports are sent from the design simulation report generator tool 184 of FIG. 3 via the computer network 110 and the requester account 1 to the requester computing device 1. The requester 1 views the simulation reports displayed on the display device of the requester computing device 1 via the requester account 1 to select the simulation reports for the circuit design schematics SCH1 and SCH2.

The selection of the simulation reports for the circuit design schematics SCH1 and SCH2 is sent from the requester computing device 1 via the requester account 1 and the computer network 110 to the management server 152. The management server 152 indicates the selection to the user accounts 1 and 2. The user 1 views the selection of the circuit design schematic SCH1 posted to the user account 1 and generates a layout design from the circuit design schematic SCH1. Similarly, the user 1 views the selection of the circuit design schematic SCH2 posted to the user account 2 and generates a layout design from the circuit design schematic SCH2. Furthermore, tests are run on the layout designs to generate multiple signoff reports. For example, the design simulation report generator tool 184 (FIG. 3) runs one or more simulations on the layout designs generated from the circuit design schematics SCH1 and SCH2. The design simulation report generator tool 184 determines that both the layout designs generated for the circuit design schematics SCH1 and SCH2 passes the one or more simulations. This determination is a completion of a frontend process, which occurs at a stage 4 of the design engineering process 930. The signoff reports indicate that the layout designs generated for the circuit design schematics SCH1 and SCH2 passes one or more tests.

The signoff reports are sent from the design simulation report generator tool 184 of FIG. 3 via the computer network 110 and the requester account 1 to the requester computing device 1. The requester 1 views the signoff reports displayed on the display device of the requester computing device 1 via the requester account 1. The requester 1 uses the requester computing device 1 to indicate via the requester account 1 that prototypes are to be generated based on the signoff reports for the layout designs generated from the circuit design schematics SCH1 and SCH2.

Upon receiving the indication that the prototypes are to be generated from the requester computing device 1 via the computer network 110, the shuttle manager tool 302 (FIG. 3) of the online design engineering system 102 provides a file including the layout design for the circuit design schematic SCH1, a file including the circuit design schematic SCH1, and a file including the specification S1 via the computer network 110 and the fabrication entity account 1 to the fabrication computing device 1. Moreover, the shuttle manager tool 302 of the online design engineering system 102 provides a file including the layout design for the circuit design schematic SCH2, a file including the circuit design schematic SCH2, and a file including the specification S1 via the computer network 110 and the fabrication entity account 1 to the fabrication computing device 1. At a stage 5 of the design engineering process 930, the fabrication entity 1 fabricates a prototype of the integrated circuit chip from the layout design generated from the circuit design schematic SCH1, and sends the prototype via the mailing service to the design engineering entity. Moreover, at the stage 5 of the design engineering process 930, the fabrication entity 1 fabricates a prototype of the integrated circuit chip from the layout design generated from the circuit design schematic SCH2, and sends the prototype via the mailing service to the design engineering entity. Upon receiving the prototypes for the circuit design schematics SCH1 and SCH2 from the fabrication entity 1, the prototype tester and test report generator tool 306 (FIG. 3) is executed by the design engineering entity to test the prototypes to validate or invalidate the prototypes. The validation or invalidation is performed at a stage 6 of the design engineering process

930. Upon determining that the prototype generated from the circuit design schematic SCH1 is valid, at a stage 7 of the design engineering process 930, the prototype is sent by the design engineering entity via the mailing service to the fabrication entity 1 for fabricating integrated circuit chips based on the prototype. On the other hand, upon determining that the prototype generated from the circuit design schematic SCH2 is invalid, the prototype is not sent by the design engineering entity via the mailing service to the fabrication entity 1. The management server 152 indicates the invalidation of the prototype generated from the circuit design schematic SCH2 to the user account 2 that is accessed by the user 2 to create the layout design from which the prototype is fabricated.

In one embodiment, upon determining that the prototype generated from the circuit design schematic SCH2 is invalid, the prototype tester and test report generator tool 306 indicates the invalidity to the user account 2 via the computer network 110. The user 2 changes the layout design generated from the circuit design schematic SCH2 to generate a changed layout design. The changed layout design is tested in the same manner in which the layout design generated from the circuit design schematic SCH2 is tested. Moreover, after passing the test, the management server 152 determines to store the changed layout design in the design database 160 for access by the user accounts 1 through N. In an embodiment, the changed layout design is obfuscated, in a manner described above, before being displayed within the user account 1 and the user accounts 3 through N based on whether the user 2 has indicated the changed layout design to be private or public.

It should be noted, that in an embodiment, at the end of the stage 3 of the design engineering process 930, a deposit account assigned to the requester 1 is debited by the credit and debit server system according to a predetermined percentage, e.g., 30%, etc., of a total cost, e.g., 100%, etc., of creating designs and fabricating integrated circuit chips from a prototype of one of the designs. The deposit account is debited for crediting by the credit and debit server system the predetermined percentage to the deposit accounts of the users 1, 2, and 3 that generated the circuit design schematics SCH1 through SCH3. Moreover, at the end of the stage 6 of the design engineering process 930, a deposit account of the requester 1 is debited by the credit and debit server system according to another predetermined percentage, e.g., 30%, etc., of the total cost. The deposit account is debited for crediting by the credit and debit server system the other predetermined percentage to deposit accounts of the user 1 that generated the layout design based on the circuit design schematic SCH1 for which the prototype is validated. Also, at the end of the stage 7 of the design engineering process 930, a deposit account of the requester 1 is debited by the credit and debit server system according to yet another predetermined percentage, e.g., 10%, etc., of the total cost. The deposit account is debited for crediting by the credit and debit server system the yet other predetermined percentage to a deposit account of the user 1 that generated the layout design generated from the circuit design schematic SCH1 for which the integrated circuit chips are fabricated at the stage 7 of the design engineering process 930.

FIG. 10 is a diagram of an embodiment of a specification 1002 of a component of the electrical circuit. Examples of parameters of the specification 1002 include a minimum value and the maximum value of an operating voltage provided as an input to the electrical circuit, a maximum value of an input quiescent current, a minimum value of a current output from the electrical circuit, and an amount of short circuit current output from the electrical circuit.

Figure 11:
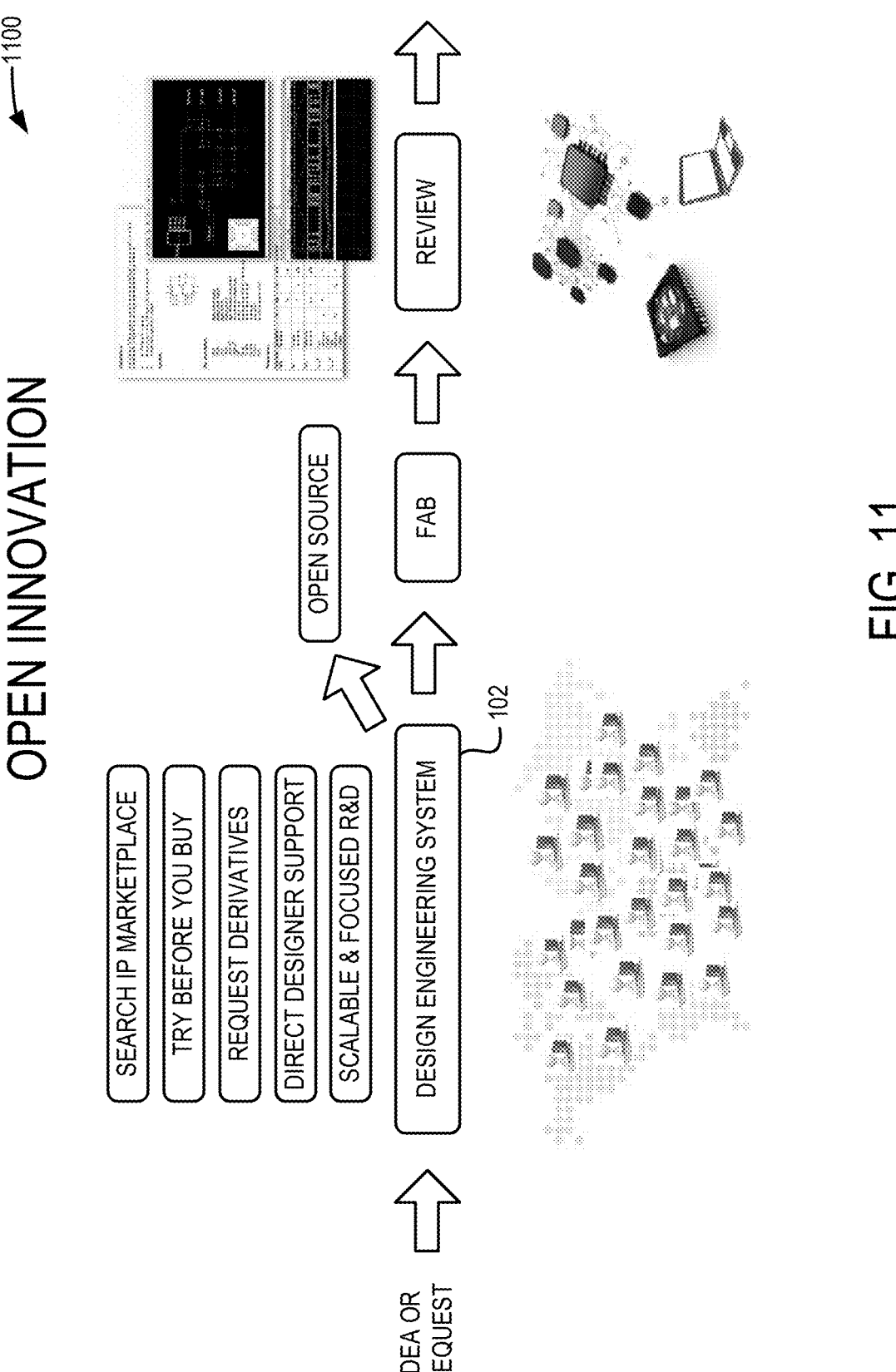
FIG. 11 is a diagram of an embodiment of the online design engineering system that provides access to multiple users via the user accounts for generating a design and fabrication of an integrated circuit from the design.

FIG. 11 is a diagram of an embodiment of a system 1100 to illustrate that the online design engineering system 102 provides access to the users 1 through N via the user accounts 1 through N for generating a design and fabrication of an integrated circuit from the design. A request for a prototype of an integrated circuit chip is provided by the requester 1 via the requester computing device 1 and the computer network 110 to the online design engineering system 102. Upon receiving the request, the online design engineering system 102 offers various advantages, such as, searching of the searchable storage 162 that has various designs; a trial, such as tests, of a design or a prototype of an integrated circuit chip before mass production of the integrated circuit chip; generation of a derivative of an integrated circuit chip design by coupling one design instead of another design with the integration circuit design 452; direct designer support provided via the user accounts 1 through N and the online design engineering system 102 by the corresponding users 1 through N to the requester 1 during each stage of generating a prototype of an integrated circuit chip; and a scalable and focused research and development. A prototype of an integrated circuit chip is fabricated in a fab, which is controlled by the one or more fabrication entities, described herein. The online design engineering system 102 provides a review of the prototype when the prototype tester and test report generator tool 306 (FIG. 3) executes a test on the prototype.

FIG. 12 is a diagram of an embodiment of a system 1200 to illustrate an interplay between the requester 1, sometimes referred to herein as a customer, and the community to fabricate a prototype of an integrated circuit chip. Examples of the customer include startup companies, product companies, and a small and midsize business (SMB), etc. Examples of the community include designers of circuit designs, developers of integrated circuit chips, testers of designs, testers of prototypes of integrated circuit chips, customers who request designs and/or prototypes of integrated circuit chips, foundry entities, and marketers of designs and/or integrated circuit chips. The customer submits a request for a prototype of an integrated circuit chip via the online design engineering system 102 to the community. The community responds to the request via the online design engineering system 102 with a prototype of an integrated circuit chip for review by the customer.

Figure 13A:
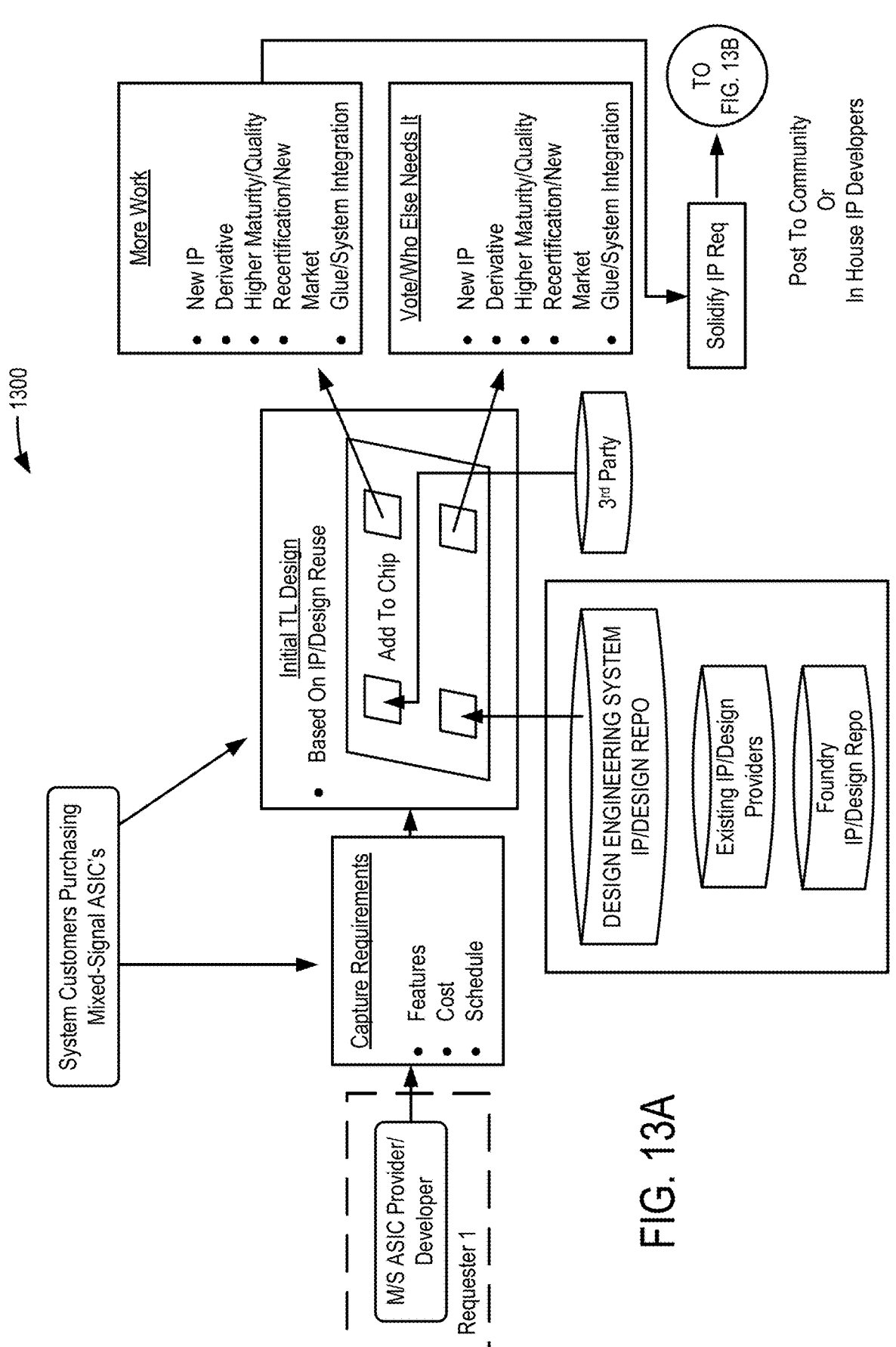
FIG. 13A is a diagram of an embodiment of a design engineering method that is executed using the online design engineering system.

FIG. 13A is a diagram of an embodiment of a design engineering method 1300 that is executed by the online design engineering system 102. The requester 1, such as an integrated circuit provider or an integrated circuit developer or an IoT developer or an SoC developer, uses the requester computing device 1 to send a specification, via the requester account 1, for generating a design to the online design engineering system 102. For example, the requester 1 uses the requester computing device 1 to access the requester account 1 via the website to post on the requester account 1 a request for generating an integrated circuit chip design and the specification. The specification includes features, such as the parameters, of a design, costs of generating the integrated circuit chip design, and a schedule for generating the integrated circuit chip design.

Upon receiving the request and the specification, the management server 152 searches the design database 160 for a design that forms a portion, such as a component design, of the integrated circuit chip design. Moreover, the management server 152 searches a database of a third party, who is not a requester or a user, to determine that the database includes a design that forms another portion, such as a component design, of the integrated circuit chip design. The management server 152 determines that an additional portion, such as an additional component design, of the integrated circuit chip design is to be generated. The management server 152 posts the request and the specification to the user accounts 1 through N in addition to a request for generating the additional portion of the integrated circuit chip design. The users 1 through N use the corresponding computing devices 1 through N to access the corresponding, such as respective, user accounts 1 through N. A design generated by the user 1 by applying the online design engineering system 102 passes simulation tests described herein as being executed via the online design engineering system 102 and the design is the additional portion of the integrated circuit chip design.

The management server 152 determines whether the requester 2 has provided, via the requester account 2, parameters of a specification that are met by the additional portion. Upon determining so, the management server 152 notifies the requester 2 via the computer network 110 and the requester account 2 of availability of the additional portion.

Figure 13B:
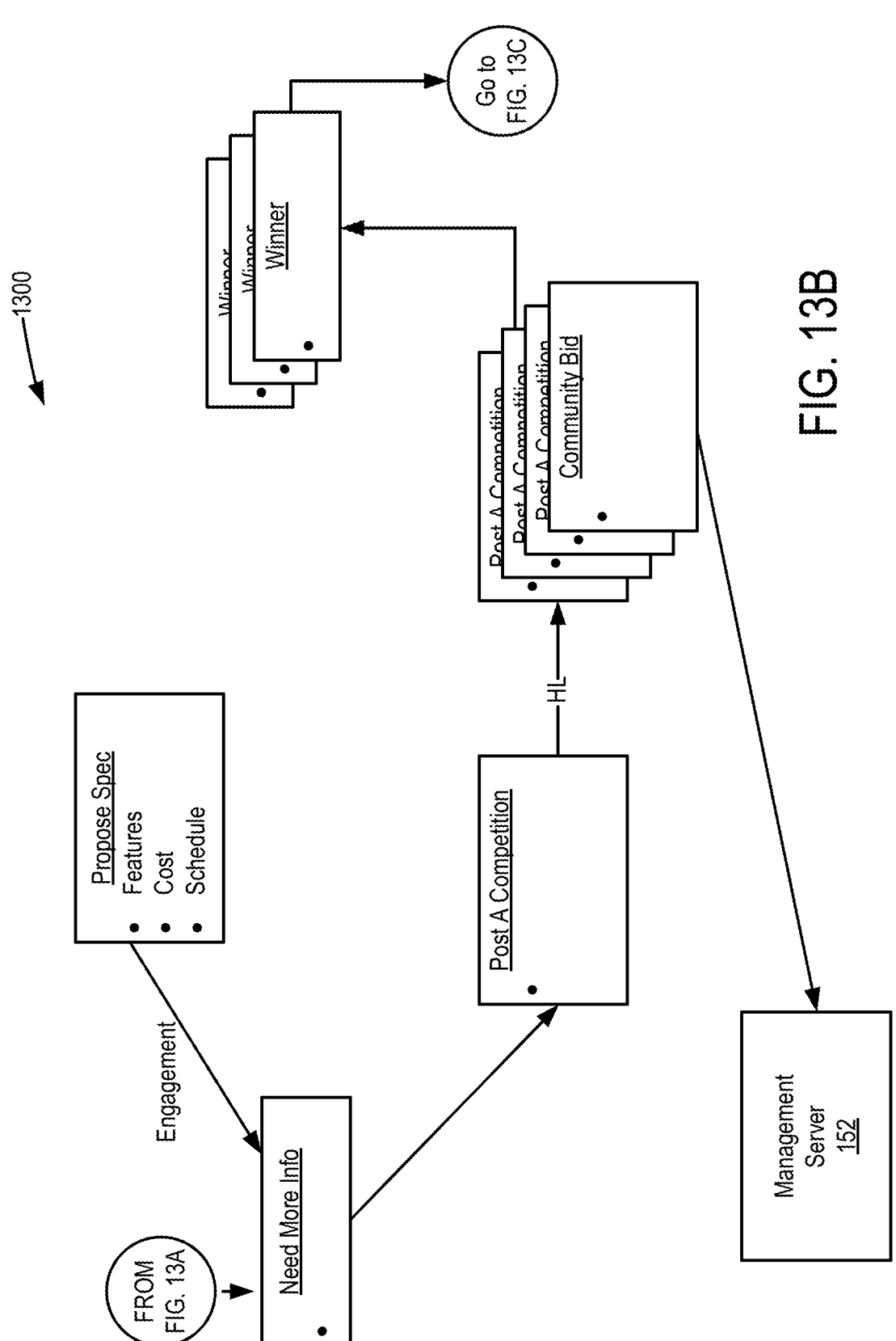
FIG. 13B is a diagram of an embodiment of a continuation of the design engineering method of FIG. 13A.

FIG. 13B is a diagram of an embodiment of a continuation of the design engineering method 1300 of FIG. 13A. As shown in FIG. 13B, upon receiving the request for the integrated circuit chip design from the requester 1 via the requester account 1, the design competition generator tool 310 posts a competition for generating the additional portion of the integrated circuit chip design. For example, the competition is posted by the design competition generator tool 310 on a webpage that is accessed via the website. The webpage is accessed upon accessing any of the user accounts 1 through N. Along with the posting of the competition, the specification of the integrated circuit chip design and the request for the integrated circuit chip design are posted by the design competition generator tool 310 on the webpage. Results of the competition and a winner, e.g., the user 1, etc., of the competition are posted by the design competition generator tool 310 on the webpage. Once the additional portion of the integrated circuit chip design has won the competition, such as by passing one or more simulation tests described herein, the additional portion or the entire integrated circuit chip design is stored within the searchable storage 162. Members, such as the users 2 through N, submit bids via corresponding user accounts 2 through N or the requester 2 submits bids via the requester account 2 for the additional portion or the entire integrated circuit chip design. The bids are sent to the user account 1 that is accessed by the user 1 to generate the additional portion. The user 1 uses the user computing device 1 to access the user account 1 to accept one of the bids. An indication of the acceptance of one of the bids is sent from the user computing device 1 via the user account 1 and the computing device 110 to the one of the user computing devices 2 through N via the corresponding user accounts 2 through N or the requester computing device 2 via the requester account 2. The credit and debit server system debits an amount of the bid that is accepted from a deposit account of the requester 2 or one of the users 2 through N and credits the amount to a deposit account of the user 1.

Figure 13C:
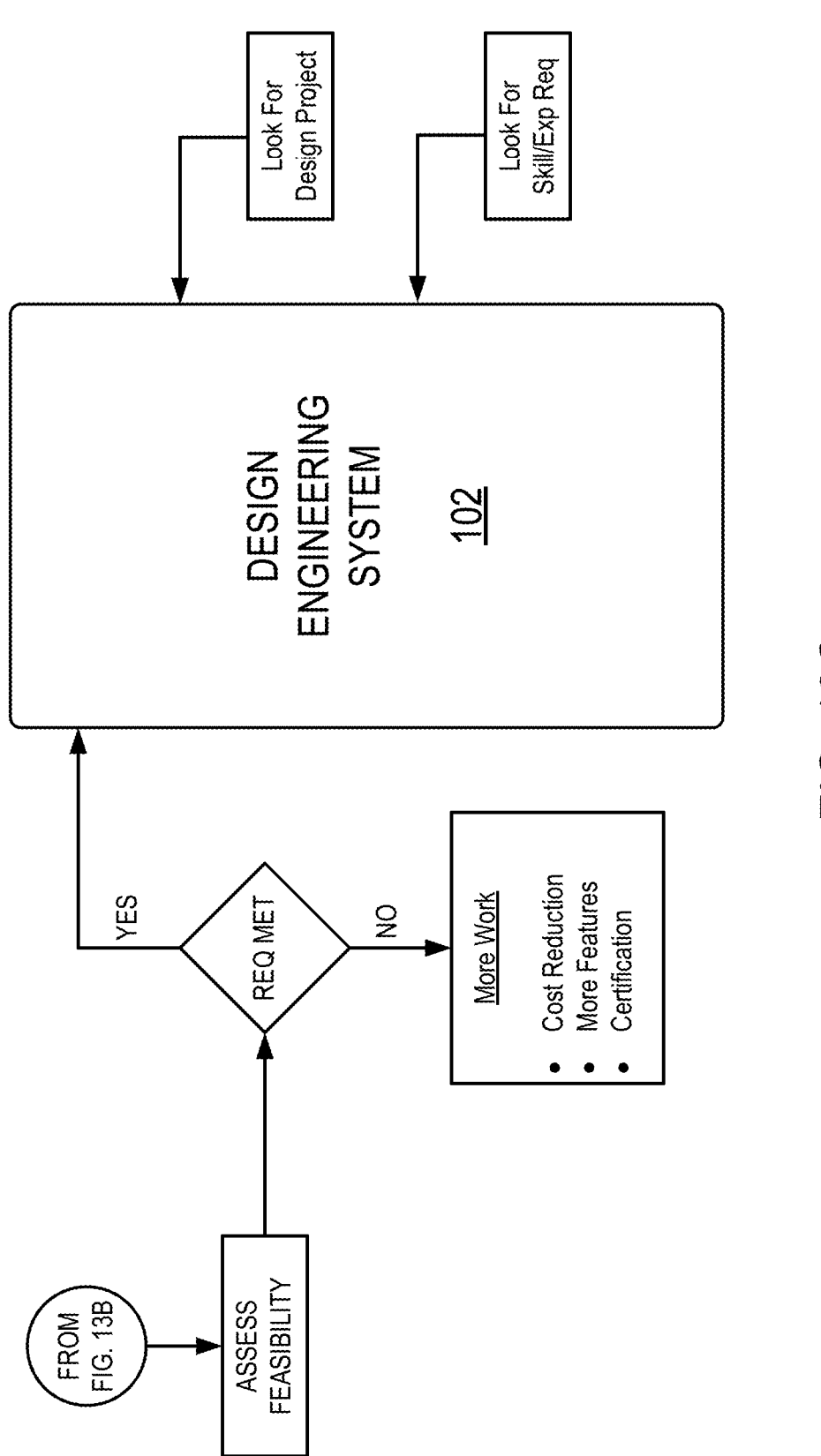
FIG. 13C is a diagram of an embodiment of a continuation of the design engineering method of FIG. 13B.

FIG. 13C is a diagram of an embodiment of a continuation of the design engineering method 1300 to illustrate functionality of the online design engineering system 102. The design project searcher tool 330 (FIG. 3) allows the users 1 through N via the corresponding user accounts 1 through N to search the project database of the online design engineering system 102 connected to the management server 152 for any projects, such as incomplete projects, for generating designs of integrated circuits. The projects are posted by the requesters 1 and 2 via corresponding requester accounts 1 and 2 to the website. For example, a project includes a specification for a design or parameters for generating the design. The specification is accessed by the design project searcher tool 300 from a name of an integrated circuit that is provided by one of the users 1 through N via corresponding user account 1 through N to search for a project. For example, the user 1 uses the user computing device 1 to access the website to further access the user account 1. The user 1 enters a name of the integrated circuit within a project search field displayed on the display device of the user computing device 1 by the management server 152, and selects a submit option, such as a submit button, displayed besides the project search field. Upon receiving the name of the integrated circuit, the design project searcher tool 330 determines whether the received name matches a name, such as a name of the integrated circuit, within a specification for a design to be generated. In response to determining that the received name matches the name within the specification, the design project searcher tool 330 accesses the project and sends the project with the specification via the computer network 110 to the user computing device 1 for access of the specification by the user 1 via the user account 1. In an embodiment, in addition to a specification for a design of an integrated circuit, the requester 1 posts using the requester account 1 to the website skills and/or expertise of a designer who will generate the design.

When the additional portion of the integrated circuit design passes one or more simulation tests described herein, such as one being conducted by the local test bench tool 165, and/or the circuit design verification tool 188, and/or the local layout verification tool 167, and/or the layout design verification tool 190, the management server 152 certifies the additional portion and stores the additional portion in the design database 160. Moreover, on the other hand, when the additional portion of the integrated circuit chip design does not pass the one or more simulation tests described herein, the management server 152 provides the additional portion to the user account 1 and indicates that the additional portion did not pass the one or more simulation tests.

Moreover, in an embodiment, when the additional portion passes a cost threshold that is set by the requester 1 via the requester account 1 for fabricating an integrated circuit chip having the additional portion, the management server 152 stores the additional portion in the design database 160. For example, the additional portion passes the cost threshold when the management server 152 determines a cost of fabricating the integrated chip having the additional portion is less than or equal to a pre-determined cost. On the other hand, when the additional portion fails the cost threshold that is set by the requester 1 via the requester account 1, the management server 152 provides the additional portion to the user account 1 and indicates that the additional portion did not meet the cost threshold. For example, the additional portion fails the cost threshold when the management server 152 determines a cost of fabricating the integrated chip having the additional portion is greater than a pre-determined cost.

In this embodiment, each component of the additional portion is associated with a pre-determined cost, which is stored in the searchable storage 162. The management server accesses the pre-determined costs and sums the costs of the components of the additional portion to determine a total cost of the additional portion to further determine whether the additional portion meets the cost threshold. For example, if the sum exceeds the cost threshold, the management server 152 determines that the cost threshold is exceeded and is not met. On the other hand, if the sum does not exceed the cost threshold, the management server 152 determines that the cost threshold is not exceeded and is met.

Figure 14A:
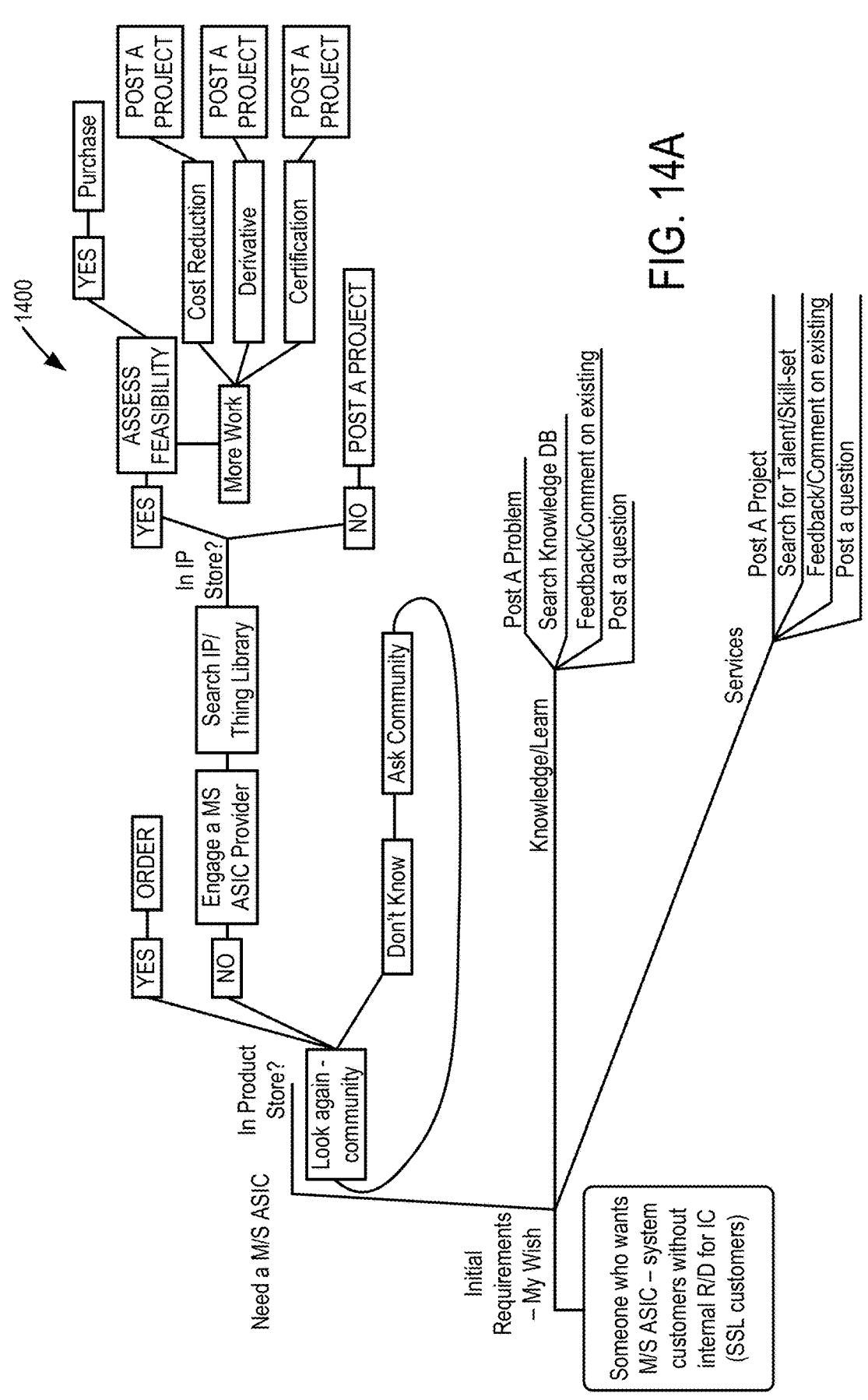
FIG. 14A is a diagram illustrating a flow of a design engineering method that is executed using the online design engineering system.

FIG. 14A is a diagram illustrating the flow of a design engineering method 1400 that is executed using the online design engineering system 102. The customer, such as the requester 1, who wishes to obtain a prototype of an integrated circuit chip sends a request from the requester computing device 1 via the requester account 1 and the computer network 110 to the online design engineering system 102 for a design of the prototype of the integrated circuit chip. For example, the customer submits a specification to the management server 152 for uploading and posting to the searchable storage 162. The design searcher tool 322 searches within an in product store, such as the design database 160, to determine based on the specification whether a design that satisfies the parameters of the specification is stored in the design database 160. Upon determining that the design satisfies the parameters, the design searcher tool 322 provides an indication via the computer network 110 and the requester account 1 to the customer of the design. When the indication is sent, the obfuscator tool 182 obfuscates one or more portions of the design upon determining that the design is designated as private by a designer, such as the user 1, of the design. An order for a prototype of the integrated circuit chip based on the design is sent from the requester computing device 1 via the requester account 1 to the fabrication entity account 1 for fabrication of the prototype. The fabrication entity 1 operates the fabrication computing device 1 to access the fabrication entity account 1 to receive the order.

On the other hand, upon determining that none of the designs stored within the design database 160 match the parameters of the specification, the design searcher tool 322 sends a request for the design and the specification via the fabrication entity account 1 and the computer network 110 to the fabrication computing device 1 controlled by the fabrication entity 1. The fabrication computing device 1 is operated by the fabrication entity 1 to search an IP library that is accessible to the fabrication entity 1 but not to the design engineering entity. Moreover, fabrication computing device 1 is operated by the fabrication entity 1 to access the design database 160 via the fabrication entity account 1. Upon accessing the design database 160, the fabrication entity 1 operates the fabrication computing device 1 to search the design database 160 for the design to determine whether the design is stored in the design database 160. Upon determining that the design is stored in the IP library or in the design database 160, the fabrication computing device 1 provides an indication to the management server 152 via the computer network 110 and the fabrication entity account 1 of the design. The management server 152 forwards the indication of the design to the requester 1 via the computer network 110 and the requester account 1. Upon receiving the indication, an order for a prototype of the integrated circuit chip based on the design is sent from the requester computing device 1 via the requester account 1 to the fabrication entity account 1 for fabrication of the prototype. On the other hand, upon receiving a determination from the fabrication computing device 1 via the fabrication entity account 1 and the computer network 110 that the design of the integrated circuit chip is not stored in the IP library and in the design database 160, the project poster tool 330 of the online design engineering system 102 posts a project for generating the design of the integrated circuit chip.

In one embodiment, upon determining that none of the designs stored within the design database 160 match the parameters of the specification, the management server 152 sends a request via the user accounts 1 through N of the community to the user computing devices 1 through N for determining whether any of the users 1 through N have knowledge of the design based on the specification. The users 1 through N operate the corresponding user computing devices 1 through N to respond to the request regarding the knowledge of the design via corresponding user accounts 1 through N and the computer network 110 to the management server 152. The management server 152 sends the response of the users 1 through N via the computer network 110 and the requester account 1 to the requester computing device 1.

Moreover, upon receiving a determination from the fabrication computing device 1 via the fabrication entity account 1 and the computing network 110 that the design is not feasible, such as more work on the design is to be done, or the design exceeds the cost threshold, or that the design fails one of more simulation tests, or a combination thereof, the project poster tool 330 (FIG. 3) of the online design engineering system 102 posts a project to make the design feasible. The project is posted on the website and is accessed by the users 1 through N via the user computing devices 1 through N and the user accounts 1 through N and the computer network 110.

In one embodiment, the customer, who wishes to learn more about the integrated circuit chip, posts a problem or a question regarding a design of an integrated circuit chip or a question regarding a designer of the integrated circuit chip to the online design engineering system 102 so that one or more of the users 1 through N via corresponding one or more of the user accounts 1 through N provide a solution to the problem or an answer to the questions. For example, the requester 1 uses the requester computing device 1 to post via the computer network 110 and the requester account 1 the problem on the website. The users 1 through N use the user computing devices 1 through N to access the problem via the user accounts 1 through N and the computer network 110. The users 1 through N use the user computing devices 1 through N to provide feedback or a comment to the problem to the requester computing device 1 via the user accounts 1 through N and the computer network 110. An example of the question regarding the designer is one inquiring about a skill set of the designer for generating a design of an integrated circuit chip.

In an embodiment, the management server 152 searches one or more of the various databases described herein, such as the design database 160, the specification database 104, the comment database 204, to provide a response to the problem or the question. The management server 152 sends the response to the requester computing device 1 via the computer network 110 and the requester account 1.

Figure 14B:
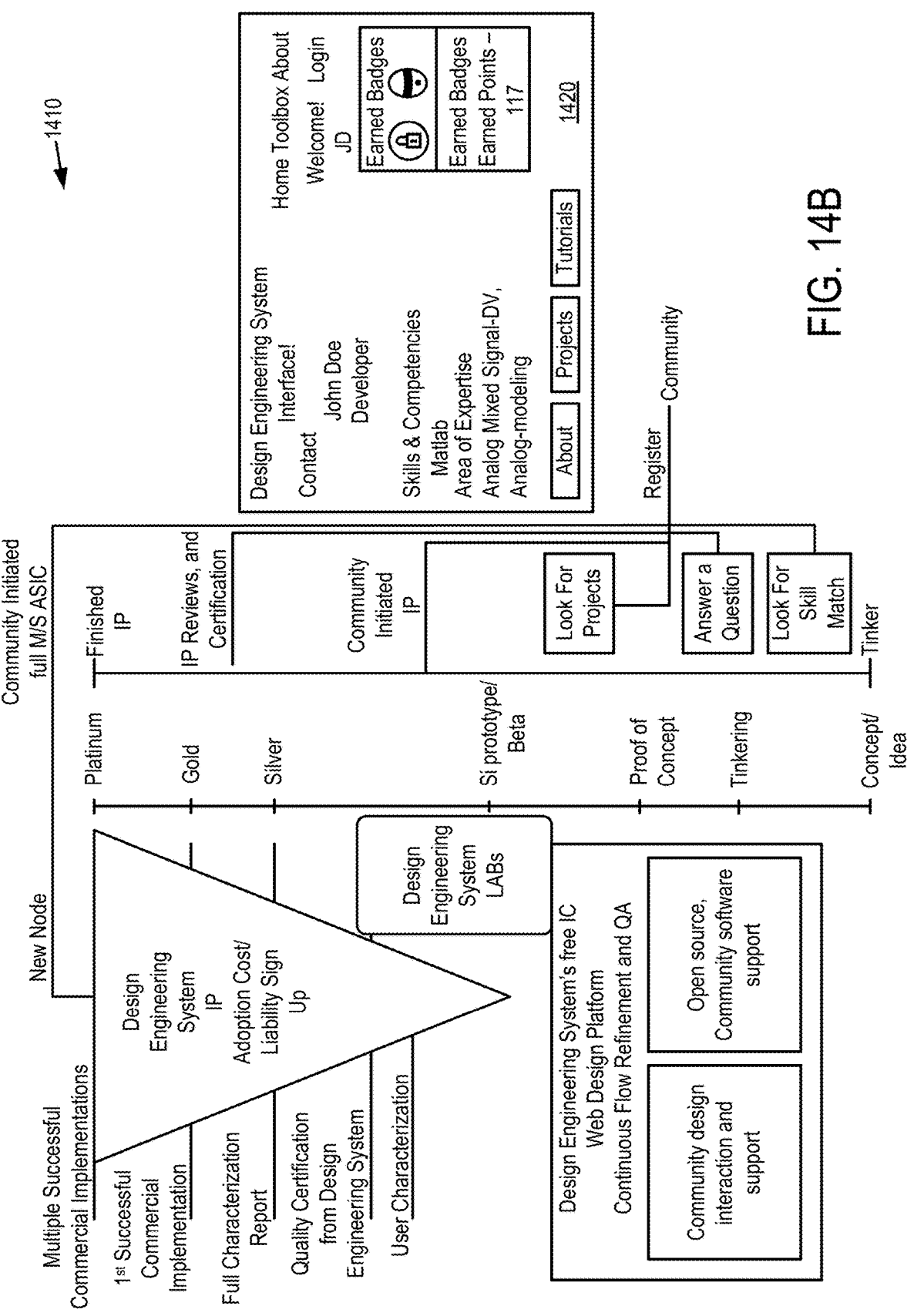
FIG. 14B is a diagram of an embodiment of a flow of a design engineering process to illustrate an interaction of one of the users with a display on a display device of a user computing device and to illustrate the online design engineering system.

FIG. 14B is a diagram of an embodiment of a flow of a design engineering process 1410 to illustrate an interaction of the user 1 with a display 1420, such as an image or a user interface, on a display device of the user computing device 1. The display 1420 is generated on the user computing device 1 that is operated by the user 1 and shows details that are accessed via the user account 1. For example, the details includes a name of the user 1; a title within an organization in which the user 1 is an employee, or an owner, or a contractor; skills and competencies of the user 1 for generating a design or for using a set of design tools; and types of components for which the user 1 has expertise in designing. Moreover, in this example, the user account 1 includes projects that are completed by the user 1 or are accepted by the user 1 via the user account 1, additional information about the user 1, tutorials that the user 1 has posted to the user account 1 and/or reviewed via the user account 1.

The user 1 registers with the online design engineering system 102 by being assigned login information, e.g., user identification, user password, etc., by the authenticator tool 332 of the online design engineering system 102. The login information that is assigned to the user account 1 is unique to the user account 1 in that the login information cannot be used to access another one of the user accounts 2 through N or the requester accounts 1 and 2 or the fabrication entity accounts 1 and 2. The user 1 logs into the user account 1 to look for projects. For example, the user 1 uses the computing device 1 to log into the user account 1 and provides an indication along with project searching criteria, such as a name of an integrated circuit, to the project searcher tool 330 of the online design engineering system 102 via the computer network 110. The project searching criteria is for a project for generating a circuit design. Examples of the name of an integrated circuit include an adder, a half adder, a flip flop, a decoder, and an encoder. Upon receiving the indication, the project searcher tool 330 searches the project database for one or more projects, such as an incomplete project, that match the project searching criteria. The project searcher tool 330 sends the project, such as a specification having a name that matches the name received within the project searching criteria, via the computer network 110 and the user account 1 to the user computing device 1.

The user 1 logs into the user account 1 by using the user computing device 1 and answers a question that is posted on the website by the requester 1 via the requester computing device 1 and the requester account 1. Within the user account 1, results of a simulation test, such as test conducted on a design that is created by the user 1, are posted by the management server 152.

Moreover, the user 1 logs into the user account 1 by operating the user computing device 1 and creates a design by using the design tools 158, described herein, tests the design, and stores the design within the design database 160. The design is certified by the automatic certification server 112 after passing one or more simulation tests.

The online design engineering system 102 stores information within an implementation database of the online design engineering system 102. The implementation database is stored within the searchable storage 162 stores the information regarding successful implementations of one or more integrated circuit chip designs and a first successful implementation of an integrated circuit chip design. For example, the management server 152 determines a number of integrated circuit chips that implement a design that is generated via the online design engineering system 102 and stores the number within the implementation database. The number of the integrated circuit chips is a number of implementations of the design. As another example, the management server 152 determines a date on which a design is implemented within an integrated circuit chip for a first time and identifies a user account of a user that created the design and stores the date and the user account identifier, such as a number or a series of alphanumeric characters, within the implementation database.

Figure 15:
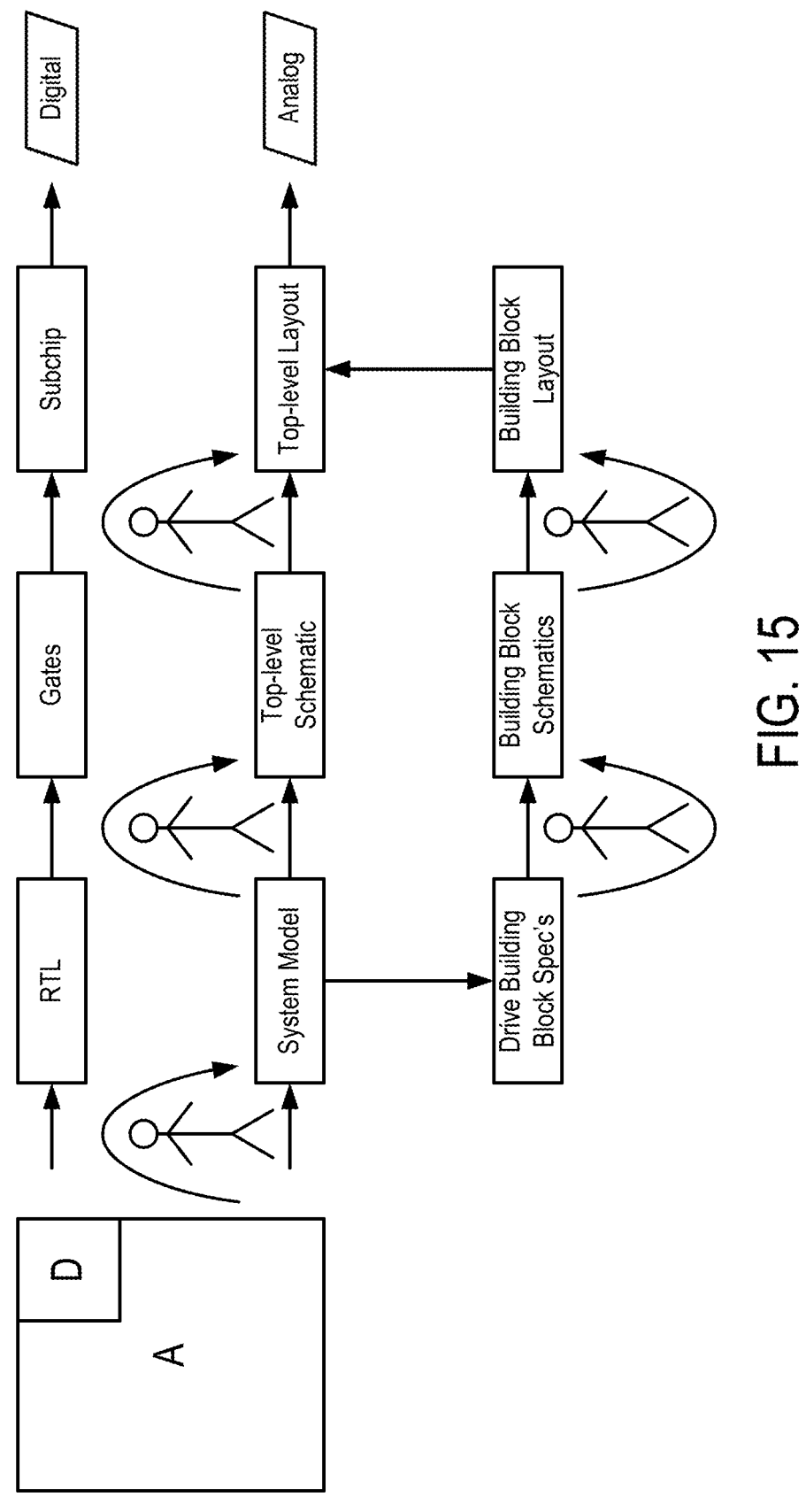
FIG. 15 is a diagram to illustrate a creation of a design.

FIG. 15 is a diagram to illustrate creation of a design, such as a design of a digital circuit and a design of an analog circuit. Register transfer level (RTL), which is a language stored in the circuit design tool database 206, is an example of the circuit design tool 162 that is accessed by the one or more users 1 through N via the corresponding, such as respective, one or more user accounts 1 through N, the computer network 110, and the corresponding one or more user computing devices 1 through N to model a circuit in terms of flow of data between registers and logical operations performed on the data. For example, the RTL language is used to generate a circuit design based on a specification. An RTL description is usually converted into a gate level description of the circuit design by a logic synthesis tool, which is an example of the circuit design tool 162 stored in the circuit design tool database 206. For example, the user 1 uses the user computing device 1 to access the user account 1 via the computer network 110 and indicate to the management server 152 that the logic synthesis tool is to be executed. Upon receiving the indication, the management server 152 executes the logic synthesis tool to generate the gate level description. The gate level description is accessed by the user 1 via the user account 1 by using the user computing device 1. In addition to the gate level description, the layout design tool 166 is accessed by the user computing device 1 via the user account 1 to generate a layout design of a subchip, such as a component, of an integrated circuit chip.

Similarly, in an analog circuit design, a system model is generated using the design tools 158. From the system model, a schematic of a circuit design of an analog circuit is generated by using the circuit design tool 164. From the top-level schematic, a top-level layout design of the analog circuit is generated by using the layout design tool 166.

Figure 16:
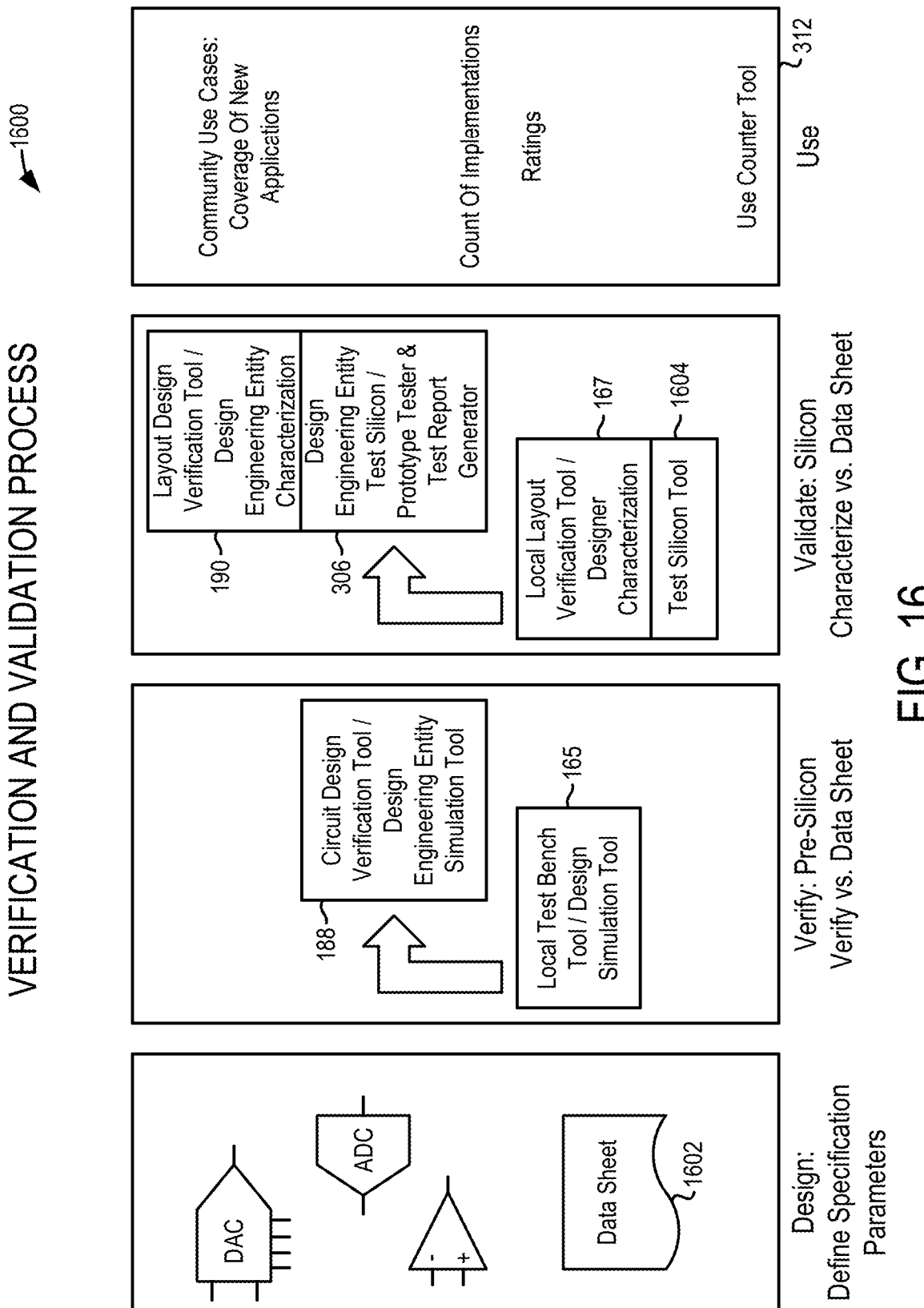
FIG. 16 is a diagram of an embodiment of a design engineering method to illustrate a validation protocol and a validation protocol.

FIG. 16 is a diagram of an embodiment of a design engineering method 1600. In the design engineering method 1600, the requester 1 operates the requester computing device 1 to provide a data sheet 1602 having multiple parameters of a specification via the requester account 1 and the computer network 110 to the management server 152. Moreover, once a circuit design is generated by the user 1 via the user account 1 based on the data sheet 1602, the user 1 uses the user computing device 1 to access the local test bench tool 165 from the automatic certification server 112. In one embodiment, the local test bench tool 165 is stored in a memory device of the user computer device 1 but is not downloaded from the automatic certification server 112 via the computer network 110. Moreover, the user 1 uses the user computing device 1 to indicate via the user account 1 to the design engineering entity to test the circuit design. Upon receiving the indication, the automatic certification server 112 executes the circuit design verification tool 188 to test the circuit design. Upon determining that the circuit design passes the test, the automatic certification server 112 issues a certificate indicating the same and sends the certificate via the computer network 110 to the user account 1 for access by the user 1 via the user computing device 1. Moreover, the certificate indicating that the circuit design passed the test is stored within the searchable storage 162 and is associated, such as linked or mapped, with the user account 1 in the searchable storage 162. The association of the certificate indicating that the circuit design passed the test and the user account 1 is performed by the management server 152. When the requester 1 operates the requester computing device 1 to access the circuit design, the management server 152 accesses the certificate indicating that the circuit design passed the test and sends the certificate via the computer network 110 to the requester computing device 1 for display of the certificate via the requester account 1. The test conducted by the design engineering entity provides an independent verification of the circuit design. The dual verification of the circuit design by the user 1 and the design engineering entity increases coverage and confidence in the circuit design.

Similarly, once a layout design is generated from the circuit design by the user 1 via the user account 1, the user 1 uses the user computing device 1 to access the local layout verification tool 167 from the automatic certification server 112. In one embodiment, the local layout verification tool 167 is stored in a memory device of the user computer device 1 but is not downloaded from the automatic certification server 112 via the computer network 110. Moreover, the user 1 uses the user computing device 1 to indicate via the user account 1 to the design engineering entity to test the layout design. Upon receiving the indication, the automatic certification server 112 executes the layout design verification tool 190 to test the layout design. Upon determining that the layout design passes the test, the automatic certification server 112 issues a certificate indicating the same and sends the certificate via the computer network 110 to the user account 1 for access by the user 1 via the user computing device 1. Moreover, the certificate indicating that the layout design passed the test is stored within the searchable storage 162 and is associated, such as linked or mapped, with the user account 1 in the searchable storage 162. The association of the certificate indicating that the layout design passed the test and the user account 1 is performed by the management server 152. When the requester 1 operates the requester computing device 1 to access the layout design, the management server 152 accesses the certificate indicating that the layout design passed the test and sends the certificate via the computer network 110 to the requester computing device 1 for display of the certificate via the requester account 1. The test conducted by the design engineering entity provides an independent verification of the layout design. The dual verification of the layout design by the user 1 and the design engineering entity increases coverage and confidence in the layout design.

Furthermore, once a prototype of an integrated circuit is generated from the layout design and sent by the fabrication entity 1 to the user 1 via the mailing service, the user 1 uses the user computing device 1 to access a local test silicon tool 1604 from the automatic certification server 112. The automatic certification server 152 does not allow a download of the local test silicon tool 1604 via the computer network 110 to the computing device 1 operated by the user 1. As such, the local test silicon tool 1604 is executed on the cloud computing node. In one embodiment, the local test silicon tool 1604 is stored in a memory device of the user computer device 1 but is not downloaded from the automatic certification server 112 via the computer network 110.

Moreover, the user 1 uses the user computing device 1 to indicate via the user account 1 to the design engineering entity to test the prototype, which is sent from the user to the design engineering entity via the mailing service or is sent from the fabrication entity 1 to the design engineering entity via the mailing service. Upon receiving the indication, the automatic certification server 112 executes the prototype tester and test report generator 306 to test the prototype. Upon determining that the prototype passes the test, the automatic certification server 112 issues a certificate indicating the same and sends the certificate via the computer network 110 to the user account 1 for access by the user 1 via the user computing device 1. Moreover, the certificate indicating that the prototype passed the test is stored within the searchable storage 162 and is associated, such as linked or mapped, with the user account 1 in the searchable storage 162. The association of the certificate indicating that the prototype passed the test and the user account 1 is performed by the management server 152. When the requester 1 operates the requester computing device 1 to access the circuit design or the layout design, the management server 152 accesses the certificate indicating that the prototype passed the test and sends the certificate via the computer network 110 to the requester computing device 1 for display of the certificate via the requester account 1. The test conducted by the design engineering entity provides an independent validation of the prototype. The dual validation by the user 1 and the design engineering entity increases coverage and confidence in the prototype.

The use counter tool 312 (FIG. 3) of the design engineering entity 102 counts a number of implementations of a design within one or more integrated circuits. Moreover, the design rating generator tool 192 (FIG. 3) generates ratings of the design. For example, a first design for which the use counter tool 312 determines to have a greater number of uses, such as a number of times for which the design is implemented in one or more integrated circuits, compared to a second design, the first design is assigned a higher rating than the second design. It should be noted that with an increase in a number of times of use of the design in an integrated circuit, e.g., a graphics processor, a gaming processor, a display processor, an operating system processor, etc., confidence in the design by the community increases.

Figure 17:
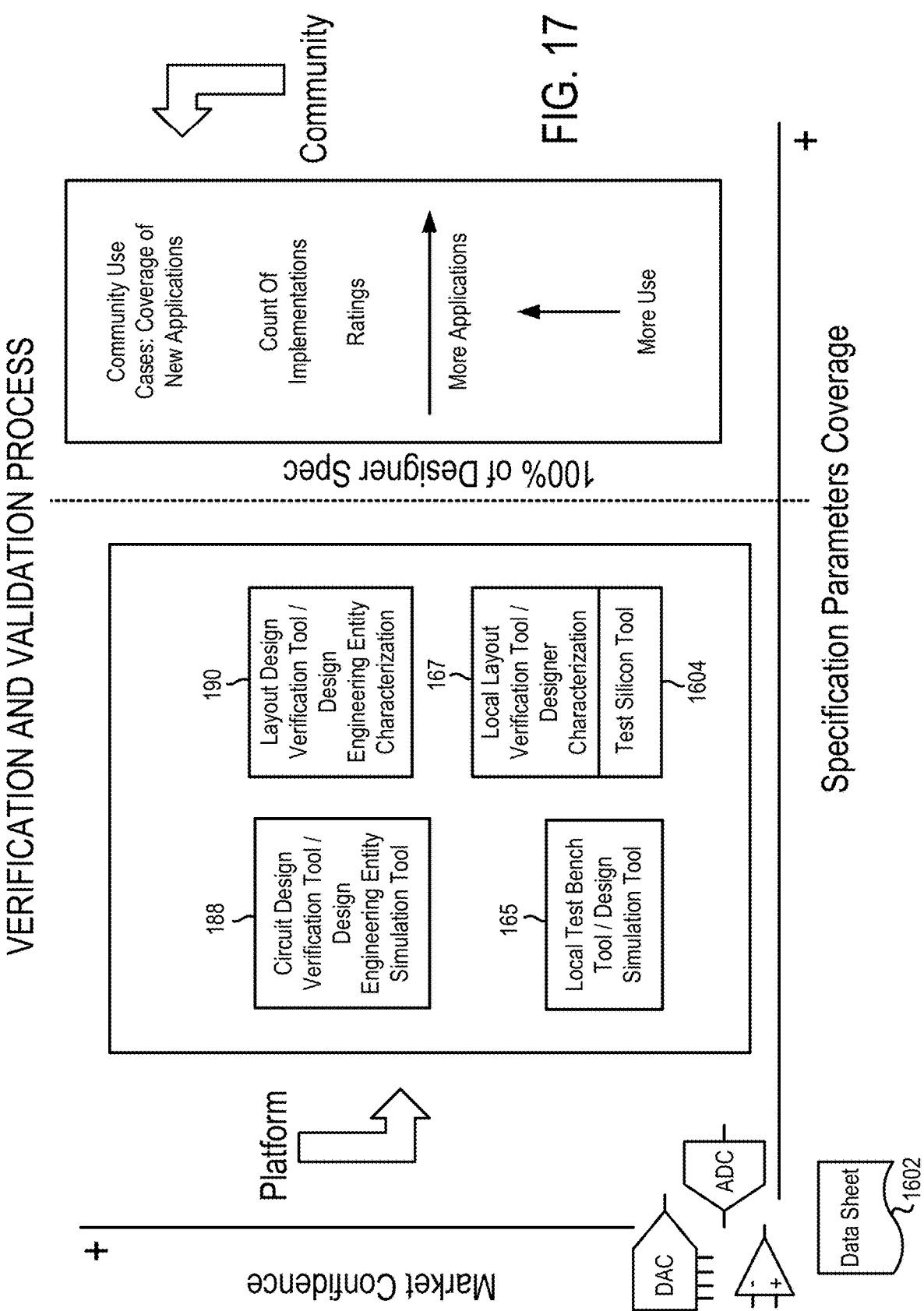
FIG. 17 is a diagram used to illustrate a relationship between confidence of the community and requesters and fabrication entities, and to illustrate specification parameters coverage.

FIG. 17 is a diagram used to illustrate a relationship between specification parameters coverage by a design and confidence of the community, requesters and fabrication entities in the design. As the design progresses through stages, e.g., circuit design test, layout design test, prototype test, integrated circuit use, etc., coverage of specification parameters of the data sheet 1602 increases. Moreover, as a number of uses of the design increases, confidence of the community and requesters and fabrication entities for the design increases and ratings of the design increase. It should be noted that a number of uses of the design increases by implementing the design in integrated circuits having different applications and/or by implementing the design for a large number of times in integrated circuits having the same application. Examples of the different applications include a mobile application, a computer application, a sensor application, and an IoT application.

FIGS. 18A-1, 18A-2, 18A-3, 18A-4, and 18A-5 are diagrams of an embodiment of a design engineering method 1800 to illustrate a creation of the data sheet 1602. In an operation 1 of the design engineering method 1800, the requester 1 uses the requester computing device 1 to access the requester account 1 to submit a request for a design of an integrated circuit. For example, the requester 1 selects an option, such as a graphical display button, displayed within the requester account 1 to submit the request for the design of the integrated circuit via the requester account 1 and the computer network 110 to the data sheet builder tool 318 (FIG. 3). In one embodiment, a fabrication entity uses the fabrication computing device 1 to access the fabrication entity account 1 to submit a request for the design of the integrated circuit. The request is submitted via the computer network 110 to the management server 152.

In an operation 2 of the design engineering method 1800, upon receiving the request for the integrated circuit, the data sheet builder tool 318 accesses the data sheet 1602 from the template database and provides access to the data sheet 1602 to the requester computing device 1 via the requester account 1 and the computer network 110. The requester 1 accesses the data sheet 1602 upon accessing the website and logging into the requester account 1. The data sheet 1602 includes multiple fields for entry, such as a name of a design of the integrated circuit, global conditions for the design, and the parameters of the design.

In an operation 3 of the design engineering method 1800, the requester 1 fills in parameters of the specification into the data sheet 1602 and selects a submit option, such as a submit button displayed on the display device of the requester computing device 1. The selection of the submit option is received by the data sheet builder tool 318 via the requester account 1 and the computer network 110. For example, the requester 1 uses the input device of the requester computing device 1 to provide the parameters within the fields. As an illustration, the requester 1 provides a single design method for testing the design. As another illustration, the requester 1 provides various design methods for testing the design. One of the design methods includes a first set of values of the parameters, such maximum and minimum input voltages at an input pin of the design, maximum and minimum output voltages at an output pin of the design, maximum and minimum input currents at an input pin of the design, maximum and minimum output currents at an output pin of the design, and minimum and maximum temperatures of operation of a prototype of the design. Another one of the design methods includes a second set of values of the parameters. At least one of the values of the second set is different one or more corresponding values of the first set. For example, the first set has a minimum value of 0 volts at an input pin and a maximum value of 10 volts at the input pin. The second set has a minimum value of 2 volts at the input pin and a maximum value of 10 volts at the input pin. As another example, the first set has a minimum value of 0 volts at the input pin and a maximum value of 10 volts at the input pin. The second set has a minimum value of 2 volts at the input pin and a maximum value of 12 volts at the input pin.

In one embodiment, once the first set of parameters are filled in by the requester 1 into the data sheet 1602 and are received from the requester 1 via the requester account 1 and the computer network 110, the data sheet builder tool 318 generates the second set of parameters to generate another different design method for testing the design. The data sheet builder tool 318 populates the data sheet 1602 with the second set and sends the data sheet 1602 via the computer network 110 and the requester account 1 to the requester computing device 1.

Upon receiving the parameters for the design, in an operation 4 of the design engineering method 1800, the data sheet builder tool 318 generates a testbench schematic drawing 1806 to execute each test method for testing the design of the integrated circuit. For example, the data sheet builder tool 318 generates a first testbench schematic drawing to execute a first test method for testing the design of the integrated circuit. As another example, the data sheet builder tool 318 generates a second testbench schematic drawing to execute a second test method for testing the design of the integrated circuit. In the second test method, one or more values, such as minimum and maximum values, of a parameter are different than one or more values, such as minimum and maximum values, of the parameter in the first test method for testing the design. To illustrate, the data sheet builder tool 318 generates a block having pin inputs and pin outputs of the design. To further illustrate, a pin input of the block receives data and a pin out of the block provides data as an output result based on the data received at the pin input. Moreover, the data sheet builder tool 318 couples a power supply, such as a voltage power source or a current power source or a signal driver, to a pin input of the block for receiving power and couples a load, such as resistors and capacitors, to a pin output of the block. Moreover, the testbench schematic drawing 1806 has a reference to an instantiation value, such as a voltage or a current value, for providing to the pin input of the block. For example, when the testbench schematic drawing 1806 is accessed via an account, such as a user account or a requester account, for execution of a simulation, the management server 152 reads the instantiation value from a memory location in the searchable storage 162 and applies the instantiation value to a pin input of the testbench schematic drawing 1806 to execute the simulation. To illustrate, there is a pointer from a memory location of the searchable storage 162 in which the testbench schematic drawing 1806 is stored to a memory location of the searchable storage 162 at which the instantiation value is stored. When the memory location of the searchable storage 162 in which the testbench schematic drawing 1806 is accessed by the management server 152, the pointer points the management server 152 to the memory location of the searchable storage 162 at which the instantiation value is stored.

The testbench schematic drawing 1806 includes the block, the pin inputs, the pin outputs, the power supply, and the load. Moreover, the testbench schematic drawing 1806 includes a resistor having a resistance R and a capacitor having a capacitance C. The testbench schematic drawing 1806 further includes an analysis to be performed to execute the test method to generate measurements of electrical parameters at one or more pin outputs of the block. For example, the test schematic drawing 1806 has values of the power supply to be provided to the pin input, and values of the resistor and the capacitor. In addition, the testbench schematic drawing 1806 has an order of execution of provision of the value of the power supply and the values of the resistor and the capacitor. For example, first the resistor is instantiated to the resistance R and the capacitor is instantiated to the capacitance C. Then, the power supply is instantiated to supply a voltage value V1 or a current value I1 or to supply an amount of power V1*I1. The power supply is to thereafter supply a voltage value V2 or a current value I2 or to supply an amount of power V2*I2 or to supply an amount of power V1*I2 or to supply an amount of power V2*I1. The value V1 is different from the value V2 and the value I1 is different from the value I2.

The requester 1 uses the requester computing device 1 to access via the requester account 1 the workspace application 180. The workspace application 180 further provides the requester account 1 access to the testbench schematic drawing 1806 from the searchable storage 162. The testbench schematic drawing 1806 is displayed within a customer workspace, which is a user interface that is generated on the display device of the requester computing device 1 by execution of the workspace application 180.

In an operation 5 of the design engineering method 1800, the data sheet 1602 including the parameters of the specification are stored by the management server 152 into the searchable storage 162. For example, the data sheet 1602 is stored within the specification database 104. To illustrate, the data sheet 1602 is stored as a specification file, such as a JavaScript Object Notation (JSON) file, within the specification database 104. The parameters filled into the data sheet 1602 are an example of the specification S1.

Moreover, in an operation 6 of the design engineering method 1800, the testbench schematic drawing 1806 is stored in the specification database 104 as a schematic drawing file, and the schematic drawing file is referred to in the specification file in which the data sheet 1602 is stored. For example, the specification file in which the data sheet

1602 is stored includes an identifier, such as a pointer, to a memory address, within the searchable storage 162, at which the schematic drawing file including the testbench schematic drawing 1806 is stored. As another example, the data sheet builder tool 318 stores the testbench schematic drawing 1806 within the schematic drawing file and stores the schematic drawing file in the searchable storage 162. In addition, the data sheet builder tool 318 generates a reference, such as a link, a mapping, or an one-to-one association, between the specification file in which the data sheet 1602 is stored and the schematic drawing file in which the testbench schematic drawing 1806 is stored. To illustrate, the specification file in which the data sheet 1602 is stored includes a pointer to a memory address, of the searchable storage 162, at which the schematic drawing file is stored. As another illustration, the schematic drawing file in which the testbench schematic drawing 1806 is stored includes a pointer to a memory address, of the searchable storage 162, at which the specification file is stored.

In an operation 7 of the design engineering method 1800, the user 1 uses the user computing device 1 to access the data sheet 1602 via the website controlled by the design engineering entity and the user account 1. For example, the user 1 accesses the website to access the user account 1 on which the data sheet 1602 is posted as a design challenge for the user 1. As another example, the user 1 uses the user computing device 1 to access the user account 1 and searches for a name of a design. Upon receiving the name of the design via the computer network 110, the management server 152 provides access to the specification file by providing data for display of the data sheet 1602 having the specification via the computer network 110 to the user computing device 1. The specification file includes a reference to the schematic drawing file. As such, in addition to access to the data for the display of the data sheet 1602 having the specification, the management server 152 provides access to the schematic drawing file by providing data for display of the testbench schematic drawing 1806 via the computer network 110 to the user computing device 1. Moreover, upon providing access to the data sheet 1602, the management server 152 generates an accept option, such as an accept button, and sends the accept option via the computer network 110 and the user account 1 to display with the data sheet 1602 that is accessed by the user account 1.

In an operation 8 of the design engineering method 1800, the user 1 uses the input device of the user computing device 1 to select the accept option to indicate an acceptance of the design challenge. The selection of the accept option is received by the data sheet builder tool 318 via the user account 1 and the computer network 110 from the user computing device 1. For example, the data sheet builder tool 318 applies the communication protocol to depacketize packets having the selection of the accept option and having an identification, such as alphanumeric characters, of the user account 1 to determine that the user account 1 has selected the accept option. Upon receiving the selection of the accept option via the user account 1 and the computer network 110, the data sheet builder tool 318, in an operation 9 of the design engineering method 1800, copies to the user account 1 the schematic drawing file in which the testbench schematic drawing 1806 is stored and copies to the user account 1 the specification file in which the data sheet 1602 is stored. To illustrate, when the schematic drawing file and the specification file are copied to the user account 1, the schematic drawing file and the specification file are copied to memory addresses, within the searchable storage 162, that are designated by the management server 152 to have information associated with, such as related to or accessible via, the user account 1. At a time the user account 1 is accessed, the schematic drawing file and the specification file are available for access by the user computing device 1 via the computer network 110 from the searchable storage 162. The user 1 uses the user computing device 1 to log into the user account 1 via the website. Upon accessing the user account 1, the user 1 has access to the data sheet 1602 via the specification file stored within the user account 1 and to the schematic drawing 1806 via the schematic drawing file stored within the user account 1. The testbench schematic drawing 1806 and the data sheet 1602 are displayed within a designer workspace, which is a user interface that is generated on the display device of the user computing device 1 by execution of the workspace application 180.

In one embodiment, instead of or in addition to the resistor and the capacitor, one or more inductors are used to form the load. For example, the inductor is coupled in series to the resistor or the capacitor or in parallel to the capacitor or the resistor to form the load. In an embodiment, instead of one resistor having the resistance R, the testbench schematic drawing 1806 has multiple resistors that are coupled to each other in series or in parallel to form the load. Moreover, instead of one capacitor having the capacitance C, the testbench schematic drawing 1806 has multiple capacitors that are coupled to each other in series or in parallel to form the load. In one embodiment, the testbench schematic drawing 1806 is generated upon execution of the local test bench tool 165, described above.

In an embodiment, instead of the testbench schematic drawing 1806, a netlist is generated and stored in a netlist file. The netlist is a list of components and a description of connectivity of the components to generate the testbench schematic drawing 1806. The netlist is stored in the specification database 104 as a netlist file, and the netlist file is referred to in the specification file in which the data sheet 1602 is stored. For example, the specification file in which the data sheet 1602 is stored includes an identifier, such as a pointer, to a memory address, within the searchable storage 162, at which the netlist file including the netlist is stored. As another example, the data sheet builder tool 318 stores the netlist within the netlist file and stores the netlist file in the searchable storage 162.

Figures 1, 18A:
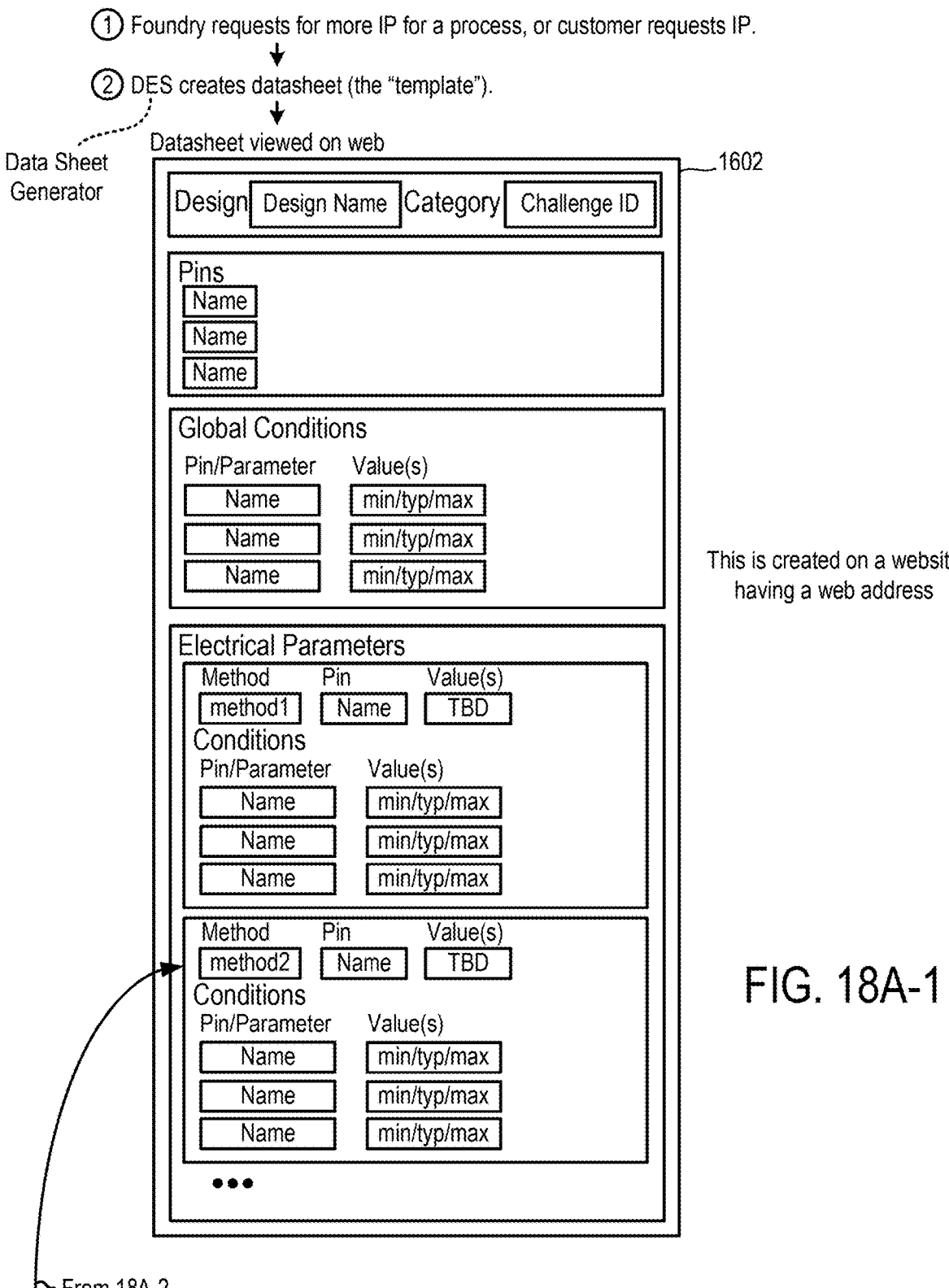
Figures 1, 18A:
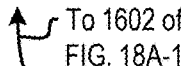
Figures 2, 18A:
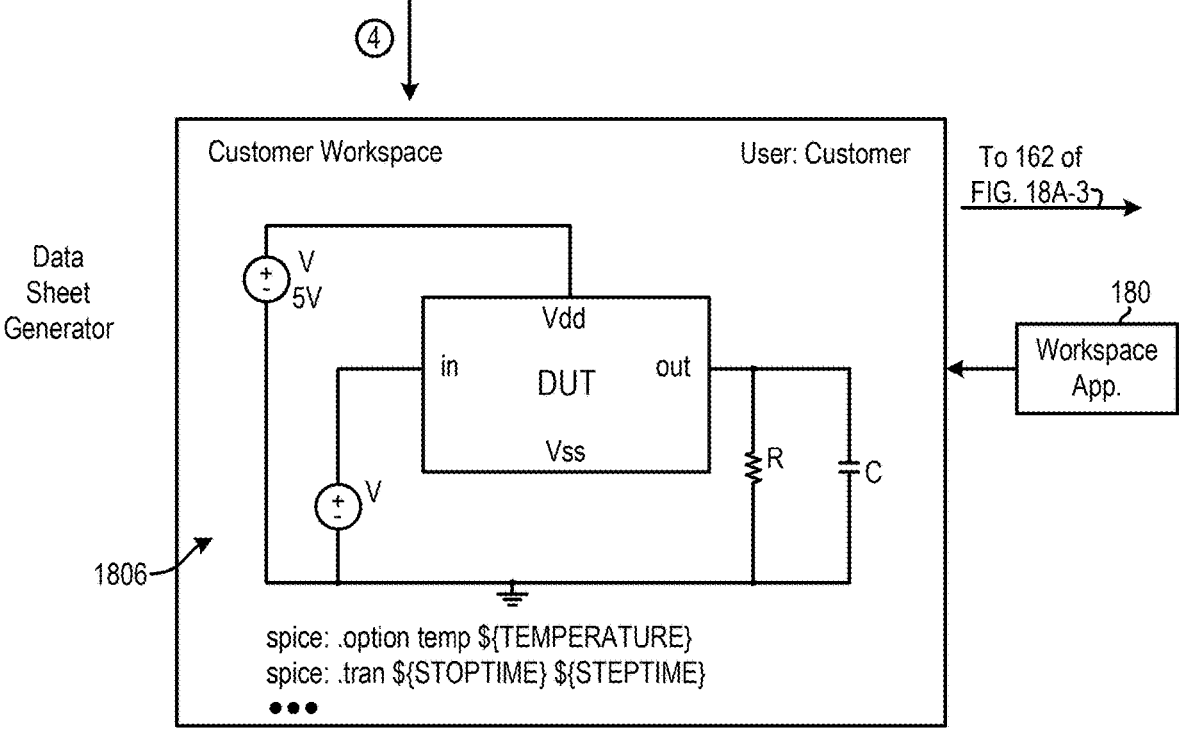
Figures 3, 18A:
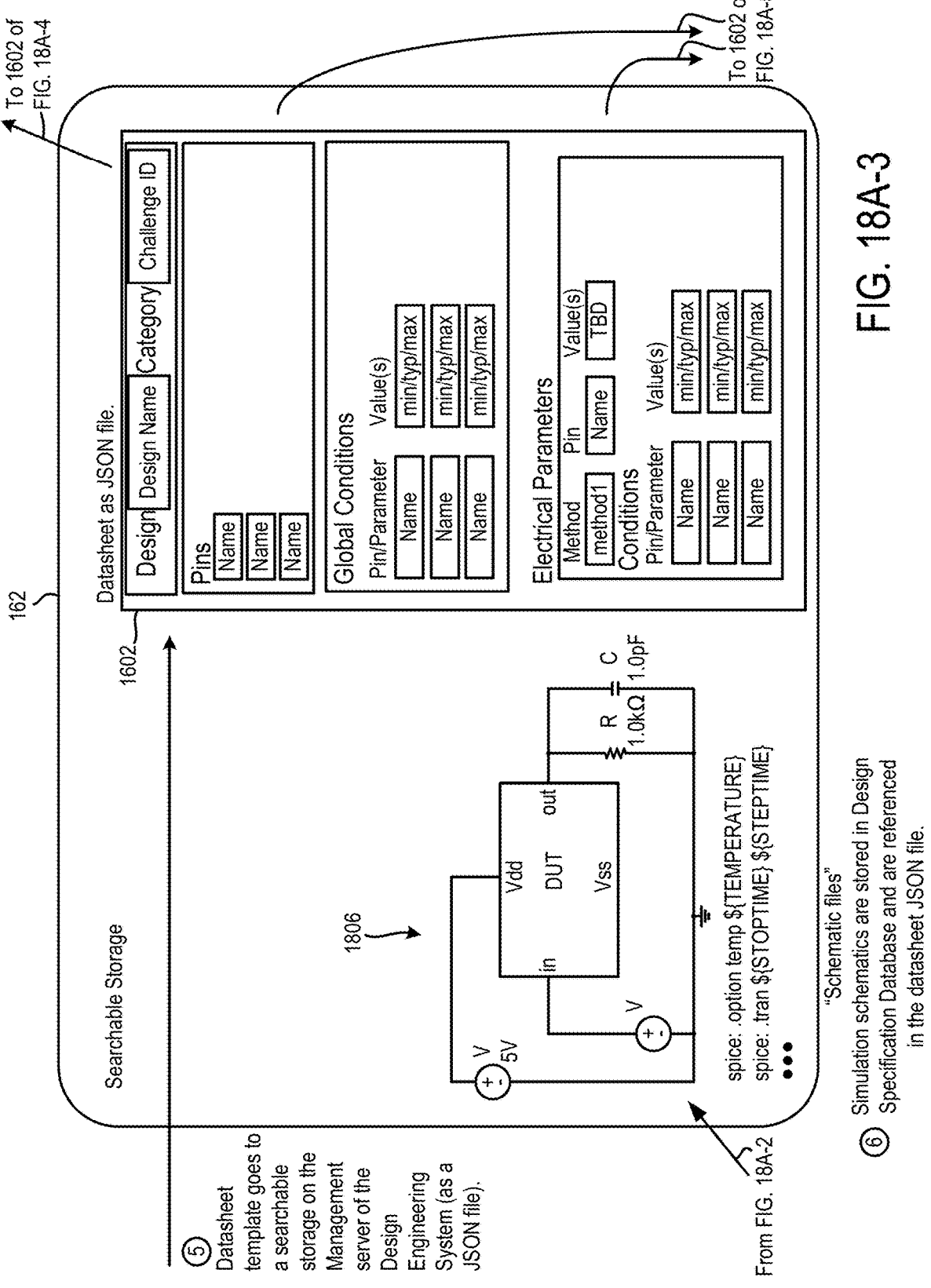
Figures 5, 18A:
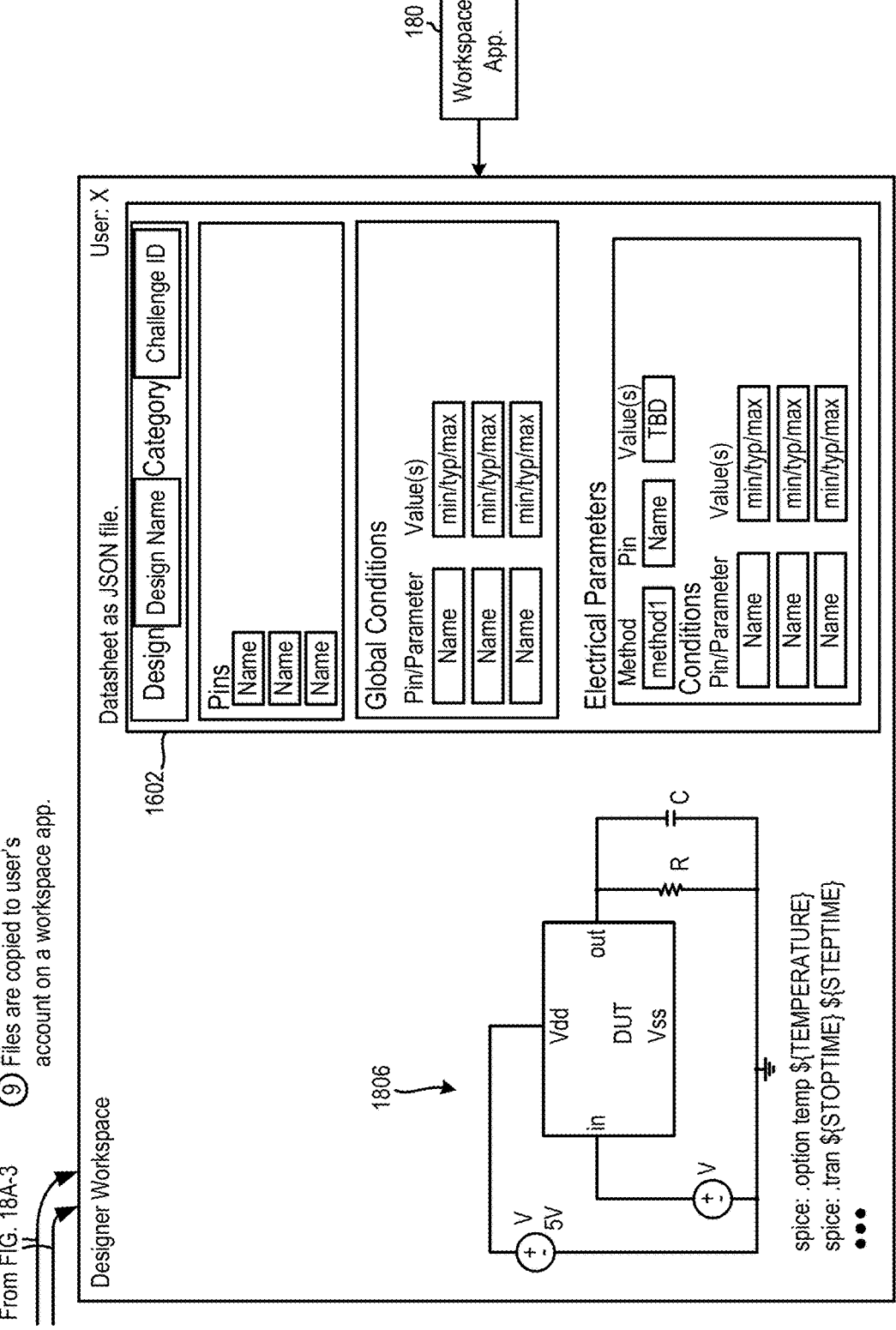
Figures 2, 18B:
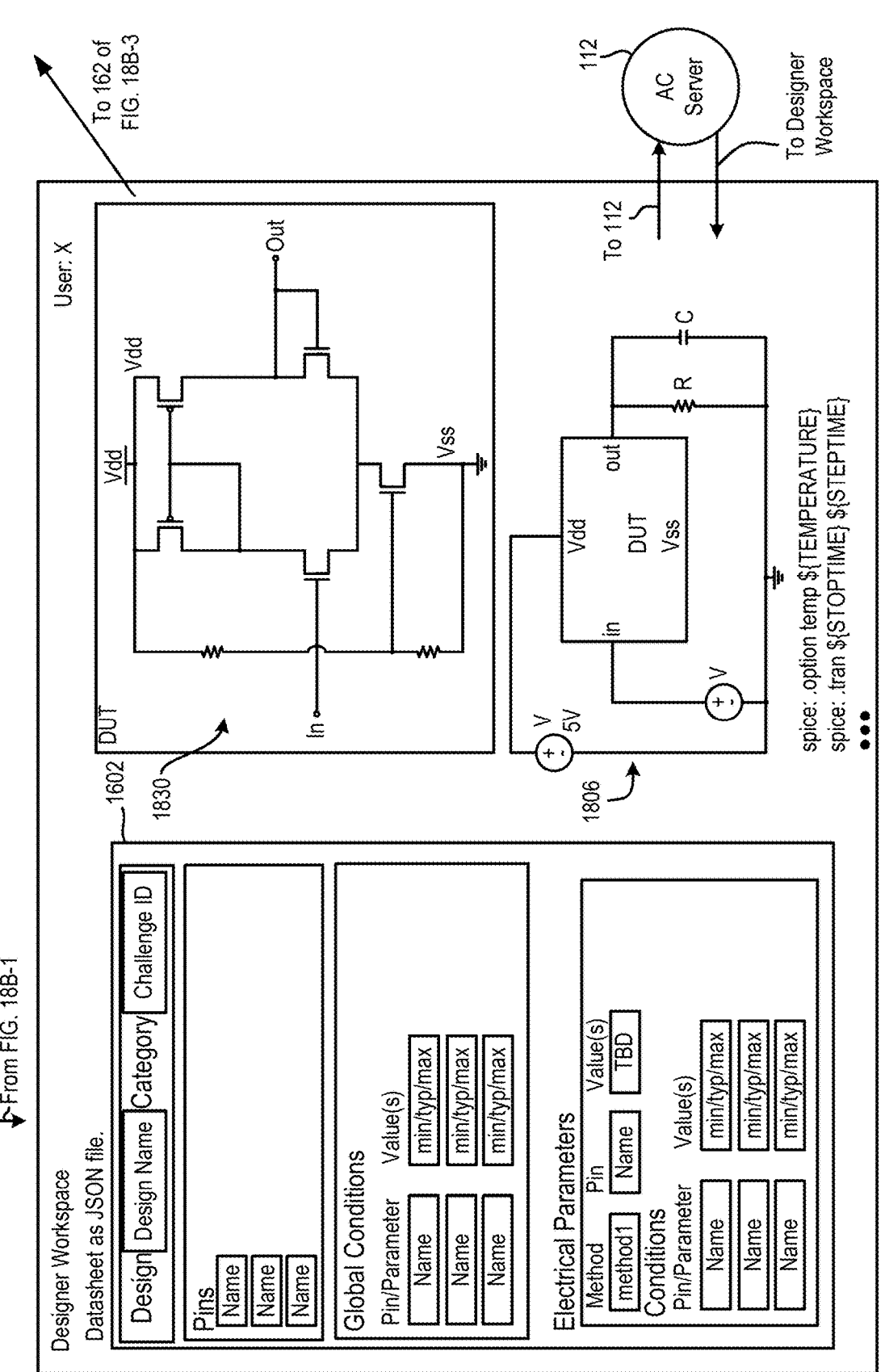
Figures 4, 18B:
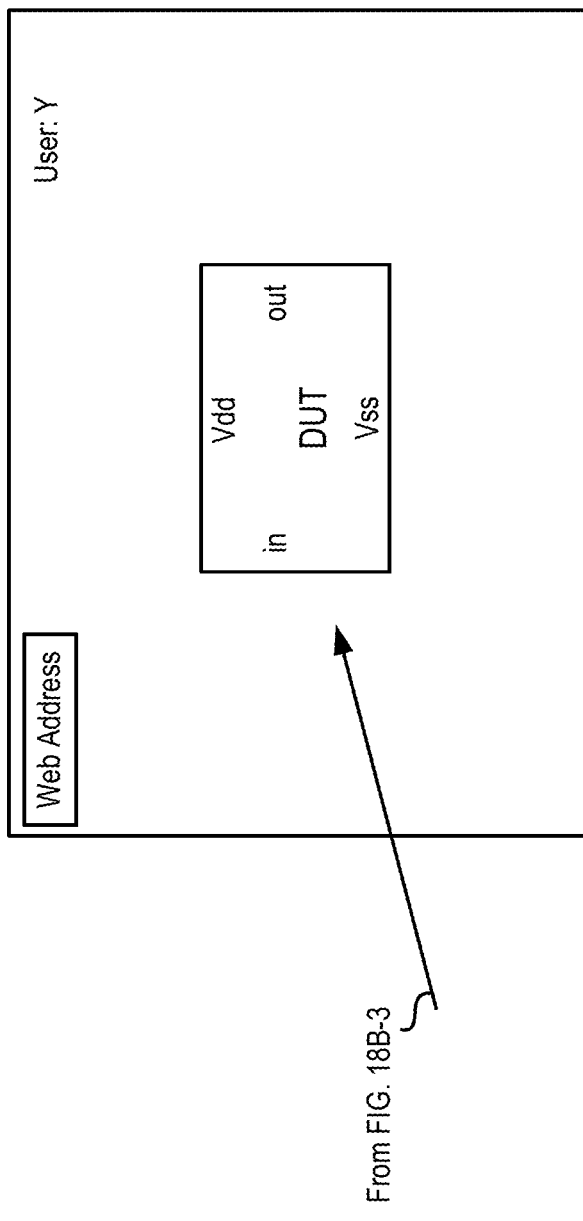

FIG. 18B-1 is a diagram to illustrate an embodiment of a continuation of the design engineering method 1800 of FIG. 18A-5. Moreover, FIG. 18B-2 is a diagram to illustrate an embodiment of a portion of the design engineering method 1800 of FIG. 18B-1. FIG. 18B-3 is a diagram to illustrate an embodiment of another portion of the design engineering method 1800 of FIG. 18B-1. Moreover, FIG. 18B-4 is a diagram to illustrate an embodiment of yet another portion of the design engineering method 1800 of FIG. 18B-1.

In an operation 10 of the design engineering method 1800, the user 1 uses the user computing device 1 to log into the user account 1 to access the circuit design tool 164 (FIG. 1F) from the circuit design tool database 206 of FIG. 2 to further generate a schematic 1830 of the design based on the data sheet 1602. For example, the user 1 uses the input device of the user computing device 1 to create the schematic 1830 by accessing the circuit design tool 164, such as gate designs, or resistor designs, or transistor designs, or inductor designs, or capacitor designs. The schematic 1830 is displayed within the designer workspace. In addition, the testbench schematic drawing 1806 and the data sheet 1602 are displayed within the designer workspace by the workspace application 180.

In an operation 11 of the design engineering method 1800, the user 1 operates the user computing device 1 to access the local test bench tool 165 of FIG. 1F from the automatic certification server 112 to test, such as simulate and characterize, the schematic 1830. For example, the user 1 selects a test schematic button on the display device of the user computing device 1. Upon receiving the selection of the test schematic button via the user account 1 and the computer network 110, the automatic certification server 112 executes the local test bench tool 165 to test the schematic 1830 to generate results of the test. The results of the test are not stored by the automatic certification server 112 into the searchable storage 162.

In an operation 12 of the design engineering method 1800, the user 1 uses the user computing device 1 to upload the schematic 1830 via the user account 1 and the computer network 110 to the searchable storage 162. For example, the user 1 uses the user computing device 1 to select an upload button displayed on the display device of the user computing device 1 to save the schematic 1830 via the user account 1 to the searchable storage 162. The results of the test that is executed using the local test bench tool 165 are not sent from the user computing device 1 via the computer network 110 to the searchable storage 162. Moreover, the management server 152, such as the circuit design tool 164, upon receiving the selection of the upload button, creates a design file, such as a JSON file, within the searchable storage 162, stores the schematic 1830 within the design file, and stores the design file within the design database 160 of the searchable storage 162. As an example, the design file includes the user login information of the user account 1 accessed to create the schematic 1830. In one embodiment, the management server 152 generates a reference from the user login information of the user account 1 accessed to create the schematic 1830 to the design file that includes the schematic 1830. For example, a pointer from a memory address of the searchable storage 162 that includes the user login information of the user account 1 to a memory address at which the design file including the schematic 1830 is stored in the searchable storage 162 is generated by the management server 152.

The public-private indicator tool 329 generates a public option and a private option, both of which are displayed within the designer workspace along with the schematic 1830. When the user 1 uses the input device of the user computing device 1 to select the public option and submits the schematic 1830 via the user account 1 and the computer network 110 to the management server 152, the public-private indicator tool 329 receives the selection of the public option via the computer network 110. The public-private indicator tool 329 provides the selection of the public option to the obfuscator tool 182. Upon receiving the selection of the public option from the public-private indicator tool 329, the schematic 1830 is not obfuscated by the obfuscator tool 182 before being displayed via the user accounts 2 through N and the computer network 110 on the display devices of the user computer devices 2 through N. On the other hand, when the user 1 uses the input device of the user computing device 1 to select the private option and submits the schematic 1830 via the user account 1 and the computer network 110 to the management server 152, the public-private indicator tool 329 receives the selection of the private option via the computer network 110. The public-private indicator tool 329 provides the selection of the private option to the obfuscator tool 182. Upon receiving the selection of the private option from the public-private indicator tool 329, the schematic 1830 is obfuscated by the obfuscator tool 182 before being displayed via the user accounts 2 through N and the computer network 110 on the display devices of the user computer devices 2 through N.

In one embodiment, the public-private indicator tool 329 provides an account identifier option to the user computing device 1 via the computer network 110 and the user account 1. The account identifier option enables the user 1 to select, via the user computing device 1 and the user account 1, an account, such as a requester account or a fabrication entity account or another user account, for which the public option or the private option is applied. Upon receiving a selection of the account identifier option identifying the account and the selection of the private option or the public option from the user computing device 1 via the user account 1 and the computer network 110, the public-private indicator tool 329 stores within the public-private indicator database 220, a mapping between the account and the selection of the public option or the private option.

In an operation 13 of the design engineering method 1800, when the user 2 or the requester 2 or the fabrication entity 1 requests access to the schematic 1830, the obfuscator tool 182 accesses the public-private indicator database 220 to determine whether the user account 2 assigned to the user 2 or the requester account 2 assigned to the requester 2 or the fabrication entity account 1 assigned to the fabrication entity 1 is mapped to the selection of the public option or the private option. Upon identifying that the user account 2 assigned to the user 2 or the requester account 2 assigned to the requester 2 or the fabrication entity account 1 assigned to the fabrication entity 1 is mapped to the selection of the public option, the obfuscator tool 182 does not obfuscate one or more portions of the schematic 1830 before providing access to the schematic 1830 via the user account 2 and the computer network 110 to the user computing device 2 or via the requester account 2 and the computer network 110 to the requester computing device 2 or via the fabrication entity account 1 and the computer network 110 to the fabrication computing device 1. On the other hand, upon identifying that the user account 2 or the requester account 2 or the fabrication entity account 1 is mapped to the selection of the private option, the obfuscator tool 182 obfuscates one or more portions of the schematic 1830 to generate an obfuscated schematic design and provides access to the obfuscated schematic design via the user account 2 and the computer network 110 to the user computing device 2 or via the requester account 2 and the computer network 110 to the requester computing device 2 or via the fabrication entity account 1 and the computer network 110 to the fabrication computing device 1.

Figures 1, 18C:
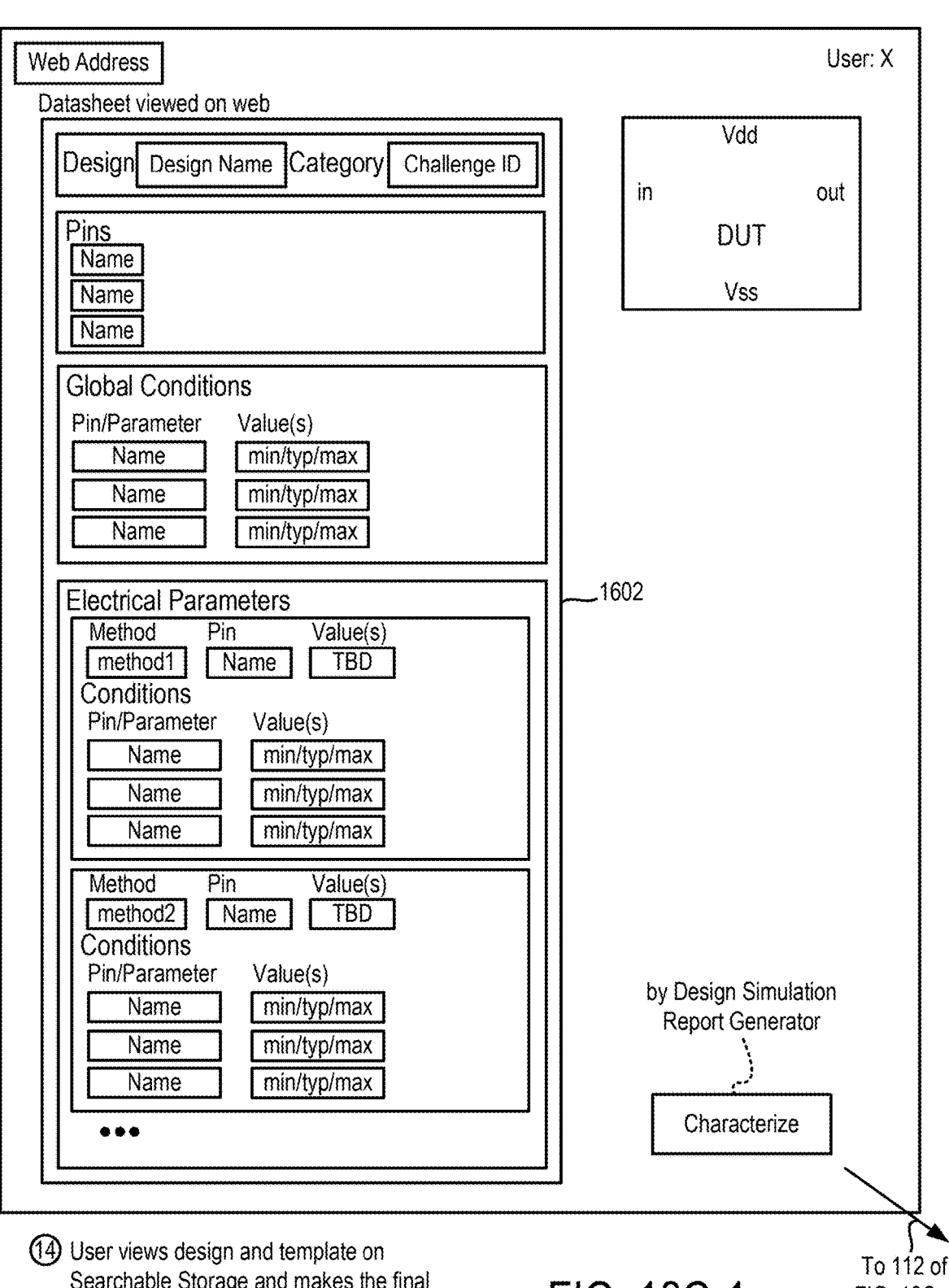
Figures 2, 18C:
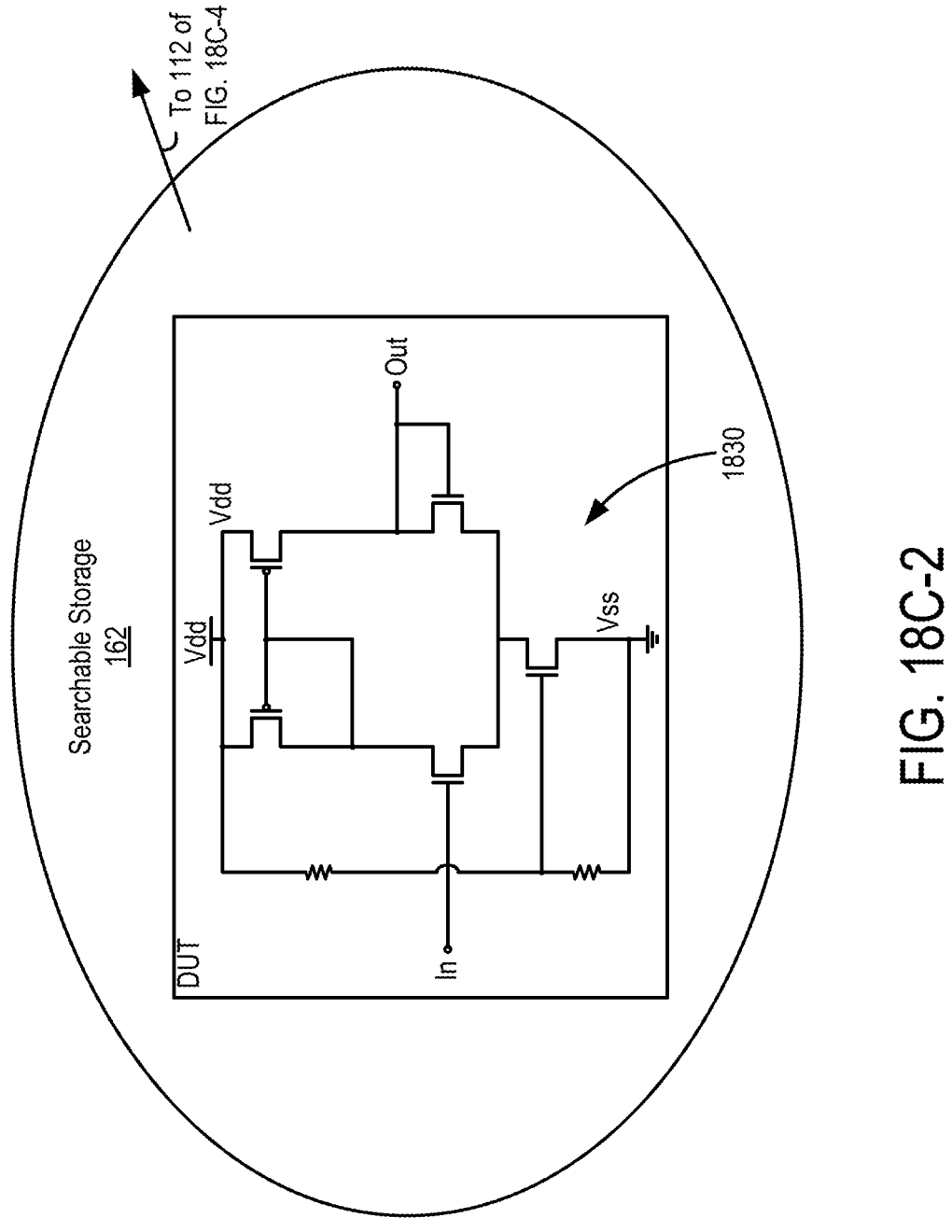
Figures 3, 18C:
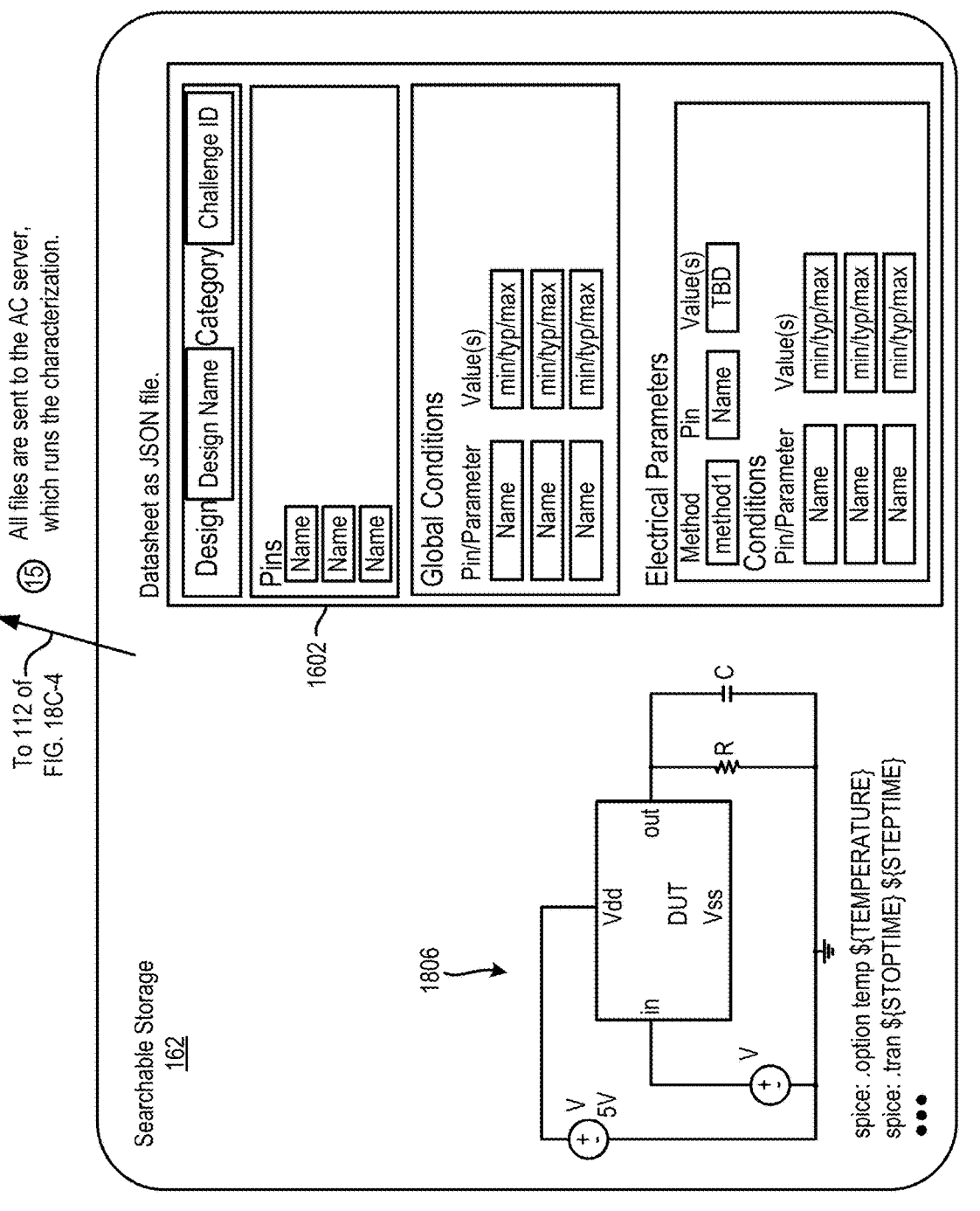
Figures 6, 18C:
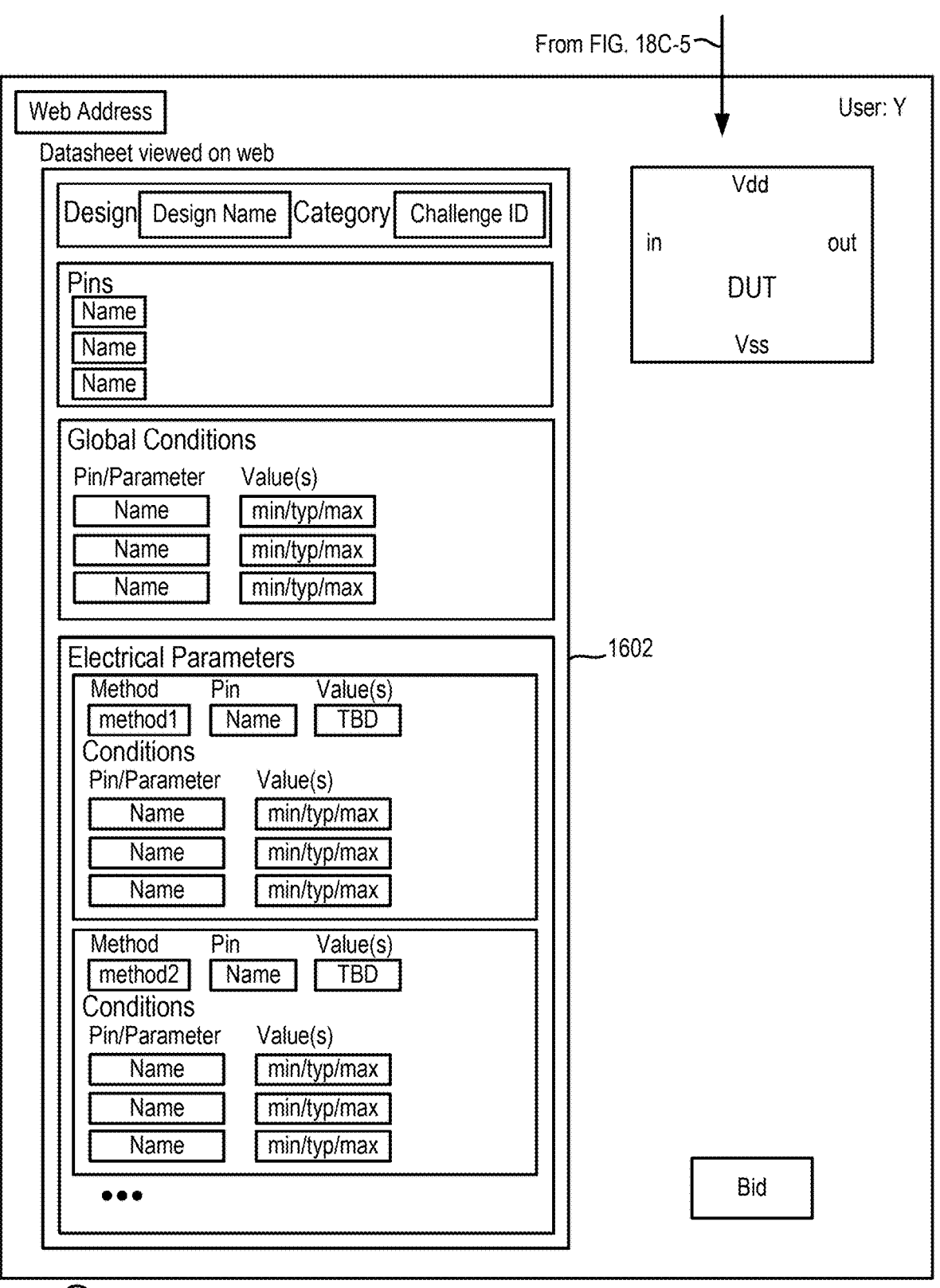

FIG. 18C-1 is a diagram to illustrate an embodiment of a continuation of the design engineering method 1800 of FIG. 18B-4. Moreover, FIG. 18C-2 is a diagram to illustrate an embodiment of a portion of the design engineering method 1800 of FIG. 18C-1. FIG. 18C-3 is a diagram to illustrate an embodiment of another portion of the design engineering method 1800 of FIG. 18C-1. Moreover, FIG. 18C-4 is a diagram to illustrate an embodiment of yet another portion of the design engineering method 1800 of FIG. 18C-1. FIG. 18C-5 is a diagram to illustrate an embodiment of another portion of the design engineering method 1800 of FIG. 18C-1. Moreover, FIG. 18C-6 is a diagram to illustrate an embodiment of yet another portion of the design engineering method 1800 of FIG. 18C-1.

In an operation 14 of the design engineering method 1800, the user 1 operates the user computing device 1 to access, via the website and the user account 1, the data sheet 1602 and the block of the testbench schematic drawing 1806. In one embodiment, in addition to the data sheet 1602 and the block, the schematic 1830 is also displayed on the website. When the block and the data sheet 1602 are accessed, the management server 152 sends via the computer network 110 a characterize option such as a characterize button, for display on the display device of the user computing device 1.

The user 1 operates the input device of the user computing device 1 to select the characterize option. Upon receiving the selection of the characterize option via the computer network 110 and the user account 1, in an operation 15 of the design engineering method 1800, the automatic certification server 112 accesses the design file in which the schematic 1830 is stored and the specification file in which the data sheet 1602 is stored from the searchable storage. The automatic certification server 112 parses the design file to access the schematic 1830 and performs an official characterization, which is a characterization by the design engineering entity, of the schematic 1830. For example, the automatic certification server 112 executes the circuit design verification tool 188 of FIG. 1F on the schematic 1830 to determine whether the schematic 1830 passes or fails a simulation test. To illustrate, the automatic certification server 112 provides an input, such as an instantiation value, to the schematic 1830 to generate an expected output and compares the expected output with a desired output, which is pre-stored in the searchable storage 162. Upon determining that the expected output matches the desired output, the automatic certification server 112 determines that the schematic 1830 passes the simulation test. On the other hand upon determining that the expected output does not match the desired output, the automatic certification server 112 determines that the schematic 1830 fails the simulation test. As another illustration, the automatic certification server 112 couples an input pin, designated an "In" of the schematic 1830 with the power supply of the testbench schematic drawing 1806 and couples the load to an output pin, labeled as "Out" of the schematic 1830. The automatic certification server 112 provides the instantiation value at the input pin to generate the expected output and compares the expected output with the desired output to determine whether the testbench schematic drawing 1806 passes the simulation test.

Upon execution of the simulation test, in an operation 16 of the design engineering method 1800, the data sheet 1602 is accessed from the searchable storage 162 and is updated by the management server 152 with results, such as pass or fail, of the simulation test. Other examples of the results of the simulation test include a value of the expected output, a value of the input, and a value of the desired output. Moreover, the data sheet 1602, after being updated with the results of the simulation test, is stored by the management server as a file, such as a JSON file, in the searchable storage 162.

In an operation 17 of the design engineering method 1800, based on the results of the simulation test, the management server 152 determines that the schematic 1830 wins the design challenge that is proposed in the operation 7 of the design engineering method 1800. For example, upon determining that the schematic 1830 passes the simulation test, the management server 152 further determines that the schematic 1830 wins the design challenge and further allows bidding to occur on the schematic 1830.

In an operation 18 of the design engineering method 1800, other users 2 through N, the requester 1, the requester 2, the fabrication entity 1, and/or a fabrication entity 2 access the block representing the schematic 1830 in an obfuscated manner via their respective accounts, such as the user accounts 2 through N, the requester account 1, the requester account 2, the fabrication entity account 1, and the fabrication entity account 2. For example, the user 2 uses the user computing device 2 to access the website and the user account 2 to further search for a design of an integrated circuit. To illustrate, the user 2 provides a name of an integrated circuit, such as an analog-to-digital converter or an oscillator or a phase-locked loop, to search for a design of the integrated circuit. The name is sent from the user computing device 2 via the computer network 110 to the management server 152. The design searcher tool 322 determines that the design name within the data sheet 1602 matches the name received from the user computing device 2.

Upon determining that the design name within the data sheet 1602 matches the name received from the user computing device 2, the design searcher tool 322 sends a request to the obfuscator tool 182 to access the schematic 1830. The obfuscator tool 182 determines whether the schematic 1830 is indicated as private or public in the public-private indicator database 220. Upon determining that the schematic is indicated as public, the obfuscator tool 182 does not obfuscate one or more portions of the schematic 1830 and sends the schematic 1830 via the computer network 110 to the user computing device 2 for display within the user account 2. On the other hand, upon determining that the schematic is indicated as private, the obfuscator tool 182 obfuscates one or more portions of the schematic 1830 to generate the block, such as a block 1832, and sends the block via the computer network 110 to the user computing device 2 for display within the user account 2. In addition to sending the block or the schematic 1830, the management server 152 sends the data sheet 1602 via the computer network 110 to the user computing device 2 for display within the user account 2. Furthermore, in addition to sending the block or the schematic 1830 and the data sheet 1602, the management server 152 sends a bid option, such as a bid button, via the computer network 110 to the user computing device 2 for display within the user account 2. The user 2 reviews the block or the schematic 1830 and the data sheet 1602 on the display device of the user computing device 2, and decides whether to bid on a design represented by the block or the schematic 1830 and the specification within the data sheet 1602. Upon determining to bid on the design, the user 2 uses the input device of the user computing device 2 to select the bid option. Upon receiving the selection of the bid option via the computer network 110 and the user account 2, the royalty generator tool 304 of FIG. 3 sends via the computer network 110 to the user computing device 2 fields for entry of a dollar amount for the bid.

Similarly, other users 3-N, the requester 1, the requester 2, the fabrication entity 1, and the fabrication entity 2 provides bids for the design represented by the block or the schematic 1830. The royalty generator tool 304 receives the various bids and determines which of the bids as the highest. The royalty generator tool 304 sends an acceptance of the bid that is the highest via the computer network 110 to the user computing device 2 for display of the acceptance within the user account 2.

FIG. 19A is a diagram of a system 1900 to illustrate functionality of the workspace application 180 and storage of various files, such as a testbench netlist file 1902 and the specification file SF1 within the searchable storage 162. The system 1900 includes the workspace application 180, the searchable storage 162, and the automatic certification server 112. The requester 1 accesses the workspace application 180 that is executed by the management server 152. For example, the requester 1 accesses the website that is controlled by the design engineering entity to log into the requester account 1 to further gain access to the workspace application 180. When the testbench schematic drawing 1806 is generated, the management server 152 executes the workspace application 180 to capture various parts, such as the block, the one or more power sources coupled to one or more input pins of the block, and the load coupled to an output pin of the block, to generate a netlist. Moreover, the management server 152 executes the workspace application 180 to store the netlist within the testbench netlist file 1902 and to store the testbench netlist file 1902 within the searchable storage 162, such as a cloud storage. Moreover, the management server 152 generates the specification file SF1 that includes the data sheet 1602 and stores the specification file SF1 within the searchable storage 162.

FIG. 19B is a diagram of an embodiment of the system 1900 to illustrate a storage of a circuit netlist file 1920 associated with the schematic 1830 in the searchable storage 162. The management server 152 executes the workspace application 180 to capture the schematic 1830 to generate the circuit netlist file 1920. For example, a circuit netlist file stores identifies, such as names or model numbers, of components, such as resistors, capacitors, transistors, logic gates, of the schematic 1830 and stores connections between the components. The management server 152 stores the circuit netlist file 1920 as a design file within the design database 160, of FIG. 1B-2, within the searchable storage 162.

FIG. 19C is a diagram of an embodiment of the system 1900 to illustrate a simulation of a design of the schematic 1830. The automatic certification server 112 accesses the testbench netlist file 1902, the specification file SF1, and the circuit netlist file 1920 from the searchable storage 162 and executes an automatic certification generator-simulator (gensim) tool 1950 to generate one or more simulation netlists 1952 for performing one or more simulation tests on the schematic 1830. The one or more simulation netlists 1952 are stored in one or more simulation files. The automatic certification server 112 executes an automatic certification launch tool 1954. Upon execution of the automatic certification launch tool 1954, the automatic certification launch tool 1954 accesses the one or more simulation files to access the one or more simulation netlists 1952 from the automatic certification gensim tool 1950 to run simulation tests on the schematic 1830. When the simulation tests are run, results 1956 of the simulation tests are generated by the automatic certification launch tool 1954. The results 1956 are stored in the data sheet 1602 by the automatic certification server 112.

When a design is to be accessed by the requester computing devices 1 and 2 via corresponding requester accounts 1 and 2 based on a name of the design, such as a name of an integrated circuit having the design, the management server 152 identifies the data sheet 1602 having the results 1956 based on the name. The management server 152 sends the data sheet 1602 having the results 1956 via the computer network 110 and the requester accounts 1 and 2 to the requester computing devices 1 and 2 for display of the data sheet 1602 on the requester computing devices 1 and 2. The requesters 1 and 2 use the requester computing devices 1 and 2 to bid on the design based on the results 1956. For example, if the results 1956 indicate that the design passes the simulation tests, the requester 1 bids a higher amount within a bid amount field displayed on the requester computing device 1 than if the results 1956 indicate that the design fails the simulation tests. The management server 152 receives the bids from the requester computing devices 1 and 2 via corresponding requester accounts 1 and 2 and the computer network 110 and compares the bids to determine the highest bid. The management server 152 further sends the bids including the highest bid to the designer via an account, such as the user account 1. The designer uses a computing device, such as the user computing device 1, to select, via the user account 1, an option to indicate acceptance of one of the bids, such as the highest bid, to the management server 152. The management server 152 sends via the computer network 110 an indication of the acceptance of one of the bids by the designer to the requester 1 via the requester account 1.

In one embodiment, the automatic certification generator-simulator (gensim) tool 1950 is the same as the circuit design verification tool 188.

Figure 19D:
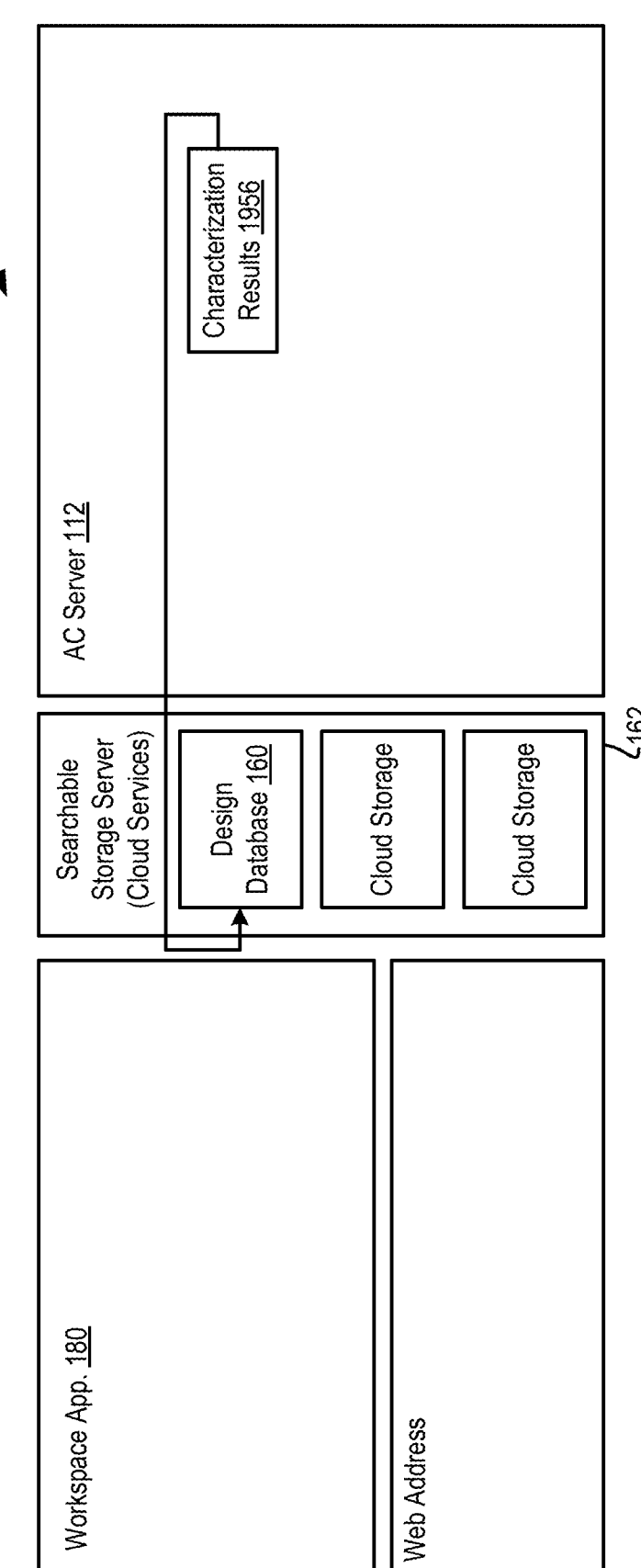
FIG. 19D is a diagram of an embodiment of the system of FIG. 19A to illustrate storage of a results of the simulation test in a design database.

FIG. 19D is a diagram of an embodiment of the system 1900 to illustrate storage of the results 1956 in the design database 160. The automatic certification server 112 stores the results 1956 within the design database 160.

It should be noted that in one embodiment, the automatic certification gensim tool 1950 and the automatic certification launch tool 1954 are parts of the design simulation report generator tool 184 of FIG. 3. Furthermore, it should be noted that in an embodiment, the automatic certification gensim tool 1950 and the automatic certification launch tool 1954 are parts of the circuit design verification tool 188 of FIG. 1F. Moreover, it should be noted that in an embodiment, the automatic certification gensim tool 1950 and the automatic certification launch tool 1954 are parts of the local test bench tool 165 of FIG. 1F.

Figure 20A:
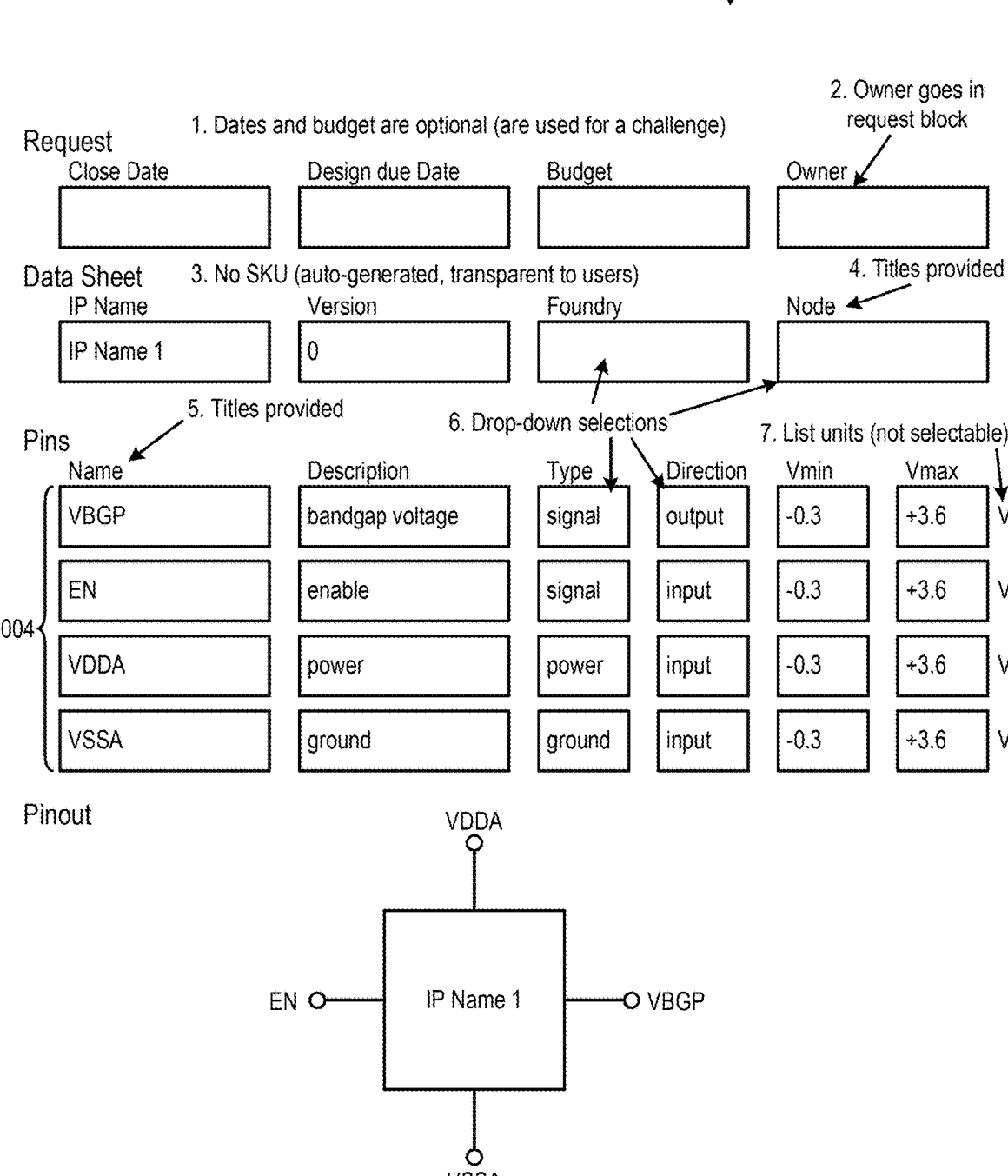
FIG. 20A is a diagram of an embodiment of a portion of a data sheet.

FIG. 20A is a diagram of a portion of a data sheet 2000. The data sheet 2000 is an example of the data sheet 1602 of FIG. 16. The data sheet 2000 includes a design due date for the users 1-N for submitting the design to the requester account 1 via respective user accounts 1-N. Moreover, the data sheet 2000 includes a budget for generating a design, testing the design, generating a prototype of the design, and/or testing the prototype of the design. In addition, the data sheet 2000 and identifies an owner, such as an intellectual property owner of the design. The intellectual property owner has rights, such as patent rights, to the design.

Moreover, the data sheet 2000 includes a name of the design and identifies a fabrication entity that will generate a prototype based on the design and/or integrated circuits based on the design. In one embodiment, a name of a design and a name of a design challenge are used herein interchangeably. The data sheet 2000 further includes parameters 2004, such as names of pins of the design, descriptions of the pins, types of signals carried by the pins, directions of the signals from a standpoint of the pins, minimum voltages at the pins, and maximum voltages at the pins. Examples of the names of the pins include Vdd, Vss, Vin, Vout, and GND for ground. Examples of the directions of the signals include input directions and output directions in which signals are carried by the pins. A signal is received by a pin when the signal is an input signal or is output from the pin when the signal is an output signal. Examples of the minimum voltages at a pin include a minimum limit, which is a minimum amount of voltage that is to be supplied to the pin or is to be output from the pin during a test of the design and/or a test of a prototype fabricated based on the design. Similarly, examples of the maximum voltages at a pin include a maximum limit, which is a maximum amount of voltage that is to be supplied to the pin or is to be output from the pin. The data sheet 2000 further includes the block having some of the pins as pin inputs for receiving a signal and some of the pins as pin outputs for generating a signal during a test of the design and/or a test of a prototype fabricated based on the design.

Figure 20B:
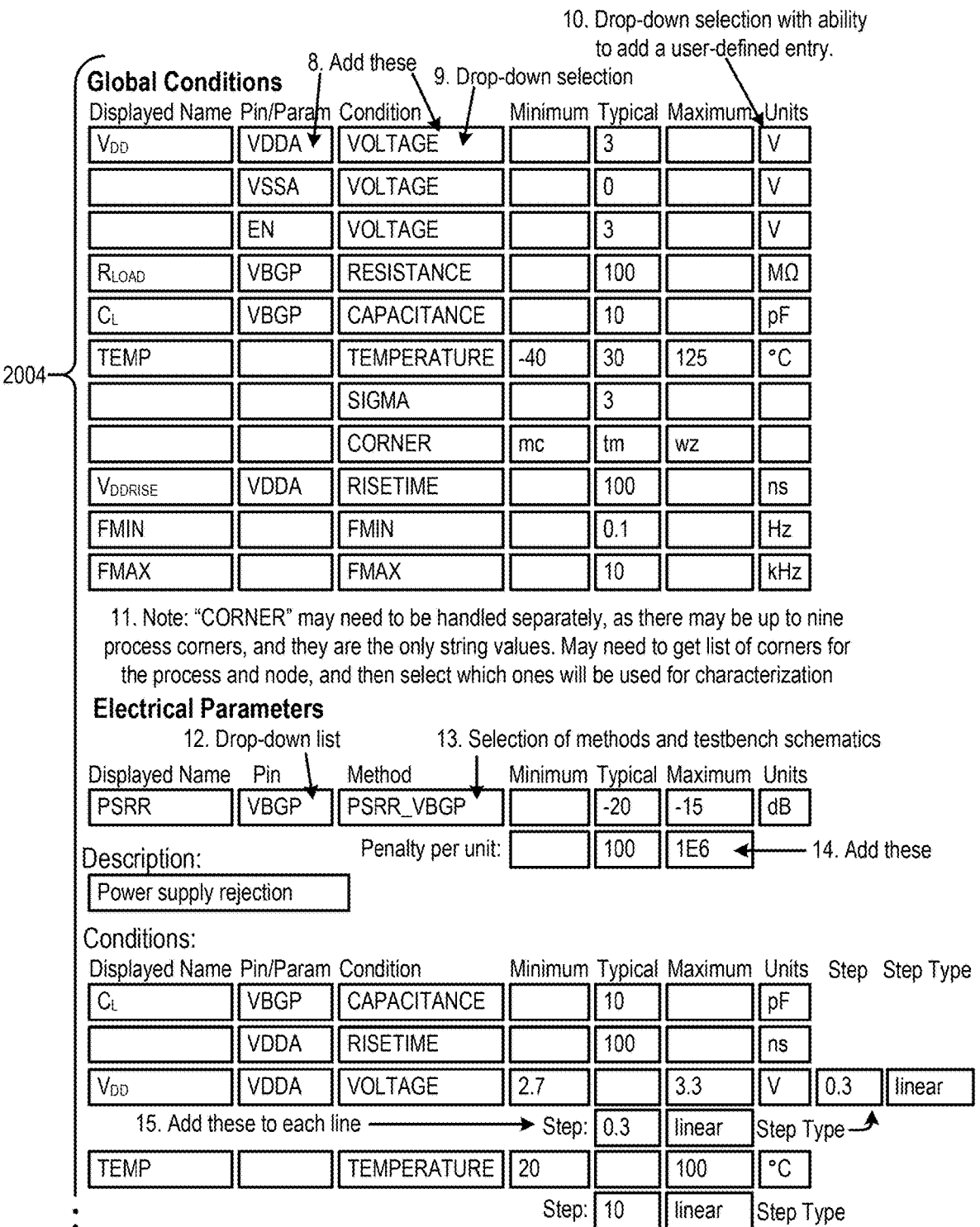
FIG. 20B is a continuation of the data sheet of FIG. 20A.

FIG. 20B is another portion of the data sheet 2000 and is a continuation of the data sheet 2000 of FIG. 20A. Another example of the parameter of the specification of the data sheet 200 further includes a typical value of a resistor, which is used as the load that is coupled to an output pin of the block to test the block. Yet another example of the parameter of the specification of the data sheet 200 further includes a typical value of a capacitor, which is used as the load that is coupled to an output pin of the block to test the block. Additional examples of the parameters of the specification of the data sheet 2000 include a temperature of operation of a prototype generated based on a design of the block, a rise time of a voltage at an input pin of the block, and a frequency of operation of the block.

The data sheet 2000 includes different values, such as minimum and maximum values, of the same parameter for performing different test methods, such as applying different conditions, on the block. For example, one of the test methods includes that a prototype generated based on the block represented in the data sheet 2000 operate within a temperature range, such as between a minimum temperature of −40 degrees centigrade (° C.) and a maximum temperature of 125° C. or between a minimum temperature of 20° C. and a maximum temperature of 100° C., without being damaged. As another example one of the test methods includes that an output pin of the block represented in the data sheet 2000 operate, such as be able to output a voltage, within a voltage range while satisfying that other parameters at other pins of the block remain within limits defined in a specification. An example of the voltage range includes a voltage between a minimum of 10 volts and a maximum of 50 volts.

As shown in the data sheet 2000, a minimum frequency of operation of the block or prototype, a maximum frequency of operation of the block or prototype, a rise time of the block or prototype, and a voltage that is supplied to the block or prototype are some examples of process technology variants. For example, when the prototype is to be used in to control an etch process in which a semiconductor wafer is being etched, a first frequency of operation and a first voltage of operation of the prototype is different. A voltage of operation of the prototype is controlled by the voltage that is supplied to the prototype. The first frequency of operation is different compared to a second frequency of operation and the first voltage of operation is different from a second voltage of operation of the prototype. The prototype has the second frequency of operation and the second voltage of operation when the prototype is used to control a deposition process in which materials are being deposited on a semiconductor wafer. The temperature range, the voltage range, and the process technology variants are examples of global testing parameters for operation of the prototype. Moreover, the temperature range, the voltage range, and the process technology variants are examples of electrical parameters of the data sheet 2000. Other examples of the electrical parameters include an amount of power to be input to or output from the prototype or block, values of components, such as transistors, resistors, inductors, and capacitors, used within the block or prototype, and a range of frequency of operation of the block or prototype, a rise time of the block or prototype.

In one embodiment, an electrical parameter of the block or prototype is a parameter that controls a function, such as an output power or a frequency of operation or an output voltage or an output current or a transfer function, of the block or prototype without affecting a size of the block or prototype. Moreover, a physical parameter of the block or prototype is a parameter that affects a size of the block or prototype and does or does not affect the function of the block or prototype.

FIG. 20C is yet another portion of the data sheet 2000 and is a continuation of the data sheet 2000 of FIG. 20B. FIG. 20C illustrates different values of the same parameters than those are illustrated in FIG. 20B. For example, FIG. 20C lists different conditions, such as different values of the parameters, to apply to the block, than those listed in FIG. 20B. To illustrate, the different conditions include a temperate range at which an integrated circuit, such as the prototype, having the parameters of the data sheet 2000 is to operate or to withstand and a voltage range which the integrated circuit is to receive. In one embodiment, a different test bench schematic is generated by the management server 152 for each of the conditions.

FIG. 20D is another portion of the data sheet 2000 and is a continuation of the data sheet 2000 of FIG. 20C. Physical parameters, such as an area, or a width, or a height, or a range between a minimum value of the area and a maximum value of the area, or a range between a minimum value of the height and a maximum value of the height, or a range between a minimum value of the width and a maximum value of the width, of the prototype of an integrated circuit chip that is generated based on the specification within the data sheet 2000 are provided in FIG. 20D. The area of the prototype, such as an integrated circuit chip, is a product of the width of the prototype and a length of the prototype. The width of the prototype is perpendicular to the length of the prototype and both the length and the width are perpendicular to the height of the prototype.

In one embodiment, the data sheet 2000 includes a pass indicator, such as "P" or "Pass", or a fail indicator, such as "F" or "Fail", for each electrical parameter on the data sheet 2000. The pass or fail indicator for the electrical parameters is generated by the circuit design verification tool 188 of FIG. 1F. For example, the circuit design verification tool 188 couples the power supply to the input pin of the schematic 1830 of FIG. 18C-4, couples a load to the output pin of the schematic 1830, and provides an instantiation value of an electrical parameter to the input pin of the schematic 1830 of FIG. 18C-4 to generate an output value of the electrical parameter at the output pin of the schematic 1830 to test the schematic 1830. When the output value is outside a range of values of the electrical parameter provided in the data sheet 2000, the circuit design verification tool 188 determines that the schematic 1830 fails a test, such as a simulation, for the electrical parameter. On the other hand, when the output value is within the range of values of the electrical parameter provided in the data sheet 2000, the circuit design verification tool 188 determines that the schematic 1830 passes the test for the electrical parameter. The circuit design verification tool 188 generates the pass indicator upon determining that the test is passed for the electrical parameter. On the other hand, the circuit design verification tool 188 generates the fail indicator upon determining that the test is failed for the electrical parameter. The circuit design verification tool 188 provides the pass and fail indicators to the data sheet builder tool 318.

The data sheet builder tool 318 updates the data sheet 2000 with the pass and fail indicators. For example, in a row of the data sheet 2000 that has a first electrical parameter, the data sheet builder tool 318 aligns the pass indicator or the fail indicator for the first electrical parameter in the row.

Moreover, in a row of the data sheet 2000 that has a second electrical parameter, the data sheet builder tool 318 aligns the pass indicator or the fail indicator for the second electrical parameter in the row. As another example, the data sheet builder tool 318 incorporates into the data sheet 2000, a correspondence between the electrical parameters and the pass and fail indicators for the electrical parameters as a separate table. To illustrate, the data sheet 2000 is updated by the data sheet builder tool 318 to include a table that has a first row that lists an output voltage as an electrical parameter and the pass or fail indicator. The data sheet 2000 is updated by the data sheet builder tool 318 to include in the table a second row that lists an output current as an electrical parameter and the pass or fail indicator.

In an embodiment, the data sheet 2000 includes a score for each electrical parameter on the data sheet 2000. The score for the electrical parameters is generated by the circuit design verification tool 188. For example, the circuit design verification tool 188 couples the power supply to the input pin of the schematic 1830 of FIG. 18C-4, couples a load to the output pin of the schematic 1830, and provides an instantiation value of an electrical parameter to the input pin of the schematic 1830 of FIG. 18C-4 to generate an output value of the electrical parameter at the output pin of the schematic 1830 to test the schematic 1830. When the output value is outside a range of values of the electrical parameter provided in the data sheet 2000 by a pre-determined limit, the circuit design verification tool 188 generates a first score indicating that the schematic 1830 fails a test for the electrical parameter. On the other hand, when the output value is within the range of values of the electrical parameter provided in the data sheet 2000, the circuit design verification tool 188 generates a second score indicating that the schematic 1830 passes the test for the electrical parameter. When the output value is outside the range of values of the electrical parameter provided in the data sheet 2000 but within the pre-determined limit, the circuit design verification tool 188 generates a third score indicating that the schematic 1830 has a higher quality than another schematic for which the first score is generated and indicating that the schematic 1830 has a lower quality than another schematic for which the second score is generated. The circuit design verification tool 188 provides the score, such as the first, second, or third score, to the data sheet builder tool 318.

The data sheet builder tool 318 updates the data sheet 2000 with the score. For example, in a row of the data sheet 2000 that has a first electrical parameter, the data sheet builder tool 318 aligns a score for the first electrical parameter in the row. Moreover, in a row of the data sheet 2000 that has a second electrical parameter, the data sheet builder tool 318 aligns a score for the second electrical parameter in the row. As another example, the data sheet builder tool 318 incorporates into the data sheet 2000, a correspondence between the electrical parameters and the scores for the electrical parameters as a separate table. To illustrate, the data sheet 2000 is updated by the data sheet builder tool 318 to include a table that has a first row that lists an output voltage as an electrical parameter and the score generated by testing the first electrical parameter. The data sheet 2000 is updated by the data sheet builder tool 318 to include in the table a second row that lists an output current as an electrical parameter and the score generated by testing the second electrical parameter.

In one embodiment, the data sheet 2000 includes a pass indicator, such as "P" or "Pass", or a fail indicator, such as "F" or "Fail", for each physical parameter on the data sheet 2000. The pass or fail indicator for the physical parameters is generated by the layout design verification tool 190 of FIG. 1F. For example, the layout design verification tool 190 determines whether a value of a physical parameter, of an integrated circuit, received from the user N via the user account N and the user computing device N via the computer network 110 is within a range of values of the physical parameter provided in the data sheet 2000. When the received value of the physical parameter is outside the range of values of the physical parameter provided in the data sheet 2000, the layout design verification tool 190 determines that a layout design generated based on the schematic 1830 fails a test for the physical parameter. On the other hand, when the received value of the physical parameter is within the range of values of the physical parameter provided in the data sheet 2000, the layout design verification tool 190 determines that the layout design passes the test for the physical parameter. The layout design verification tool 190 generates the pass indicator upon determining that the test is passed for the physical parameter. On the other hand, the layout design verification tool 190 generates the fail indicator upon determining that the test is failed for the physical parameter. The layout design verification tool 190 provides the pass and fail indicators to the data sheet builder tool 318.

The data sheet builder tool 318 updates the data sheet 2000 with the pass and fail indicators. For example, in a row of the data sheet 2000 that has a first physical parameter, the data sheet builder tool 318 aligns the pass indicator or the fail indicator for the first physical parameter in the row. Moreover, in a row of the data sheet 2000 that has a second physical parameter, the data sheet builder tool 318 aligns the pass indicator or the fail indicator for the second physical parameter in the row. As another example, the data sheet builder tool 318 incorporates into the data sheet 2000, a correspondence between the physical parameters and the pass and feel indicators for the physical parameters as a separate table. To illustrate, the data sheet 2000 is updated by the data sheet builder tool 318 to include a table that has a first row that lists a width of a transistor as a physical parameter and the pass or fail indicator. The data sheet 2000 is updated by the data sheet builder tool 318 to include in the table a second row that lists a length of the transistor as another physical parameter and the pass or fail indicator.

In an embodiment, the data sheet 2000 includes a score for each physical parameter on the data sheet 2000. The score for the physical parameters is generated by the layout design verification tool 190. For example, the layout design verification tool 190 determines whether a value of a physical parameter, of an integrated circuit, received from the user N via the user account N and the user computing device N via the computer network 110 is outside a range of values of the physical parameter provided in the data sheet 2000 by a pre-set limit. Upon determining that the received value of the physical parameter is outside the range of values of the physical parameter by the pre-set limit, the layout design verification tool 190 generates a first score indicating that a layout design generated based on the schematic 1830 fails a test for the physical parameter. On the other hand, when the received value of the physical parameter is within the range of values of the physical parameter provided in the data sheet 2000, the layout design verification tool 190 generates a second score indicating that the layout design passes the test for the electrical parameter. When the received value of the physical parameter is outside the range of values of the physical parameter provided in the data sheet 2000 but within the pre-set limit, the layout design verification tool 190 generates a third score indicating that the layout design has a higher quality than another layout design for which the first score is generated and has a lower quality than another layout design for which the second score is generated. The layout design verification tool 190 provides the score, such as the first, second, or third score, to the data sheet builder tool 318.

The data sheet builder tool 318 updates the data sheet 2000 with the score. For example, in a row of the data sheet 2000 that has a first physical parameter, the data sheet builder tool 318 aligns the score for the first physical parameter in the row. Moreover, in a row of the data sheet 2000 that has a second physical parameter, the data sheet builder tool 318 aligns the score for the second physical parameter in the row. As another example, the data sheet builder tool 318 incorporates into the data sheet 2000, a correspondence between the physical parameters and the scores for the physical parameters as a separate table. To illustrate, the data sheet 2000 is updated by the data sheet builder tool 318 to include a table that has a first row that lists a width of a transistor as a physical parameter and the score for the physical parameter. The data sheet 2000 is updated by the data sheet builder tool 318 to include in the table a second row that lists a length of the transistor as another physical parameter and the score for the other physical parameter.

In one embodiment, the layout design verification tool 190 generates a composite pass indicator, such as "P" or "Pass", or a composite fail indicator, such as "F" or "Fail", for all the parameters of the data sheet 2000 based on a pass indicator or a fail indicator for each of the parameters. For example, the layout design verification tool 190 determines that a majority of the parameters of the data sheet 2000 have a pass indicator to further determine that a design of an integrated circuit to be fabricated from the parameters of the data sheet 2000 has a composite pass indicator. On the other hand, the layout design verification tool 190 determines that a majority of the parameters of the data sheet 2000 have a fail indicator to further determine that a design of an integrated circuit to be fabricated from the parameters of the data sheet 2000 has a composite fail indicator. As another example, the layout design verification tool 190 determines from weights assigned to the parameters of the data sheet 2000 and pass or fail indicators of the parameters a composite pass or a composite fail indicator for the data sheet 2000. To illustrate, when two out of three parameters of the data sheet 2000 have fail indicators and the third parameter has a pass indicator, the layout design verification tool 190 determines that the third parameter has a higher weight than weights of the first and second parameters and assigns a composite pass indicator to the data sheet 2000. The layout design verification tool 190 sends the composite pass or the composite fail indicator to the data sheet builder tool 318. The data sheet builder tool 318 incorporates the composite pass indicator or the composite fail indicator into the data sheet 2000. For example, the data sheet builder tool 318 includes within the data sheet 2000 the composite pass indicator or the composite fail indicator on a webpage having the data sheet 2000.

In an embodiment, the layout design verification tool 190 generates a composite score for all the parameters of the data sheet 2000 based on individual scores of each of the parameters. The composite score is generated to determine whether a design of an integrated circuit to be fabricated from the parameters of the data sheet 2000 passes or fails a test. For example, the layout design verification tool 190 calculates a weighted average of the scores of the parameters of the data sheet to generate a composite score. To illustrate, the layout design verification tool 190 assigns a greater weight to a parameter of the data sheet 2000 than to another parameter of the data sheet 2000. A weight to be assigned to a parameter is stored in the searchable storage 162 by the management server 152. As another illustration, the layout design verification tool 190 assigns the same weight to all parameters of the data sheet 2000. Upon determining that the weighted average is outside a pre-determined range of averages, the layout design verification tool 190 determines that the design passes the test. On the other hand, upon determining that the weighted average is within the pre-determined range of averages, the layout design verification tool determines that the design fails the test. As another example, the layout design verification tool 190 calculates a weighted average of the scores of the parameters of the data sheet 2000. The weighted average is an example of a composite score. Upon determining that the composite score is greater than a predetermined average, the layout design verification tool 190 determines that the design passes the test. On the other hand, upon determining that the composite score is less than the pre-determined average, the layout design verification tool determines that the design fails the test. The layout design verification tool 190 sends the composite score to the data sheet builder tool 318. The data sheet builder tool 318 incorporates the composite score into the data sheet 2000. For example, the data sheet builder tool 318 includes within the data sheet 2000 the composite score on a webpage having the data sheet 2000.

In one embodiment, in addition to the composite score, the composite pass indicator of the composite fail indicator is included within the data sheet 2000 by the data sheet builder tool 318. In an embodiment, instead of the average values of scores of the parameters of the data sheet 2000, a median value of the scores is calculated by the layout design verification tool 190 to generate a composite score for the data sheet 2000.

In an embodiment, the design competition generator tool 310 of FIG. 3 compares the composite indicators, such as a composite pass indicator or a composite fail indicator, of two different data sheets to determine a winner of a competition for generating a design of an integrated circuit. For example, the design competition generator tool 310 compares a first composite indictor from a first data sheet, such as the data sheet 2000, and a second composite indictor from a second data sheet, and determines whether the first composite indictor is pass and the second composite indicator is fail. Upon determining that the first composite indictor is pass and the second composite indicator is fail, the design competition generator tool 310 determines that the user account 1 that is accessed to generate a first design of the integrated circuit is a winner of the competition and the user account 2 that is accessed to generate a second design of the integrated circuit is not the winner. On the other hand, upon determining that the second composite indictor is pass and the first composite indicator is fail, the design competition generator tool 310 determines that the user account 2 that is accessed to generate the second design of the integrated circuit is a winner of the competition and the user account 1 that is accessed to generate the first design of the integrated circuit is not the winner. The first design is assigned the first composite indicator and the second design is assigned the second composite indicator by the layout design verification tool 190, and both the first composite indicator and the second composite indicator are obtained by the design competition generator tool 310 from the searchable storage 162 or from the layout design verification tool 190. Both the first and second data sheets have the same minimum and maximum limits of the electrical parameters and the same minimum and maximum limits of the physical parameters. For example, both the first and second data sheets have minimum and maximum values of parameters based on which the designs for the integrated circuit are generated by the users 1 and 2 via the corresponding user accounts 1 and 2. The user 1 accesses the first data sheet having the first composite indicator via the user account 1 and the computer network 110 from the data sheet builder tool 318. Moreover, the user 2 accesses the second data sheet having the second composite indicator via the user account 2 and the computer network 110 from the data sheet builder tool 318.

In an embodiment, the design competition generator tool 310 of FIG. 3 compares the composite scores of two different data sheets to determine a winner of a competition for generating a design of an integrated circuit. For example, the design competition generator tool 310 compares a first composite score from a first data sheet, such as the data sheet 2000, and a second composite score from a second data sheet, and determines whether the first composite score is greater than the second composite score. Upon determining that the first composite scores greater than the second composite score, the design competition generator tool 310 determines that the user account 1 that is accessed to generate a first design of the integrated circuit is a winner of the competition and the user account 2 that is accessed to generate a second design of the integrated circuit is not the winner. The first design is assigned the first composite score and the second design is assigned the second composite score by the layout design verification tool 190. As explained above, both the first and second data sheets have the same minimum and maximum limits of the electrical parameters and the same minimum and maximum limits of the physical parameters.

Figure 20E:
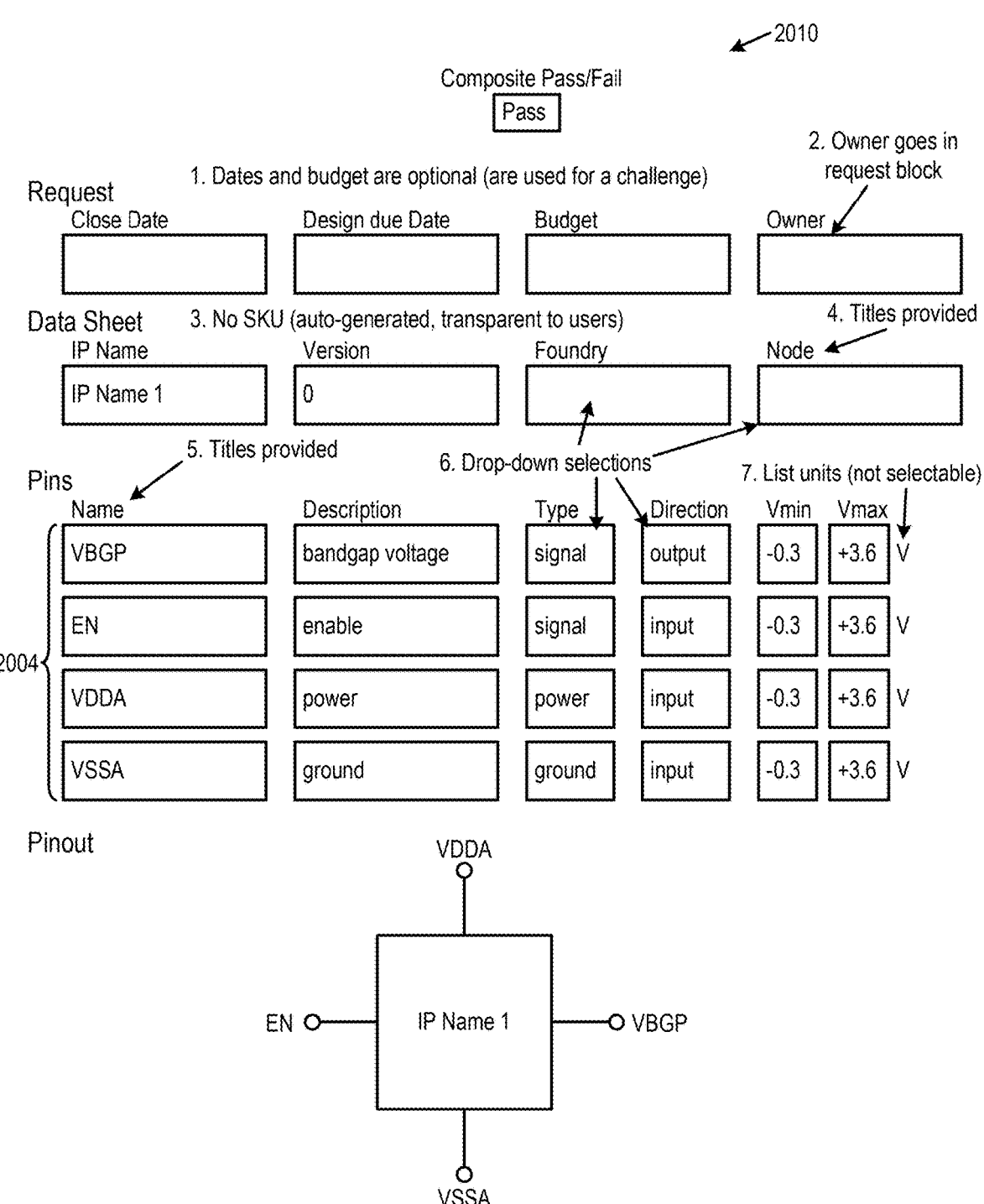
FIG. 20E is a diagram of an embodiment of a portion of a data sheet.
Figure 201:
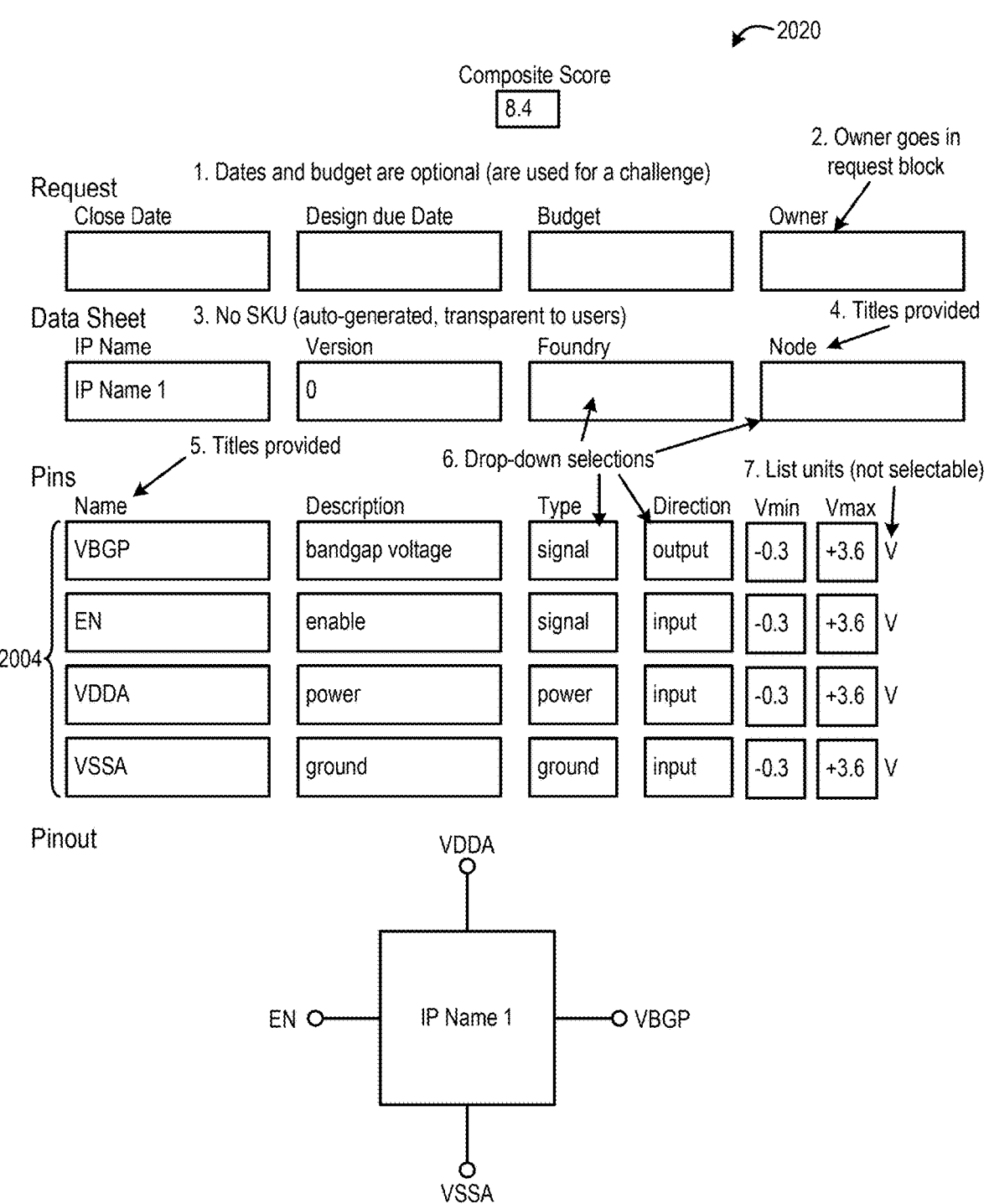

FIG. 20E is a diagram of an embodiment of a data sheet 2010 to illustrate pass (P) or fail (F) evaluations for each parameter of the data sheet 2010 and a composite pass/fail evaluation for all the parameters of the data sheet 2010. FIG. 20F is a continuation of the data sheet 2010 of FIG. 20E. FIG. 20G is a continuation of the data sheet 2010 of FIG. 20F. FIG. 20H is a continuation of the data sheet 2010 of FIG. 20G.

FIG. 20I is a diagram of an embodiment of a data sheet 2020 to illustrate scores assigned to each parameter of the data sheet 2020 and a composite score for all the parameters of the data sheet 2020. FIG. 20J is a continuation of the data sheet 2020 of FIG. 20I. FIG. 20K is a continuation of the data sheet 2020 of FIG. 20J. FIG. 20L is a continuation of the data sheet 2020 of FIG. 20K.

Figure 21:
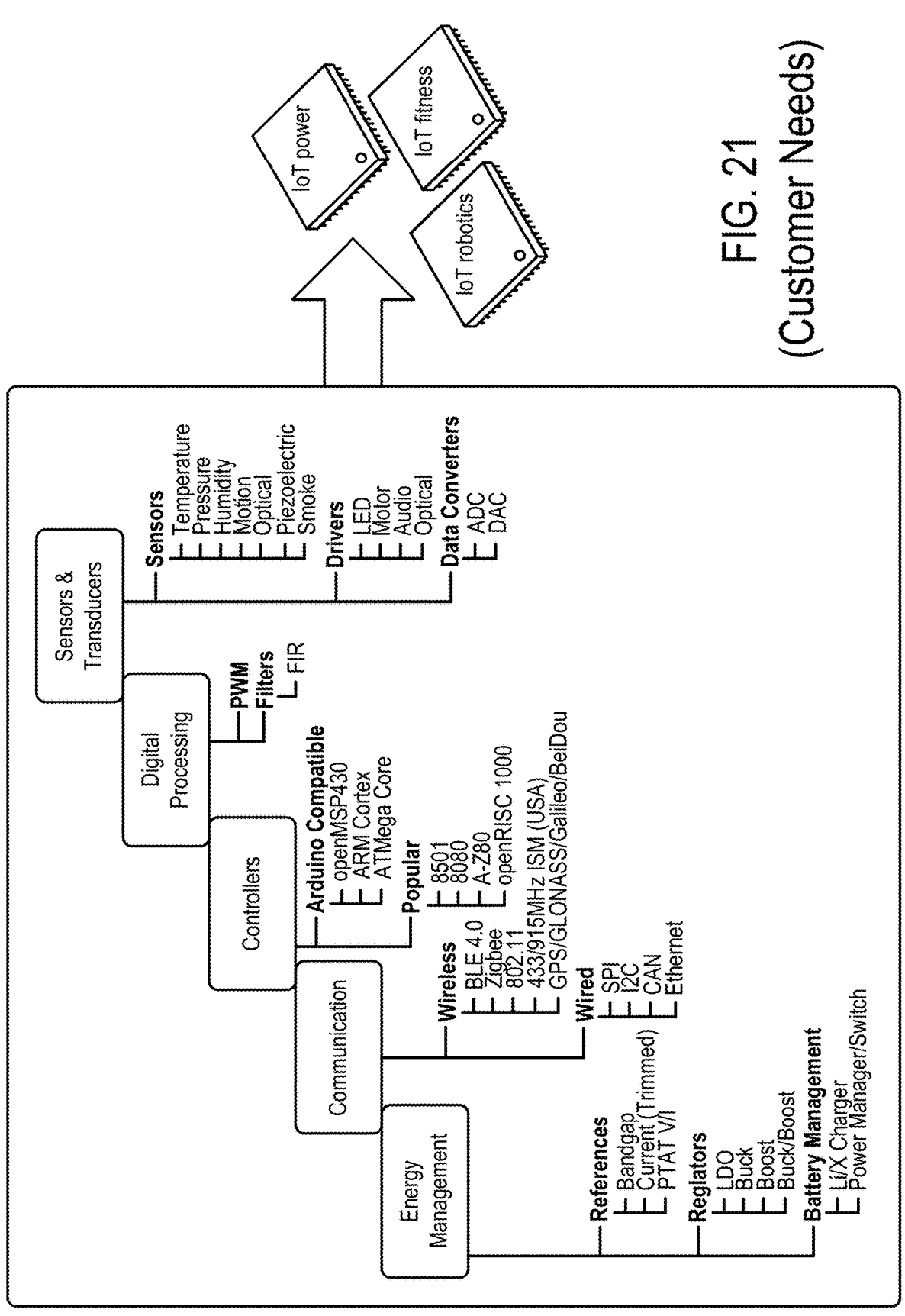
FIG. 21 is a diagram to illustrate a variety of integrated circuit chips that are designed using the online design engineering system.

FIG. 21 is a diagram to illustrate a variety of integrated circuit chips that are designed using the online design engineering system 102. For example, the online design engineering system 102 is used to generate a design of a design regulator, a power manager switch, a chip that implements a wireless protocol, a chip that implements a wired protocol, a filter, a sensor, and a driver circuit.

Figure 22:
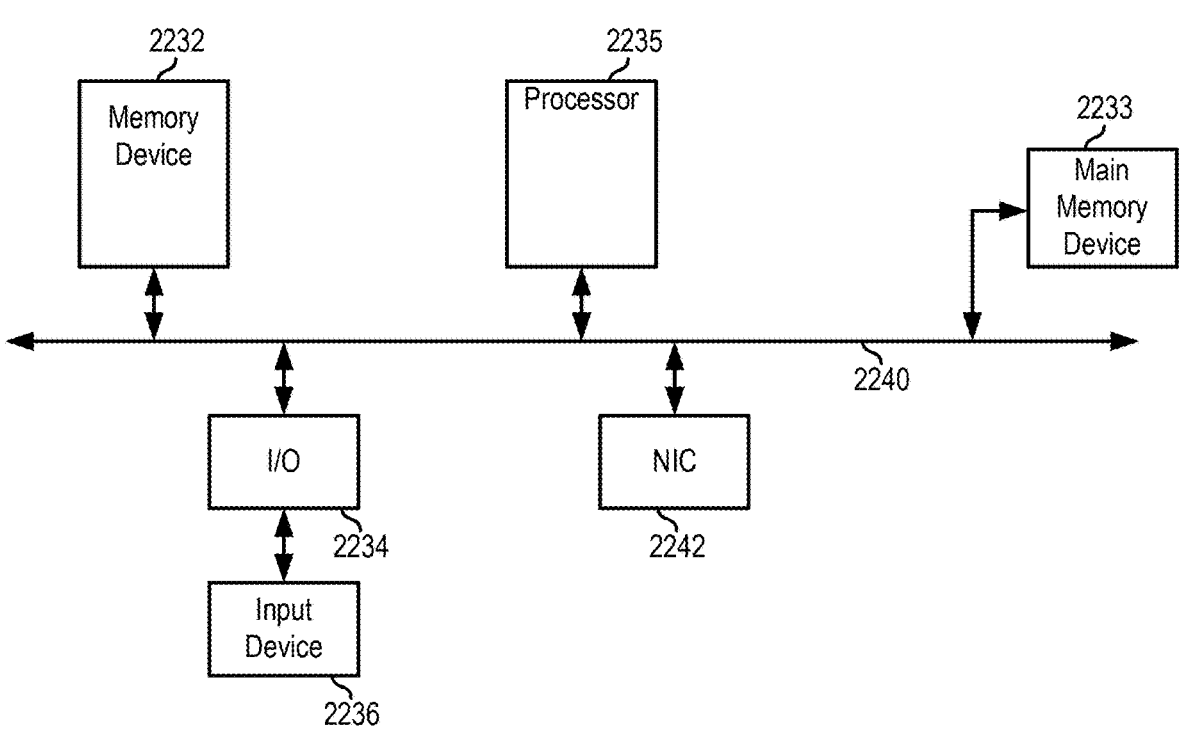
FIG. 22 is an embodiment of a computing device that is used to execute the design engineering methods described herein.

FIG. 22 is an embodiment of a computing device 2200 that is used to execute the design engineering methods described herein. In one embodiment, the computing device 2200 is an example of any of the computing devices, such as any of the user computing devices 1-N, the requester computing device 1, the requester computing device 2, the fabrication computing device 1, or the fabrication computing device 2, described herein. The computing device 2200 may include more or less components than those shown in FIG. 22.

The computing device 2200 includes a processor 2235 in communication with a memory device 2202 via a bus 2240. The processor 2235 performs the functions described herein as being performed by a computing device, described herein. The processor 2235 is also in communication with a main memory device 2203 via the bus 2240. The computing device 2200 includes a network interface controller 2242, an input device 2236, and an input/output (I/O) interface 2234. Examples of a network interface controller include a network interface card and a network adapter that apply a communication protocol, such as a Transmission Control Protocol over Internet protocol (TCP/IP) to communicate with the computer network 110. In one embodiment, instead of a network interface controller, a modem is used to communicate with the computer network 110. The network interface controller 2242 includes circuitry for coupling the computing device 2200 to the computer network 110.

The input device 2236 is coupled with the bus 2240 via the input/output interface 2234. Examples of the input device 2236 include a keyboard, a keypad, a touch screen, a mouse, and/or one or more buttons that are used to power-up and boot the computing device 2200. In an embodiment, the input/output interface 2234 converts a signal received from the input device 2236 into a signal that is compatible with the bus 2240. In one embodiment, the input/output interface 2234 converts the signal that is received via the bus 2240 to the signal that is sent to the input device 2236.

In an embodiment, the computing device 2200 includes a set of speakers (not shown) that are coupled to the bus 2240 via an audio interface (not shown). The audio interface performs a variety of audio-related processes, such as accessing the audio data from the memory device 2233 and filtering the audio data. Moreover, in one embodiment, the computing device includes a display device (not shown), such as, for example, a liquid crystal display device, a light emitting diode display device, a plasma display, or a cathode ray tube display for displaying a user interface.

The memory device 2233 includes a random-access memory (RAM), a read-only memory (ROM), or a combination thereof. The memory device 2233 illustrates an example of computer storage media for storage of information, such as, computer-readable instructions, data structures, program modules or other data. The memory device 2233 stores a basic input/output system ("BIOS") for controlling low-level operation of the computing device 2200. The main memory device 2233 also stores an operating system for controlling the operation of computing device 2200. It will be appreciated that in one embodiment, the operating system includes UNIX™, LINUX™, or Windows™ operating system.

It should be noted that although one processor 2235 is shown within the computing device 2200, in one embodiment, a different number of processors, such as two or more, etc., are included within the computing device 2200 and the different number of processors perform the operations described in the present disclosure as being performed by a computing device. Also, it should be noted that in one embodiment, more than two memory devices store data that is stored in the memory device 2233.

Figure 23:
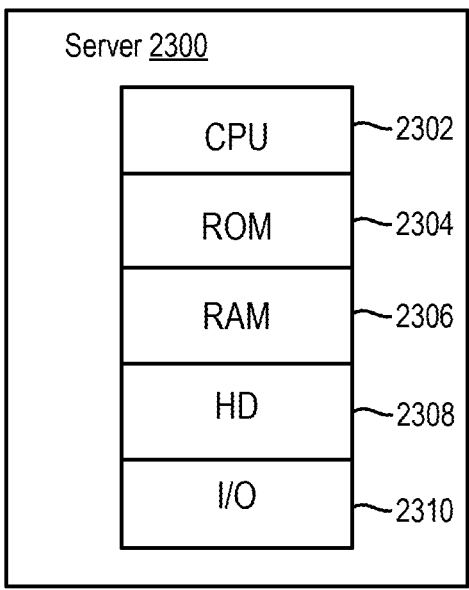
FIG. 23 is a diagram of an embodiment of a server to execute the design engineering methods described herein.

FIG. 23 is a diagram of an embodiment of a server 2300 described herein. The server 2300 is an example of the management server 152 or of the automatic certification server 112 or of any other server described herein. The server 2300 includes a CPU 2302, a ROM 2304, a RAM 2306, a hard disk drive (HD) or storage memory 2308, and input/output (I/O) interface 2310 for coupling input/output devices, such as, a keyboard, monitor, printer, electronic pointing device (e.g., mouse, trackball, stylus, etc.), or the like. In one embodiment, the ROM 2304 and/or RAM 2306 includes one or more databases, described herein. It should be noted that in an embodiment, the server 2300 has more than one CPU, ROM, RAM, HD, I/O, or other hardware components.

In an embodiment, multiple designers create a circuit design and are considered joint owners of the circuit design by the online design engineering system 102. The online design engineering system 102 keeps a record of a user account that is used to generate a design, and the record is then accessed to determine that a user assigned the user account is an owner of the circuit design. In an embodiment in which multiple user accounts are used to generate circuit designs, the users assigned the user accounts are considered owners of the circuit design.

Moreover, in one embodiment, the online design engineering system 102 provides an iterative process with which to measure success or failure of a circuit design in a shorter amount of time than that provided by conventional prototype development systems. For example, the online design engineering system 102 is accessed by the users 1 through N via the respective user accounts 1-N to create and submit designs to the online design engineering system 102. Simulation software provided within the online design engineering system 102 is executed to run a simulation on the circuit designs. The one or more fabrication entities fabricate one or more prototypes based the designs. The one or more prototypes are tested using the online design engineering system 102, e.g., the one or more prototypes are tested on the PCB by using software that is stored in the online design engineering system 102. As such, there is no need for the users 1 through N to have one-to-one relationships or personal contacts with the fabrications entities or with the requester. Rather, the online design engineering system 102 facilitates generation and execution of simulations of designs for fabricating prototypes and testing the prototypes. The online design engineering system 102 allows for a higher number of iterations of designs and of the prototypes compared to the conventional prototype development systems.

Figure 24:
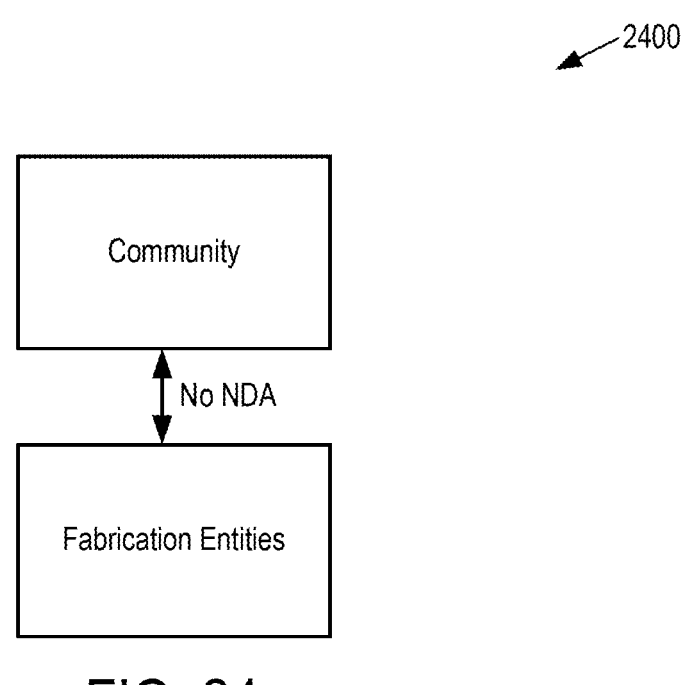
FIG. 24 is a diagram of an embodiment of a system to illustrate that there is no non-disclosure agreement (NDA) between fabrication entities and the community.

FIG. 24 is a diagram of an embodiment of a system 2400 to illustrate that there is no non-disclosure agreement (NDA) between fabrication entities, such as the fabrication entity 1 and fabrication entity 2, and the community. Layout features that are used to generate a layout design are not visible to one or more users, such as the users 1 through N, of the community. Examples of the layout features include n-wells, p-wells, n-type diffusions, p-type diffusions, n-type ion implantations, p-type ion implantations, p-type substrates, n-type substrates, contacts, metals, vias, polysilicons, oxide cuts, etc. The layout features of the layout design are created by a fabrication entity. A fabrication computing device, such as the fabrication computing device 1, provides access to the layout features, which are unobfuscated, to the obfuscator tool 182 via the computer network 110. The layout features are accessed by the obfuscator tool 182 and are obfuscated by the obfuscator tool 182. The obfuscation of the layout features protects intellectual property of the fabrication entities and no NDA is needed between the fabrication entities and the community of users.

Figure 25:
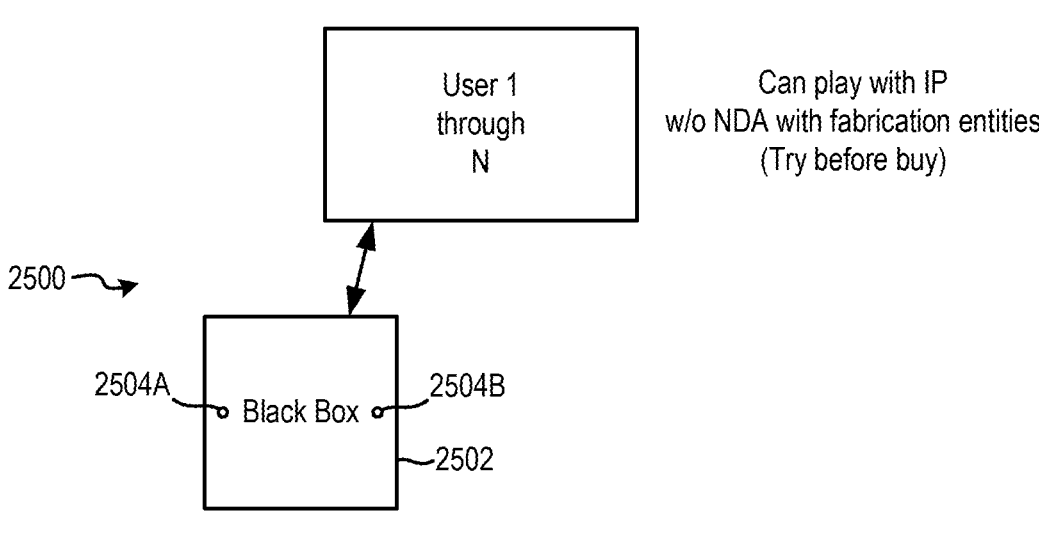
FIG. 25 is a diagram of an embodiment of a system to illustrate that a user uses a layout design of an integrated circuit chip with another layout design of another integrated circuit chip to create yet another integrated circuit chip design.

FIG. 25 is a diagram of an embodiment of a system 2500 to illustrate that a user uses a layout design of an integrated circuit chip with another layout design of another integrated circuit chip or with an integration circuit design, such as glue logic, to create yet another integrated circuit chip design. The user 1 operates the user computing device 1 to access the website that is controlled by the design engineering entity. The user 1 logs into the user account 1 via the website and selects a try before buy option, such as a try before buy button, displayed on a webpage accessible via the website. The user 1 further operates the user computing device 1 to access the workspace application 180 to access the layout design tool 166. Upon receiving the selection of the try before buy option, the management server 152 provides access to an obfuscated layout design 2502. For example, the obfuscated layout design 2502 is sent from the design database 160 via the computer network 110 to the user computing device 1 via the user account 1 and the workspace application 180 for display on the display device of the user computing device 1. The obfuscated layout design 2502 has one or more input ports, such as an input port 2504A, and one or more output ports, such as an output port 2504B, and has the obfuscated layout features that are generated by the obfuscator tool 182. The obfuscated layout features are generated by obfuscating the layout features that are accessed from the fabrication computing device 1 via the computing network 110. The obfuscated layout design 2502 is displayed as an opaque object, such as a black box, or a colored box, or a colored object of any shape, in which the layout features are obfuscated. The obfuscated layout design 2502 is sent from the obfuscator tool 182 via the computer network 110 to the user computing device 1 for display on the display device of the user computing device 1.

The user 1 couples the obfuscated layout design 2502 with a layout design that is generated by the user 1 via the user account 1 by accessing the layout design tool 166. For example, the user 1 couples an input port of the layout design generated by the user 1 with the output port 2504B and couples the output port of the layout design generated by the user 1 with the input port 2504A to generate an integrated circuit chip design. The user 1 selects a test button displayed on the display device of the user computing device 1 to execute the local layout verification tool 167 or the layout design verification tool 190 of FIG. 1F to simulate the integrated circuit chip design. The integrated circuit chip design includes the layout design generated by the user 1 and the obfuscated layout design 2502. There is no NDA needed between a fabrication entity that creates the layout features that are hidden in the obfuscated layout design 2502 and the user 1 because the user 1 cannot access the layout features via the user account 1.

Figure 26A:
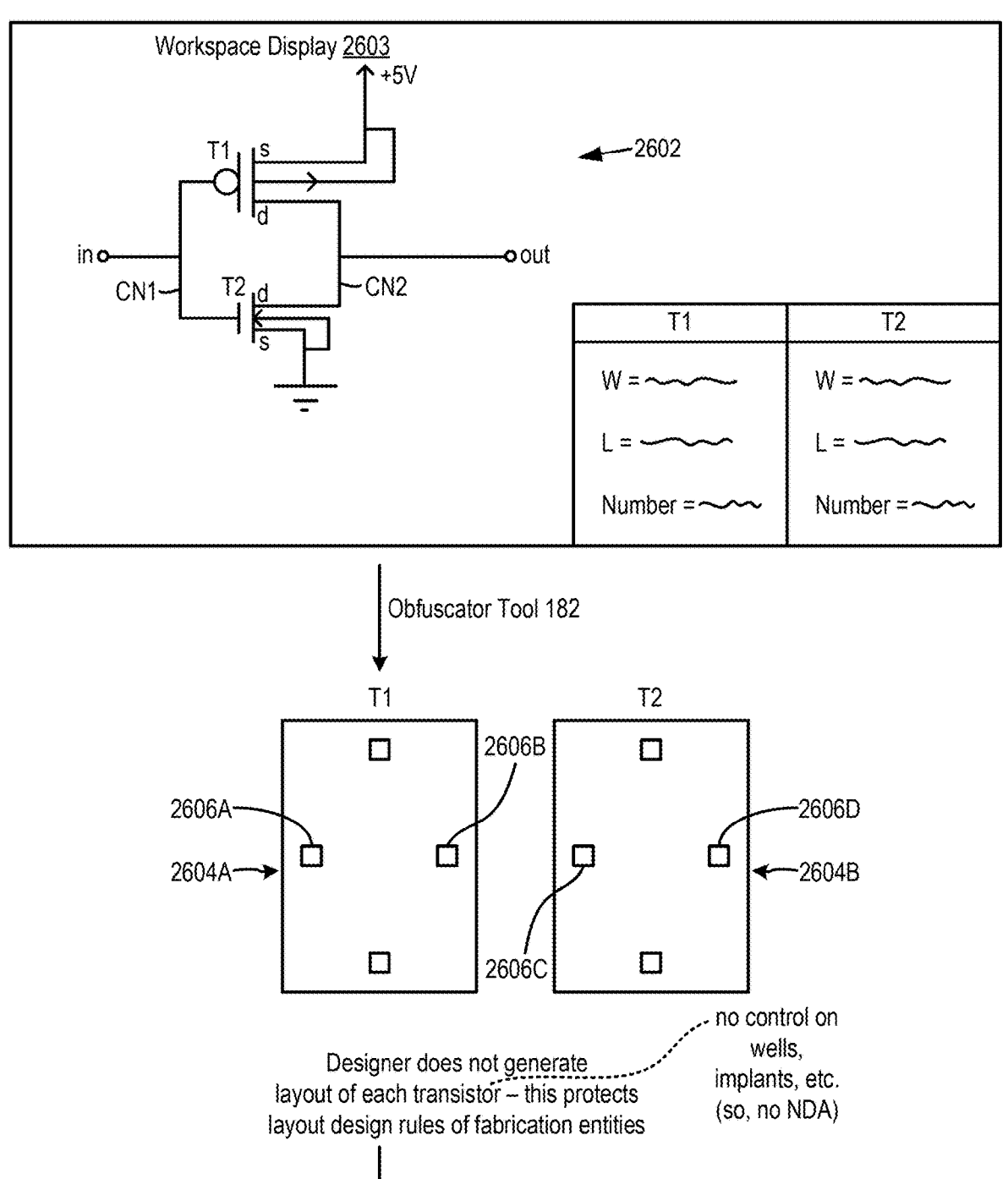
FIG. 26A is a diagram of an embodiment to illustrate generation of obfuscated designs from a schematic.

FIG. 26A is a diagram of an embodiment to illustrate generation of obfuscated designs, such as an obfuscated design 2604A and 2604B, from a schematic 2602. Each obfuscated design 2604A and 2604B is an example of a generic layout feature representation. For example, the obfuscated design 2604A does not show that the transistor T1 has a gate, a drain, and a source. Similarly, the obfuscated design 2604B does not show that the transistor T2 has a gate, a drain, and a source.

The transistor T1 is represented by the obfuscator tool 182 as the obfuscated design 2604A. Similarly, the transistor T2 is represented by the obfuscator tool 182 as the obfuscated design 2604B.

An obfuscated design of a component, such as a transistor or a logic gate, of a schematic has the same electrical characteristics as that of the component. For example, the obfuscated design 2604A has the same rise time or the same threshold voltage or the same transfer characteristic or the same output characteristic as that of the transistor T1. As another example, the obfuscated design 2604B has the same rise time or the same threshold voltage or the same transfer characteristic or the same output characteristic as that of the transistor T2. Other examples of the electrical characteristics include a current gain of a bipolar junction transistor, or power consumption of a logic gate, or a speed with which data is processed by the logic gate.

The user 1 accesses the workspace application 180 via the user account 1 on the user computing device 1. Upon accessing the workspace application 180, the user 1 uses the user computing device 1 to access the circuit design tool 164 to generate the schematic 2602 on a workspace display 2603. The workspace display 2603 includes an image of the schematic 2602 displayed on the display device of the user computing device 1. The schematic 2602 includes a p-type metal oxide semiconductor field effect transistor (MOSFET) T1 and an n-type MOSFET T2. A source of the transistor T1 is coupled to a voltage source, such as a 5 volt voltage source, and a source of the transistor T2 is coupled to a voltage potential, such as a ground voltage potential. Moreover, gates of both the transistors T1 and T2 are coupled with each other as an input connection, which for example, is coupled to a power source. The input connection is labeled as "in" in FIG. 26A. Also, a drain of the transistor T1 and a drain of the transistor T2 is coupled to an output connection. The output connection is labeled as "out" in FIG. 26A. The gate of the transistor T1 is connected to the gate of the transistor T2 via a connection CN1, which is coupled to the input connection. Also, the drain of the transistor T1 is connected to the drain of the transistor T2 via a connection CN2, which is coupled to the output connection.

The user 1 uses the user computing device 1, the workspace application 180, and the circuit design tool 164 to select a size of the transistor T1, such as a width of the transistor T1 and a length of the transistor T1, and to select a number of transistors T1 to be used in the schematic 2602. Moreover, the user 1 uses the user computing device 1, the workspace application 180, and the circuit design tool 164 to select a size of the transistor T2, such as a width of the transistor T2 and a length of the transistor T2, and to select a number of transistors T2 to be used in the schematic 2602.

When a selection of an option, such as a save button or a send button, displayed via the user account 1 on the workspace display 2603 is made by the user 1 via the input device of the user computing device 1, the schematic 2602 is sent via the computer network 110 to the circuit design tool 164 of the design engineering system 102. To illustrate, the user computing device 1 applies the communication protocol to generate packets from the schematic 2602 and sends the packets via the computer network 110 to the design engineering system 102. Upon receiving the packets, the design engineering system 102 depacketizes the packets to extract the schematic 2602. Also, the management server 152 of the design engineering system 102 generates a design file having the schematic 2602 and stores the design file in the design database 160.

The obfuscator tool 182 of the design engineering system 102 accesses the design file having the schematic 2602 from the design database 160 and obfuscates layout features of components, such as the transistors T1 and T2, to generate the obfuscated designs 2604A and 2604B. For example, the obfuscator tool 182 renders as opaque the layout features of the transistor T1 to generate the obfuscated design 2604A and renders as opaque the layout features of the transistor T2 to generate the obfuscated design 2604B. Examples of the layout features of a transistor include the transistor and the connections CN1 and CN2. Other examples of the layout features include a diffusion or a substrate or a well of a transistor.

Moreover, the obfuscator tool 182 excludes scaled representations of the layout features in the obfuscated designs 2604A and 2604B. For example, the obfuscator tool 182 hides or renders as opaque the scaled representations. A width of a transistor and a length of a transistor are examples of scaled representations of the transistor. Other examples of scaled representations of a layout feature include a size, such as a depth, or a width, or a length, or a dimension, or a combination thereof, of the layout feature.

The obfuscated design 2604A includes an input port 2606A and an output port 2606B. For example, the input port 2606A represents a connection to a gate of the transistor T1 and the output port 2606B represents a connection to a drain of the transistor T1. Similarly, the obfuscated design 2606B includes an input port 2606C and an output port 2606D. As an example, the input port 2606C represents a connection to a gate of the transistor T2 and the output port 2606D represents a connection to a drain of the transistor T2.

The user 1 accesses the workspace application 180 to further access the layout design tool 166 to generate a layout design from the schematic 2602. When the layout design tool 166 is accessed via the user account 1 and the computer network 110, the obfuscator tool 182 does not permit the user 1 via the user account 1 to access the layout features of the transistors T1 and T2 and generates the obfuscated designs 2606A and 2606B. For example, the obfuscator tool 182 does not permit the user 1 to access via the user account 1 to select or change spacing between wells of the transistors T1 and T2, sizes of the wells, sizes of substrates of the transistors T1 and T2, sizes of contacts of the transistors T1 and T2, sizes of vias that are coupled to the transistors T1 and T2, sizes of metals that are coupled to the transistors T1 and T2, sizes of oxide layers of the transistors T1 and T2, sizes of diffusions of the transistors T1 and T2, sizes of ion implantations of the transistors T1 and T2, types of the transistors T1 and T2, and sizes of polysilicons of the transistors T1 and T2. An example of a size, as used herein, of a layout feature includes a width or a length or a depth or a combination thereof of the layout feature. The layout features are an intellectual property of one or more fabrication entities, such as the fabrication entity 1 and the fabrication entity 2. Without an NDA, the intellectual property of the fabrication entities is protected while the user account 1 is still provided access to the obfuscated designs 2604A and 2604B. The obfuscated designs 2604A and 2604B are sent by the obfuscator tool 182 via the computer network 110 and the user account 1 to the user computing device 1 for display on the display device of the user computing device 1.

It should be noted that in an embodiment, although the obfuscated designs 2604A and 2604B are generate from different types of transistors T1 and T2, both the obfuscated designs 2604A and 2604B have the same representation. For example, there is no difference between sizes and shapes of the obfuscated designs 2604A and 2604B. As another example, there is no difference in a number of ports of the obfuscated designs 2604A and 2604B.

FIG. 26B is a diagram of an embodiment of a workspace display 2610 to illustrate a manual placement of obfuscated designs and of generating manual routes between the obfuscated designs. The workspace display 2610 is generated when the user 1 operates the user computing device 1 to access the workspace application 180 to further access the layout design tool 166 to generate a layout design from the schematic 2602 of FIG. 26A. Upon accessing the layout design tool 166, the user 1 accesses the obfuscated designs 2604A and 2604B from the design database 160 via the user account 1 and the obfuscator tool 182, and uses the input device of the user computing device 1 to place the obfuscated designs 2604A and 2604B at positions P1 and P2. For example, the obfuscated design 2604A is placed at the position P1 and the obfuscated design 2604B is placed at the position P2. As another example, the obfuscated design 2604A is placed at a position P3 and the obfuscated design 2604B is placed at a position P4.

Moreover, upon placing the obfuscated designs 2604A and 2604B, the user 1 uses the input device of the user computing device 1 to generate routes, such as metal connections, between the obfuscated designs 2606A and 2606B to create an integrated circuit chip design 2608, which is a layout design. For example, the user 1 uses the input device of the user computing device 1 to access and place a route 2612 between the input ports 2606A and 2606C and to generate a master input port 2620A, which is connected to the route 2604A. As another example, the user 1 uses the input device of the user computing device 1 to access and place a route 2622 between the output ports 2606B and 2606D and to generate a master output port 2620B, which is connected to the route 2622. The user 1 uses the input device of the user computing device 1 to connect the master input port 2620A to the route 2612 and to connect the master output port 2620B to the route 2622. As yet another example, the user 1 uses the input device of the user computing device 1 to generate a metal connection between two layout features of a layout design. The integrated circuit chip design 2608 includes the master input port 2620A and the master output port 2620B. Moreover, the user 1 uses the user computing device 1 to generate master ports 2620C and 2620D within the integrated circuit chip design 2608.

Once the obfuscated designs 2604A and 2604B of the integrated circuit chip design 2608 are placed and are connected with each other by the user 1 via the user computing device 1 and the user account 1, and the user 1 selects a save option or a send option displayed on the workspace display 2610, the management server 152 generates an outer boundary 2626 of the integrated circuit chip design 2608 and the user computing device 1 sends the integrated circuit chip design 2608 via the computer network 110 to the design engineering system 102. The management server 152 generates a design file having the integrated circuit chip design 2608 and stores the design file in the design database 160.

Figure 27:
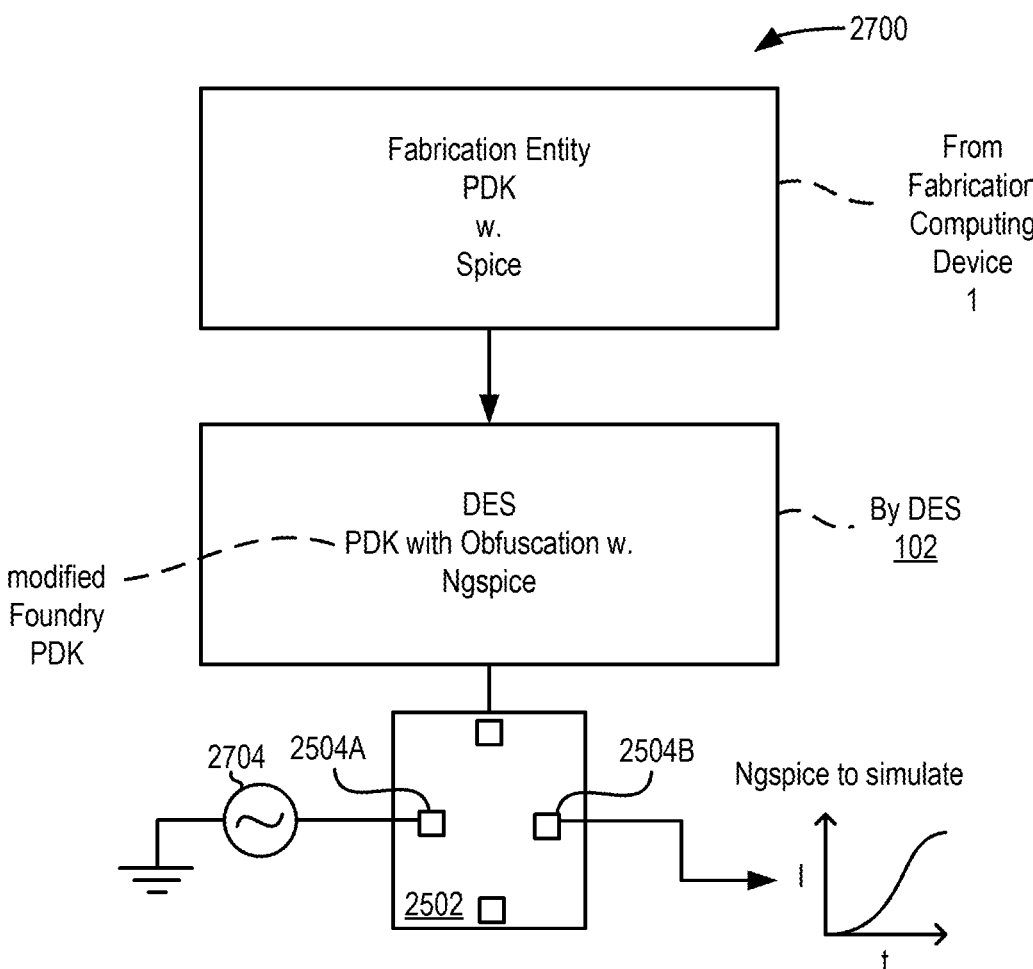
FIG. 27 is a diagram of an embodiment of a system to illustrate an application of an obfuscator tool to a process design kit (PDK) that is controlled by a fabrication entity.

FIG. 27 is a diagram of an embodiment of a system 2700 to illustrate an application of the obfuscator tool 182 to a process design kit (PDK) that is controlled by the fabrication entity 1. In an embodiment, the fabrication entity PDK is a set of files used within a semiconductor industry to model a fabrication process for a layout design tool used to generate a layout design of an integrated circuit. In one embodiment, the fabrication entity PDK is an example of a layout design tool that is controlled by the fabrication entity 1. For example, the fabrication entity 1 has licensing rights to use or allow use of the fabrication entity PDK or has intellectual property rights to the fabrication entity PDK. As another example, the fabrication entity PDK is created by the fabrication entity 1 defining a certain technology variation for its processes. The fabrication entity PDK includes a simulation computer software, such as a computer program, for verifying a layout design or a circuit design. For example, the fabrication entity PDK includes SPICE™ or a modification of SPICE™.

The management server 152 obtains a copy of the fabrication entity PDK via the computer network 110 from the fabrication entity computing device 1. For example, the design engineering entity is provided a license to use and modify the fabrication entity PDK. As another example, the management server 152 downloads a copy of the fabrication entity PDK from the fabrication computing device 1 via the computer network 110 and the fabrication entity account 1. As yet another example, the design engineering entity uses an input device coupled to the management server 152 to download a copy of the PDK.

The design engineering entity, such as an employee of the design engineering entity, uses the input device coupled to the management server 152 and the management server 152 to modify the fabrication entity PDK to generate a DES PDK. For example, the design engineering entity uses the input device coupled to the management server 152 and the management server 152 to modify the fabrication entity PDK to generate the DES PDK. As another example, the fabrication entity PDK is integrated with the obfuscator tool 182 to generate the DES PDK. As another example, the fabrication entity PDK is modified to include call functions to the obfuscator tool 182. As yet another example, SPICE™ or its modification is changed to create a verification software tool or is replaced with another verification software tool, such as Next generation SPICE™ (Ngspice™). To illustrate, SPICE™ or its derivative is modified by the design engineering entity to create the verification software tool or is replaced by the design engineering entity with another verification software tool.

When the layout design tool 166, such as the DES PDK, is accessed via the computer network 110 by the user computing device N to generate a layout design, the obfuscator tool 182 that is integrated within the DES PDK obfuscates, such as hides, or renders opaque, or covers, layout features of a component, such as a transistor, a logic gate, a resistor, a capacitor, an inductor, or another electrical element, of a circuit design that is generated by the user 1 via the user account 1, to generate the obfuscated design 2502. For example, when the user N requests via the layout design tool 166 an access to the transistor T1 or T2, the obfuscated design 2502 is generated from the transistor T1 or the transistor T2 by obfuscating one or more layout features of the transistor, and sent from the obfuscator tool 182 via the computer network 110 and the user account N to the user computing device N for display of the obfuscated design 2502 on the display device of the user computing device N. Each obfuscated design 2604A and 2604B of FIG. 26A is an example of the obfuscated design 2502.

The user N uses the user computing device N to access the verification software tool of the DES PDK via the account and the computer network 110 to test the obfuscated design 2502. For example, a power source 2704, such as a current supply or a voltage supply, is coupled to the input port 2504A of the obfuscated design 2502 by the verification software tool of the DES PDK to generate data at the output port 2504B of the obfuscated design 2702. Examples of the data at the output port 2504B include a plot of current I at the output port 2504B versus time t.

In one embodiment, the user N uses the user computing device N to access the verification software tool of the DES PDK via the user account N to access the integrated circuit chip design 2608 of FIG. 26B from the design database 160 and to test the integrated circuit chip design 2608. The verification software tool of the DES PDK is accessed when the user N operates the user computing device N to access the workspace application 180 to further access the verification software tool of the DES PDK. As an example, during the test of the integrated circuit chip design 2608, the power source 2704 is coupled to the master input port 2620A of the integrated circuit chip design 2608 to generate data at the master output port 2620B of the integrated circuit chip design 2608. Examples of the data at the master output port 2620B include a plot of voltage at the master output port 2620B versus voltage at the master input port 2620A. It should be noted that when the integrated circuit chip design 2608 is accessed via the user account N and the verification software tool of the DES PDK to be tested, there is no display of the schematic 2602 of FIG. 26A based on which the integrated circuit chip design 2608 is generated. Electrical characteristics, such as transfer characteristics or output characteristics or voltage at output versus voltage at input or current at output versus current at input, of both the schematic 2602 and the integrated circuit chip design 2608 are the same. Moreover, when the integrated circuit chip design 2608 is accessed by the user N via the user account N and the verification software tool of the DES PDK to test the integrated circuit chip design 2608, there is no display of one or more of the layout features of the integrated circuit chip design 2608 and/or of one or more scaled representations of the one or more features. Also, when the integrated circuit chip design 2608 is accessed by the user N via the user account N and the verification software tool of the DES PDK to test the integrated circuit chip design 2608, a number of components, such as the transistors T1 and T2, are obfuscated by the obfuscator tool 182. To illustrate, when the components are obfuscated, there is no representation of how many of the components are used, positions of the components in the integrated circuit chip design 2608, types of the components, spacing, such as a perpendicular distance, between two adjacent components in the integrated circuit chip design 2608, and identities of the components. In the illustration, a type of a component, such as n-type or p-type, identifies the component and/or a series of alphanumeric characters, such as a serial number, assigned to the component identifies the component.

In the embodiment, the obfuscator tool 182 obfuscates the one or more layout features and/or the one or more scaled representations to generate a display the integrated circuit chip design 2608 on the display device of the user computing device N via the computer network 110 to facilitate a test of the integrated circuit chip design 2608. For example, the obfuscator tool 182 obfuscates the routes 2612 and 2622 shown in FIG. 26B but does not obfuscate the master input ports 2620A and 2620B of the integrated circuit chip design 2608. Moreover, the obfuscator tool 182 obfuscates the obfuscated designs 2604A and 2604B but does not obfuscate the master ports 2620C and 2620D. The master port 2620C is connected to a power source and the master port 2620D is to be connected to another power source during a test of the integrated circuit chip design 2608. Also, the master port 2620C is connected to a port of the obfuscated design 2604A shown in FIG. 26B and the master port 2620D is connected to a port of the obfuscated design 2604B shown in FIG. 26B.

Figure 28:
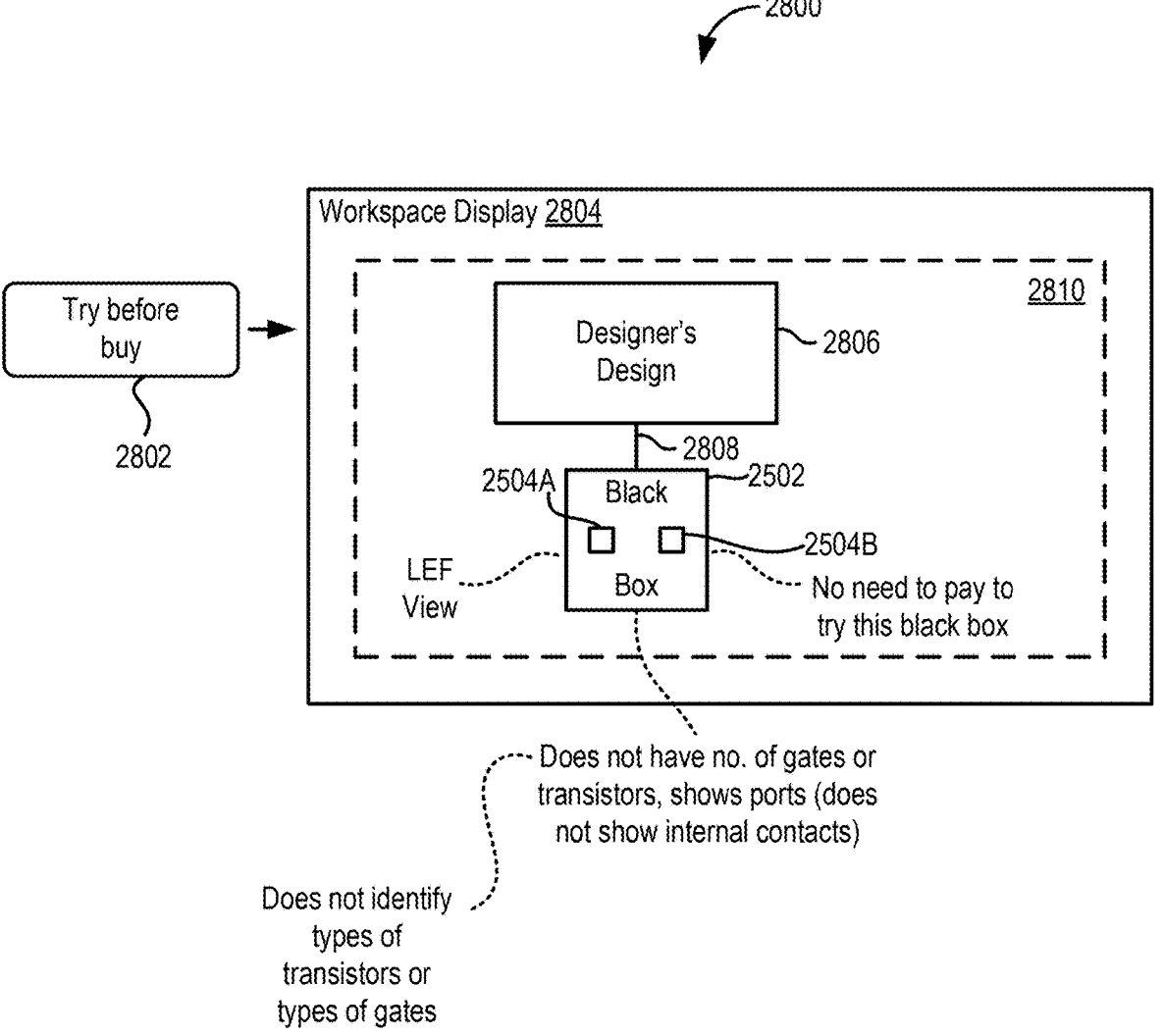
FIG. 28 is a diagram of an embodiment of a system to illustrate a try before buy option of the online design engineering system.

FIG. 28 is a diagram of an embodiment of a system 2800 to illustrate a try before buy option 2802. A user or a requester uses a computing device, such as the requester computing device 1 or the user computing device 1, to access the try before buy option 2802 via an account, such as the user account 1 or the requester account 1. The try before buy option 2802 is generated by the management server 152 for display on the computing device. Furthermore, the user or the requester accesses via the account the workspace application 180 to further access the layout design tool 166. Moreover, upon receiving the selection of the try before buy option 2802 and the request for accessing the layout design tool 166, the obfuscator tool 182 sends the obfuscated design 2502 via the computer network 110 to the computing device for display via the account. For the purposes of FIG. 28, a circuit schematic from which the obfuscated design 2502 is generated is created by the user 2 via the user account 2.

The user, such as the user 1, or the requester uses an input device of the computing device to connect, via one or more connections, such as a connection 2808, the obfuscated design 2502 with a design 2806, such as a layout design, to generate an integrated circuit chip design 2810. Examples of the design 2806 include the design A and the design B of FIG. 4B-2. To illustrate, the design 2806 is created by the user 1 by accessing the layout design tool 166. Other examples of the design 2806 include the integration circuit logic 452 of FIG. 4B-2. It should be noted that the obfuscated design 2502 does not display the layout features and associated scaled representations, such as whether a transistor obfuscated within the obfuscated design 2502 is an n-type or a p-type transistor, or a type of a logic gate, or a number of logic gates obfuscated within the obfuscated design 2502, or contacts with components within the obfuscated design 2502, or types of wells used within the obfuscated design 2502, or depths of the wells, or lengths of the wells, or widths of the wells, or types of diffusions used within the obfuscated design 2502, or depths of the diffusions, or lengths of the diffusions, or widths of the diffusions, or a number of oxide layer cuts within the obfuscated design 2502, or an arrangement of GDS layers within the obfuscated design 2502, or a location of the GDS layers with respect to each other within the obfuscated design 2502, or locations of polysilicons within the layout design 2502, or widths of the polysilicons, or lengths of the polysilicons, or a number of contacts within the obfuscated design 2502, or metals that connect one component to another within the obfuscated design 2502. Examples of types of logic gates include an AND gate, an OR gate, a NOR gate, a NAND gate, a buffer, and a NOT gate. A type of logic gate performs a different function than a different type of logic gate. For example, the NOT gate changes a bit 1 to a bit 0 and the buffer allows passage of the bit 1 at its input to output a bit 1 at its output. Moreover, the user or requester verifies functionality of the integrated circuit chip design 2810 by accessing the local layout verification tool 167 or the layout design verification tool 190 via the computer network 110 and the account.

In an embodiment, the user or requester does not need to pay to try the obfuscated design 2502, such as using the obfuscated design 2502 with the design 2806. For example, the credit and debit server system does not debit a financial account of the user 2 via the computer network 110 to credit a financial account of the user 1 to pay the user 2 for use, such as a simulation, of the obfuscated design 2502.

Figure 29:
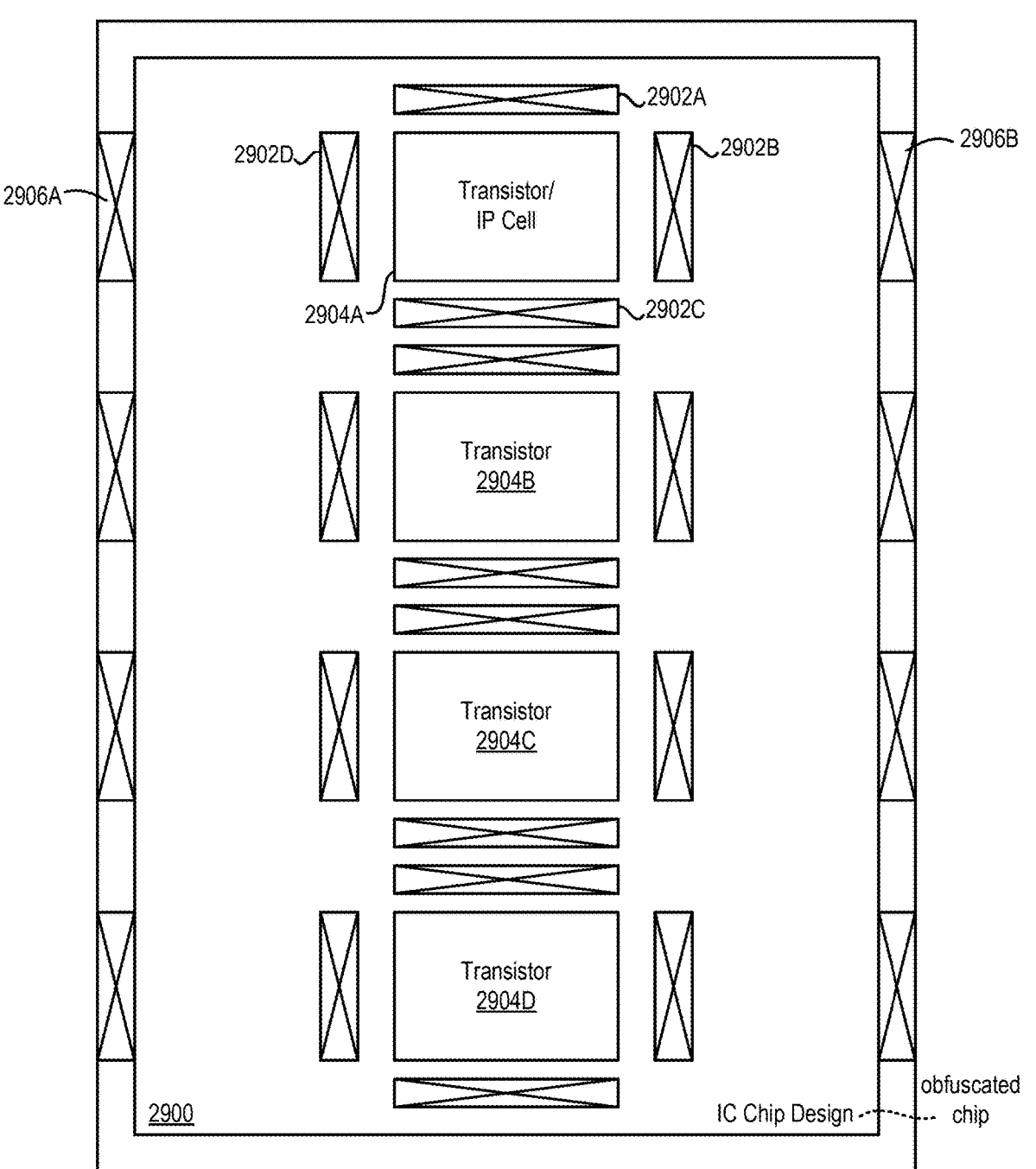
FIG. 29 is a diagram of an embodiment of an integrated circuit chip design that is obfuscated by the obfuscator tool.

FIG. 29 is a diagram of an embodiment of an integrated circuit chip design 2900 that is obfuscated by the obfuscator tool 182. The integrated circuit chip design 2900 includes multiple transistors 2904A, 2904B, 2904C, and 2904D. Moreover, the integrated circuit chip design 2900 includes one or more internal ports, such as an internal port 2902A, an internal port 2902B, an internal port 2902C, and an internal port 2902D. An example of the internal port 2902D is the port 2504A (FIG. 25) and an example of the internal port 2902B is the port 2504B (FIG. 25). Moreover, the internal port 2902A is coupled to a power source and the internal port 2902C is coupled to a ground potential or another power source. Similarly, each of the remaining transistors 2904B through 2904C is surrounded by internal ports.

Moreover, the integrated circuit chip design 2900 has one or more external ports, such as an external port 2906A and an external port 2906B. Each external port is coupled to an external port of another integrated circuit chip design. Moreover, each external port of the integrated circuit chip design 2900 is coupled to one or more internal ports of the integrated circuit chip design 2900.

The user 1 accesses the layout design tool 166 to generate the integrated circuit chip design 2900. Layout features of the transistors 2904A through 2904D are obfuscated by the obfuscator tool 182. For example, the obfuscator tool 182 hides a type of any of the transistors 2904A through 2904D. The user 1 accesses via the user account 1 and the computer network 110 the layout design tool 166 to select widths of the transistors 2904A through 2904D, lengths of the transistors 2904A through 2904D, and a number of the transistors 2904A and 2904D. The layout design tool 166 is accessed to position the transistors 2904A through 2904D, to connect via the input device of the user computing device 1 the internal ports of the integrated circuit chip design 2900, and to connect one or more of the internal ports of the integrated circuit chip design 2900 with one or more external ports of the integrated circuit chip design 2900. Also, the user 1 uses the input device of the user computing device 1 to access the layout design tool 166 to connect the external ports of the integrated circuit chip design 2900 with external ports of another integrated circuit chip design.

In one embodiment, one or more internal ports that surround a transistor of the integrated circuit chip design 2900 is coupled to one or more internal ports that surround another transistor of the integrated circuit chip design 2900. In an embodiment, instead of each transistor 2904A through 2904C, another IP cell, such as a logic gate, multiple transistors, multiple logic gates, one or more inductors, one or more capacitors, one or more resistors, or a combination thereof, is used in the nitrated circuit chip design 2900. In one embodiment, each internal port, such as any of the internal ports 2902A through 2902D, has one or more contacts and the contacts are coupled to gates of different transistors. In an embodiment, the terms external port and master port are used herein interchangeably.

Figure 30:
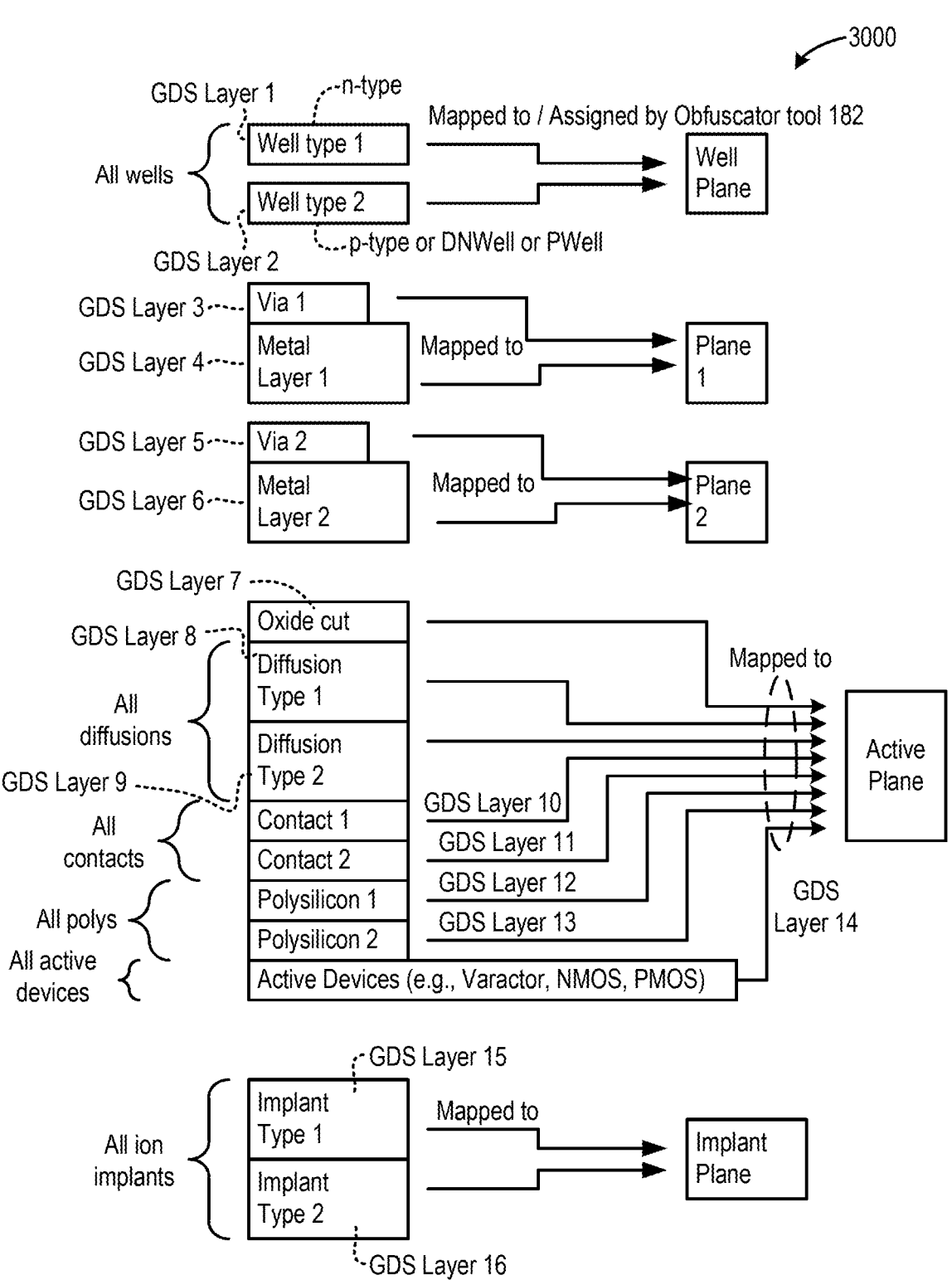
FIG. 30 is a diagram of an embodiment of a system for mapping a Graphics Database System (GDS) layer of a layout design to a plane.

FIG. 30 is a diagram of an embodiment of a system 3000 for mapping a GDS layer of a layout design to a plane. The fabrication entity PDK includes multiple GDS layers, such as the layout features, that can be used by the user 1 to generate a layout design when there is an NDA between a fabrication entity that owns intellectual property rights to the fabrication entity PDK and the user 1. In case of an absence of the NDA, the obfuscator tool 182 of the DES PDK maps one or more GDS layers of the fabrication entity PDK to a plane of the DES PDK to obfuscate a layout design that has the GDS layers. For example, the obfuscator tool 182 maps, such as establishes a one-to-one correspondence with, or assigns, or creates a unique relationship between, a GDS layer 1 of a layout design to a well plane of the DES PDK. Moreover, in this example, the obfuscator tool 182 maps a GDS layer 2 of the layout design to the well plane. An illustration of the GDS layer 1 is a well type 1, such as an n-type well, and an illustration of the GDS layer 2 is a well type 2, such as a p-type well or a DNwell or a Pwell. The well type 2 is different from the well type 1.

As another example, the obfuscator tool 182 places GDS layers within a layout design on a plane. To illustrate, the obfuscator tool 182 places wells of different types of a layout design on the well plane. Continuing with the example, instead of sending the GDS layers via the computer network 110 to an account for display on a computing device, such as a user computing device or a requester computing device, the obfuscator tool 182 combines two or more GDS layers into one or more planes and sends the planes, instead of the GDS layers, via the computer network 110 to the computing device for display via the account.

As another example, the obfuscator tool 182 maps a GDS layer 3 of the layout design to a plane 1 of the DES PDK. The plane 1 is different from, such as not the same as, the well plane. Moreover, in this example, the obfuscator tool 182 maps a GDS layer 4 of the layout design to the plane 1. An illustration of the GDS layer 3 is a via 1 that connects two layout features of the layout design through a layer, such as a dielectric layer, of the layout design and an illustration of the GDS layer 3 is a metal layer 1 that connects two layout features of the layout design.

As yet another example, the obfuscator tool 182 maps a GDS layer 5 of the layout design to a plane 2 of the DES PDK. The plane 2 is different from, such as not the same as, the well plane and is different from the plane 1. Moreover, in this example, the obfuscator tool 182 maps a GDS layer 6 of the layout design to the plane 2. An illustration of the GDS layer 5 is a via 2 that connects two layout features of the layout design through a layer, such as a dielectric layer, of the layout design and an illustration of the GDS layer 6 is a metal layer 2 that connects two layout features of the layout design. In one embodiment, the metal layer 2 is located above the metal layer 1 in the layout design.

As another example, the obfuscator tool 182 maps a GDS layer 7 of the layout design to an active plane of the DES PDK. The active plane is different from, such as not the same as, the well plane, is different from the plane 1, and is different from the plane 2. Moreover, in this example, the obfuscator tool 182 maps a GDS layer 8 of the layout design to the active plane. An illustration of the GDS layer 7 is an oxide cut that is laid over a layout feature of the layout design to protect the layout feature and an illustration of the GDS layer 8 is a diffusion of type 1, such as n-type or p-type diffusion, within a layout feature of the layout design.

Continuing with the example, the obfuscator tool 182 maps a GDS layer 9 of the layout design to the active plane of the DES PDK. Moreover, in this example, the obfuscator tool 182 maps a GDS layer 10 of the layout design to the active plane. An illustration of the GDS layer 9 is a diffusion of type 2, such as n-type or p-type diffusion, within a layout feature of the layout design, and an illustration of the GDS layer 10 is a contact 1 of the layout design. The contact 1 is coupled to a layout feature of the layout design. The diffusion of the type 2 is different from the diffusion of the type 1. To illustrate, the type 2 diffusion is p-type and the type 1 diffusion is n-type.

Continuing further with the example, the obfuscator tool 182 maps a GDS layer 11 of the layout design to the active plane of the DES PDK. Moreover, in this example, the obfuscator tool 182 maps a GDS layer 12 of the layout design to the active plane. An illustration of the GDS layer 11 is a contact 2 of the layout design and an illustration of the GDS layer 12 is a polysilicon 1 of the layout design. The contact 2 is coupled to a different layout feature of the layout design than a layout feature to which the contact 1 is coupled. As an illustration, a polysilicon is used as a gate electrode.

Continuing with the example, the obfuscator tool 182 maps a GDS layer 13 of the layout design to the active plane of the DES PDK. Moreover, in this example, the obfuscator tool 182 maps a GDS layer 14 of the layout design to the active plane. An illustration of the GDS layer 13 is a polysilicon 2 of the layout design and an illustration of the GDS layer 14 is an active device or a passive device of the layout design. The polysilicon 2 is different from the polysilicon 1. To illustrate, the polysilicon 2 is a material used to fabricate a different gate electrode than a gate electrode fabricated from polysilicon 1. Examples of the active device include a varactor diode, a transistor, an NMOS, a PMOS, a rectifier, and a logic gate. Examples of the passive device include a resistor, a capacitor, and an inductor.

The obfuscator tool 182 maps a GDS layer 15 of the layout design to an implant plane of the DES PDK. The implant plane is different from, such as not the same as, the well plane, is different from the plane 1, is different from the plane 2, and is different from the active plane. Moreover, in this example, the obfuscator tool 182 maps a GDS layer 16 of the layout design to the implant plane. An illustration of the GDS layer 15 is an ion implant type 1 of the layout design and an illustration of the GDS layer 16 is an ion implant type 2 of the layout design. The ion implant type 2 is different from the ion implant type 1. To illustrate, the ion implant type 1 is an n-type implant and the ion implant type 2 is a p-type implant.

When the user N requests via the user account N for the layout design, the obfuscator tool 182 obfuscates two or more of the GDS layers 1 through 16 of the layout design and sends the well plane, the plane 1, the plane 2, and/or the implant plane via the computer network 110 to the user computing device N for display via the user account N. For example, the obfuscator tool 182 determines that the user account N does not have permission to view the GDS layers 1 through 16 and upon determining so, the obfuscator tool 182 maps the GDS layers 1 and 2 to the well plane, the GDS layers 3 through 6 to the plane 1, the GDS layers 7 through 14 to the plane 2, and/or the GDS layers 15 and 16 to the implant plane, and sends the well plane, the plane 1, the plane 2, and/or the implant plane to the user computing device 1 for display on the display device of the user computing device 1. To illustrate, instead of sending any two GDS layers via the computer network to the user computing device 1 for display via the user account 1, the obfuscator tool 182 generates a plane from the GDS layers and sends the plane via the computer network 110 to the user computing device 1 for display via the user account 1.

In an embodiment, a GDS layer on a plane cannot overlap with a GDS layer of a different type. For example, the well type 1 cannot overlap with the well type 2. As another example, the diffusion type 1 cannot overlap with the diffusion type 2. As yet another example, the implant type 1 cannot overlap with the implant type 2.

In an embodiment, the obfuscator tool 182 establishes a mapping between a GDS layer of the fabrication entity PDK and a plane of the DES PDK by generating a pointer from a memory address of the searchable storage 162 in which data of the GDS layer is stored to a memory address of the searchable storage 162 in which data of the plane is stored. In another embodiment, the obfuscator tool 182 establishes a mapping between a GDS layer of the fabrication entity PDK and a plane of the DES PDK by generating a pointer from a memory address of the searchable storage 162 in which data of the plane is stored to a memory address of the searchable storage 162 in which data of the GDS layer is stored.

Figure 31:
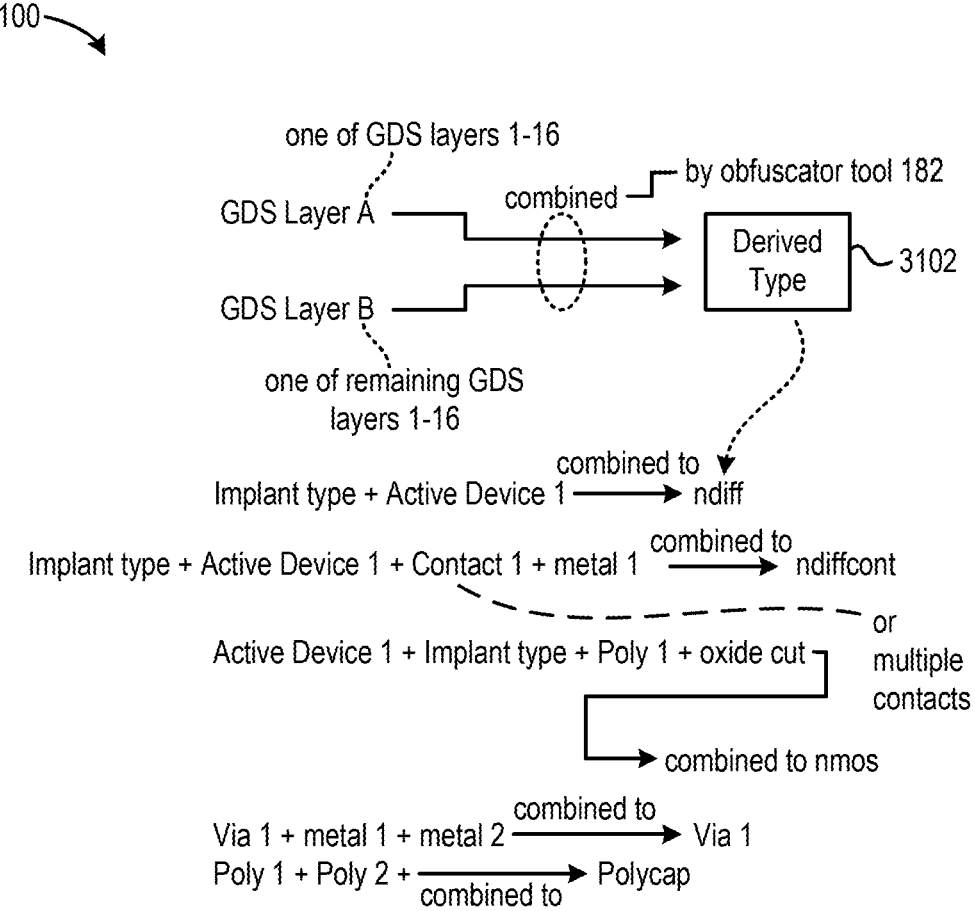
FIG. 31 is a diagram of an embodiment of a system to illustrate generation of a derived type from two or more GDS layers.

FIG. 31 is a diagram of an embodiment of a system 3100 to illustrate generation of a derived type from two or more GDS layers. An example of a derived type is a layout feature. The obfuscator tool 182 combines a GDS layer A and a GDS layer B of a layout design to generate a derived type 3102, which is a layout feature of the derived type. For example, when the user N operates the user computing device N to access the layout design tool 166 to further access a layout design from the design database 160, the obfuscator tool 182 accesses the public-private indicator database 220 to determine whether the user account N has permission to access the layout design. Upon determining that the user account N does not have the permission, the obfuscator tool 182 integrates the GDS layers A and B of the layout design to generate the derived type 3102 to obfuscate the GDS layers A and B. The obfuscator tool 182 sends the derived type 3102, instead of the GDS layers A and B, via the computer network 110 to the user computing N for display via the user account N. On the other hand, upon determining that the user account N has the permission, the obfuscator tool 182 does not integrate the GDS layers A and B of the layout design to generate the derived type 3102, and sends the GDS layers A and B via the computer network 110 to the user computing N for display via the user account N. Examples of the GDS layer A include any of the GDS layers 1 through 16 and examples of the GDS layer B includes any remaining layers of the GDS layers 1 through 16 that are not the GDS layer A. Additional examples of the GDS layer A include any of layout features of the layout design and of the GDS layer B include any of remaining features of the layout design. None of the remaining features is the GDS layer A. The derived type 3102 is generated to obfuscate two or more of the GDS layers 1 through 16.

As an example, an implant type, such as n-type or p-type implant, of the layout design is merged by the obfuscator tool 182 with an active device 1 of the layout design to generate an ndiff derived type. Illustrations of the active device 1 include any of the active devices, such as a transistor and a logic gate, described above. As another example, an implant type of the layout design is merged by the obfuscator tool 182 with the active device 1, a contact 1 of the layout design, and a metal 1 of the layout design to generate an ndiffcont derived type. An illustration of the contact 1 is a metal contact to a gate or a source or a drain of a transistor. Another illustration of the contact 1 is a metal contact to an input of a logic gate or an output of the logic gate. Yet another illustration of the contact 1 is a metal contact to a terminal of a resistor or a capacitor or an inductor. An illustration of the metal 1 is a metal connection between two layout features of the layout design. As yet another example, an implant type of the layout design is merged by the obfuscator tool 182 with the active device 1, one or more contacts of the layout design, and the metal 1 of the layout design to generate the ndiffcont derived type. As another example, the active device 1 of the layout design is merged by the obfuscator tool 182 with an implant type of the layout design, a polysilicon 1 of the layout design, and an oxide cut of the layout design to generate an nmos derived type. An illustration of the polysilicon 1 is a polysilicon layer of an electrode of a transistor. An illustration of the oxide cut is an oxide layer that is deposited on a layout feature to protect the layout feature. As yet another example, a via 1 of the layout design is combined by the obfuscator tool 182 with the metal 1, a metal 2 of the layout design to generate a vial derived type. As an illustration, the metal 2 connects two layout features of the layout design and at least one of the layout features connected via the metal 2 is different than at least one of the layout features connected via the metal 1. An illustration of the via 1 is a via between two layout features of the layout design. The via extends through a layer, such as an oxide layer or a dielectric layer, or both the layers, of the layout design. As another example, the polysilicon 1 is merged by the obfuscator tool 182 with a polysilicon 2 of the layout design to generate a polycap derived type. As an illustration, the polysilicon 2 is polysilicon of a different terminal of a transistor compared to the polysilicon 1. To further illustrate, the polysilicon 2 is polysilicon of a gate of a transistor and the polysilicon 1 is polysilicon is of a drain of the transistor. As another illustration, the polysilicon 2 is polysilicon of a terminal of a different transistor compared to the polysilicon 1. To further illustrate, the polysilicon 2 is polysilicon of a gate of a transistor and the polysilicon 1 is polysilicon is of a gate of another transistor.

In one embodiment, the obfuscator tool 182 combines two or more GDS layers to generate a derived type after the GDS layers are placed on a plane. For example, the GDS layers A and B are mapped to a plane. After the mapping, the obfuscator tool 182 combines the GDS layers A and B into a derived type, which is located on the plane. As another example, more than two GDS layers are mapped to a plane. After the mapping, the obfuscator tool 182 combines the more than two GDS layers into a derived type, which is located on the plane.

FIG. 32 is a diagram of an embodiment of a listing of obfuscator rules that are applied by the obfuscator tool 182 to obfuscate one or more layout features of a layout design. When the user N operates the user computing device N to access the layout design tool 166 via the user account N to generate the layout design, the obfuscator tool 182 applies one or more of the obfuscator rules to determine whether to permit the user N via the input device of the user computing device N to generate or modify a layout feature of the layout design. For example, the obfuscator tool 182 permits the user N via the user account N to select spacing between two wells of the layout design but does not allow the user N to select via the user account N widths of the wells and does not allow the user N to draw via the user account N the wells. As another example, the obfuscator tool 182 prevents the user N via the user account N to select the spacing between the two wells, the widths of the wells, and/or to draw the wells. As another example, the obfuscator tool 182 allows the user N via the user account N to draw a diffusion type 1 of the layout design, to select a width of the diffusion type 1, and to select spacing between two diffusion types of the layout design. As an example, the obfuscator tool 182 prohibits the user N via the user account N to draw the diffusion type 1 of the layout design, to select the width of the diffusion type 1, and/or to select the spacing between two diffusion types 1 of the layout design. As another example, the obfuscator tool 182 does not allow the user N via the user account N to draw a diffusion type 2 of the layout design and to select a width of the diffusion type 2, and allows the user N via the user account N to select spacing between two diffusion types of the layout design. As an example, the obfuscator tool 182 prevents the user N via the user account N to draw the diffusion type 2 of the layout design, to select the width of the diffusion type 2, and/or to select the spacing between two diffusion types 2 of the layout design. The diffusion type 2 is different from the diffusion type 1. To illustrate, the diffusion type 1 is an n-type diffusion within a well and the diffusion type 2 is a p-type diffusion within another well.

As another example, the obfuscator tool 182 does not permit the user N via the user account N to draw a polysilicon of the layout design, to select a width of the polysilicon, and to select a spacing between two polysilicons of the layout design. As another example, the obfuscator tool 182 prevents the user N via the user account N to draw the polysilicon of the layout design, to select the width of the polysilicon, and/or to select the spacing between two poly-silicons of the layout design. As an example, the obfuscator tool 182 permits the user N via the user account N to draw a metal, such as a metal connection between two layout features, of the layout design, to select a width of the metal, and to select a spacing between two metals of the layout design. As another example, the obfuscator tool 182 pro-hibits the user N via the user account N to draw the metal of the layout design, to select the width of the metal, and/or to select the spacing between two metals of the layout design.

As an example, the obfuscator tool 182 permits the user N via the user account N to draw a via, such as a via connecting two layout features, of the layout design, to select a width of the via, and to select a spacing between two vias of the layout design. As another example, the obfuscator tool 182 prevents the user N via the user account N to draw a via of the layout design, to select a width of the via, and/or to select a spacing between two vias of the layout design. As an example, the obfuscator tool 182 does not permit the user N via the user account N to draw an active device of the layout design, to select a width of the active device, and to select a spacing between two active devices of the layout design. As another example, the obfuscator tool 182 pre-vents the user N via the user account N to draw an active device of the layout design, to select a width of the active device, and/or to select a spacing between two active devices of the layout design.

Figure 33:
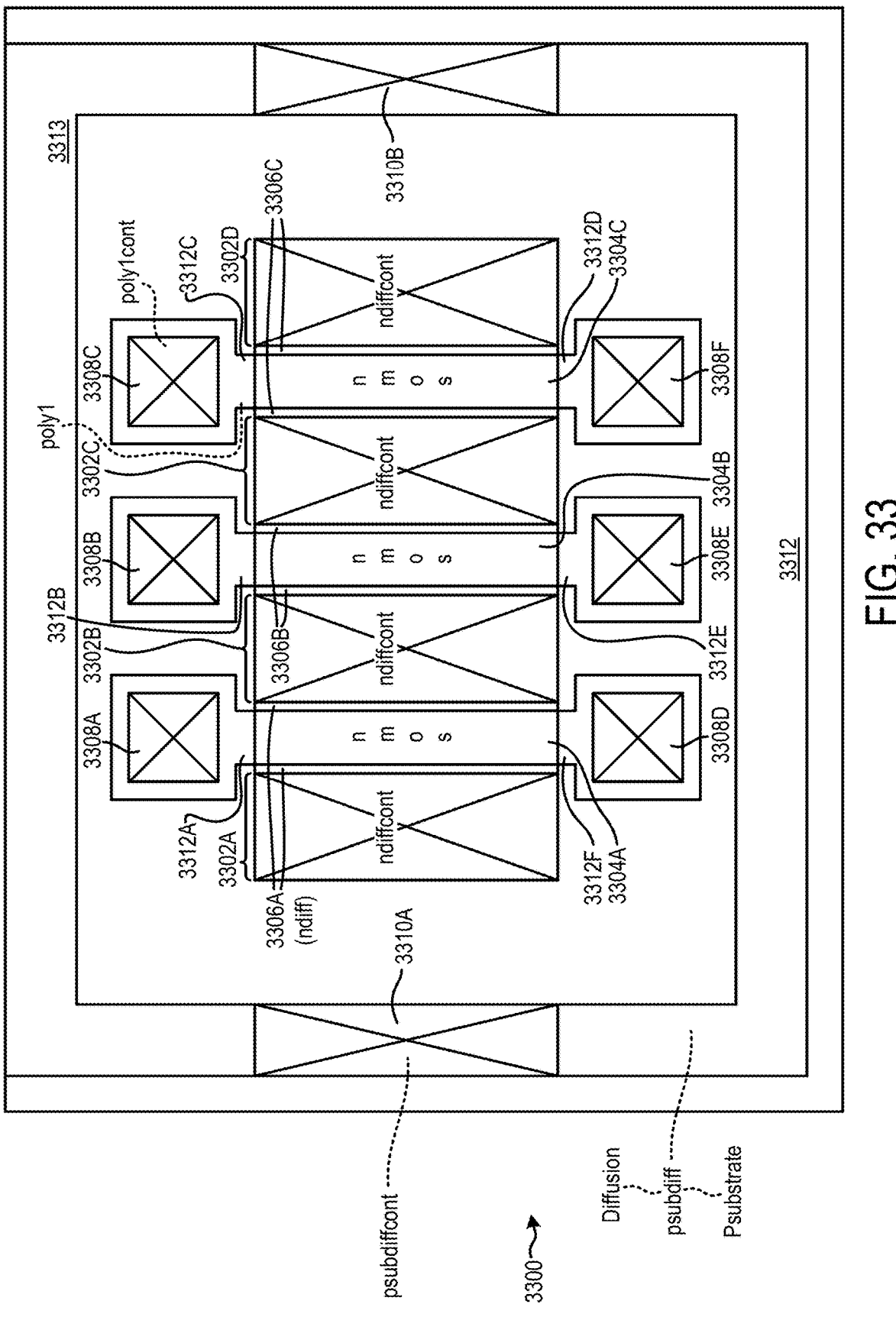
FIG. 33 is a diagram of an embodiment of an integrated circuit chip design, which is obfuscated by the obfuscator tool to generate derived types.

FIG. 33 is a diagram of an embodiment of an integrated circuit chip design 3300, which is obfuscated by the obfus-cator tool 182 by generating derived types. The integrated circuit chip design 3300 includes four ndiffcont derived types 3302A, 3302B, 3302C, and 3302D. Moreover, the integrated circuit chip design 3300 further includes three nmos derived types 3304A, 3304B, and 3304C. Each nmos derived type 3304A, 3304B, and 3304C is located between two ndiffcont derived types. The integrated circuit chip design 3300 includes three ndiff derived types 3306A, 3306B, and 3306C. Each ndiff derived type 3306A, 3306B, and 3306C is adjacent to two ndiffcont derived types.

Moreover, the nmos derived type 3304A is coupled to a polysilicon 3312A, such as the polysilicon 1, at one end and to a polysilicon 3312F at an opposite end. Similarly, the nmos derived type 3304B is coupled to a polysilicon 3312B at one end and to a polysilicon 3312E at an opposite end. Also, the nmos derived type 3304C is coupled to a poly-silicon 3312C at one end and to a polysilicon 3312D at an opposite end.

The polysilicon 3312A is coupled to a contact 3308A of the integrated circuit chip layout design 3300 and the polysilicon 3312B is coupled to a contact 3308B of the integrated circuit chip layout design 3300. Moreover, the polysilicon 3312C is coupled to a contact 3308C of the integrated circuit chip layout design 3300 and the polysili-con 3312D is coupled to a contact 3308F of the integrated circuit chip layout design 3300. Also, the polysilicon 3312E is coupled to a contact 3308E of the integrated circuit chip layout design 3300 and the polysilicon 3312F is coupled to a contact 3308D of the integrated circuit chip layout design 3300.

Moreover, the integrated circuit chip layout design 3300 includes a contact 3310A and another contact 3310B. Each of the contacts 3310A and 3310B is an example of a port to couple a diffusion 3313 within a p-type substrate of the integrated circuit chip design 3300 to another integrated circuit chip design to test the integrated circuit chip design 3300 or the other integrated circuit chip design.

Figure 34:
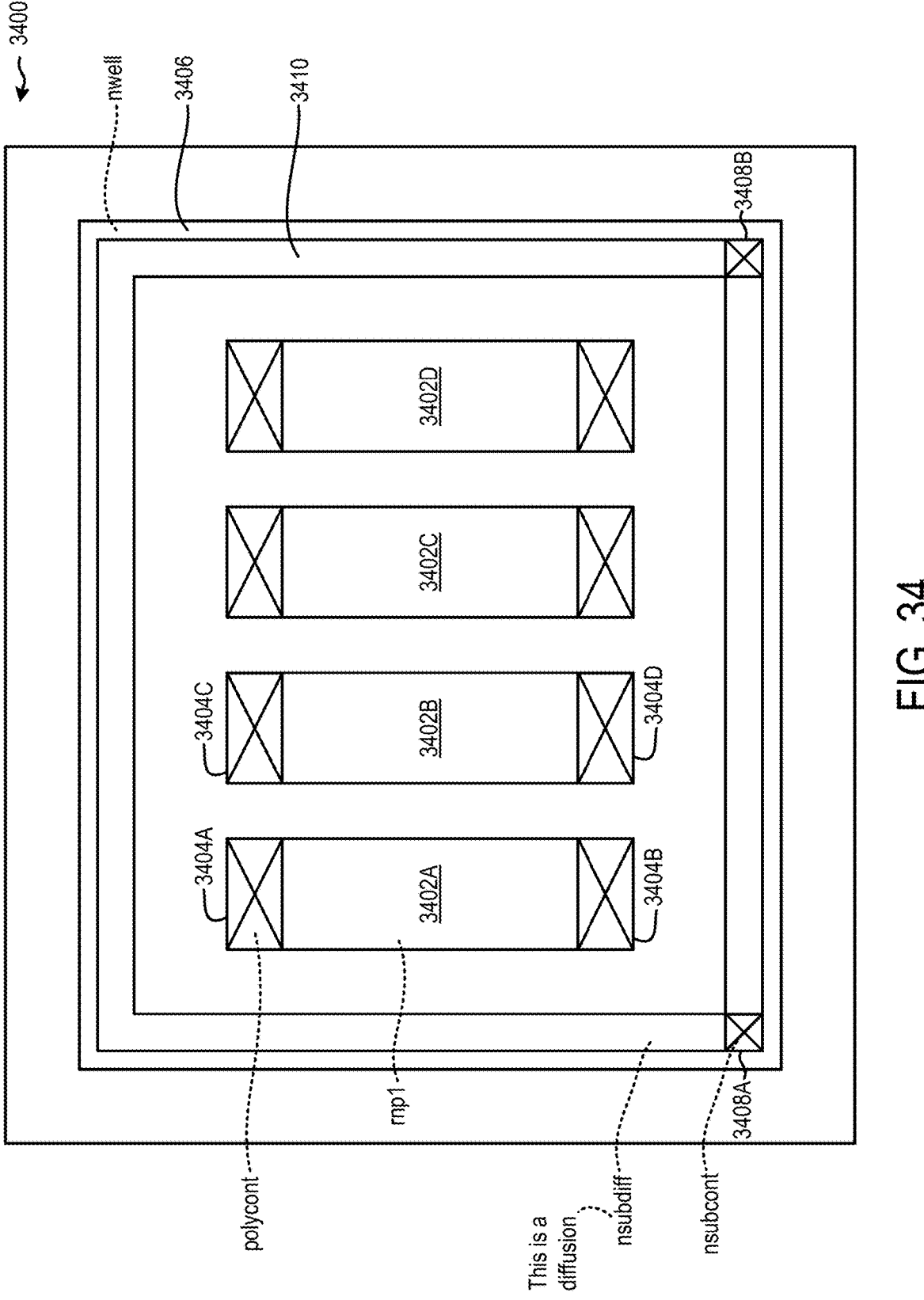
FIG. 34 is a diagram of an embodiment of an integrated circuit chip design to illustrate multiple derived types.

FIG. 34 is a diagram of an embodiment of an integrated circuit chip design 3400 to illustrate multiple derived types. The integrated circuit chip design 3400 has an arrangement of a derived type rnp1, which is generated by the obfuscator tool 182 by combining two or more GDS layers described above. For example, four blocks 3402A, 3402B, 3402C, and 3402D are arranged in a row. Each block 3402A, 3402B, 3402C, and 3402D is of the derived type rnp1. Each block 3402A, 3402B, 3402C, and 3402D of the derived type mp1 is coupled to a contact at both ends. As an example, the block 3402A is connected to a contact 3404A at one end of the block 3402A and to a contact 3404B at its opposite end of the block 3402A. As another example, the block 3402B is coupled to a contact 3404C at one end of the block 3402B and to a contact 3404D at an opposite end of the block 3402B. Similarly, the block 3402C is coupled to a contact at one end of the block 3402C and to another contact at another end of the block 3402C. Moreover, the block 3402D is coupled to a contact at one end of the block 3402D and to another contact at another end of the block 3402D. Further-more, the integrated circuit chip design 3400 includes an n-type well 3406, multiple contacts 3408A and 3408B to a n-type substrate of the integrated circuit chip design 3400, and a diffusion 3410 within the n-type substrate.

In one embodiment, each contact of the integrated circuit chip design 3400 that is coupled to a block, such as the block 3402A, 3402B, 3402C, and 3402D, is a combination, gen-erated by the obfuscator tool 182, of contacts. For example, the contact 3404A is a combination of two or more contacts. One of the two or more contacts is connected to a GDS layer of a layout design and another one of the two or more contacts is connected to another GDS layer of the layout design. For example, one of the two more contacts is connected to a gate of a transistor of the layout design in another one of the two or more contacts is connected to a drain of the same or a different transistor of the layout design.

Figure 35:
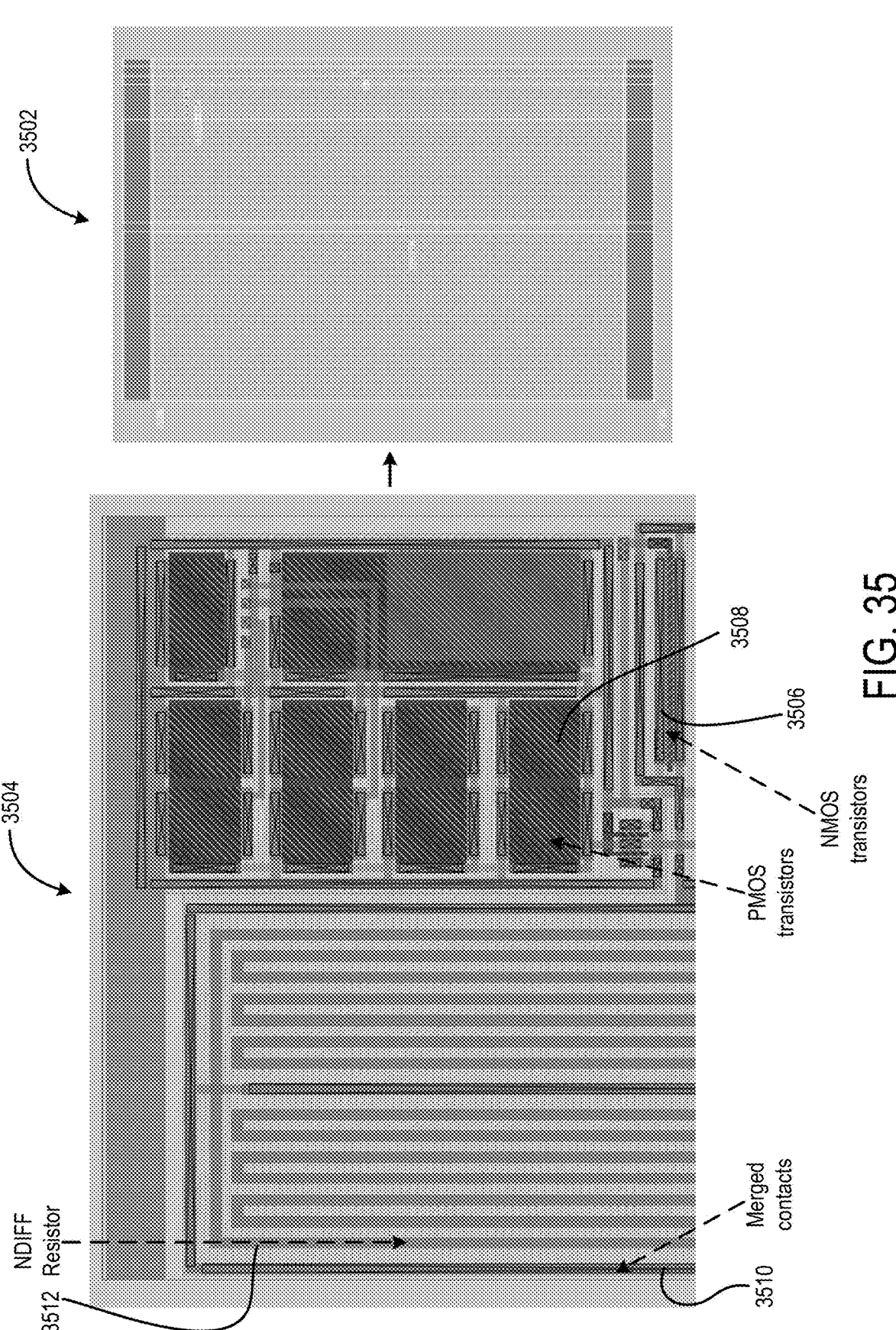
FIG. 35 is a diagram to illustrate an embodiment of an obfuscated integrated circuit chip design that is generated from an unobfuscated integrated circuit chip design.

FIG. 35 is a diagram to illustrate an embodiment of an obfuscated integrated circuit chip design 3502 that is gen-erated from an integrated circuit chip design 3504. The obfuscated tool 182 accesses the integrated circuit chip design 3504 from the design database 160 of FIG. 1B-2 and obfuscates one or more layout features of the integrated circuit chip design 3504 to generate the obfuscated inte-grated circuit chip design 3502. The layout features of the integrated circuit chip design 3504 include NMOS transis-tors 3506, PMOS transistors 3508, merged contacts 3510, and a resistor 3512. In one embodiment, the merged contacts 3510 are referred to herein as a combined contact that has a combination of two or more contacts. The two or more contacts are combined by the obfuscator tool 182. It should be noted that in the obfuscated integrated circuit chip design 3502, the NMOS transistors 3506, the PMOS transistors 3508, the merged contacts 3510, and the resistor 3512 are not visible, such as, are opaque or are hidden. For example, when the user N operates the user computing device N to access via the layout design tool 166 the integrated circuit chip design 3504 from the design database 160, the obfus-cated tool 182 renders as opaque the NMOS transistors 3506, the PMOS transistors 3508, the merged contacts 3510, and the resistor 3512 to generate the obfuscated integrated circuit chip design 3502. The obfuscated tool 182 sends the obfuscated integrated circuit chip design 3502 via the com-puter network 110 to the user computing device N for display by the user account N on the display device of the user computing device N.

Figure 36A:
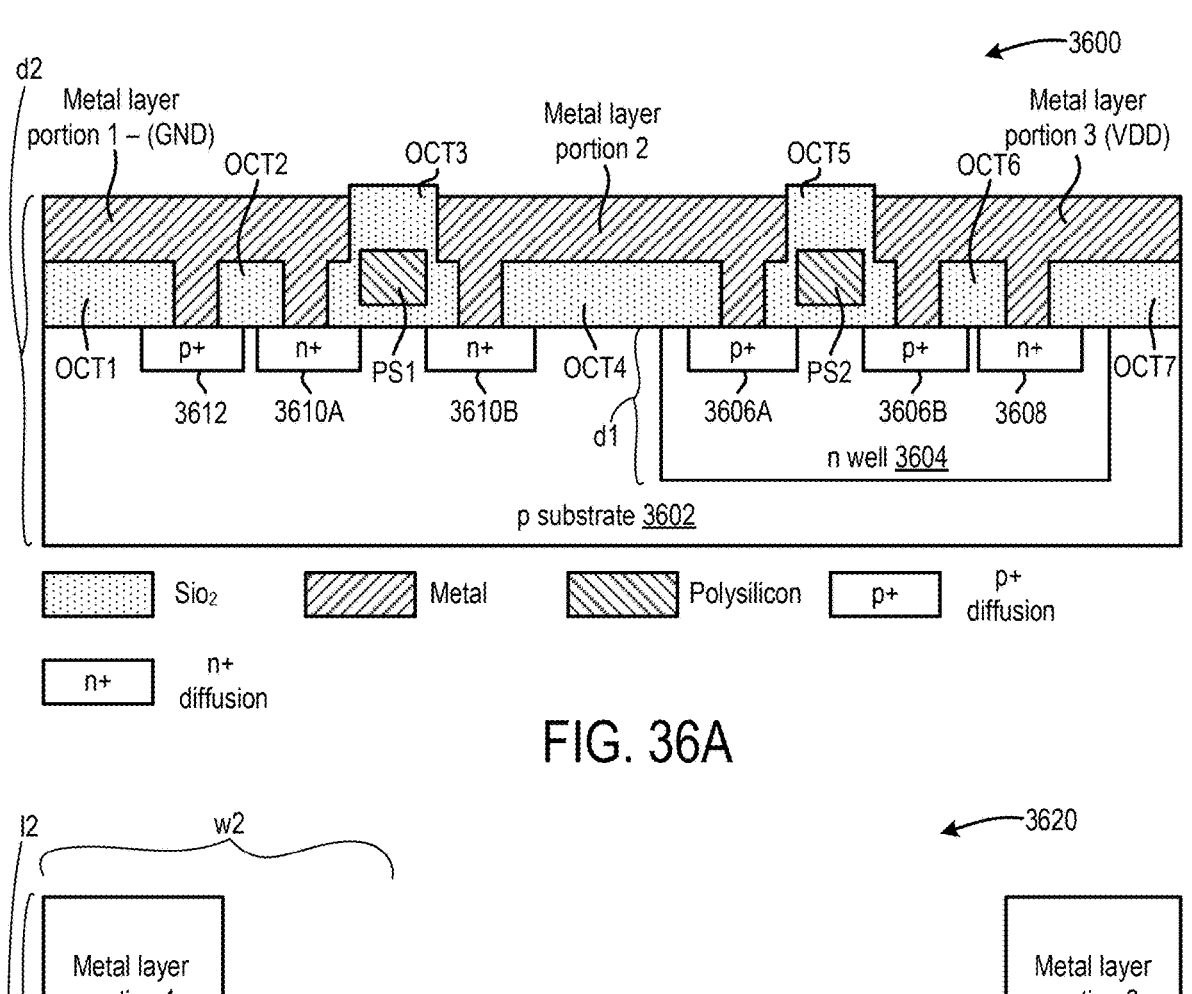
FIG. 36A is an embodiment of an unobfuscated layout design of an inverter.

FIG. 36A is an embodiment of an unobfuscated layout design 3600 of an inverter. The layout design 3600 has a p-type substrate 3602. An n-type well 3604 is formed within the p-type substrate 3602. Moreover, a dopant is added within the n-type well 3604 to form a p-type diffusion 3606A and is also added at a different position within the n-type well 3604 to form another p-type diffusion 3606B. Also, a dopant is added within the n-type well 3604 to form an n-type diffusion 3608 within the n-well 3604.

Similarly, a dopant is added within the p-type substrate 3602 to form an n-type diffusion 3610A and is also added at a different position within the p-type substrate 3602 to form another n-type diffusion 3610B. Also, a dopant is added within the p-type substrate 3602 to form a p-type diffusion 3612 within the p-type substrate 3602.

Moreover, an oxide layer cut OCT1 is formed on top of the p-type substrate 3602 and a portion of the p-type diffusion 3612. In addition, an oxide layer cut OCT2 is formed on top of a portion of the p-type diffusion 3612 and a portion of the n-type diffusion 3610A. Also, an oxide layer cut OCT3 is formed on top of a portion of the n-type diffusion 3610A, a portion of the p-type substrate 3602, and a portion of the n-type diffusion 3610B. An oxide layer cut OCT4 is formed on top of a portion of the n-type diffusion 3610B, a portion of the p-type substrate 3602, a portion of the n-type well 3604, and a portion of the p-type diffusion 3606A. Moreover, an oxide layer cut OCT5 is formed on top of a portion of the p-type diffusion 3606A, a portion of the n-type well 3604, and a portion of the p-type diffusion 3606B. Also, an oxide layer cut OCT6 is formed on top of a portion of the p-type diffusion 3606B and a portion of the n-type diffusion 3608. Also, an oxide layer cut OCT7 is formed on top of a portion of the n-type diffusion 3608, a portion of the n-type well 3604, and a portion of the p-type substrate 3602. An oxide cut is made from silicon dioxide.

A metal layer portion 1 is fabricated on top of the oxide layer cuts 1 and 2, and on top of the p-type diffusion 3612 and the n-type diffusion 3610A, and is adjacent to the oxide layer cut OCT3. Moreover, a metal layer portion 2 is fabricated on top of the n-type diffusion 3610B, the oxide layer cut 4, the p-type diffusion 3606A, and is adjacent to the oxide layer cuts OCT3 and OCT 5. A metal layer portion 3 is fabricated on top of the p-type diffusion 3606B, the n-type diffusion 3608, and on top of the oxide layer cuts 6 and 7, and is adjacent to the oxide layer cut OCT5. The metal layer portion 1 is a ground connection, for example, is at a ground potential. Moreover, the metal layer portion 2 is an output, such as an output port, of the unobfuscated layout design 3600 and the metal layer portion 3 is at a potential VDD, which is different from the ground potential. The oxide layer cut OCT3 surrounds a polysilicon PS1, which represents a gate electrode, and the oxide layer cut OCT5 surrounds a polysilicon PS2, which represents another gate electrode. Both the polysilicons PS1 and PS2 are coupled to each other to form an input, such as an input port, of the unobfuscated layout design 3600.

The n-type diffusion 3610A, the polysilicon PS1, and the n-type diffusion 3610B together form an active device, such as an NMOS transistor. Moreover, the p-type diffusion 3606A, the polysilicon PS2, and the n-type diffusion 3606B form another active device, such as a PMOS transistor.

In one embodiment, a metal layer portion of a layout design is sometimes referred to herein as a metal of the layout design.

Figure 36B:
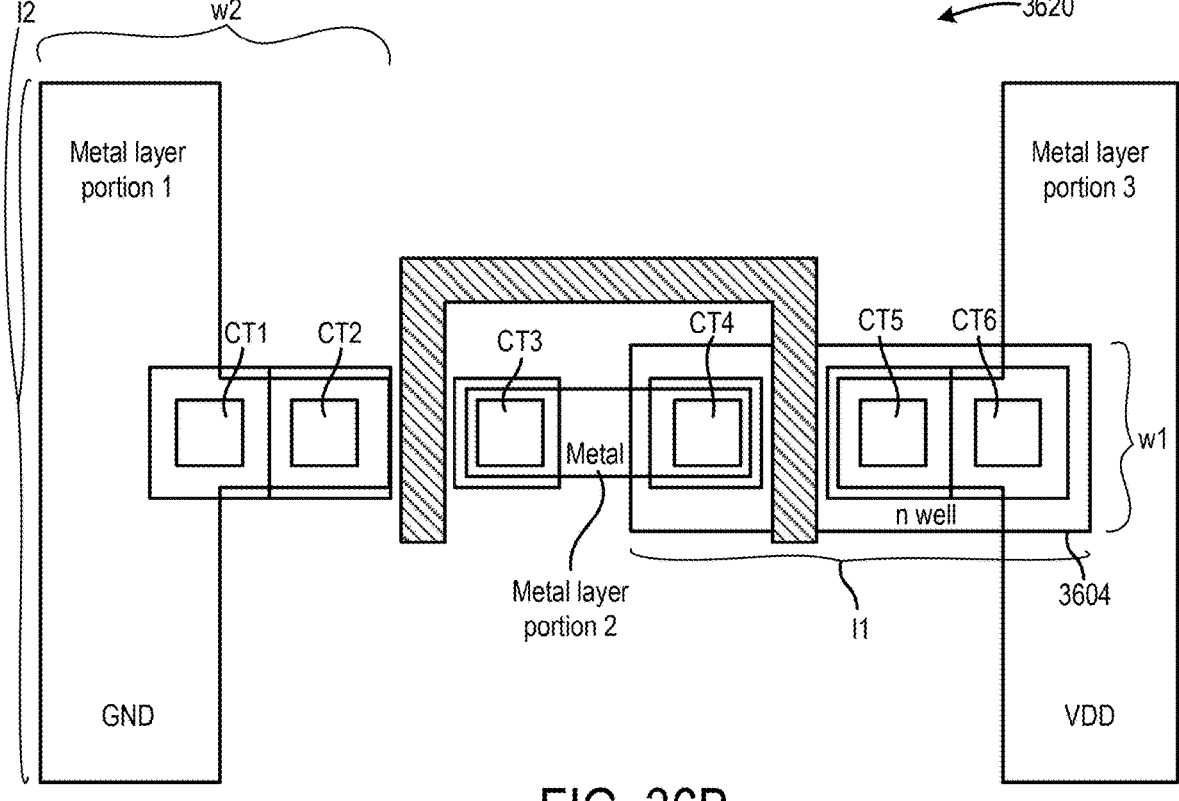
FIG. 36B is a diagram of an embodiment of a top view of the layout design of FIG. 36A.

FIG. 36B is a diagram of an embodiment of a top view 3620 of the layout design 3600 of FIG. 36A. The top view 3620 shows multiple contacts CT1, CT2, CT3, CT4, CT5, and CT6 of the layout design. The contact CT1 connects to the p-type diffusion 3612 and the contact CT2 connects to the n-type diffusion 3610A. Moreover, the contact CT3 connects to the n-type diffusion 3610B. The contact CT4 connects to the p-type diffusion 3636A. The contact CT5 connects to the p-type diffusion 3606B and the contact CT6 connects to the n-type diffusion 3608.

It should be noted that each layout feature of the layout design 3600 has a size, such as a width, a length, and a depth. For example, the n-type well 3604 has a depth d1, a width w1, and a length l1. As another example, the metal layer portion 1 has a depth d2, a width w2, and a length l2.

A1. A system for obfuscating a circuit design, comprising:
a circuit design tool configured to receive the circuit design from a user computing device via a computer network and a user account, wherein the circuit design includes a plurality of circuit components and connections between the circuit components, wherein one of the circuit components is of a different type than one of remaining of the circuit components, wherein each circuit component has an input and an output;
an obfuscator tool coupled to the circuit design tool, wherein the obfuscator tool is configured to obfuscate the types of the circuit components to generate an obfuscated design for each component; and
a layout design tool coupled to the obfuscator tool, wherein the layout design tool is configured to receive, from the user computing device via the user account and the computer network, a request for accessing the layout design tool,
wherein the obfuscator tool is configured to send the obfuscated design of each of the circuit components to the user computing device via the user account and the computer network when the request to access the layout design tool is received A2. The system of claim A1, wherein the obfuscator tool is configured to combine a first Graphics Database System (GDS) layer with a second GDS layer to generate a derived type.

A3. The system of claim A2,
wherein the first GDS layer is a type of ion implant, the second GDS layer is an active device, and the derived type is a type of diffusion, or
wherein the first GDS layer is a first polysilicon and the second GDS layer is a second polysilicon.

A4. A non-transitory computer readable medium containing program instructions for obfuscating a circuit design, wherein execution of the program instructions by one or more processors of a computer system causes the one or more processors to carry out a plurality of operations of:
receiving the circuit design from a user computing device via a computer network and a user account, wherein the circuit design includes a plurality of circuit components and connections between the circuit components, wherein one of the circuit components is of a different type than one of remaining of the circuit components, wherein each circuit components has an input and an output;
obfuscating, by an obfuscator tool, the circuit components to obfuscate the types of the circuit components to generate an obfuscated design for each component;
receiving, from the user computing device by the user account and the computer network, a request to access a layout design tool; and
sending the obfuscated design of each of the circuit components to the user computing device via the user account and the computer network upon receiving the request to access the layout design tool.

A5. The non-transitory computer readable medium of claim A4, further comprising allowing, by the layout design tool, the user account to place the obfuscated designs of the circuit components and to generate routing between the obfuscated designs to generate an integrated circuit chip design.

A6. The non-transitory computer readable medium of claim A5, further comprising:

receiving a request to access the integrated circuit chip design via another user account and the computer network;

obfuscating, by the obfuscator tool, the integrated circuit chip design to generate an obfuscated integrated circuit design; and sending the obfuscated integrated circuit design by the computer network to the other account.

A7. The non-transitory computer readable medium of claim A6, wherein the obfuscated integrated circuit design is an opaque design object that covers the types of the circuit components, the placement of the circuit components, and the routing between the circuit components.

A8. A non-transitory computer readable medium containing program instructions for obfuscating a circuit design, wherein execution of the program instructions by one or more processors of a computer system causes the one or more processors to carry out a plurality of operations of:

receiving the circuit design from a user computing device via a computer network and a user account, wherein the circuit design includes a plurality of circuit components and connections between the circuit components;

obfuscating each of the circuit components by transforming layout features associated with the circuit design into a generic layout feature representation, wherein the generic layout feature representation excludes scaled representations of the layout features, wherein said obfuscating is performed so that each circuit component is represented as an obfuscated design that has electrical characteristics of the circuit component and excludes access to the layout features of the circuit component;

generating a visual representation of the obfuscated designs, wherein each of the obfuscated designs has an input port and an output port;

enabling placement of the obfuscated designs and routing between the input ports and the output ports of the obfuscated designs; and generating an obfuscated integrated circuit design having a master input port, a master output port, the obfuscated designs, and the routing between the obfuscated designs, wherein the obfuscated integrated circuit design is accessible to simulate the circuit design without exposing the circuit design such that the simulation of the circuit design is performed while the circuit components are obfuscated.

A9. The non-transitory computer readable medium of claim A8, wherein the obfuscated integrated circuit design is an opaque object that obfuscates the circuit components and the routing between the obfuscated designs, and does not hide the master input port and the master output port.

A10. The non-transitory computer readable medium of claim A8, wherein the generic layout feature representation obfuscates a number of the layout features, wherein the scaled representations include widths, lengths, and depths of the layout features.

It should be noted that some of the above-described embodiments are described with respect to functions executed by a server, such as the management server 152. In various embodiments, the functions described herein as being performed by one server are performed by multiple servers, such as two or more servers. For example, one of the multiple servers performs some of the functions and another one of the servers performed remaining of the functions.

It should be noted that some of the above-described embodiments are described with respect to functions executed by a processor, such as a processor of the management server 152. In various embodiments, the functions described herein as being performed by one processor of a server are performed by multiple processors, such as two or more processors, of the server or of different servers. For example, one of the multiple processors performs some of the functions and another one of the processors performed remaining of the functions.

In one aspect, one or more embodiments described in the present disclosure are fabricated as computer-readable code on a computer-readable storage medium, which is a storage device or a memory device. The computer-readable storage medium holds data which is readable by a processor. Examples of the computer-readable storage medium include network attached storage (NAS), a memory device, a ROM, a RAM, a combination of RAM and ROM, a Compact Disc (CD), a Blu-ray™ disc, a flash memory, a hard disk, and a magnetic tape. The computer-readable storage medium, in one embodiment, is distributed over a network-coupled computer system so that the computer readable code is stored and executed in a distributed fashion.

In one embodiment, some features described in one of the embodiments described above are combined with some features described in another one of the embodiments described above.

Although the embodiments described in the present disclosure have been described in detail for purposes of clarity of understanding, it will be apparent that certain changes and modifications can be practiced within the scope of the appended claims. Accordingly, the embodiments are to be considered as illustrative and not restrictive, and the embodiments are not to be limited to the details given herein, but may be modified within the scope and equivalents of the appended claims.

The invention claimed is:

1. A method comprising:

accessing a plurality of parameters for designing an integrated circuit from a specification stored in a specification database;

generating a circuit design of the integrated circuit, wherein the circuit design is generated based on the plurality of parameters, wherein the circuit design is generated when access to a circuit design tool is provided via a computer network and a user account;

generating a software tool to control access by another user account to one or more portions of the circuit design;

generating a layout design based on a plurality of components of the circuit design;

generating an obfuscator tool that obfuscates each component, from the plurality of components, by transforming layout features associated with the circuit design into a generic layout feature representation that excludes scaled representations of the layout features to generate an obfuscated design;

testing the circuit design and the layout design based on the plurality of parameters to generate a plurality of test results; and providing a report including the plurality of test results.

2. The method of claim 1, wherein the plurality of parameters include a number of pins of the integrated circuit and a name of each of the pins, wherein one of the pins is configured to receive an input value and another one of the pins is configured to provide an output value based on the input value, wherein the plurality of parameters include a plurality of physical parameters of the integrated circuit, wherein the plurality of physical parameters include a size of the integrated circuit.

3. The method of claim 1, further comprising executing, by a server, the circuit design tool stored on the server, for said generating the circuit design, wherein the circuit design tool cannot be downloaded to a client device via the computer network, wherein when the circuit design tool is accessed, the client device does not display a download button to prohibit the download of the circuit design tool to the client device.

4. The method of claim 1, further comprising:

accessing another software tool for generating the layout design; and modifying, by a server, the other software tool to generate the software tool.

5. The method of claim 4, further comprising executing the software tool, wherein said executing the software tool includes:

identifying a plurality of portions of the circuit design to be associated with a plurality of blocks; and identifying one or more remaining portions of the circuit design to not be associated with respective one or more blocks.

6. The method of claim 1, further comprising:

receiving a request to access the circuit design via the other user account;

determining whether the other user account is to be allowed access to the circuit design; and executing the software tool to facilitate testing of the circuit design or the layout design via the other user account.

7. The method of claim 1, further comprising:

executing, by a server, a layout design tool stored on the server, for said generating the layout design, wherein the layout design tool cannot be downloaded to a client device via the computer network, wherein when the layout design tool is accessed, the client device does not display a download button to prohibit the download of the layout design tool to the client device.

8. The method of claim 1, wherein the plurality of parameters include a plurality of test parameters, the method further comprising:

receiving a request to access the circuit design via the other user account;

determining whether the other user account is to be allowed access to the circuit design;

executing the software tool to facilitate said testing of the circuit design via the other user account, wherein said testing the circuit design includes:

accessing the plurality of test parameters from the specification stored in the specification database;

applying the plurality of test parameters to an input of the circuit design and an output of the circuit design after said executing the software tool to output a plurality of test results;

determining whether the circuit design passes or fails a test based on the plurality of test results.

9. The method of claim 1, wherein said testing the circuit design comprises:

generating, by a server, a first test method for testing the circuit design, wherein said testing the circuit design includes applying, by the server, the first test method to the circuit design to generate a first one of the plurality of test results.

10. The method of claim 9, further comprising generating, by the server, a second test method for testing the circuit design based on the first test method, wherein said testing the circuit design comprises applying, by the server, the second test method to the circuit design to generate a second one of the plurality of test results.

11. The method of claim 10, wherein said applying the first test method includes:

instantiating a first input value to an input pin of the circuit design;

generating a first output value at an output pin of the circuit design based on the first input value; and determining whether the first output value matches a predetermined value to output a first test result, and wherein said applying the second test method includes:

instantiating a second input value to the input pin of the circuit design;

generating a second output value at an output pin of the circuit design based on the second input value; and determining whether the second output value matches a predetermined value to output a second test result.

12. The method of claim 11, further comprising generating the report including the first and second test results, wherein said providing the report includes sending the report via the computer network to a client device.

13. The method of claim 1, wherein said generating the layout design occurs after said applying the software tool to the circuit design.

14. A computer system comprising:

a processor configured to:

access a plurality of parameters for designing an integrated circuit from a specification stored in a specification database;

generate a circuit design of the integrated circuit, wherein the circuit design is generated based on the plurality of parameters, wherein the circuit design is generated when access to a circuit design tool is provided via a computer network and a user account;

generate a software tool to control access by another user account to one or more portions of the circuit design;

generate a layout design based on a plurality of components of the circuit design;

generate an obfuscator tool that is configured to overlay the layout design with an opaque portion that hides one or more proprietary layout features while enabling routing between input ports and output ports;

test the circuit design and the layout design based on the plurality of parameters to generate a plurality of test results; and provide a report including the plurality of test results; and a memory device coupled to the processor.

15. The computer system of claim 14, wherein the plurality of parameters include a number of pins of the integrated circuit and a name of each of the pins, wherein one of the pins is configured to receive an input value and another one of the pins is configured to provide an output value based on the input value, wherein the plurality of parameters include a plurality of physical parameters of the integrated circuit, wherein the plurality of physical parameters include a size of the integrated circuit.

16. The computer system of claim 14, wherein the processor is configured to execute the circuit design tool stored in the memory device to generate the circuit design, wherein the processor is configured to not allow a download of the circuit design tool to a client device via the computer network, wherein when the circuit design tool is accessed, the client device does not display a download button to prohibit the download of the circuit design tool to the client device.

17. The computer system of claim 14, wherein the processor is configured to:

access another software tool for generating the layout design; and modify the other software tool to generate the software tool.

18. The computer system of claim 14, wherein the processor is configured to:

generate a first test method for testing the circuit design, wherein to test the circuit design, the processor is configured to apply the first test method to the circuit design to generate a first one of the plurality of test results; and generate a second test method for testing the circuit design based on the first test method, wherein to test the circuit design, the processor is configured to apply the second test method to the circuit design to generate a second one of the plurality of test results.

19. The computer system of claim 18, wherein to apply the first test method, the processor is configured to:

instantiate a first input value to an input pin of the circuit design;

generate a first output value at an output pin of the circuit design based on the first input value; and determine whether the first output value matches a predetermined value to output a first test result, and wherein to apply the second test method, the processor is configured to:

instantiate a second input value to the input pin of the circuit design;

generate a second output value at an output pin of the circuit design based on the second input value; and determine whether the second output value matches a predetermined value to output a second test result, wherein the processor is configured to generate the report including the first and second test results, wherein to provide the report, the processor is configured to send the report via the computer network to a client device.

* * * * *